United States Patent [19]

Morton

[11] Patent Number: 5,014,235
[45] Date of Patent: May 7, 1991

[54] CONVOLUTION MEMORY

[75] Inventor: Steven G. Morton, 39 Old Good Hill Rd., Oxford, Conn. 06483

[73] Assignee: Steven G. Morton, Oxford, Conn.

[21] Appl. No.: 133,011

[22] Filed: Dec. 15, 1987

[51] Int. Cl.⁵ ............................................. G06F 7/52
[52] U.S. Cl. ................................. 364/900; 364/927.8; 364/923.5; 364/939.3; 364/754
[58] Field of Search ... 364/200 MS File, 900 MS File, 364/754

[56] References Cited

U.S. PATENT DOCUMENTS

| | | | |
|---|---|---|---|
| 3,440,611 | 4/1969 | Falkoff et al. | 364/200 |
| 4,150,434 | 4/1979 | Shibayama et al. | 364/728.01 |
| 4,347,580 | 8/1982 | Bond | 364/728.01 |
| 4,489,393 | 12/1984 | Kawahara et al. | 364/728.01 |
| 4,493,048 | 1/1985 | Kung et al. | 364/754 |
| 4,593,373 | 6/1986 | Kiuchi et al. | 364/900 X |
| 4,750,144 | 6/1988 | Wilcox | 364/728.01 |
| 4,754,412 | 6/1988 | Deering | 364/736 |
| 4,777,614 | 10/1988 | Ward | 364/754 |

Primary Examiner—Thomas M. Heckler
Attorney, Agent, or Firm—Harry Smith

[57] ABSTRACT

Method and apparatus including a system of integrated ciruit devices for executing matrix operations of the form [A] operated upon by [B] equals [C], where [A], [B] and [C] are each a matrix having a plurality of elements expressed in either unsigned or in two's complement format. The system includes at least one first array of data storage means organized as (j) physical rows and (k) physical columns of bits for providing storage for one bit of each of a plurality of elements of a row vectors of the matrix [A], an individual one of the (j) rows having bits of the same binary weight. The system further includes at least one second array of data storage means organized as (m) physical rows and (n) physical columns of bits, an individual one of the (m) rows storing a same binary weight bit or each of a plurality of elements of a column vector of the matrix [B]. The system further includes a processing device for processing in a predetermined manner a specified one of the (j) rows of the first array of data storage means with a specified one of the (m) rows of the second array of data storage means for producing a plurality of (x) output bits. The system also includes logic for determining a number of the output bits having a specified logic state and logic for determining a dot product.

20 Claims, 110 Drawing Sheets

Figure 1A
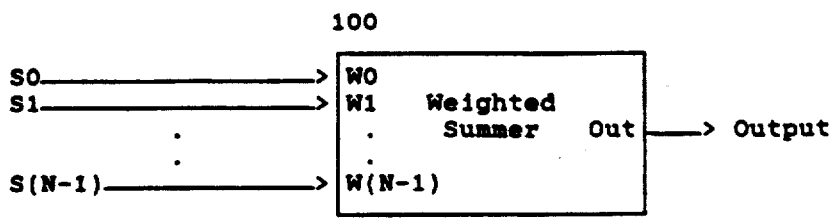
Where:
Output = W * S = (W0*S0) + (W1*S1) + ... + ([W(N-1)]*[S(W-1)])
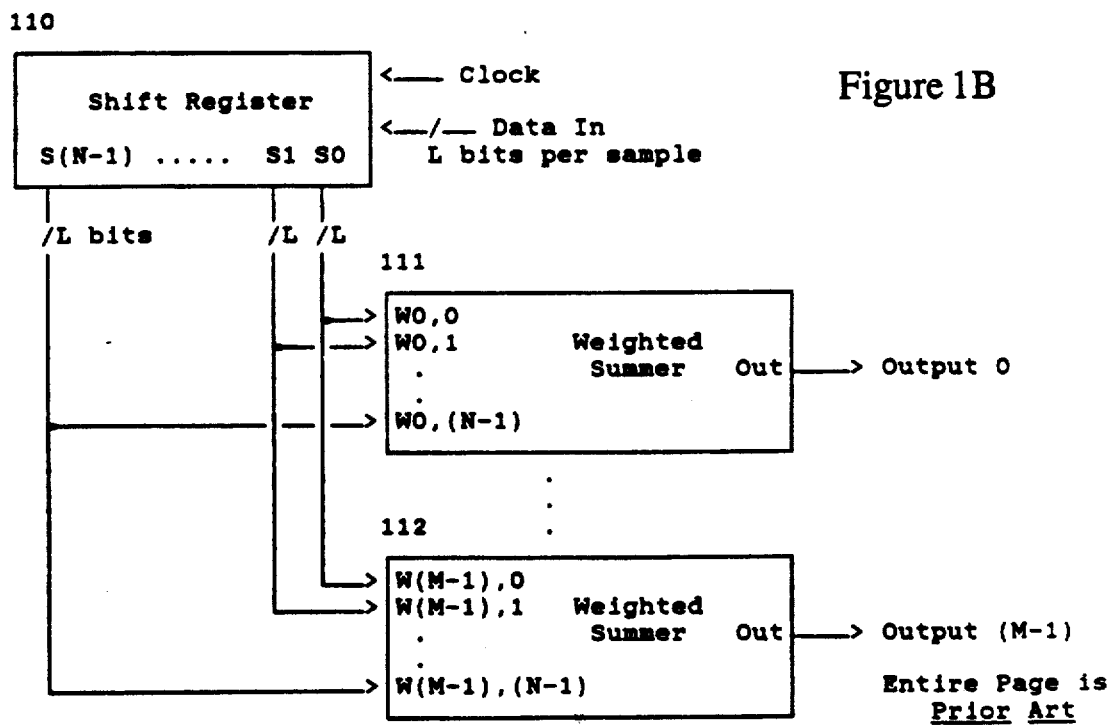
Figure 1B
Entire Page is Prior Art
Where:
Output = [W] * S = ((W0\*S) + (W1\*S) + ... + ([W(M-1)]\*S))

Prior Art

Entire Page is Prior Art

Figure 2A $$\begin{vmatrix} A0 & A1 & A2 & A3 \\ B0 & B1 & B2 & B3 \\ C0 & C1 & C2 & C3 \\ D0 & D1 & D2 & D3 \end{vmatrix} * \begin{vmatrix} S0 \\ S1 \\ S2 \\ S3 \end{vmatrix} = \begin{vmatrix} W0 \\ W1 \\ W2 \\ W3 \end{vmatrix}$$
   200              201        202 where:

W0 = (A0*S0 + A1*S1 + A2*S2 + A3*S3)
W1 = (B0*S0 + B1*S1 + B2*S2 + B3*S3)
W2 = (C0*S0 + C1*S1 + C2*S2 + C3*S3)
W3 = (D0*S0 + D1*S1 + D2*S2 + D3*S3)

Figure 2B $$\begin{vmatrix} A0 & A1 & A2 & A3 \\ B0 & B1 & B2 & B3 \\ C0 & C1 & C2 & C3 \\ D0 & D1 & D2 & D3 \end{vmatrix} * \begin{vmatrix} S0 & T0 & U0 & V0 \\ S1 & T1 & U1 & V1 \\ S2 & T2 & U2 & V2 \\ S3 & T3 & U3 & V3 \end{vmatrix} = \begin{vmatrix} W0 & X0 & Y0 & Z0 \\ W1 & X1 & Y1 & Z1 \\ W2 & X2 & Y2 & Z2 \\ W3 & X3 & Y3 & Z3 \end{vmatrix}$$
              203                        204                            205

Is equivalent to:

$$\left(\begin{vmatrix} A0..A3 \\ B0..B3 \\ C0..C3 \\ D0..D3 \end{vmatrix} * \begin{vmatrix} S0 \\ S1 \\ S2 \\ S3 \end{vmatrix} = \begin{vmatrix} W0 \\ W1 \\ W2 \\ W3 \end{vmatrix}\right) + \left(\begin{vmatrix} A0..A3 \\ B0..B3 \\ C0..C3 \\ D0..D3 \end{vmatrix} * \begin{vmatrix} T0 \\ T1 \\ T2 \\ T3 \end{vmatrix} = \begin{vmatrix} X0 \\ X1 \\ X2 \\ X3 \end{vmatrix}\right) +$$
                    206                                       209

$$\left(\begin{vmatrix} A0..A3 \\ B0..B3 \\ C0..C3 \\ D0..D3 \end{vmatrix} * \begin{vmatrix} U0 \\ U1 \\ U2 \\ U3 \end{vmatrix} = \begin{vmatrix} Y0 \\ Y1 \\ Y2 \\ Y3 \end{vmatrix}\right) + \left(\begin{vmatrix} A0..A3 \\ B0..B3 \\ C0..C3 \\ D0..D3 \end{vmatrix} * \begin{vmatrix} V0 \\ V1 \\ V2 \\ V3 \end{vmatrix} = \begin{vmatrix} Z0 \\ Z1 \\ Z2 \\ Z3 \end{vmatrix}\right)$$
                    212                                       215

Figure 2C $$\begin{vmatrix} A0..A3 \\ B0..B3 \\ C0..C3 \\ D0..D3 \end{vmatrix} * \begin{vmatrix} S0 \\ S1 \\ S2 \\ S3 \end{vmatrix}$$ is equivalent to:
       218           219

$$\left(\begin{vmatrix} A0 & A1 & 0 & 0 \\ B0 & B1 & 0 & 0 \\ 0 & 0 & 0 & 0 \\ 0 & 0 & 0 & 0 \end{vmatrix} * \begin{vmatrix} S0 \\ S1 \\ 0 \\ 0 \end{vmatrix}\right) + \left(\begin{vmatrix} 0 & 0 & 0 & 0 \\ 0 & 0 & 0 & 0 \\ C0 & C1 & 0 & 0 \\ D0 & D1 & 0 & 0 \end{vmatrix} * \begin{vmatrix} S0 \\ S1 \\ 0 \\ 0 \end{vmatrix}\right) +$$
                   220             221                         223

$$\left(\begin{vmatrix} 0 & 0 & A2 & A3 \\ 0 & 0 & B2 & B3 \\ 0 & 0 & 0 & 0 \\ 0 & 0 & 0 & 0 \end{vmatrix} * \begin{vmatrix} 0 \\ 0 \\ S2 \\ S3 \end{vmatrix}\right) + \left(\begin{vmatrix} 0 & 0 & 0 & 0 \\ 0 & 0 & 0 & 0 \\ 0 & 0 & C2 & C3 \\ 0 & 0 & D2 & D3 \end{vmatrix} * \begin{vmatrix} 0 \\ 0 \\ S2 \\ S3 \end{vmatrix}\right)$$
                   224             225                         227

Entire Page is <u>Prior Art</u>

Figure 3
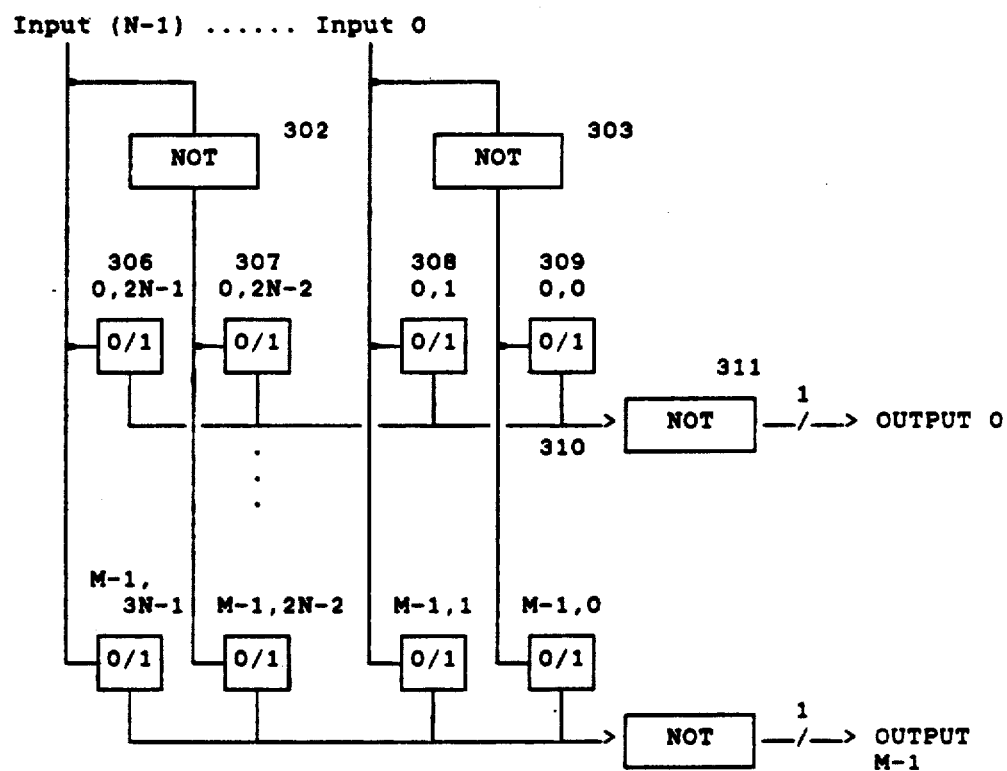
Storage Cell Operation
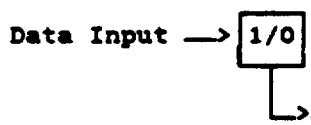
Truth Table for Reading
| Data Input | Stored Value | Cell Output |
|---|---|---|
| don't care | 0 | High-Z 1 |
| 0 | 1 | High-Z 1 |
| 1 | 1 | Low-Z 0 |
Prior Art Legend: —R— represents a resistor that is connected between a horizontal (——) and a vertical ( | ) conductor.

Prior Art

Legend: —P— represents a phototransistor whose source and drain are connected between the horizontal (——) and vertical ( | ) conductors.

Prior Art

Storage Cell Operation

Symbol

Data Input ──▶ [C] ──▶ Data Output
              ▲
              └── Select

Truth Table

| Data Input | Select | Data Output |
|---|---|---|
| don't care | 0 | High-Z |
| 0 | 1 | 0 |
| 1 | 1 | 1 |

Figure 8A

|  | Col Addr 2 | Col Addr 1 | Col Addr 0 |
|---|---|---|---|
| Row Address 0: | (V0,0 - V1,0) | (V0,1 - V1,1) | (V0,2 - V1,2) |
| Row Address 1: | (V2,0 - V3,0) | (V2,1 - V3,1) | (V2,2 - V3,2) |
| Row Address 2: | (V4,0 - V5,0) | (V4,1 - V5,1) | (V4,2 - V6,2) |
| Row Address 3: | (V6,0 - V7,0) | (V6,1 - V7,1) | (V6,2 - V7,2) |

Note: each row of these coefficients comes from a ROW of Figure 4B.

Figure 8B

|  | Col Addr 3 | Col Addr 2 | Col Addr 1 | Col Addr 0 |
|---|---|---|---|---|
| Row Address 0: | (H0,0 - H1,0) | (H0,1 - H1,1) | (H0,2 - H1,2) | (H0,3 - H1,3) |
| Row Address 1: | (H2,0 - H3,0) | (H2,1 - H3,1) | (H2,2 - H3,2) | (H2,3 - H3,3) |
| Row Address 2: | (H4,0 - H5,0) | (H4,1 - H5,1) | (H4,2 - H5,2) | (H4,3 - H5,3) |

Note: each row of these coefficients comes from a COLUMN of Figure 4B.

Figure 9A $$\begin{vmatrix} (V0,0 - V1,0) & (V0,1 - V1,1) & (V0,2 - V1,2) \\ (V2,0 - V3,0) & (V2,1 - V3,1) & (V2,2 - V3,2) \\ (V4,0 - V5,0) & (V4,1 - V5,1) & (V4,2 - V6,2) \\ (V6,0 - V7,0) & (V6,1 - V7,1) & (V6,2 - V7,2) \end{vmatrix} * \begin{vmatrix} AV0 \\ AV1 \\ AV2 \end{vmatrix}$$

$$= \begin{vmatrix} [(V0,0-V1,0)AV0 + (V0,1-V1,1)AV1 + (V0,2-V1,2)AV2] \\ [(V2,0-V3,0)AV0 + (V2,1-V3,1)AV1 + (V2,2-V3,2)AV2] \\ [(V4,0-V5,0)AV0 + (V4,1-V5,1)AV1 + (V4,2-V6,2)AV2] \\ [(V6,0-V7,0)AV0 + (V6,1-V7,1)AV1 + (V6,2-V7,2)AV2] \end{vmatrix}$$

Figure 9B $$\begin{vmatrix} (H0,0 - H1,0) & (H0,1 - H1,1) & (H0,2 - H1,2) & (H0,3 - H1,3) \\ (H2,0 - H3,0) & (H2,1 - H3,1) & (H2,2 - H3,2) & (H2,3 - H3,3) \\ (H4,0 - H5,0) & (H4,1 - H5,1) & (H4,2 - H5,2) & (H4,3 - H5,3) \end{vmatrix} * \begin{vmatrix} AH0 \\ AH1 \\ AH2 \\ AH3 \end{vmatrix}$$

$$= \begin{vmatrix} [(H0,0-H1,0)AH0 + (H0,1-H1,1)AH1 + (H0,2-H1,2)AH2 + (H0,3-H1,3)AH3] \\ [(H2,0-H3,0)AH0 + (H2,1-H3,1)AH1 + (H2,2-H3,2)AH2 + (H2,3-H3,3)AH3] \\ [(H4,0-H5,0)AH0 + (H4,1-H5,1)AH1 + (H4,2-H5,2)AH2 + (H4,3-H5,3)AH3] \end{vmatrix}$$

Figure 10

| Criteria | Analog E-O BAM (p.a.) | Digital BAM |
| --- | --- | --- |
| 1. Weight Application | optical stimulation of photomask affects conductance of phototransistors | digital multiplication of stored value; no optical inputs |
| 2. Programmability | fixed photomask, possible volume hologram | semiconductor memory; technology depends upon the application |
| 3. Match Selection | no - best match only | yes - fully maskable |
| 4. Circuit Activity | massively parallel, continuous feedback | highly parallel, sampled data system |
| 5. Weight Accuracy and Resolution | several : 1, many : 1 | unlimited but affects the number of chips required |
| 6. Min. Chip Count (for similar size die, technology, and matrix dimensions) | 1 | 5 |
| 7. Chip Count vs Accuracy and Resolution | fixed, set by noise and drift | chip count increases with accuracy and resolution |
| 8. Settling Time for 64 points | 5-50 uS (est) time constant, 100uS total | 5uS (est)/iteration with 32MHz clock |
| 9. Settling Time vs Accuracy and Resolution | increases | increases linearly or may plateau with increased parallelism |
| 10. Network Bandwidth | 10's to 100's KHz (est) for 64 * 64 matrix | programmable, independent of matrix size |
| 11. Max. Matrix Size | 256 (est), set by noise and drift | unlimited |
| 12. Typ. Matrix Size | 64 * 64 | 256 * 256 |
| 13. Temperature Stability | req. constant temp. for max. accuracy | meets military requirements |
| 14. Process Sensitivity | gain, photo gain, and DC offsets | negligible - digital technology |
| 15. Pin Count | grows with number of neurons | largely fixed (about 50 for main chip) |

Note: "p.a." is prior art

Note:

Control = (1) Matrix Control, (2) Processor Control, and (3) Buffer Control.

Figure 12C

| Pin Name | Pin Count | Function |
|---|---|---|
| I. Matrix Memory | | |
| A. Control | | |
| 1. Matrix Address | 8 | input, muxed row/col address |
| 2. Matrix Chip Select | 1 | input |
| 3. Matrix Address Control | 2 | input, is decoded |
| 4. Matrix Read/Write | 1 | input, write = 1 |
| 5. Matrix Write Strobe | 1 | input |
| B. Data | | |
| 1. Matrix Data | 1 | input/output |
| II. Processor | | |
| 1. Dot Product Output Enable | 1 | input |
| 2. Dot Product Out | 9 | output |
| 3. Processor Control | 1 | input |
| III. Buffer Memory | | |
| A. Control | | |
| 1. Buffer Address | 8 | input |
| 2. Buffer Chip Select | 1 | input |
| 3. Buffer Address Control | 3 | input, is decoded |
| 4. Buffer Read/Write | 1 | input, write = 1 |
| 5. Buffer Strobe | 1 | input, for reading and writing, doubles as Clock (Clk) |
| B. Data | | |
| 1. Buffer Data | 8 | input/output |
| IV. Common | | |
| 1. Power, Ground, Reset | 3 | |
| Total: | 50 | |

Figure 12D
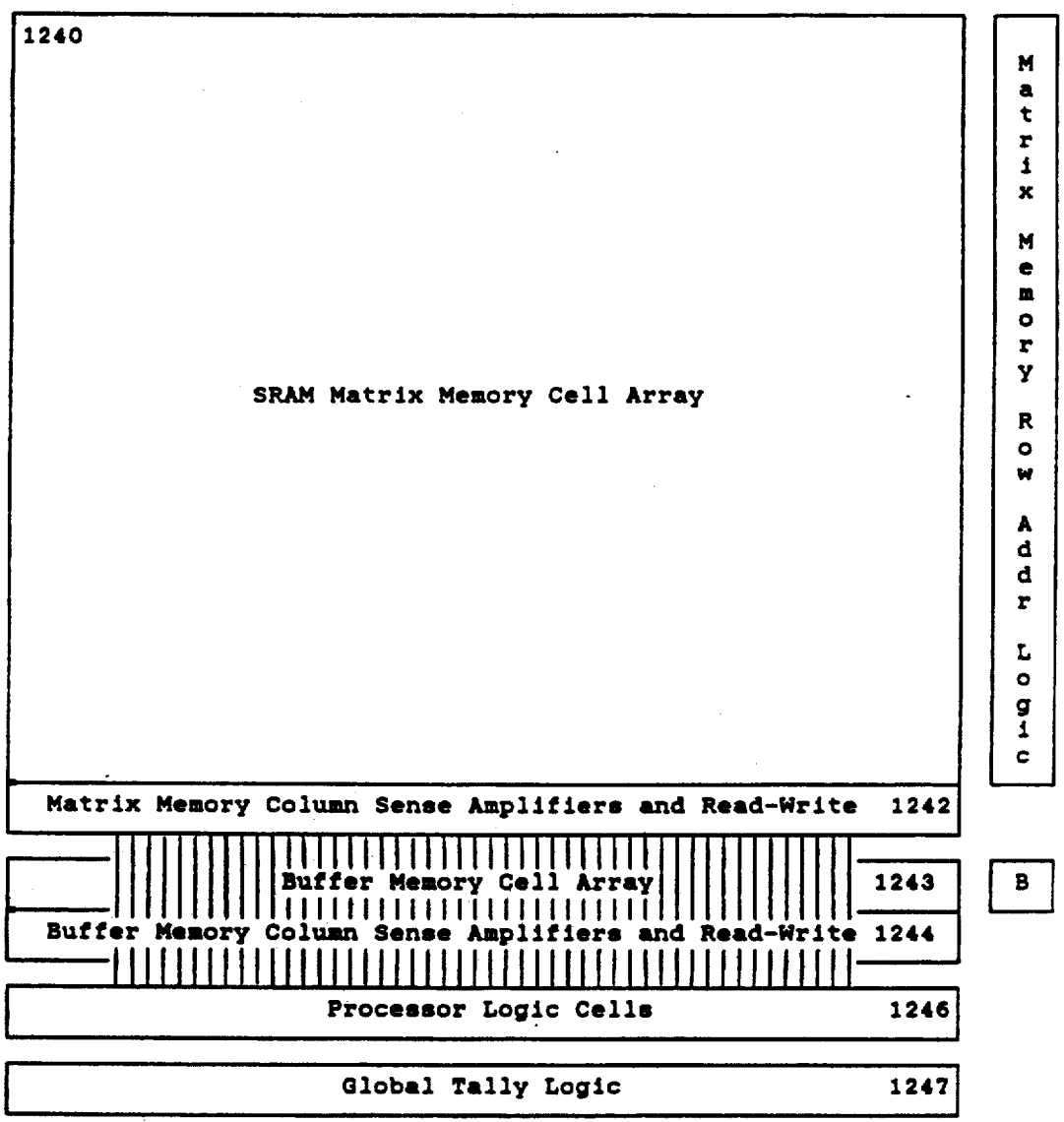
Legend: Scale: 
B — (1) Buffer Memory Row Address Logic and (2) Row Sense Amplifier and Read/Write Logic Memory Cell Operation

| Symbol | Truth Table | | | | |
|---|---|---|---|---|---|
| | Function | Data | Data- | Cell State | Select |
| | hold | High-Z | High-Z | C - no change | 0 |
| | read | C Medium-Z | C- Medium-Z | C - no change | 1 |
| | write | D Low-Z | D- Low-Z | D -> C | 1 |

Figure 13D
Symbol
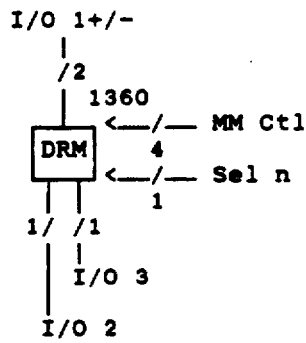
Detailed Design
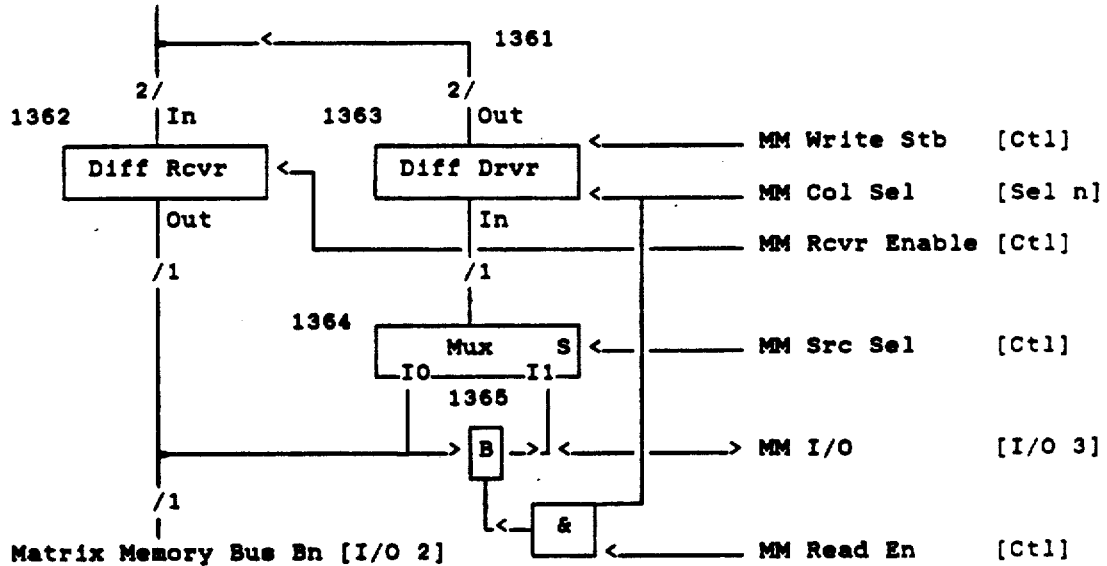
Legend:
B - tri-state buffer

Figure 14C

I. Matrix Control 0. matrix write (and apply column address)
1. matrix row address select
2. matrix low limit select
3. matrix high limit select II. Processor Control 0. no-op
1. run III. Buffer Control 0. buffer write (and apply column address)
1. buffer row address select
2. buffer low limit select
3. buffer high limit select
4. buffer clear row
5. buffer set row
6. --unused--
7. --unused--

Figure 14D

I. Matrix Memory Row Address Logic (Figure 13A)

1. Mat Low Limit Stb - matrix low limit select state AND Matrix Chip Select AND Matrix Stb AND Matrix Read/Write.

2. Mat High Limit Stb - matrix high limit select state AND Matrix Chip Select AND Matrix Stb AND Matrix Read/Write.

3. Run - run state.

4. Matrix Row Address Strobe - matrix row address select state AND Matrix Chip Select AND Matrix Stb AND Matrix Read/Write.

5. Matrix Row Strobe - logic "1".

II. Matrix Memory Driver/Receiver/Multiplexer (Figure 13D)

1. MM Write Stb - matrix write state AND Matrix Stb AND Matrix Read/Write AND Matrix Chip Select.

2. MM Rcvr Enable - logic "1" (for future expansion)

3. MM Src Sel - logic "1" (for future expansion)

4. MM Read En - Matrix Chip Select AND (NOT Matrix Read/Write).

III. Cell Control (Figure 14B)

1. Load Mask - buffer set row state AND buffer strobe AND buffer read/write AND BM Row Select 17.

2. Clear Mask - buffer clear row state AND buffer strobe AND buffer read/write AND BM Row Select 17.

Figure 14D, cont.

IV. Buffer Memory Row Address Logic (Figure 15A)

1. Bfr Low Lim Stb - buffer low limit select state AND Buffer Chip Select AND Buffer Read/Write AND Buffer Stb.

2. Bfr High Lim Stb - buffer high limit select state AND Buffer Chip Select AND Buffer Read/Write AND Buffer Stb.

3. Run - run state.

4. Buffer Row Addr Stb - buffer row address select state AND Buffer Chip Select AND Buffer Read/Write AND Buffer Stb.

5. Buffer Row Strobe - logic "1".

V. Buffer Memory (Figure 15B)

1. BM Row Stb - logic "1".

VI. Buffer Memory Row Driver/Receiver (Figures 15D & E)

1. BM RDR Pchg - (NOT buffer read/write) AND buffer strobe AND buffer chip select AND buffer stb leading edge.

2. BM RDR Write - buffer write state AND buffer read/write AND buffer strobe AND buffer chip select.

VII. Buffer Memory Column Driver/Receiver (Figure 15F)

1. BM CDR Ctl 0 (Pchg) - run state AND buffer stb leading edge.

2. BM CDR Ctl 1 (Clr) - buffer clear row state AND buffer chip select AND buffer strobe AND buffer read/write.

Figure 15C, part 1 of 2
Symbol:
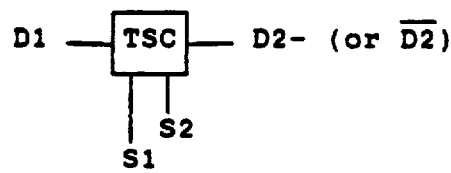
Truth Table:
| Function | S1 | D1 | S2 | D2- |
|---|---|---|---|---|
| hold | 0 | x | 0 | x |
| Read Row | 1 | C Med-Z | x | x |
| Clear Row | 1 | 0 Low-Z | 0 | x |
| Read Column | x | x | 1 | C- Med-Z |
| Set Column | 0 | x | 1 | 0 Low-Z |

Figure 15C, part 2 of 2
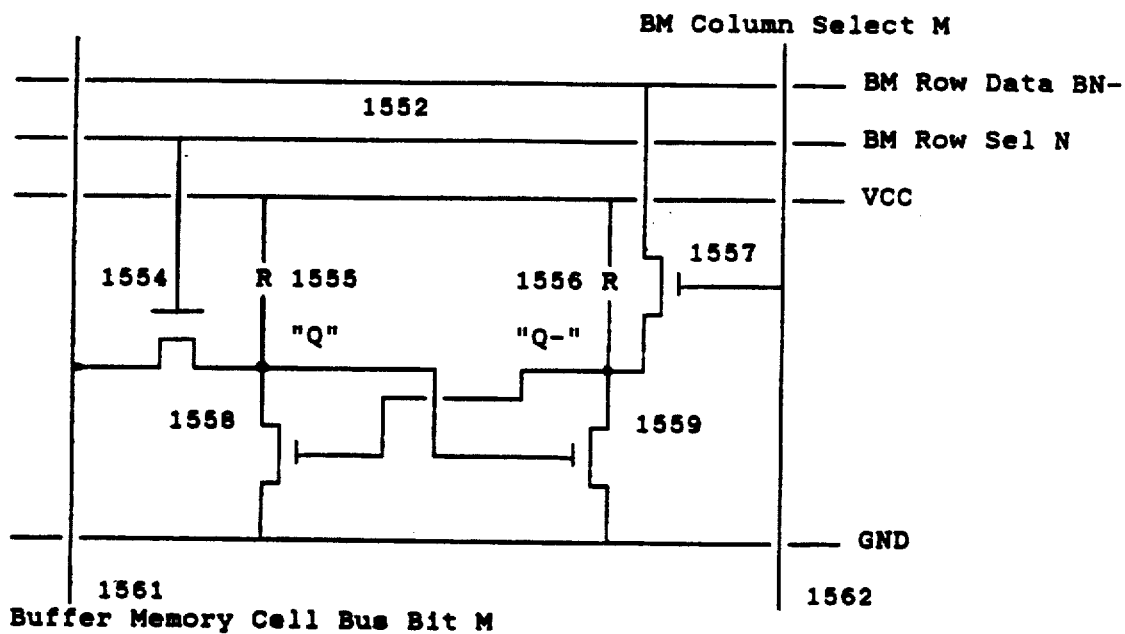
Legend:
R is a resistor

Symbol

Truth Table

| Function | BM Row Data | Buffer Data | Select | RDR Pchg | RDR Write |
|---|---|---|---|---|---|
| no-op | High-Z | High-Z | 0 | x | x |
| Read Precharge | 1 Med-Z | High-Z | 1 | 1 | 0 |
| Read | Bm | Bm- Low-Z | 1 | 0 | 0 |
| Write | Bn- Low-Z | Bn | 1 | 0 | 1 |

Note:

A buffer memory transpose storage cell may only be set from the row lines using inverted data. It is cleared from the column lines using true data.

Figure 15F
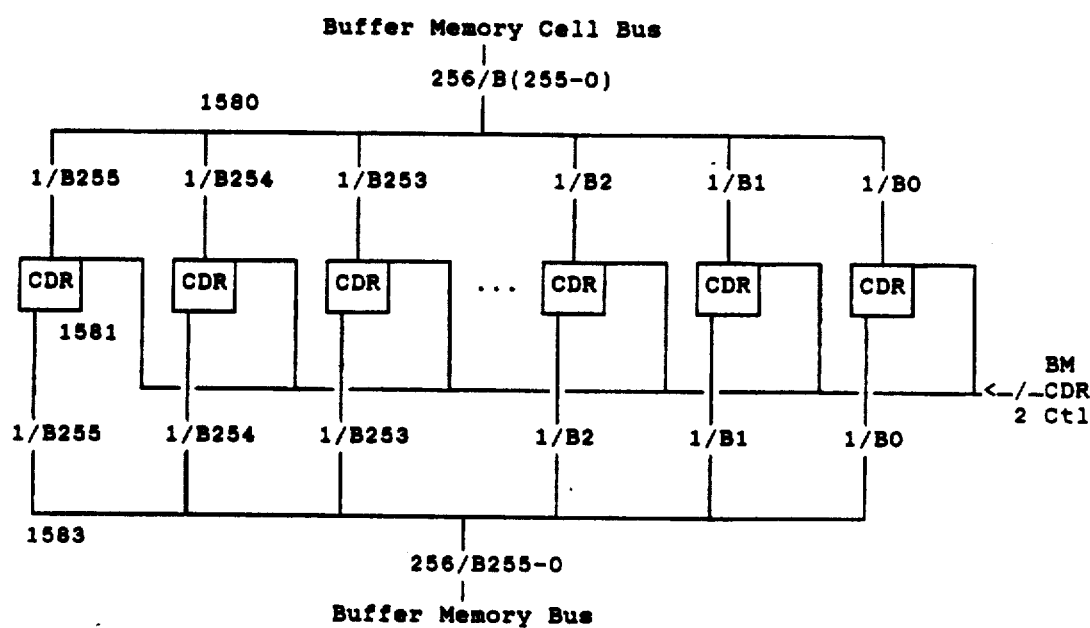
Symbol
Data In
CDR   <-/- CDR Ctl 0,
    2   CDR Ctl 1
Data Out
Truth Table
| Function | Data In | Data Out | CDR Ctl 1 | CDR Ctl 0 |
|---|---|---|---|---|
| Precharge | 1 Med-Z | x | 0 | 1 |
| Read | x | Data In Low-Z | 0 | 0 |
| Clear | 0 Low-Z | x | 1 | 0 |

ALU functions:

0. AIN plus BIN, each cycle except as noted below
    1. AIN, first cycle for each element (Column-Vector Out is read during this cycle)
    2. BIN minus AIN, last cycle for each 2's complement element

Figure 19

Assumptions:

1. convolution memory chip M, M = 0 to BWM - 1, stores one bit of each element of the weight matrix, where the weight of each bit is 0 or $2^M$, unless 2's complement weights are used, in which case convolution memory chip BWM - 1 stores bits with weight 0 or $-(2^M)$.
2. the weight of bit N, N = 0 to BICV - 1, in each element of the input column vector is 0 or $2^N$, unless 2's complement arithmetic is used, in which case bit BICV - 1 has a weight of 0 or $-(2^N)$.
3. 2's complement is used.
4. all rows and all columns are active.

Definitions:

1. the number of bits in each element of the input column vector is BICV.
2. the number of bits in each element of the weight matrix is BWM.
3. the number of columns in the weight matrix is CWM.
4. the number of rows in the weight matrix is RWM.
5. the row index is RI.
6. the input column vector bit index is ICVBI.

Loop0:   Wait for input column vector and weight matrix to be ready;
         RI = 0;

Loop1:   ALU = 0;
         ICVBI = 0; do all bits for a row, then do next row;

Loop2:   For all convolution memories simultaneously, n = 0 to BWM - 1;
                  DPO(n) = Input_Column_Vector (Bit ICVBI) DOT Weight_Matrix (Row RI);
                  Endfor;
                  Adder_Tree_Output = [2^0](DPO(0)) + [2^1](DPO(1)) + ... + [2^(BICV-2)](DPO(BWM-2)) - [2^(BICV-1)](DPO(BWM-1));
                  If ICVBI = 0, then ALU = Adder_Tree_Output;
                  If 0 < ICVBI < BICV - 1, then ALU = (1/2 * ALU) + Adder_Tree_Output;
                  If ICVBI = BICV - 1, then ALU = (1/2 * ALU) - Adder_Tree_Output;
                  ICVBI = ICVBI + 1;
                  If ICVBI < BICV then GOTO Loop2;

Output_Column_Vector (Element RI) = ALU * 2^(BICV-1);
         RI = RI + 1;
         If RI < RIWM then GOTO Loop1;

GOTO Loop0;

Figure 20A

Matrix     *     Vector     =     Product

In Decimal Representation:

```
[ -8  6 -4  2 ]          [ -7 ]              [  40 ]
[  0 -2  4 -6 ]    *     [ -3 ]      =       [ -24 ]
            2000         [  3 ]                     2002
                         [  7 ] <--2001
```

In 2's Complement Binary Representation:

```
                                                    ┌─RESULT A
[ 1000 0110 1100 0010 ]    [ 1001 ]        [ 0101000 ]
[ 0000 1110 0100 1010 ]  * [ 1101 ]    =   [ 1101000 ]
                   2003    [ 0011 ]  2005  └─RESULT B
                           [ 0111 ] <--2004
```

Binary contents of convolution memories CM3 - CM0:

```
        Matrix: [ 1000 0110 1100 0010 ] <── Row 0
                [ 0000 1110 0100 1010 ] <── Row 1
                   ·    ·    ·    ·   ──CM0 (bit 0)
                    ·    ·    ·    ·  ──CM1 (bit 1)
                     ·    ·    ·    · ──CM2 (bit 2)
                      ·    ·    ·    ·──CM3 (bit 3 --- sign bit)
```

```
                    CM3           CM2           CM1           CM0
                   2007          2008          2009          2010
Matrix memory row 0: [ 1 0 1 0 ]  [ 0 1 1 0 ]  [ 0 1 0 1 ]  [ 0 0 0 0 ]
Matrix memory row 1: [ 0 1 0 1 ]  [ 0 1 1 0 ]  [ 0 1 0 1 ]  [ 0 0 0 0 ]
Element:              0 1 2 3      0 1 2 3      0 1 2 3      0 1 2 3
```

Binary contents of buffer memories in all convolution memories:

```
2011
   [ 1001 ] <── element 0
   [ 1101 ] <── element 1
   [ 0011 ] <── element 2
   [ 0111 ] <── element 3            element:  0 1 2 3
        ·──── buffer memory row 0 - bit 0 = [ 1 1 1 1 ]
         ·─── buffer memory row 1 - bit 1 = [ 0 0 1 1 ]
          ·── buffer memory row 2 - bit 2 = [ 0 1 0 1 ]
           ·─ buffer memory row 3 - bit 3 = [ 1 1 0 0 ] (sign bit)
```

Figure 20B

Sequence of operations for minimum latency, maximum buffer size:

```
STEP 0.                     CM3           CM2           CM1           CM0

Matrix memory row 0:    [ 1 0 1 0 ]   [ 0 1 1 0 ]   [ 0 1 0 1 ]   [ 0 0 0 0 ]
Buffer memory row 0:    [ 1 1 1 1 ]   [ 1 1 1 1 ]   [ 1 1 1 1 ]   [ 1 1 1 1 ]
Bit-wise AND:             1 0 1 0       0 1 1 0       0 1 0 1       0 0 0 0
Tally (# of 1's):         0 0 1 0       0 0 1 0       0 0 1 0       0 0 0 0
Summation of                                                   └──> + 0 0 1 0
  weighted tallies:                                   └─────────> + 0 0 1 0
                                        └────2's complement────> + 1 1 1 0
Result 0,0:                                                      = 1 1 1 1 1 0 0

STEP 1.                     CM3           CM2           CM1           CM0

Matrix memory row 0:    [ 1 0 1 0 ]   [ 0 1 1 0 ]   [ 0 1 0 1 ]   [ 0 0 0 0 ]
Buffer memory row 1:    [ 0 0 1 1 ]   [ 0 0 1 1 ]   [ 0 0 1 1 ]   [ 0 0 1 1 ]
Bit-wise AND:             0 0 1 0       0 0 1 0       0 0 0 1       0 0 0 0
Tally (# of 1's):         0 0 0 1       0 0 0 1       0 0 0 1       0 0 0 0
Summation of                                                   └──> + 0 0 0 1
  weighted tallies:                                   └─────────> + 0 0 0 1
                                        └────2's complement────> + 1 1 1 1
Result 0,1:                                                      = 1 1 1 1 1 1 0

STEP 2.                     CM3           CM2           CM1           CM0

Matrix memory row 0:    [ 1 0 1 0 ]   [ 0 1 1 0 ]   [ 0 1 0 1 ]   [ 0 0 0 0 ]
Buffer memory row 2:    [ 0 1 0 1 ]   [ 0 1 0 1 ]   [ 0 1 0 1 ]   [ 0 1 0 1 ]
Bit-wise AND:             0 0 0 0       0 1 0 0       0 1 0 1       0 0 0 0
Tally (# of 1's):         0 0 0 0       0 0 0 1       0 0 1 0       0 0 0 0
Summation of                                                   └──> + 0 0 1 0
  weighted tallies:                                   └─────────> + 0 0 0 1
                                        └────2's complement────> + 0 0 0 0
Result 0,2:                                                      = 0 0 0 1 0 0 0

STEP 3.                     CM3           CM2           CM1           CM0

Matrix memory row 0:    [ 1 0 1 0 ]   [ 0 1 1 0 ]   [ 0 1 0 1 ]   [ 0 0 0 0 ]
Buffer memory row 3:    [ 1 1 0 0 ]   [ 1 1 0 0 ]   [ 1 1 0 0 ]   [ 1 1 0 0 ]
Bit-wise AND:             1 0 0 0       0 1 0 0       0 1 0 0       0 0 0 0
Tally (# of 1's):         0 0 0 1       0 0 0 1       0 0 0 1       0 0 0 0
Summation of                                                   └──> + 0 0 0 1
  weighted tallies:                                   └─────────> + 0 0 0 1
                                        └────2's complement────> + 1 1 1 1
Result 0,3:                                                      = 1 1 1 1 1 1 0

Product formation:

Result 0,0: (sign extended)              1 1 1,1 1 1 1 0 0
Result 0,1: (sign extended, scaled)    + 1 1,1 1 1 1 1 0
Result 0,2: (sign extended, scaled)    + 0,0 0 0 1 0 0 0
Result 0,3: (2's complement, scaled)   + 0 0 0 0 0 1 0
Dot-Product Out: (RESULT A)            = 0 0 0 0 1 0 1 0 0 0
```

Figure 20C

```
STEP 4.                       CM3           CM2           CM1           CM0

Matrix memory row 1:  [ 0 1 0 1 ]   [ 0 1 1 0 ]   [ 0 1 0 1 ]   [ 0 0 0 0 ]
Buffer memory row 0:  [ 1 1 1 1 ]   [ 1 1 1 1 ]   [ 1 1 1 1 ]   [ 1 1 1 1 ]
Bit-wise AND:           0 1 0 1       0 1 1 0       0 1 0 1       0 0 0 0
Tally (# of 1's):       0 0 1 0       0 0 1 0       0 0 1 0       0 0 0 0
Summation of                                              └──> + 0 0 1 0
   weighted tallies:                              ─────────────> + 0 0 1 0
                                     └──────2's complement─────> + 1 1 1 0
Result 1,0:                                                    = 1 1 1 1 1 0 0

STEP 5.                       CM3           CM2           CM1           CM0

Matrix memory row 1:  [ 0 1 0 1 ]   [ 0 1 1 0 ]   [ 0 1 0 1 ]   [ 0 0 0 0 ]
Buffer memory row 1:  [ 0 0 1 1 ]   [ 0 0 1 1 ]   [ 0 0 1 1 ]   [ 0 0 1 1 ]
Bit-wise AND:           0 0 0 1       0 0 1 0       0 0 0 1       0 0 0 0
Tally (# of 1's):       0 0 0 1       0 0 0 1       0 0 0 1       0 0 0 0
Summation of                                              └──> + 0 0 0 1
   weighted tallies:                              ─────────────> + 0 0 0 1
                                     └──────2's complement─────> + 1 1 1 1
Result 1,1:                                                    = 1 1 1 1 1 1 0

STEP 6.                       CM3           CM2           CM1           CM0

Matrix memory row 1:  [ 0 1 0 1 ]   [ 0 1 1 0 ]   [ 0 1 0 1 ]   [ 0 0 0 0 ]
Buffer memory row 2:  [ 0 1 0 1 ]   [ 0 1 0 1 ]   [ 0 1 0 1 ]   [ 0 1 0 1 ]
Bit-wise AND:           0 1 0 1       0 1 0 0       0 1 0 1       0 0 0 0
Tally (# of 1's):       0 0 1 0       0 0 0 1       0 0 1 0       0 0 0 0
Summation of                                              └──> + 0 0 1 0
   weighted tallies:                              ─────────────> + 0 0 0 1
                                     └──────2's complement─────> + 1 1 1 0
Result 1,2:                                                    = 1 1 1 1 0 0 0

STEP 7.                       CM3           CM2           CM1           CM0

Matrix memory row 1:  [ 0 1 0 1 ]   [ 0 1 1 0 ]   [ 0 1 0 1 ]   [ 0 0 0 0 ]
Buffer memory row 3:  [ 1 1 0 0 ]   [ 1 1 0 0 ]   [ 1 1 0 0 ]   [ 1 1 0 0 ]
Bit-wise AND:           0 1 0 0       0 1 0 0       0 1 0 0       0 0 0 0
Tally (# of 1's):       0 0 0 1       0 0 0 1       0 0 0 1       0 0 0 0
Summation of                                              └──> + 0 0 0 1
   weighted tallies:                              ─────────────> + 0 0 0 1
                                     └──────2's complement─────> + 1 1 1 1
Result 1,3:                                                    = 1 1 1 1 1 1 0

Product formation:

Result 1,0: (sign extended)              1 1 1,1 1 1 1 1 0 0
Result 1,1: (sign extended, scaled)    + 1 1,1 1 1 1 1 1 0
Result 1,2: (sign extended, scaled)    + 1,1 1 1 1 0 0 0
Result 1,3: (2's complement, scaled)   + 0 0 0 0 0 1 0
Dot Product Out: (RESULT B)            = 1 1 1 1 1 0 1 0 0 0
```

Figure 22D
Symbol
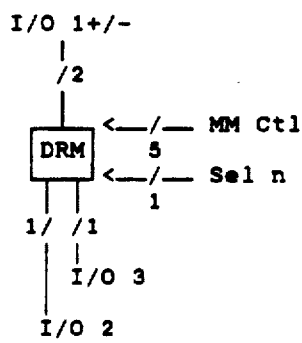
Detailed Design
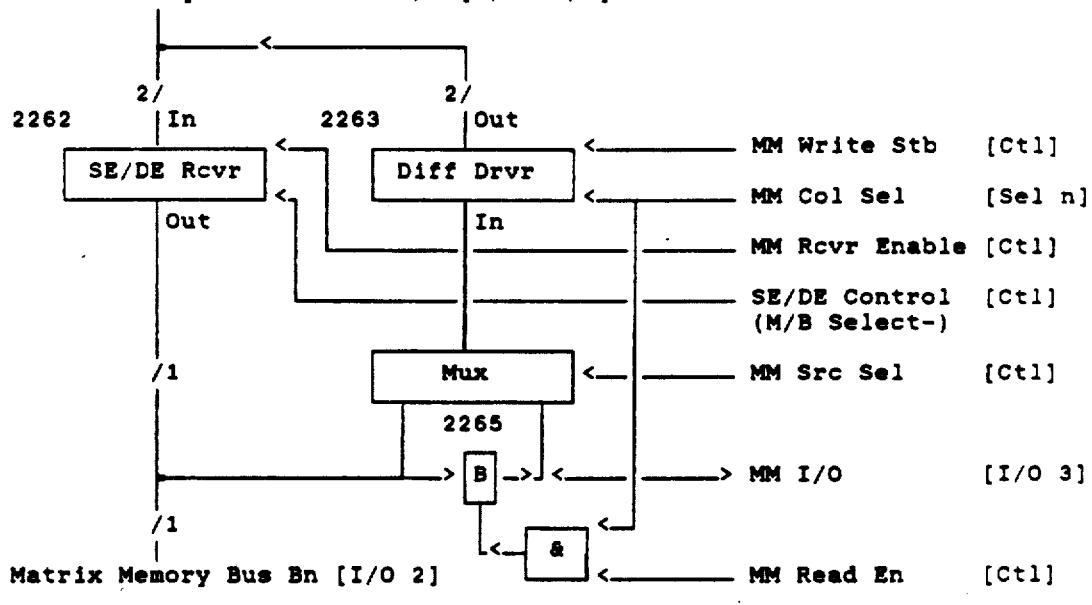
Legend:
B - tri-state buffer Figure 22G
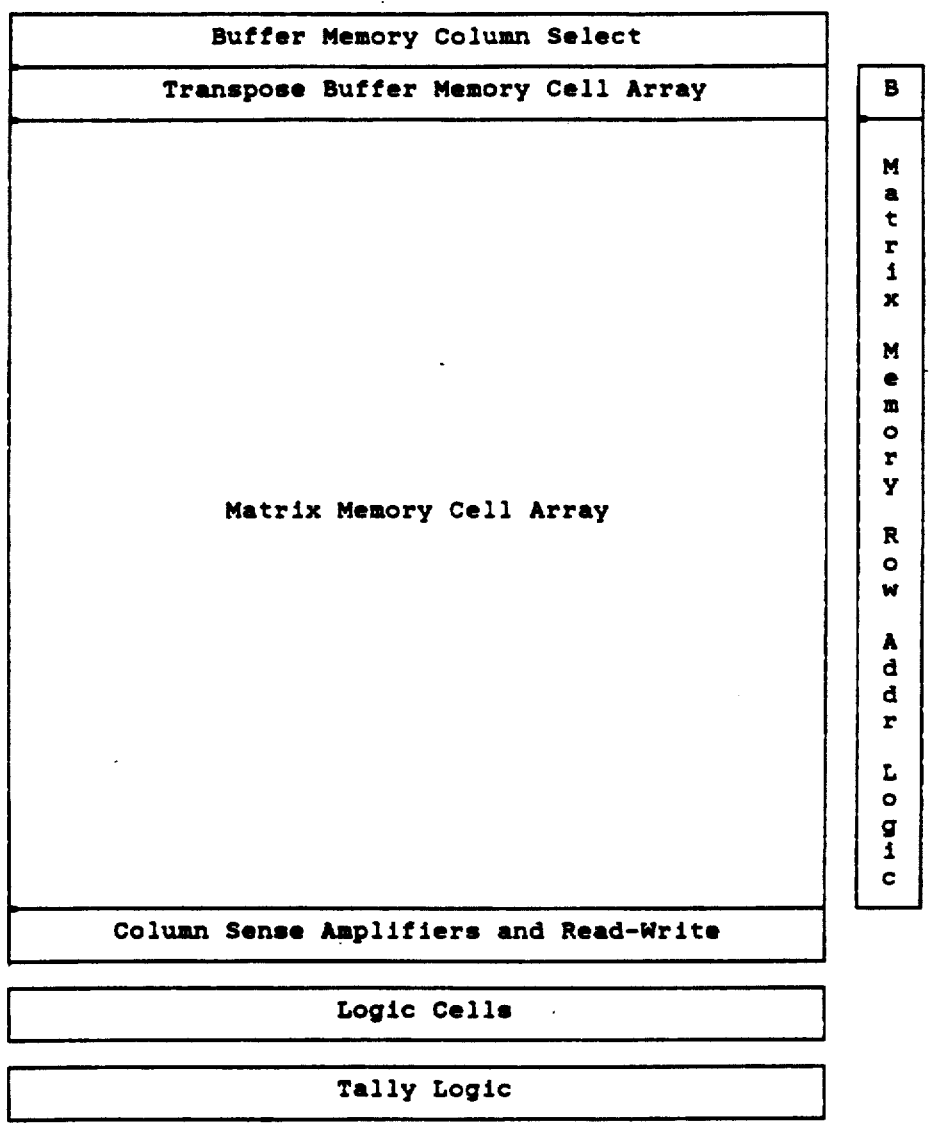
Legend:
B - Buffer Memory Row Address Logic
Scale: 

ALU functions:

0. AIN plus BIN, each cycle except as noted below
   1. AIN, first cycle for each element
   2. BIN minus AIN, last cycle for each 2's complement element

Figure 24

```
Assumptions:

1. convolution memory chip M, M = 0 to BWM - 1, stores one bit of each
element of the weight matrix, where the weight of each bit is 0 or 2^M,
unless 2's complement weights are used, in which case convolution
memory chip BWM - 1 stores bits with weight 0 or -(2^M).
2. the weight of bit N, N = 0 to BICV - 1, in each element of the input
column vector is 0 or 2^N, unless 2's complement arithmetic is used, in
which case bit BICV - 1 has a weight of 0 or -(2^N).
3. 2's complement is used.
4. all rows and all columns are active.

Definitions:

1. the number of bits in each element of the input column vector is
BICV.
2. the number of bits in each element of the weight matrix is BWM.
3. the number of columns in the weight matrix is CWM.
4. the number of rows in the weight matrix is RWM.
5. the row index is RI.
6. the input column vector bit index is ICVBI.

Loop0:   Wait for weight matrix to be ready;
         ICVBI = 0; do same bit for each row, then do next bit;

Loop1:   Wait for current bit of input column vector to be ready;
             RI = 0;

Loop2:   For all convolution memories simultaneously, n = 0
to BWM - 1;
                     DPO(n) = Input_Column_Vector (Bit ICVBI) DOT
Weight_Matrix (Row RI);
                 Endfor;
                 Adder_Tree_Output = [2^0](DPO(0)) + [2^1](DPO(1)) +
... + [2^(BICV-2)](DPO(BWM-2)) - [2^(BICV-1)](DPO(BWM-1));
                 If ICVBI = 0, then ALU(RI) = Adder_Tree_Output;
                 If 0 < ICVBI < BICV - 1, then ALU(RI) = (1/2 *
ALU(RI)) + Adder_Tree_Output;
                 If ICVBI = BICV - 1, then Do;
                     ALU(RI) = (1/2 * ALU(RI)) - Adder_Tree_Output;
                     Output_Column_Vector (Element RI) = ALU(RI) *
2^(BICV-1);
                 End do;
                 RI = RI + 1;
                 If RI < RIWM then GOTO Loop2;

ICVBI = ICVBI + 1;
         If ICVBI < BICV then GOTO Loop1;

GOTO Loop0;
```

Figure 26

RANK-256 MATRIX * VECTOR PERFORMANCE ESTIMATES

| Hardware Parallelism<br>Con. Mem. Chip Type | MOPS | Accum.<br>Chips | Convol.<br>Mem. Chips | Total<br>Chips |
|---|---|---|---|---|
| 1. 8-bit coefficient precision * 1-bit input | | | | |
| Medium | | | | |
| 64K*1, 1 * 256-Point*1-Bit | 8192 | 1 | 8 | 9 |
| 2. 8 * 8 - bit precision | | | | |
| Minimum | | | | |
| 64K*1, 1 * 256-Point*1-Bit | 128 | 1 | 8 | 9 |
| 64K*1, 4 * 256-Point*1-Bit | 512 | 1 | 2 | 3 |
| Medium | | | | |
| 64K*1, 1 * 256-Point*1-Bit | 1024 | 1 | 8 | 9 |
| 64K*4, 4 * 256-Point*1-Bit | 1024 | 1 | 2 | 3 |
| 64K*4, 4 * 64-Point*4-Bit | 1024 | 1 | 2 | 3 |
| Maximum | | | | |
| 64K*1, 1 * 256-Point*1-Bit | 8192 | 9 | 64 | 73 |
| 64K*4, 4 * 256-Point*1-Bit | 8192 | 3 | 16 | 19 |
| 3. 16 * 16 - bit precision | | | | |
| Medium | | | | |
| 64K*1, 1 * 256-Point*1-Bit | 512 | 2 | 16 | 18 |
| 64K*4, 4 * 256-Point*1-Bit | 512 | 1 | 4 | 5 |
| Maximum | | | | |
| 64K*1, 1 * 256-Point*1-Bit | 8192 | 36 | 256 | 292 |
| 64K*4, 4 * 256-Point*1-Bit | 8192 | 9 | 64 | 73 |
| 4. 32 * 32 - bit precision | | | | |
| Medium | | | | |
| 64K*1, 1 * 256-Point*1-Bit | 256 | 4 | 32 | 36 |
| 64K*4, 4 * 256-Point*1-Bit | 256 | 2 | 8 | 10 |
| Maximum | | | | |
| 64K*1, 1 * 256-Point*1-Bit | 4096 | 164 | 1024 | 1188 |
| 64K*4, 4 * 256-Point*1-Bit | 4096 | 36 | 256 | 292 |

Notes:

1. 1 OPS = 1 combination read/multiply/accumulate operation (or "connection" in neural network terms) per second. The clock rate is assumed to be 32 MHz, to which MOPS is directly proportional.
2. The accumulator tree is assumed to have 8-chip : 1-chip reduction at each stage.
3. The chip count does not include control or interface chips.

Memory Cell Operation

| Symbol | Truth Table | | | |
|---|---|---|---|---|
| | Function | Data | Cell State | Select |
| Data — [C] | hold | High-Z | C - no change | 0 |
| Select | read | C - Medium-Z | C - no change | 1 |
| | write | D Low-Z | D -> C | 1 |

Matrix Memory Cell Bus

Memory Cell Operation

Symbol          Truth Table

Data    Data-

| Function | Data | Data- | Cell State | Select |
|---|---|---|---|---|
| no-op | High-Z | High-Z | C - no change | 0 |
| read | C Medium-Z | C- Medium-Z | C - no change | 1 |
| write |  |  |  |  |
| ROM | ----------mask programmed only---------- | | | |
| EPROM | high voltage |  | 0 -> C | 1 |
|  | apply UV light |  | 1 -> all C's | x |
| EEPROM | high voltage |  | 1 or 0 -> C | 1 |

Note:

If the convolution memory stores the most significant bit of the coefficient, then Slice Type = Most Significant Slice. If the slice is the most significant slice and the matrix is represented in 2's complement form, then the 2's complement of Sum 3 is passed through the Mux, otherwise the true form is passed.

Note:

1. (a,b,c,d) are selected from local buffer memory bits (0,1,2,3) then (4,5,6,7), respectively, for 8-bit precision of the column-vector.
2. Slice Type is true for the Sum 3 block of the convolution memory that stores the most significant bit of the matrix when the matrix is represented in 2's complement form, causing the complementing of the Sum 3 input.

Clock, Control →

Legend:

PFU = Programmable Function Unit

Figure 34B

| Pin Name | Pin Count | Function |
|---|---|---|

I. Matrix Memory

A. Control

| | | |
|---|---|---|
| 1. Matrix Address | 8 | input, muxed row/col address |
| 2. Matrix Chip Select | 1 | input |
| 3. Matrix Control | 2 | input, is decoded |
| 4. Matrix Read/Write | 1 | input, write = 1 |
| 5. Matrix Write Stb | 1 | input |

B. Data

| | | |
|---|---|---|
| 1. Matrix Data | 1 | input/output |

II. Processor

| | | |
|---|---|---|
| 1. Dot Product Output Enable | 1 | input |
| 2. Dot Product Out | 9 | output |
| 3. Processor Control | 10 | input |

III. Buffer Memory

A. Control

| | | |
|---|---|---|
| 1. Buffer Address | 8 | input |
| 2. Buffer Chip Select | 1 | input |
| 3. Buffer Control | 3 | input, is decoded |
| 4. Buffer Read/Write | 1 | input, write = 1 |
| 5. Buffer Strobe | 1 | input, for reading and writing, doubles as Clock (Clk) |
| 6. Address Propogate | 1 | input |

B. Data

| | | |
|---|---|---|
| 1. Buffer Data | 8 | input/output |

IV. Common

| | | |
|---|---|---|
| 1. Power, Ground, Reset | 3 | |
| Total: | 60 | |

Figure 34C

I. Processor Control

A. Bit 0
        0. no-op
        1. run (auto-increment matrix and buffer row address counters)

B. Bit 1
        0. AND function
        1. XOR function

II. Matrix Shift Register 0 Control B1, B0

0. no-op
    1. clear
    2. load
    3. shift

III. Matrix Shift Register 1 Control B1, B0

0. no-op
    1. clear
    2. load
    3. shift

IV. Buffer Shift Register 0 Control B1, B0

0. no-op
    1. clear
    2. load
    3. shift

V. Multiplexer Select/Convolution Window Width Selection 0. 8-points
    1. 16-points
    2. 32-points
    3. 64-points

Figure 34D

I. Matrix Control 0. no-op (apply column address/matrix address write state)

1. matrix row address select 2. matrix low limit select 3. matrix high limit select

II. Buffer Control 0. no-op (apply column address)

1. buffer row address select 2. buffer low limit select 3. buffer high limit select 4. buffer clear row 5. buffer set row 6. buffer write row 7. --unused--

Where C2 = buffer write row state AND buffer chip select AND buffer strobe AND buffer read/write.

Note:

For simplicity, the parallel connections from Reg 0 to Reg 1 are not shown.

Figure 35C

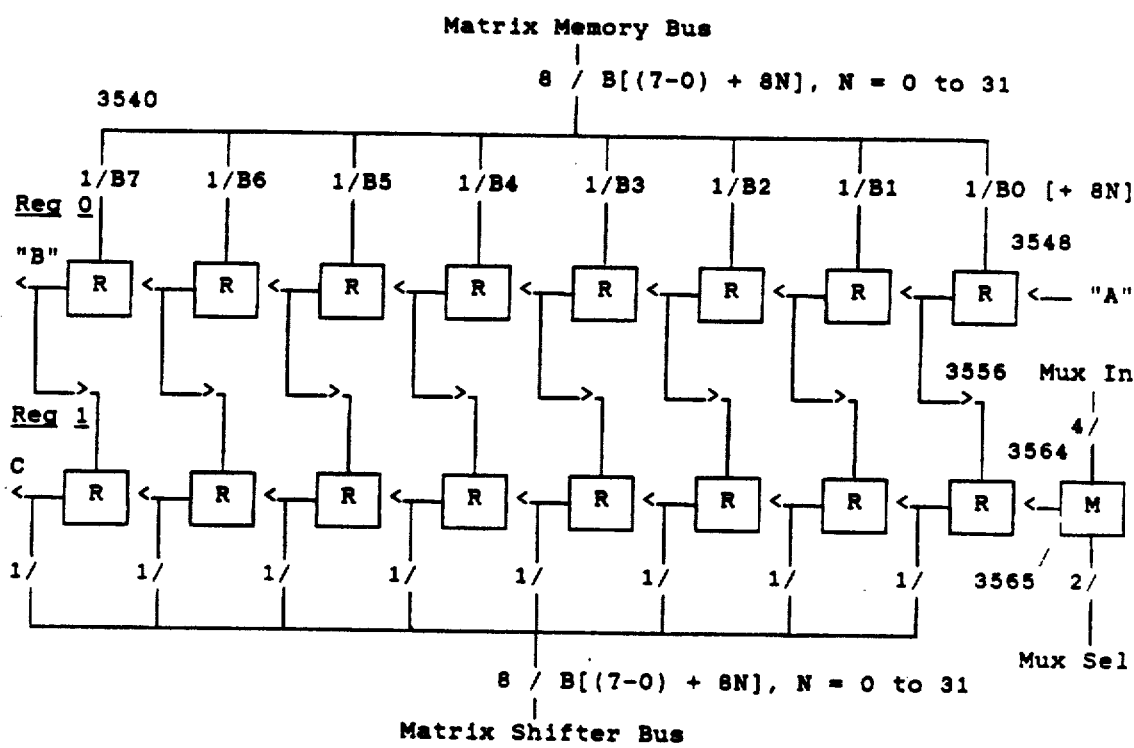

Clk = Buffer Strobe --> to all register cells (R)

Matrix Shift Register 0 Control --> to all register 0 cells

Matrix Shift Register 1 Control --> to all register 1 cells

Register Operations no-op: hold current state of register

Load register 0: matrix memory bus --> register 0

Clear Rn: 0 --> Rn

Shift register 0: R0(bit n) --> R0(bit n+1), except "A" --> R0(bit 0)

Load register 1: R0(bit n) --> R1(bit n)

Shift register 1: R1(bit n) --> R1(bit n+1), except "M" --> R1(bit 0)

Figure 35D

| Submodule | Input 3 | Input 2 | Input 1 | Input 0 |
|---|---|---|---|---|
| (Window width: | 64 points | 32 points | 16 points | 8 points) |
| U0 | Reg 0 B63 | Reg 0 B31 | Reg 0 B15 | Reg 0 B7 |
| U1 | Reg 1 B7 | Reg 1 B7 | Reg 1 B7 | Reg 0 B15 |
| U2 | Reg 1 B15 | Reg 1 B15 | Reg 0 B31 | Reg 0 B23 |
| U3 | Reg 1 B23 | Reg 1 B23 | Reg 1 B23 | Reg 0 B31 |
| U4 | Reg 1 B31 | Reg 0 B63 | Reg 0 B47 | Reg 0 B39 |
| U5 | Reg 1 B39 | Reg 1 B39 | Reg 1 B39 | Reg 0 B47 |
| U6 | Reg 1 B47 | Reg 1 B47 | Reg 0 B63 | Reg 0 B55 |
| U7 | Reg 1 B55 | Reg 1 B55 | Reg 1 B55 | Reg 0 B63 |

Legend:
    M - multiplexer
    B - buffer with tri-state output
    R - register Clk = Buffer Strobe --> to all register cells (Rs)

Register Operations no-op: hold current register state
load register 0: buffer memory bus (bit n) --> register 0 (bit n)
clear register 0: 0 --> register 0
shift register 0: register 0 (bit n + 8) --> register 0 (bit n) with
    end-around wraparound

Figure 36A

Image Picture Element Map

```
line  0: AA AB AC AD AE AF AG AH AI AJ AK AL AM AN AO AP
line  1: BA BB BC BD BE BF BG BH BI BJ BK BL BM BN BO BP
line  2: CA CB CC CD CE CF CG CH CI CJ CK CL CM CN CO CP
line  3: DA DB DC DD DE DF DG DH DI DJ DK DL DM DN DO DP
line  4: EA EB EC ED EE EF EG EH EI EJ EK EL EM EN EO EP
line  5: FA FB FC FD FE FF FG FH FI FJ FK FL FM FN FO FP
line  6: GA GB GC GD GE GF GG GH GI GJ GK GL GM GN GO GP
line  7: HA HB HC HD HE HF HG HH HI HJ HK HL HM HN HO HP
line  8: IA IB IC ID IE IF IG IH II IJ IK IL IM IN IO IP
line  9: JA JB JC JD JE JF JG JH JI JJ JK JL JM JN JO JP
line 10: KA KB KC KD KE KF KG KH KI KJ KK KL KM KN KO KP
line 11: LA LB LC LD LE LF LG LH LI LJ LK LL LM LN LO LP
line 12: MA MB MC MD ME MF MG MH MI MJ MK ML MM MN MO MP
line 13: NA NB NC ND NE NF NG NH NI NJ NK NL NM NN NO NP
line 14: OA OB OC OD OE OF OG OH OI OJ OK OL OM ON OO OP
line 15: PA PB PC PD PE PF PG PH PI PJ PK PL PM PN PO PP
```

Figure 36B

Definitions of 4 * 4 Groups of Picture Elements as Window 0,4N

```
Window 0,-4  Window 0,0    Window 0,4    Window 0,8    Window 0,12  Window 0,16
.........................................................................
00 00 00 00.AA AB AC AD.AE AF AG AH.AI AJ AK AL.AM AN AO AP.00 00 00 00

00 00 00 00.BA BB BC BD.BE BF BG BH.BI BJ BK BL.BM BN BO BP.00 00 00 00
      +          +          +          +          +          +
00 00 00 00.CA CB CC CD.CE CF CG CH.CI CJ CK CL.CM CN CO CP.00 00 00 00

00 00 00 00.DA DB DC DD.DE DF DG DH.DI DJ DK DL.DM DN DO DP.00 00 00 00
.........................................................................
00 00 00 00 EA EB EC ED EE EF EG EH EI EJ EK EL EM EN EO EP 00 00 00 00

00 00 00 00 FA FB FC FD FE FF FG FH FI FJ FK FL FM FN FO FP 00 00 00 00
```

Linear Picture Element Sequence from Window 0,0

```
15 14 13 12.11 10  9  8. 7  6  5  4. 3  2  1  0. :Matrix Memory Column
AA AB AC AD.BA BB BC BD.CA CB CC CD.DA DB DC DD. :Picture elements
```

Figure 36C

Definitions of 4 * 4 Groups of Picture Elements as Window 0,4N+1

```
   Window 0,-3 Window 0,1  Window 0,5  Window 0,9  Window 0,13
   ................................................................
00.00 00 00 AA.AB AC AD.AE.AF AG AH AI.AJ AK AL AM.AN AO AP 00.00 00 00
   .         .         .         .         .         .
00.00 00 00 BA.BB BC BD BE.BF BG BH BI.BJ BK BL BM.BN BO BP 00.00 00 00
   .    +    .    +    .    +    .    +    .    +    .
00.00 00 00 CA.CB CC CD CE.CF CG CH CI.CJ CK CL CM.CN CO CP 00.00 00 00
   .         .         .         .         .         .
00.00 00 00 DA.DB DC DD DE.DF DG DH DI.DJ DK DL DM.DN DO DP 00.00 00 00
   ................................................................
00 00 00 00 EA EB EC ED EE EF EG EH EI EJ EK EL EM EN EO EP 00 00 00 00

00 00 00 00 FA FB FC FD FE FF FG FH FI FJ FK FL FM FN FO FP 00 00 00 00
```

Linear Picture Element Sequence from Window 0,1

Definitions of 4 * 4 Groups of Picture Elements as Window 0,4N+2

```
      Window 0,-2 Window 0,2  Window 0,6  Window 0,10 Window 0,14
   ................................................................
00 00.00 00 AA AB.AC AD AE AF.AG AH AI AJ.AK AL AM AN.AO AP 00 00.00 00
      .         .         .         .         .         .
00 00.00 00 BA BB.BC BD BE BF.BG BH BI BJ.BK BL BM BN.BO BP 00 00.00 00
      .    +    .    +    .    +    .    +    .    +    .
00 00.00 00 CA CB.CC CD CE CF.CG CH CI CJ.CK CL CM CN.CO CP 00 00.00 00
      .         .         .         .         .         .
00 00.00 00 DA DB.DC DD DE DF.DG DH DI DJ.DK DL DM DN.DO DP 00 00.00 00
   ................................................................
00 00 00 00 EA EB EC ED EE EF EG EH EI EJ EK EL EM EN EO EP 00 00 00 00

00 00 00 00 FA FB FC FD FE FF FG FH FI FJ FK FL FM FN FO FP 00 00 00 00
```

Linear Picture Element Sequence from Window 0,2

Definitions of 4 * 4 Groups of Picture Elements as Window 0,4N+3

```
         Window 0,-1 Window 0,3   Window 0,7 Window 0,11 Window 0,15
.........................................................................
00 00 00.00 AA AB AC.AD AE AF AG.AH AI AJ AK.AL AM AN AO.AP 00 00 00.00
         .           .           .           .           .
00 00 00.00 BA BB BC.BD BE BF BG.BH BI BJ BK.BL BM BN BO.BP 00 00 00.00
         +           +           +           +           +
00 00 00.00 CA CB CC.CD CE CF CG.CH CI CJ CK.CL CM CN CO.CP 00 00 00.00
         .           .           .           .           .
00 00 00.00 DA DB DC.DD DE DF DG.DH DI DJ DK.DL DM DN DO.DP 00 00 00.00
.........................................................................
00 00 00 00 EA EB EC ED EE EF EG EH EI EJ EK EL EM EN EO EP 00 00 00 00

00 00 00 00 FA FB FC FD FE FF FG FH FI FJ FK FL FM FN FO FP 00 00 00 00
```

Linear Picture Element Sequence from Window 0,3

Definitions of 4 * 4 Groups of Picture Elements as Window 1,4N

```
Window 1,-4 Window 1,0   Window 1,4   Window 1,8  Window 1,12 Window 1,16
00 00 00 00 AA AB AC AD AE AF AG AH AI AJ AK AL AM AN AO AP 00 00 00 00
.........................................................................
00 00 00 00.BA BB BC BD.BE BF BG BH.BI BJ BK BL.BM BN BO BP.00 00 00 00
            .           .           .           .           .
00 00 00 00.CA CB CC CD.CE CF CG CH.CI CJ CK CL.CM CN CO CP.00 00 00 00
            +           +           +           +           +
00 00 00 00.DA DB DC DD.DE DF DG DH.DI DJ DK DL.DM DN DO DP.00 00 00 00
            .           .           .           .           .
00 00 00 00.EA EB EC ED.EE EF EG EH.EI EJ EK EL.EM EN EO EP.00 00 00 00
.........................................................................
00 00 00 00 FA FB FC FD FE FF FG FH FI FJ FK FL FM FN FO FP 00 00 00 00
```

Linear Picture Element Sequence from Window 1,0

```
Column:15 14 13 12.11 10  9  8. 7  6  5  4. 3  2  1  0.

Reg 0: xx xx xx xx.xx xx xx xx.xx xx xx xx.xx xx xx xx.         Window 0,<-4
                                                                R0 op: no-op
Reg 1: 00 00 00 00.00 00 00 00.00 00 00 00.00 00 00 00.         R1 op: clear Reg 0: AA AB AC AD.BA BB BC BD.CA CB CC CD.DA DB DC DD.         Window 0,-4
                                                                R0 op: load
Reg 1: 00 00 00 00.00 00 00 00.00 00 00 00.00 00 00 00.                row 0
                                                                R1 op: clear Reg 0: AB<AC<AD<xx.BB<BC<BD<xx.CB<CC<CD<xx.DB<DC<DD<xx.         Window 0,-3
        └──>──┘    └──>──┘    └──>──┘    └──>──┘                R0 op: shift
Reg 1: 00<00<00<AA.00<00<00<BA.00<00<00<CA.00<00<00<DA.         R1 op: shift Reg 0: AC AD xx xx.BC BD xx xx.CC CD xx xx.DC DD xx xx.         Window 0,-2
                                                                R0 op: shift
Reg 1: 00 00 AA AB.00 00 BA BB.00 00 CA CB.00 00 DA DB.         R1 op: shift Reg 0: AD xx xx xx.BD xx xx xx.CD xx xx xx.DD xx xx xx.         Window 0,-1
                                                                R0 op: shift
Reg 1: 00 AA AB AC.00 BA BB BC.00 CA CB CC.00 DA DB DC.         R1 op: shift Reg 0: AE AF AG AH.BE BF BG BH.CE CF CG CH.DE DF DG DH.         Window 0,0
                                                                R0 op: load
Reg 1: AA AB AC AD.BA BB BC BD.CA CB CC CD.DA DB DC DD.                row 1
                                                                R1 op: shift Reg 0: AF AG AH xx.BF BG BH xx.CF CG CH xx.DF DG DH xx.         Window 0,1
                                                                R0 op: shift
Reg 1: AB AC AD AE.BB BC BD BE.CB CC CD CE.DB DC DD DE.         R1 op: shift Reg 0: AG AH xx xx.BG BH xx xx.CG CH xx xx.DG DH xx xx.         Window 0,2
                                                                R0 op: shift
Reg 1: AC AD AE AF.BC BD BE BF.CC CD CE CF.DC DD DE DF.         R1 op: shift Reg 0: AH xx xx xx.BH xx xx xx.CH xx xx xx.DH xx xx xx.         Window 0,3
                                                                R0 op: shift
Reg 1: AD AE AF AG.BD BE BF BG.CD CE CF CG.DD DE DF DG.         R1 op: shift Reg 0: AI AJ AK AL.BI BJ BK BL.CI CJ CK CL.DI DJ DK DL.         Window 0,4
                                                                R0 op: load
Reg 1: AE AF AG AH.BE BF BG BH.CE CF CG CH.DE DF DG DH.                row 2
                                                                R1 op: shift
```

Figure 37, cont.

```
Column:15 14 13 12.11 10  9  8. 7  6  5  4. 3  2  1  0.
Reg 0:  00 00 00 00.00 00 00 00.00 00 00 00.00 00 00 00.     Window 0,12
                                                             R0 op: clear
Reg 1:  AM AN AO AP.BM BN BO BP.CM CN CO CP.DM DN DO DP.     R1 op: shift Reg 0:  00 00 00 xx.00 00 00 xx.00 00 00 xx.00 00 00 xx.     Window 0,13
                                                             R0 op: shift
Reg 1:  AN AO AP 00.BN BO BP 00.CN CO CP 00.DN DO DP 00.     R1 op: shift Reg 0:  00 00 xx xx.00 00 xx xx.00 00 xx xx.00 00 xx xx.     Window 0,14
                                                             R0 op: shift
Reg 1:  AO AP 00 00.BO BP 00 00.CO CP 00 00.DO DP 00 00.     R1 op: shift Reg 0:  00 xx xx xx.00 xx xx xx.00 xx xx xx.00 xx xx xx.     Window 0,15
                                                             R0 op: shift
Reg 1:  AP 00 00 00.BP 00 00 00.CP 00 00 00.DP 00 00 00.     R1 op: shift Reg 0:  xx xx xx xx.xx xx xx xx.xx xx xx xx.xx xx xx xx.     Window 0,16
                                                             R0 op: shift
Reg 1:  00 00 00 00.00 00 00 00.00 00 00 00.00 00 00 00.     R1 op: shift Reg 0:  xx xx xx xx.xx xx xx xx.xx xx xx xx.xx xx xx xx.     Window 0,>16
                                                             R0 op: no-op
Reg 1:  00 00 00 00.00 00 00 00.00 00 00 00.00 00 00 00.     R1 op: no-op
```

Figure 38A

Examples of 16-Point Window Coefficients

```
Rectangular 2 * 8:    line 0: c0 c1 c2 c3 c4 c5 c6 c7
                      line 1: c8 c9 cA cB cC cD cE cF Memory Image:         .c0 c1 c2 c3 c4 c5 c6 c7.c8 c9 cA cB cC cD cE cF.
                      .        line 0          .        line 1          .

Square 4 * 4          Memory Image line 0: c0 c1 c2 c3   .c0 c1 c2 c3.c4 c5 c6 c7.c8 c9 cA cB.cC cD cE cF.
line 1: c4 c5 c6 c7   .  line 0   .  line 1   .  line 2   .  line 3   .
line 2: c8 c9 cA cB
line 3: cC cD cE cF
```

Figure 38B

Zeroth Memory Map for 4 * 4 Window and 16-Column Input

Column: 15 14 13 12.11 10 9 8. 7 6 5 4. 3 2 1 0.

```
Row 0 : AA AB AC AD.BA BB BC BD.CA CB CC CD.DA DB DC DD.    Window 0,0
Row 1 : AE AF AG AH.BE BF BG BH.CE CF CG CH.DE DF DG DH.    Window 0,4
Row 2 : AI AJ AK AL.BI BJ BK BL.CI CJ CK CL.DI DJ DK DL.    Window 0,8
Row 3 : AM AN AO AP.BM BN BO BP.CM CN CO CP.DM DN DO DP.    Window 0,12 c0 c1 c2 c3.c4 c5 c6 c7.c8 c9 cA cB.cC cD cE cF.    Window coef
           line 0  .   line 1  .   line 2  .   line 3  .
```

Figure 38C

First Memory Map for 4 * 4 Window and 16-Column Input

```
Row 0 > EA EB EC ED.BA BB BC BD.CA CB CC CD.DA DB DC DD.    Window 1,0
Row 1 : AE AF AG AH.BE BF BG BH.CE CF CG CH.DE DF DG DH.    Window 0,4
Row 2 : AI AJ AK AL.BI BJ BK BL.CI CJ CK CL.DI DJ DK DL.    Window 0,8
Row 3 : AM AN AO AP.BM BN BO BP.CM CN CO CP.DM DN DO DP.    Window 0,12
        --changing--
        c0 c1 c2 c3.c4 c5 c6 c7.c8 c9 cA cB.cC cD cE cF.    Window coef
           line 0  .   line 1  .   line 2  .   line 3  .
```

Figure 38D

Second Memory Map for 4 * 4 Window and 16-Column Input

```
Row 0 : EA EB EC ED.BA BB BC BD.CA CB CC CD.DA DB DC DD.    Window 1,0
Row 1 > EE EF EG EH.BE BF BG BH.CE CF CG CH.DE DF DG DH.    Window 1,4
Row 2 : AI AJ AK AL.BI BJ BK BL.CI CJ CK CL.DI DJ DK DL.    Window 0,8
Row 3 : AM AN AO AP.BM BN BO BP.CM CN CO CP.DM DN DO DP.    Window 0,12
        --changing--
        c0 c1 c2 c3.c4 c5 c6 c7.c8 c9 cA cB.cC cD cE cF.    Window coef
           line 0  .   line 1  .   line 2  .   line 3  .
```

Figure 38E

Third Memory Map for 4 * 4 Window and 16-Column Input

```
Row 0 : EA EB EC ED.BA BB BC BD.CA CB CC CD.DA DB DC DD.    Window 1,0
Row 1 : EE EF EG EH.BE BF BG BH.CE CF CG CH.DE DF DG DH.    Window 1,4
Row 2 > EI EJ EK EL.BI BJ BK BL.CI CJ CK CL.DI DJ DK DL.    Window 1,8
Row 3 : AM AN AO AP.BM BN BO BP.CM CN CO CP.DM DN DO DP.    Window 0,12
        --changing--
        c0 c1 c2 c3.c4 c5 c6 c7.c8 c9 cA cB.cC cD cE cF.    Window coef
           line 0  .   line 1  .   line 2  .   line 3  .
```

Figure 38F

Fourth Memory Map for 4 * 4 Window and 16-Column Input

```
Column: 15 14 13 12.11 10  9  8. 7  6  5  4. 3  2  1  0.

Row 0 : EA EB EC ED.BA BB BC BD.CA CB CC CD.DA DB DC DD.    Window 1,0
Row 1 : EE EF EG EH.BE BF BG BH.CE CF CG CH.DE DF DG DH.    Window 1,4
Row 2 : EI EJ EK EL.BI BJ BK BL.CI CJ CK CL.DI DJ DK DL.    Window 1,8
Row 3 > EM EN EO EP.BM BN BO BP.CM CN CO CP.DM DN DO DP.    Window 1,12
        --changed--
        cC cD cE cF.c0 c1 c2 c3.c4 c5 c6 c7.c8 c9 cA cB.    Window coef
          line 3   .   line 0  .   line 1  .   line 2  .
```

Figure 38G

Eighth Memory Map for 4 * 4 Window and 16-Column Input

```
Row 0 : EA EB EC ED.FA FB FC FD.CA CB CC CD.DA DB DC DD.    Window 2,0
Row 1 : EE EF EG EH.FE FF FG FH.CE CF CG CH.DE DF DG DH.    Window 2,4
Row 2 : EI EJ EK EL.FI FJ FK FL.CI CJ CK CL.DI DJ DK DL.    Window 2,8
Row 3 : EM EN EO EP.FM FN FO FP.CM CN CO CP.DM DN DO DP.    Window 2,12
              --changed--
        c8 c9 cA cB.cC cD cE cF.c0 c1 c2 c3.c4 c5 c6 c7.    Window coef
          line 2   .   line 3  .   line 0  .   line 1  .
```

Figure 38H

Twelveth Memory Map for 4 * 4 Window and 16-Column Input

```
Row 0 : EA EB EC ED.FA FB FC FD.GA GB GC GD.DA DB DC DD.    Window 3,0
Row 1 : EE EF EG EH.FE FF FG FH.GE GF GG GH.DE DF DG DH.    Window 3,4
Row 2 : EI EJ EK EL.FI FJ FK FL.GI GJ GK GL.DI DJ DK DL.    Window 3,8
Row 3 : EM EN EO EP.FM FN FO FP.GM GN GO GP.DM DN DO DP.    Window 3,12
                     --changed--
        c4 c5 c6 c7.c8 c9 cA cB.cC cD cE cF.c0 c1 c2 c3.    Window coef
          line 1   .   line 2  .   line 3  .   line 0  .
```

Figure 38I

Sixteenth Memory Map for 4 * 4 Window and 16-Column Input

```
Row 0 : EA EB EC ED.FA FB FC FD.GA GB GC GD.HA HB HC HD.    Window 4,0
Row 1 : EE EF EG EH.FE FF FG FH.GE GF GG GH.HE HF HG HH.    Window 4,4
Row 2 : EI EJ EK EL.FI FJ FK FL.GI GJ GK GL.HI HJ HK HL.    Window 4,8
Row 3 : EM EN EO EP.FM FN FO FP.GM GN GO GP.HM HN HO HP.    Window 4,12
                                --changed--
        c0 c1 c2 c3.c4 c5 c6 c7.c8 c9 cA cB.cC cD cE cF.    Window coef
          line 0   .   line 1  .   line 2  .   line 3  .
```

Figure 39

```
Window 0,8  Window 0,12 Window 0,16        :Chip 0
..........................................
AI AJ AK AL.AM AN AO AP.OO 00 00 00.
              .           .           .
BI BJ BK BL.BM BN BO BP.00 00 00 00.
   +       .    +      .    +      .       ..........
CI CJ CK CL.CM CN CO CP.00 00 00 00.
              .           .           .
DI DJ DK DL.DM DN DO DP.00 00 00 00.
...................................
     3900  .      3901   .      3902  .
           .             .            .
Chip 1:    .Window 0,12 Window 0,16 Window 0,20 Window 0,24 Window 0,28
           ...........................................................
           .OO 00 00 00.AQ AR AS AT.AU AV AW AX.AY AZ Aa Ab.Ac Ad Ae Af
           .           .           .           .           .
           .00 00 00 00.BQ BR BS BT.BU BV BW BX.BY BZ Ba Bb.Bc Bd Be Bf
..........  .     +    .     +     .     +     .     +     .     +
           .00 00 00 00.CQ CR CS CT.CU CV CW CX.CY CZ Ca Cb.Cc Cd Ce Cf
           .           .           .           .           .
           .00 00 00 00.DQ DR DS DT.DU DV DW DX.DY DZ Da Db.Dc Dd De Df
           ...........................................................
                 3903         3904        3905

Window 0,10 Window 0,14             :Chip 0
      ...................................
      AI AJ.AK AL AM AN.AO AP 00 00.00 00
           .           .           .
      BI BJ.BK BL BM BN.BO BP 00 00.00 00     Window 0,14 Chip 0 Output =
         + .     +     .     +     .            c0*AO + c1*AP + c4*BO + c5*BP +
      CI CJ.CK CL CM CN.CO CP 00 00.00 00      c8*CO + c9*CP + c12*DO + c13*DP
           .           .           .
      DI DJ.DK DL DM DN.DO DP 00 00.00 00
      .....................................
              .    3909    .
              .            .
Chip 1:       .Window 0,14 Window 0,18
              ...............................
              00 00.OO 00 AQ AR.AS AT AU AV.AW AX
                   .           .           .             Window 0,14 Chip 1
              00 00.00 00 BQ BR.BS BT BU BV.BW BX             Output =
                   .    +      .     +     .              c2*AQ + c3*AR +
              00 00.00 00 CQ CR.CS CT CU CV.CW CX         c6*BQ + c7*BR +
                   .           .           .             c10*CQ + c11*CR +
              00 00.00 00 DQ DR.DS DT DU DV.DW DX         c14*DQ + c15*DR
              .................................
                            3910

Chip 0 Output + Chip 1 Output =
   c0*AO + c1*AP + c2*AQ + c3*AR + c4*BO + c5*BP + c6*BQ + c7*BR +
   c8*CO + c9*CP + c10*CQ + c11*CR + c12*DO + c13*DP + c14*DQ + c15*DR
```

Figure 40B

Rectangular Definition of Window

C0,0  C0,1  ...... C0,30  C0,31
.
.
.
C31,0 C31,1 ...... C31,30 C31,31

Buffer Memory Memory-Map for Initial 32 * 32 - Point
Convolution Window When In Use Correlation Memory Group 3:

C0,0...C0,31;  C1,0...C1,31;  C2,0...C2,31;  C3,0...C3,31;
 255.....224   223.....192   191.....160   159.....128 :Bfr Mem Column C4,0...C4,31;  C5,0...C5,31;  C6,0...C6,31;  C7,0...C7,31.
 127......96    95......64    63......32    31........0 :Bfr Mem Column Correlation Memory Group 2:

C8,0...C8,31;  C9,0...C9,31;  C10,0...C10,31; C11,0...C11,31;
C12,0...C12,31; C13,0...C13,31; C14,0...C14,31; C15,0...C15,31.

Correlation Memory Group 1:

C16,0...C16,31; C17,0...C17,31; C18,0...C18,31; C19,0...C19,31;
C20,0...C20,31; C21,0...C21,31; C22,0...C22,31; C23,0...C23,31.

Correlation Memory Group 0:

C24,0...C24,31; C25,0...C25,31; C26,0...C26,31; C27,0...C27,31;
C28,0...C28,31; C29,0...C29,31; C30,0...C30,31; C31,0...C31,31.

Note: assume that bit N of each coefficient, numbering bits from 0 to
M-1, is placed in row N of the Buffer Memory.

Figure 40C

```
Correlation Memory Group 3:

C0,0...C0,31; C1,0...C1,31; C2,0...C2,31; C3,0...C3,31;
  255.....224  223.....192  191.....160  159.....128 :Bfr Mem Col
        L___ will be new bottom row of window after shifting C4,0...C4,31; C5,0...C5,31; C6,0...C6,31; C255,0...C255,31.
  127......96   95......64   63......32    31.........0 :Bfr Mem Col Correlation Memory Group 2:

C8,0...C8,31; C9,0...C9,31; C10,0...C10,31; C11,0...C11,31;
C12,0...C12,31; C13,0...C13,31; C14,0...C14,31; C7,0...C7,31.

Correlation Memory Group 1:

C16,0...C16,31; C17,0...C17,31; C18,0...C18,31; C19,0...C19,31;
C20,0...C20,31; C21,0...C21,31; C22,0...C22,31; C15,0...C15,31.

Correlation Memory Group 0:

C24,0...C24,31; C25,0...C25,31; C26,0...C26,31; C27,0...C27,31;
C28,0...C28,31; C29,0...C29,31; C30,0...C30,31; C23,0...C23,31.

Note: assume that bit N of each coefficient, numbering bits from 0 to
M-1, is placed in row (N + K) of the Buffer Memory, where K is the
number of bits of precision of the coefficient and is consistent with
the ability to write multi-bit data into the buffer memory in a single
cycle.
```

Figure 40D

Correlation Memory Group 3:

```
C255,0...C255,31; C0,0...C0,31; C1,0...C1,31; C2,0...C2,31;
   255.......224   223.....192   191.....160   159.....128 :Bfr Mem Col
       └─────────────┴── new bottom row of window C3,0...C3,31; C4,0...C4,31; C5,0...C5,31; C6,0...C6,31.
  127......96    95......64    63......32    31.........0 :Bfr Mem Col
```

Correlation Memory Group 2:

```
C7,0...C7,31; C8,0...C8,31; C9,0...C9,31; C10,0...C10,31;
C11,0...C11,31; C12,0...C12,31; C13,0...C13,31; C14,0...C14,31.
```

Correlation Memory Group 1:

```
C15,0...C15,31; C16,0...C16,31; C17,0...C17,31; C18,0...C18,31;
C19,0...C19,31; C20,0...C20,31; C21,0...C21,31; C22,0...C22,31.
```

Correlation Memory Group 0:

```
C23,0...C23,31; C24,0...C24,31; C25,0...C25,31; C26,0...C26,31;
C27,0...C27,31; C28,0...C28,31; C29,0...C29,31; C30,0...C30,31.
```

Note: assume that bit N of each coefficient, numbering bits from 0 to M-1, is placed in rows N and (N + K) of the Buffer Memory.

Figure 41

|    | Line Length | Window Width | Window Height | Rows Stored | Row Width | Chip Count |
|----|-------------|--------------|---------------|-------------|-----------|------------|
| 1. | 256  | 16 | 16 | 16  | 256  | 1  |
| 2. | 256  | 32 | 32 | 8   | 1024 | 4  |
| 3. | 256  | 64 | 64 | 4   | 4096 | 16 |
| 4. | 512  | 16 | 16 | 32  | 256  | 1  |
| 5. | 512  | 32 | 32 | 16  | 1024 | 4  |
| 6. | 512  | 64 | 64 | 8   | 4096 | 16 |
| 7. | 1024 | 16 | 16 | 64  | 256  | 1  |
| 8. | 1024 | 32 | 32 | 32  | 1024 | 4  |
| 9. | 1024 | 64 | 64 | 16  | 4096 | 16 |
| 10.| 2048 | 16 | 16 | 128 | 256  | 1  |
| 11.| 2048 | 32 | 32 | 64  | 1024 | 4  |
| 12.| 2048 | 64 | 64 | 32  | 4096 | 16 |
| 13.| 4096 | 16 | 16 | 256 | 256  | 1  |
| 14.| 4096 | 32 | 32 | 128 | 1024 | 4  |
| 15.| 4096 | 64 | 64 | 64  | 4096 | 16 |

Note:

1. The line length is the number of picture elements in each line of the image.

2. The number of rows stored is the number of rows of picture elements that must be stored in a correlation memory chip to compute all convolution windows while loading each picture element only once into a correlation memory chip.

3. The chip count is the minimum number of nK * 1, 1 * 256-point*1-bit correlation memory chips required per bit of precision of the image. The amount of matrix memory storage required in each chip is 256 bits times the number of rows stored.

Note: the curve extends into the third quadrant.

CONVOLUTION MEMORY

I. BACKGROUND OF THE INVENTION

1. Field of the Invention

The invention relates primary to semiconductor devices to perform the multiplication of a matrix times a vector. This fundamental operation is required for digital signal processing, matrix multiplication, and artificial neural networks, and is advantageously carried out by digital, parallel processing units as disclosed herein that combine memory and logic onto a single chip in such a way as to provide an efficient, modular means for allowing the precision of the multiplier and the multiplicand to be chosen appropriately for the application.

2. Description of the Prior Art

The multiplication of a matrix times a vector is an elementary operation. It is used extensively in digital signal processing for convolution and correlation, in linear algebra for matrix multiplication, and in artificial neural networks to form weighted summers, or artificial neurons.

As an introduction to the terminology used in this disclosure, the terminology of artificial neural networks, FIG. 1A shows a weighted summer 100. This weighted summer computes the dot product of a signal vector, S, and a weight vector, W, to produce a scalar result, Output. Such a weighted summer performs the basic operation of a neuron, weighting a set of stimuli, S0 to $S(N-1)$, according to their respective importance, W0 to $W(N-1)$. Note that a slight liberty has been taken in this analogy to a neuron, namely the allowing of the weights to have positive or negative values, whereas a physical neuron has only positive or zero weights but two sets of inputs, one set excitory (providing positive weights), the other set inhibitory (providing negative weights).

FIG. 1B is the block diagram of ganged weighted summers driven from a common shift register 110. Each weighted summer as 111 and 112 presumably has a different set of weights. Discrete Fourier transforms may be computed or matched filtering operations may be performed with the proper set of weights in the various weighted summers when a single signal is sampled in time, providing a set of time-delayed signals to the weighted summers.

FIG. 1C is the block diagram of ganged weighted summers driven from a two-dimensional array of shift registers. Each weighted summer, as 134, receives a set of stimuli from all shift registers, as 130 and 132. If the successive samples represent spatial samples, rather than temporal ones, then operations such as convolution and correlation may be performed upon a two-dimensional image.

FIG. 1D is the block diagram of a conventional memory system. A Data Bus 140 is connected to the data port, D, of each random access memory (RAM) chip as 141 to 144. Each memory chip in the figure stores only one bit of a word that is N bits wide and thus connects to only one of the many wires of the Data Bus.

All bits of each of the Address Bus and the Control Bus are required by each of the RAM chips, and are thus connected to each of the RAM chips. The number of wires, M, in the Address Bus depends upon the speed requirements of the RAM, being capable of directly selecting any location in a high performance system, in which case M=16, or being multiplexed between a row address and a column address in a lower performance system, in which case M=8.

As many RAM chips may be used as necessary to store the number of bits contained in a word, increasing the storage capacity of the system in direct proportion to the number of bits in the word, but having no direct bearing upon the computation power of the system since there is no processing logic contained in the RAM chips.

FIG. 1E is the block diagram of a conventional 64K*1 RAM. A logically square array of memory cells 147, having 256 rows of 256 bits each, has one row selected for access by the row address logic 148 under control of the Address Bus. Reading the memory results in the access of all 256 bits in the chosen row, and each of these bits is simultaneously received by a sense amplifier that is dedicated to a particular column of memory cells in the memory cell array. These many sense amplifiers are located in the sense amplifier and column read/write logic 149. Depending upon the type of memory, there may be true and complement data coming from each memory cell for a total of 512 wires, rather than 256, connecting the memory cell array 147 to the sense amplifiers 149, although the number of unrelated bits is unchanged at 256.

The column read/write logic, under control of the Address Bus, selects one of the outputs of the 256 sense amplifiers for connection to the Data Bus when a read operation is performed. It is important to notice that the other 255 bits, 99.6% of all bits read, are ignored, i.e., wasted, and that if additional data is desired, even from the same row, then, with minor variations, the entire read cycle must be repeated.

The invention disclosed herein shows how to effectively use all of the bits that are read from the row of the memory, providing one to two orders of magnitude improvement in the cost effectiveness of many systems.

Depending again upon the type of memory, the writing of data into the memory is typically performed in either of two ways. In one method, the read-modify-write method, an entire row of the memory is read and the result is temporarily stored in the column read/write logic 149. Under control of the Data Bus, one of the received bits is changed in the column read/write logic in the column selected by the Address Bus, and the whole row is written back into the memory cell array. In the second method, the direct-set method, the true and complement states of the bit from the Data Bus are placed upon the pair of data lines for one column of the memory using low impedance drivers, where the column is selected by the Address Bus. A high impedance is maintained on the pairs of data lines for the other columns. The data is stored in the memory cell that is at the intersection of the driven column and the selected row.

FIG. 2 reviews basic matrix multiplication operations. FIG. 2A shows the multiplication of a matrix 200, times a column-vector, S 201, to produce an output column-vector, W 202. The same vector, S, has thus been used four times, once for each of the four rows of the matrix. The invention disclosed herein requires that the S vector need be fetched only once from main memory, not four times, to perform this operation.

FIG. 2B shows the multiplication of the ABCD matrix 203 times the STUV matrix 204 to produce the output matrix WXYZ 205. This operation is decomposed into a series of matrix times vector operations, where the ABCD matrix 203 is invariant, but the STUV matrix 204 is decomposed into the S 207, T 210, U 213 and V 216 vectors. In the invention disclosed herein, the ABCD matrix would be fetched only once from main memory for this entire series of operations, not four times. Since the invention herein will typically operate on matrices of 256 by 256, rather than 4 by 4, the savings in memory bandwidth are in fact 256:1 rather than 4:1.

FIG. 2C shows submatrix multiplication. In the event that the ABCD matrix 218 and the S vector 219 are very large, they may be partitioned into multiple smaller units. The S vector may be decomposed into upper 221 and lower 225 portions, and the ABCD matrix 218 may be decomposed into an upper left 220, upper right 224, lower left 222, and a lower right 226 portion. Multiplications are performed on these smaller units, and the results are summed with the zeroes serving only as placeholders that are not being stored in memory.

A conventional scalar processor, such as a Motorola MC68030 or Intel 80386 microprocessor, performs matrix multiplications sequentially. It first computes two addresses and fetches an element of the matrix and an element of the vector, then performs the multiplication and stores the product in a temporary location, typically an on-chip register. The process is repeated for each pair of elements of the dot product, accumulating the results in the temporary register. The contents of the temporary location are stored in memory following operation upon the last element of the vector. The process is repeated for the next dot product, and so on. Many address computations, memory accesses, multiplications and accumulations are required to perform this sequence, hence it is very slow.

Various arithmetic co-processor chips are available to speed up such computations in microprocessor systems. They typically provide hardware that cannot be economically placed upon the microprocessor chip. They are limited in performance because they operate in the same sequential fashion as the microprocessor since they are slaved to the instruction sequence of the microprocessor. Furthermore there is limited storage on board the co-processor chip and there is a single path to memory that is only as wide as the arithmetic unit of the microprocessor.

Array processors are often attached to a host computer to provide a variety of computation-intensive operations independently of the host computer. However, a typical bottleneck in such a system is the need to pass data back and forth between the array processor and the host computer.

It is important to note that all of the bits of each variable must be stored and operated upon in a single chip for most conventional arithmetic chips in order to perform multiplication and addition. Furthermore, it is difficult for multiple such chips to share the storage and computation load without a complex interconnection network and complex control structure choosing what goes where and which chip does what. In addition, the placement of all bits upon a single chip results in set numbers of bits of precision for the operation, typically 8, 16, 24, or 32, for each of the multiplier and the multiplicand, blocking the system designer from obtaining maximum economy of operation for those tasks that could be better suited by different levels of precision. Systems employing artificial neural network techniques are such a case, where the multiplicand may require only single-bit precision, but the multiplier may require many more, depending upon the number of patterns that collectively form a memory.

Existing bit-slice architectures, such as the relatively old Advanced Micro Devices 2900 family, provide some freedom in choosing the level of precision in multiples of 4 bits, but are severly hampered in their ability to perform multiplication since they support only a sequential, add-and-shift algorithm, rather than a much faster, parallel approach. Furthermore, the amount of storage that they contain is very limited, typically 16 registers, whereas tens of thousands are required to efficiently perform many matrix times vector operations, and they lack the ability to perform vector dot products in any fashion other than a sequential one.

High speed, typically 50 nS or less, multiplier/accumulator chips, may be combined with high speed static RAMs, address generators and control logic to implement dot product operations. The problem here again is that very high speed data paths are needed between chips in order to move the data around. The size of these data paths is proportional to the number of chips operating in parallel, where more chips operating in parallel presumably increases the system's performance. The movement of data between chips is inefficient because of the relatively high capacitance of the signal lines connecting the various chips and the transmission line considerations that they must be given, requiring high power, whereas the amount of capacitance on a signal line that stays on a chip is typically several orders of magnitude less, and the very short lengths avoid transmission line problems in many cases, requiring drastically less power to convey the same signal from one point to another. In addition, it is economical to have bus widths of several hundred bits on a single chip in certain regular structures, but it is very expensive to have like bus widths connecting multiple chips.

The building of systems from many multiply/accumulator chips working together with their outputs being summed externally is inefficient because many pins are required to carry the information in order to perform the summation. The summing of two 32-bit quantities by a free-standing adder requires 97 data pins, two 32-bit inputs and one 33-bit output, so the pin usage efficiency is only about $\frac{1}{3}$. Furthermore, since an adder is a simple circuit, a very tiny chip is able to perform the function, but the adder would require many more pins than such a minimal size function requires, wasting chip area and increasing costs. Such a chip is said to be "pin limited".

Supercomputers, such as the Cray-1, employ specialized hardware in the form of multiple memory banks and multiple multiply/accumulator units in order to speed the accessing and processing of information. Such structures, when implemented with very high speed, i.e., several nanosecond cycle time, very expensive devices with demanding cooling requirements, provide enormous improvements in performance over scalar processors but are fundamentally inefficient because of the many times that the same matrix element must be fetched to perform the matrix times vector operation. In addition, the use of multiple memory banks capable of operating simultaneously provides an improvement in performance only when the placement of data in the memory is well suited for the operation being performed.

The issue of efficiency is key to the invention disclosed herein, since the inventor has attempted to radically reduce the cost and improve the performance of a system performing a vector dot product computation by methodically considering how well each primitive element, e.g., transistor or interconnect line, of that structure is being used, and by choosing structures that maximally utilize each of their elements. This approach could be construed to be an extreme case of RISC, for reduced instruction set computer, which attempts to perform only the most useful of operations, and to perform them very effectively. However, a RISC machine is a sequential, programmable device that competes directly with microprocessors, whereas the structures disclosed herein are relatively unprogrammable, relatively special purpose devices, being programmable only in the sense of how data is moved around, what size matrices and vectors are handled, what portions of those matrices are used, and what numeric values are involved.

Many free-space analog optical and electro-optical devices have been described to perform matrix multiplication for general purpose computing and artificial neural network applications. Since such optical devices are mechanical systems, none have the small size, precision, temperature/mechanical stability, or modularity that this invention provides. Since their technology is radically different from the digital, semiconductor devices described herein, they are not considered further except as an example to demonstrate the benefits of the approach disclosed herein.

Similarly, many analog electrical devices are being described by researchers for artificial neural network applications. The lack of precision and stability of these analog devices is a fundamental barrier to their being applied to conventional signal processing tasks, and even limits their utility to their intended tasks. While such devices were not intended to compete with digital signal processing techniques, they will not find a marketplace until their novelty can be demonstrated to be translatable into a commercially significant asset.

Much work was done in the 1970's on analog filter chips with programmable coefficients for use in sampled data processing. This work was abandoned as a result of the difficulty of storing analog variables for prolonged periods (even a fraction of a second) and as a result of the development of inexpensive digital signal processors. Only inflexible chips with fixed coefficients using switched capacitor techniques became commercially viable.

In contrast, the invention disclosed herein is shown to offer advantages in many existing digital signal processing markets, and to offer significant advantages in the artificial neural network or neurocomputer, presumably pattern recognition, marketplace as well.

In a much broader sense, the combination of logic and substantial amounts of memory on a single chip has many examples in the art. None, however, are specifically tailored to provide the product of two long vectors, let alone the the multiplication of a matrix times a vector, while minimizing system support costs, particularly as relates to the cost of providing a very high memory bandwidth to provide the multiplier and the multiplicand.

Examples of prior art devices that are relevant to this disclosure are:

1. NCR GAPP Chip

The NCR GAPP ("geometric arithmetic parallel processor") chip has 72 simple processing units. Each processing unit has two groups of memory and a 1-bit, arithmetic and logic unit (ALU). All memories have a common address, and all ALU's execute the same instruction simultaneously. The processing units are arranged in an 12*6 matrix with each processing unit being connected to its nearest neighbors, and edge processing units being connected to input/output pins on the package. It is a parallel processor chip as a result of its multiplicity of processing units.

Data is moved into and out of the chip in serial fashion via the connections between the nearest neighbors. No global mechanism is provided. This structure takes advantage of the wide aggregate width of the on-chip memories, where each of the bits may be operated upon simultaneously.

There is no global logic that combines the outputs of all of the processing units and there is no mechanism for increasing the precision of a word by combining multiple chips.

2. ITT/Alcatel Cellular Array Processor Array Chip II-M

The Cellular Array Processor ("CAP") array chip II-M contains a 256-bit wide memory that is organized as 16 groups of 16 bits each. Each group of 16 bits is connected to its own processor unit containing a 16-bit ALU. Additional memory/processing unit pairs are provided in anticipation of fabrication defects that are likely due to the large physical size of the chip. The 256-bit wide memory is about 256 words deep, for a total useful storage capacity of 64K bits. It is a parallel processor chip as a result of its multiplicity of memory/processor units.

Like the GAPP chip, all of the memory has a common address, and the ALU's have a common instruction. Data may be moved into and out of the chip via a common data bus that is 16-bits wide. All processing units operate in tandem with the operation being specified by a set of instruction inputs. This structure takes advantage of the wide width of the on-chip memory, where all of the 256 bits from any row of the memory may be processed simultaneously.

There is no global logic that combines the outputs of all of the processing units, and there is no mechanism for increasing the precision of a word by combining multiple chips, although multiple ALU's may operate together to increase the word size, within limits. The absence of global logic, plus its reliance on 16-bit words and a general purpose instruction set, preclude its use for the efficient computation of vector dot products.

This chip is described in "A Fault-Tolerant, Bit-Parallel, Cellular Array Processor" by Steven Morton in the *Proceedings of the* 1986 *Fall Joint Computer Conference*, pp 277-286, and in numerous U.S. patent applications that were filed in December 1985.

3. Microprocessor Chips with On-chip Cache Memory

A microprocessor chip such as the Motorola MC68020 contains a small amount of on-chip memory, or cache memory, to avoid fetching instructions for a repetitive program segment from slower, external memory. As there is only a single, shallow memory that is 16 or 32 bits wide, according to the number of bits in the microprocessor's ALU, and there is only a single ALU, this is a sequential, not a parallel, processor. Its precision cannot be increased by combining the operation of multiple like chips, and the bulk of the area of the chip is consumed by logic and read-only memory, not read/write memory.

4. Video Dynamic Random Access Memory

A Video Dynamic Random Access Memory ("VDRAM") such as the Texas Instruments TMS4161, organized as 64K*1, makes use of the fact that fetching a row of the memory provides 256 data bits internal to the chip. These bits may be loaded into an on-chip shift register of like length so that data in the register may be shifted out of the chip at high speed while the memory operates in normal, random access fashion, reading or writing a word that is 1-bit wide. No processing logic is provided.

5. Inmos Transputer

This microprocessor, of which there are several versions, has four independent on-chip buffers to facilitate the passing of data between multiple like chips using serial bit-streams. Each buffer is typically 8-bits wide and has 2K locations. The only processing, other than handling link protocols, is provided by that single ALU.

6. FEBRIS Chip

This chip is intended for pattern recognition applications using binary data, for which it provides a 256-point correlation. It contains 16 16-bit shift registers for data that are used to load 16 16-bit match registers and 16 16-bit mask registers. For $i=0$ to 15 and $j=0$ to 15, the $(i,j)$'th bit from the data register is exclusive-OR'd with the $(i,j)$'th bit from the match register, and the result is logically ANDed with the $(i,j)$'th bit of the mask register. The outputs of all of the exclusive-OR gates feed a distributed logic block that tallies the number of inputs that are true. This tally results in a count of 0 to 256, requiring a 9-bit output.

No method is described for increasing the precision of each of the 256 variables that are contained in the 16 16-bit data shift registers, each bit of data must be fed into the chip 16 times for use in all possible positions of the convolution window, and a set of interconnected, external shift registers is required to provide the data that is being fed into the chip.

This chip is described in "FEBRIS: A Chip for Pattern Recognition" by Marcel Pelgrom et al, *IEEE Journal of Solid State Circuits*, June 1987, pp 423–429. It is significant in the context of this invention because it employs a tally circuit, a key element in this invention.

7. Multiply/Accumulator Chips

Multiply/accumulator chips are made by several vendors. Typical fixed point units are the TRW MPY-16 and the IDT 7210. Inputs have 8, 12 or 16 bits. Floating point units are also available from vendors such as Weitek.

8. Correlator Chips

Correlator chips place registers, multipliers and adders on the same chip in order to provide filtering operations. They are more effective for doing certain types of operations, such as correlations or two-dimensional convolutions, than groups of multiplier/accumulator chips because the multipliers and the adders are contained on the same chip. A typical unit is the Inmos IMS A100 Cascadable Signal Processor, containing a 32-stage transversal filter and allowing coefficients that are selectable to be 4, 8, 12 or 16 bits wide. However, the wider is the coefficient, the lower is the sampling rate since the multiplier hardware is only 4 bits wide at its input, being cycled to provide more bits, since it is not economical to provide 32 16*16 multipliers on a single chip. However, the chip applies the same signal, or successively delayed versions of the same signal, to the multipliers, so it cannot be used as a general purpose dot product operator such as for matrix multiplication.

9. Programmable Logic Array (PLA)

FIG. 3 shows an elementary combinatorial logic circuit combining logic, as 302 and 311, and memory, as 306 and 307, on the same chip. This circuit is a binary form of the weighted summer 100 and may be considered to be a matched filter. Like a neuron, the weights as 306 and 307 have only zero or positive values, since a set of NOT gates, or inverters, as 302 and 303 provide the equivalent of inhibitory weights. The wire as 310 sums the currents from the outputs of the row of storage elements 306 to 309 and feeds the input of a NOT gate 311, the input being true unless any of the storage cells in concert with the inputs provides a false level.

10. Hopfield Network

Analog approaches for realizing artificial neural networks have been described as a means to provide high performance at low cost. The apparent simplicity of these analog circuits, such as a multiplier built from a single transistor and a summer built from a wire and an inverting amplifier, is very appealing in contrast to the large amount of irregular logic that is generally used to implement the same function digitally. Furthermore, the idea that all of the many elements are operating simultaneously is intriguing.

Unfortunately, the temperature stability of such analog circuits is very poor, and it is difficult to obtain adequate yields due to the many fabrication parameters that must be tightly controlled. In addition, such analog chips are special purpose, have limited expansion capability, and have a structure that is unfamiliar to most engineers, making them expensive to design, test and use.

FIG. 4A is the circuit diagram of a Hopfield Network as popularized by John Hopfield of Caltech. This is an analog circuit with feedback that reportedly can recognize highly distorted patterns. (See D. Tank and J. Hopfield, "Collective Computation in Neuronlike Circuits", *Scientific American*, December 1987, pp 104–114, for an overview of such circuit principles.)

The positive (+) and negative (−) inputs to each amplifier as 400 are presumably held at virtual ground by the amplifier. By virtual ground it is meant that regardless of the current applied to the input (within reasonable limits) by agencies external to the amplifier, the potential of the input is held at zero volts, i.e., it is virtually at ground, isolating the effects of each input device from all others and allowing wires as 401 and 402 to sum the currents. The difference between the currents flowing into the positive and negative inputs is amplified and converted into a voltage that appears at the output 403 of the amplifier. This output is then feed to all other amplifiers by the vertical wire 416.

The current flowing into the positive input of amplifier 400 is the dot product of the stimulus vector, comprising the output voltages of all of the amplifiers, times the excitory weighting vector, comprising the conductances ($Vm,n = 1/R$) of the set of resistors 420, 422, and 424. Similarly, the current flowing into the negative input of amplifier 400 is the dot product of the stimulus vector, again comprising the outputs of all of the amplifiers, times the inhibitory weighting vector, comprising the conductances of the set of resistors 421, 423, and 425.

It is not immediately apparent, but the frequency characteristics of the amplifiers play a key role by determining the stability of the circuit. Large circuits, with long vertical and horizontal conductors and high resulting capacitance, can oscillate if the frequency characteristic is improperly chosen. In addition, a small amount of noise can circulate through the circuit, hence one typically chooses a transfer function for the amplifier that suppresses very small signals.

It is important to note that the invention herein is sufficiently general in its application as to be able to implement numerous forms of artificial neural networks, as will be shown. Researchers may support or disprove various forms of artificial neural network circuits without bearing upon the validity of this invention.

11. Analog Bidirectional Associative Memory (BAM)

As described by Bart Kosko of Verac, Inc. in concert with Clark Guest of UCSD, a single-chip BAM comprising an analog network of amplifiers and phototransistors may be built on a single chip. See FIG. 4B. The circuit is bidirectional in that the application of a pattern "A" on the horizontal bus from the AHn amplifiers 453, 457, 461, and 465 results in the determination of a related pattern "B" on the vertical bus from the AVn amplifiers 469, 473, and 477, and vice-versa.

An optical weighting pattern with a gray-scale is permanently stored photographically on the BAM chip by fabrication of a photomask that contains two interdigitated subpatterns, a horizontal pattern and a vertical pattern. A pattern to be matched may be input electrically on either of the two orthogonal busses, in which case the matched response appears after a settling time that is related to how far the input pattern deviates from a stored pattern and to the frequency response of the weighting network and the amplifiers.

Assuming that the positive and negative inputs to an amplifier as 450 are at virtual ground, a pair of horizontal input conductors as 451 and 452 performs current summing at the positive and negative inputs to amplifier 450 whose output 453 drives a horizontal output conductor. In addition, a first weighting matrix is provided by columns of MOS phototransistors as 480 and 481, each phototransistor having a conductance represented by $V_{m,n}$. The matrix of phototransistors is overlaid with a photomask having a gray scale and acts as a set of variable resistors. The photomask controls the amount of illumination reaching each phototransistor from an external illuminator in order to control the current passed through a phototransistor as 480 between a vertical output conductor as 469 and a horizontal input conductor as 451. Two phototransistors are required for each vertical output bus as 469 for each amplifier; one, as 480, for the positive input (excitory) and one, as 481, for the negative input (inhibitory), in order to realize both positive and negative weights since a transistor's conductance is unipolar.

Like the previously described network, a pair of vertical input conductors as 467 and 468 performs current summing at the positive and negative inputs to an amplifier as 466 whose output 469 drives a vertical output conductor. A second weighting matrix is provided by rows of MOS phototransistors as 486 and 487, each phototransistor having a conductance represented by $H_{m,n}$. The matrix of phototransistors is overlaid with a photomask having a gray scale to control the amount of illumination reaching the phototransistors from an external illuminator in order to control the current passed through the phototransistors from a set of vertical output conductors into the horizontal input conductors.

All amplifiers, whose outputs are bipolar, are equipped with an output transfer characteristic that alleviates noise problems by suppressing signals near zero volts. In many applications, a two-state output is all that is required, with the best performance being obtained with levels of $+V$ and $-V$ rather than V and O.

In summary, the advantages of analog, electro-optical BAM circuit are:
1. All weights may be modified simultaneously optically by the use of a patterned illuminator.
2. A multiplication is performed by a single phototransistor, and the use of pairs of phototransistors on complementary amplifier inputs improves accuracy.
3. Summing is performed by a wire that is presumably held at virtual ground by an amplifier.
4. All circuit nodes are active simultaneously.
5. Each optical storage node provides a gray scale.
6. An entire feedback circuit may be implemented on a single chip.

In summary, the disadvantages of analog, electro-optical BAM circuit are:
1. Routing of a large number of optical signals to multiple destinations is difficult and hard to miniaturize.
2. Multiplication accuracy depends upon the magnitude of a phototransistor's drain-source voltage, the polarity of the drain-source voltage, the effective gate-source voltage, and the nominal conductance of the channel.
3. Summing accuracy depends upon the magnitude of offset voltages at the inputs of the amplifiers.
4. The value of the weights has a wide tolerance depending upon the ability to control the optical transmission of the photomask and the photogain of each transistor, parameters that can vary across the chip.
5. Two storage nodes are required to produce a signed weight.
6. Placement of an entire feedback circuit on one chip makes it difficult to vary the size of the network.
7. The floating gate of an MOS phototransistor is noisy.
8. Unless the resistivity of the substrate can be greatly reduced, the operating frequency of the circuit must be constrained to avoid interference between circuit elements.
9. Since the circuit is dependent upon analog phenomena, care must be taken to avoid errors resulting from I-R drops in signal conductors.
10. Since the complexity of an amplifier is much higher than the complexity of its input weighting network, the width of the physical layout of an amplifier will be much larger than the spacing between the pairs of input conductors to each amplifier, complicating the layout and/or reducing the utilization of the chip area.
11. In the absence of time-division multiplexing of I/O signal lines and the use of sample-and-hold amplifiers, many I/O pins are required and the currents needed to drive these pins will cause interference on the chip.

A comparison of the above analog, electro-optical BAM with a digital BAM using techniques disclosed herein is given in FIG. 10.

II. SUMMARY OF THE INVENTION

In the most general terms, the object of the invention is to *efficiently* multiply an arbitrary matrix times an arbitrary vector. The issue of efficiency relates to (1)

the number of times that the same sequence of data must be fetched from an expensive memory and be conveyed via an expensive interconnection system to a processing unit in order to provide the operation and (2) how effectively each circuit element is used.

Note that it is assumed herein that the matrix is being multiplied times a vector that is a column-vector. The multiplication of each row of a matrix times a column-vector is identical to the multiplication of each row of a matrix times a transposed row-vector, hence the invention is applicable to both. The terminology of column-vector is used only to simplify the description of the operation since, as will be shown, each row of the matrix is placed in a row of memory cells, and the entire row may be accessed in a single cycle of the memory.

In the view of the inventor, the fetching of the column-vector repeatedly by existent systems, once for each row of the matrix, is wasteful and interferes with the sharing of data by multiple processing units, and that this waste increases as the length, or number of elements, of the vector increases. This situation is made worse by the multiplication of two matrices, A*B, since the entire A matrix must be fetched for each column of the B matrix. Likewise, an application requiring the repetitive use of the same matrix, such as for recursive pattern recognition using artificial neural network techniques, requires access to the same matrix many times, repetitive access that costs a great deal of memory bandwidth, and the higher is the memory bandwidth, the higher is the cost.

In particular:

1. An elementary, generic, intelligent memory structure, a "convolution memory chip", is described that efficiently multiplies a matrix times a vector. It is shown that through the use of this chip, the processing power of a system increases as the storage capacity of a system increases.

2. A basic method for efficiently combining the output of many simple logic processing elements is described.

3. A novel method for performing the multiplication of a matrix times a vector is described. This method has two significant versions depending upon whether it is more important to obtain each dot product with minimal latency, i.e., minimal delay from the beginning of the computation of a particular dot product until the completion of that dot product, but at the expense of more hardware, or to complete a set of dot products in a group with lessened hardware cost but with appreciably increased latency.

4. Methods are given for increasing the number of convolution memory chips beyond the minimum number required to store the matrix in order to further increase system performance.

5. Fixed-point representation with any combination of signed and unsigned numbers may be used, so long as all numbers have a consistent representation within each of the matrix and the vector.

6. The precisions of the multiplier and multiplicand may be freely chosen. The precision of the multiplier may be easily chosen during the operation of the circuit, whereas the precision of the multiplicand is most effectively chosen during the design of the system. Full precision summation is performed.

7. The number of rows of the matrix and the number of elements of the vector may be freely chosen independently, although the efficiency of the structure is related to these dimensions, increasing with the dimensions, and the structure is intended for dimensions of the order of 256 or multiples thereof. Any size that is smaller than the maximum capacity of a chip may be selected dynamically, while the system is in operation. Furthermore, arbitrary portions of the matrix may be freely masked, or disabled, dynamically. Matrices that are larger than the capacity of a single chip may be handled by having multiple chips operate collectively.

8. The structure of the memory and buffers upon each chip, the structure of a group of like chips and an intermediate chip (a "vector accumulator chip"), and the sequence with which the multiplication is carried out, are all designed in such a way as to drastically reduce the number of memory cycles that is required external to each convolution memory chip to support the multiplication. This reduction reduces the number and the cost of chips that are required to support the multiplication function and facilitates the sharing of memories external to the convolution memory chips by reducing the demands that are made upon them. In very intensive data processing applications, a matrix may reside for prolonged periods or permenently within the convolution memory chip, avoiding any fetching whatsoever of the matrix from memory external to the chip.

9. Further, since there are many applications where long vectors are desired, with 256 or more elements being common, and that many bits of precision for the elements of both the matrix and the vector are required, it is necessary to organize the storage and processing logic modularly, in such a way that they may be uniformly spread over multiple like chips in a simple fashion. In addition, since one may need more capability than even very capable chips can provide, it is necessary that multiple like chips may be able to work cooperatively to handle arbitrarily large problems with very high precision, and that it should be possible to make a cost/performance trade-off between the number of chips used in a system and system throughput.

10. It is also desirable to construct the chips is such a way that the bulk of the chip area is devoted to memory, rather than logic, since memory is very dense but logic is not, and many problems require a great deal of information to be stored and processed, and one would like to minimize the movement of data between temporary storage areas and areas from which computations may be performed. Furthermore, such memory may be made tolerant to manufacturing defects by providing a small percentage of spare rows and or columns, using techniques that are well known in the art, in order to reduce costs. Such inexpensive fault tolerant techniques do not exist for random logic structures.

11. It is also an object of the invention that the design be compatible with many technologies, such as silicon and gallium arsenide, so that the most appropriate fabrication technology may be applied depending upon the environment in which the chips must operate and the performance required. Furthermore, while the use of CMOS design techniques is shown herein, the underlying design techniques are compatible with other design techniques as well, such as bipolar.

12. It is also an object of the invention that the design be compatible with many memory technologies, such as DRAM, SRAM, EPROM, EEPROM, and ROM, so that any lifetime of the data may be provided. Systems may thus be manufactured with built-in patterns stored in non-volatile memory, yet have capability that evolves using data stored in volatile memory.

13. Operation of the logic portion of the convolution memory chip should be efficient so as to provide maximum performance in the smallest possible area. An adder using a carry look-ahead circuit is considered efficient in that most of the gates are active most of the time, unlike a combinatorial multiplier wherein there is only a moving wave of activity, hence most of the gates are inactive at any instant, resulting in underutilization of the chip.

14. In order to achieve maximum utilization of the memory, the structure of the logic portion of the convolution memory chip should reflect the inherent structure of a memory. Since a high capacity memory cell array is roughly square in order to minimize the length of a signal run in any direction and thereby reduce capacitance and improve performance, the number of bits available simultaneously at its output is the square root of the total number of bits that it stores. The logic structure should thus be able to utilize a large number of bits at the output of a memory.

15. Alternative embodiments of the convolution memory chip are described to show the effects of trading off performance for cost, i.e., the size of the chip.

16. Applications of the convolution memory chip to realize common structures from the field of artificial neural networks are given.

17. An extension of the design of the convolution memory chip in the form of a correlation memory chip is given to show how the addition of a modest amount of processor logic greatly extends the applicability of the basic design for many digital signal processing applications, particularly two-dimensional spatial filtering.

18. A hierarchical memory system employing many modules built from convolution memory chips and/or correlation memory chips is given to show the enormous processing power available, e.g., one trillion multiplication/accumulation operations per second, that may be economically realized using the techniques described herein.

III. BRIEF DESCRIPTION OF THE DRAWINGS

1. Prior Art

FIG. 1A is the block diagram of a weighted summer, FIG. 1B is the block diagram of ganged weighted summers being driven from a one-dimensional shift register, FIG. 1C is the block diagram of ganged weighted summers being driven from a two-dimensional array of shift registers, FIG. 1D is the block diagram of a conventional memory system, and FIG. 1E is the block diagram of a 64K*1 random access memory (RAM).

FIGS. 2A-2C are equations summarizing basic matrix multiplication operations.

FIG. 3 is the circuit diagram for a programmable logic array.

2. According to this Invention 2.1 Introduction

Figure 5:
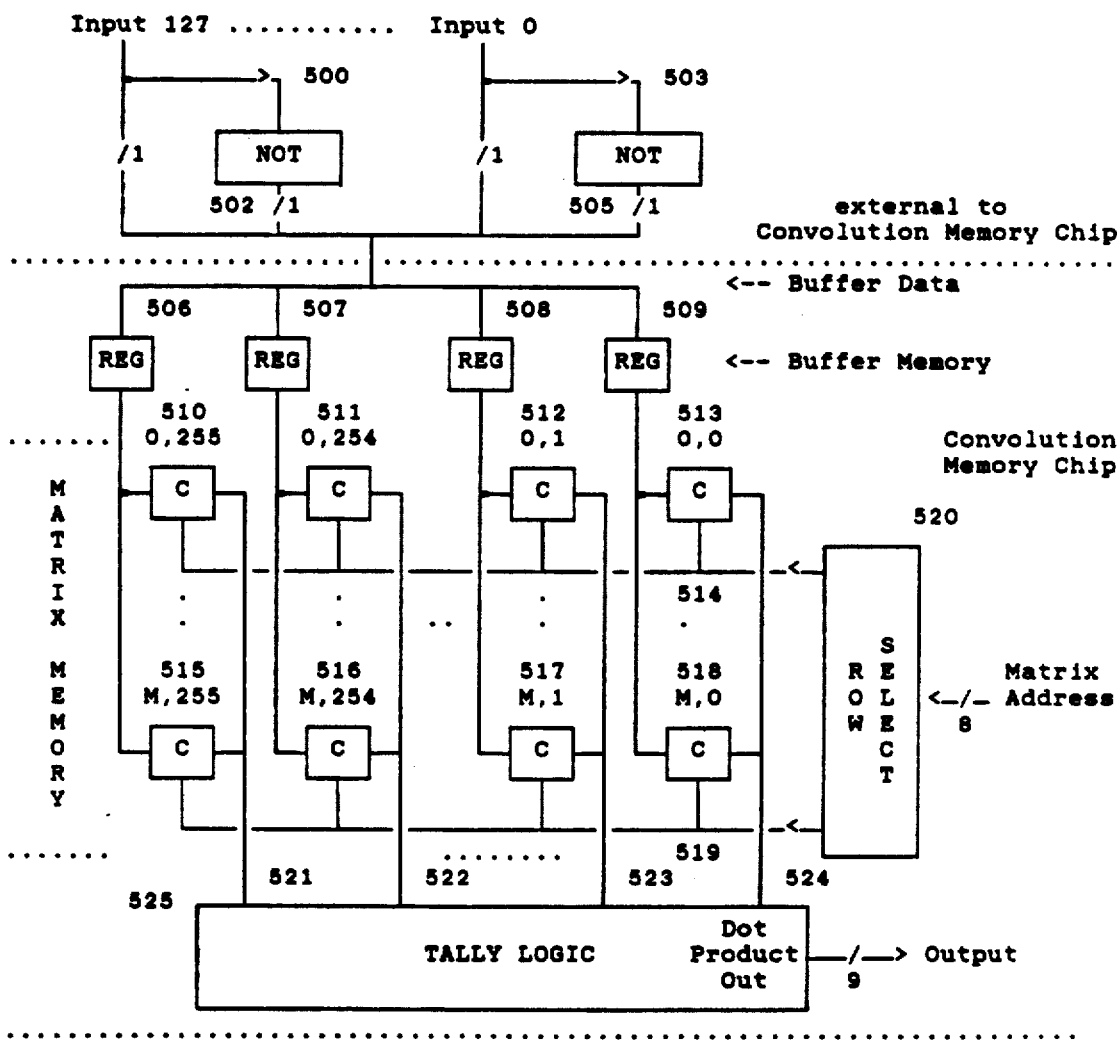

FIG. 5 is the circuit diagram for the equivalent circuit of a 64K*1, 1*256-point*1-bit convolution memory chip used as a linear-summing programmable logic array.

Figure 6:
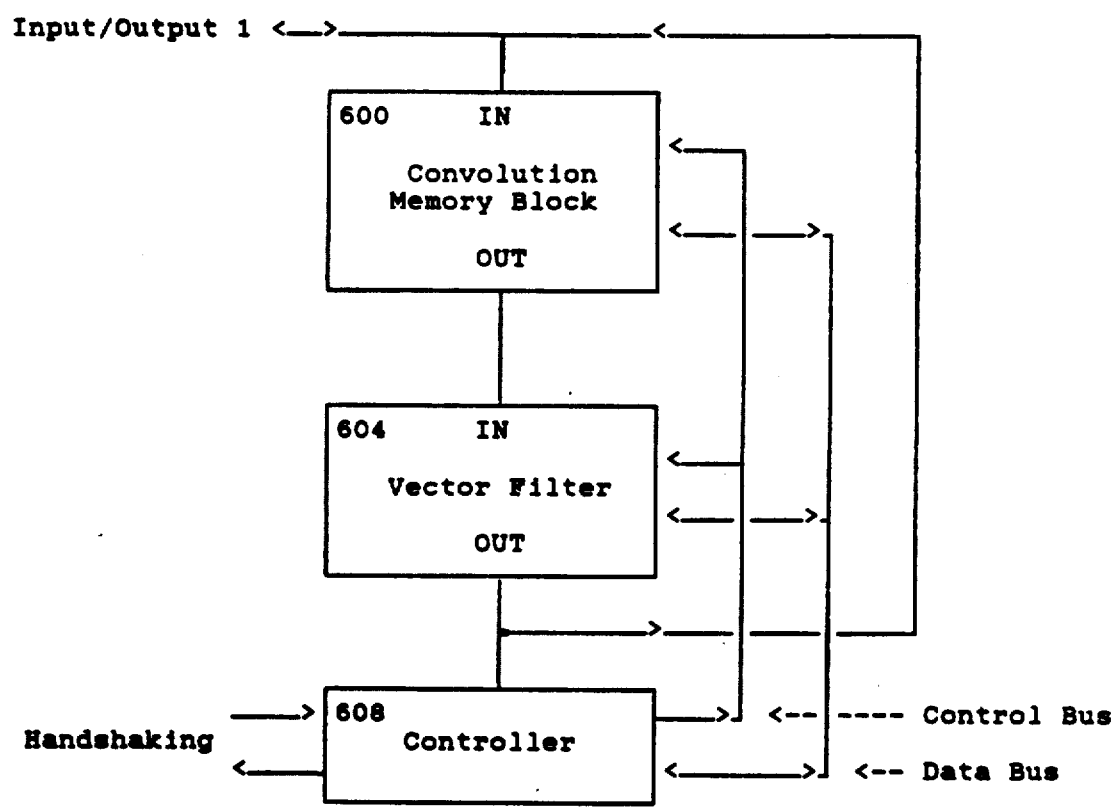

FIG. 6 is the block diagram of the digital equivalent of a Hopfield network using a convolution memory chip.

Figure 7:
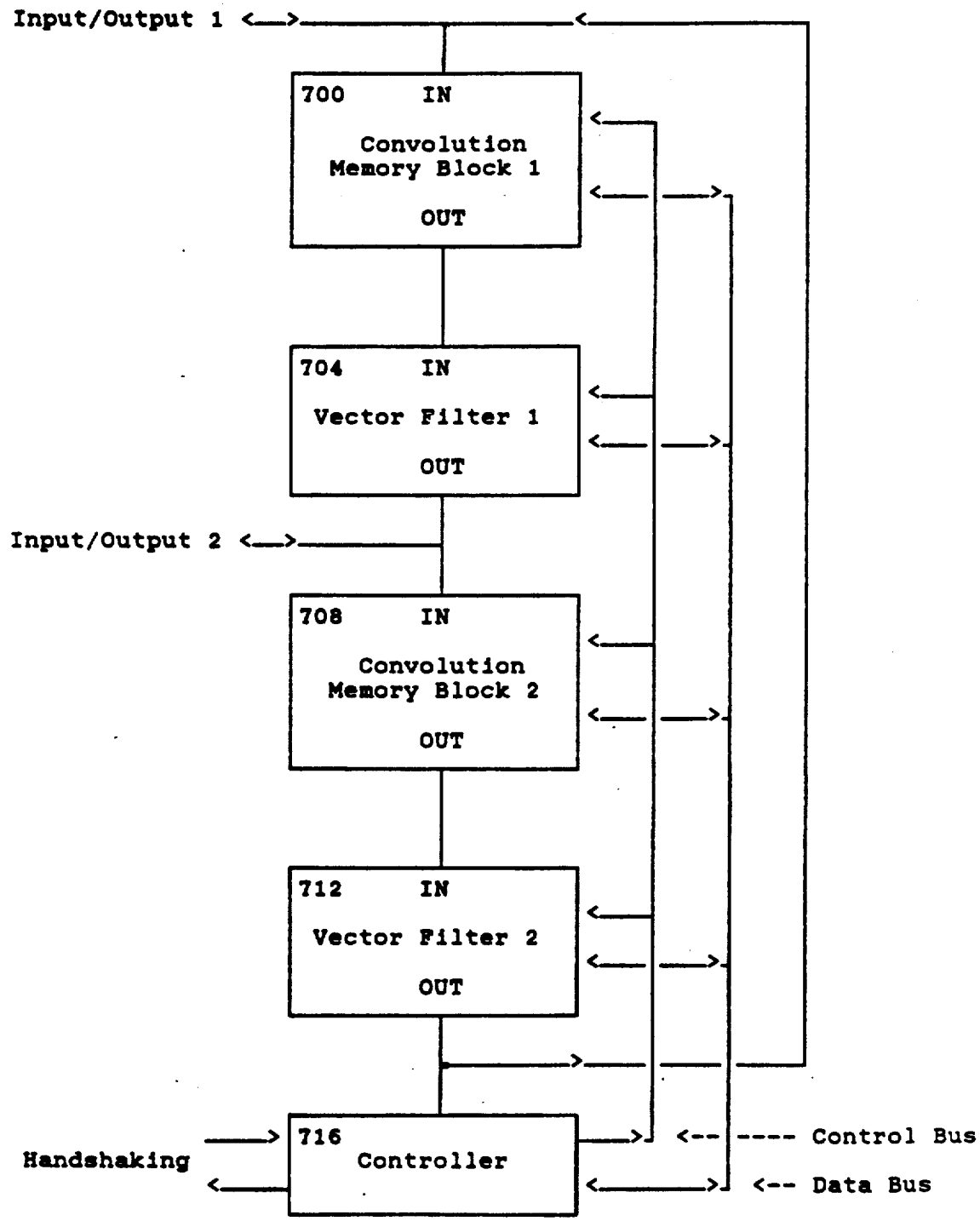

FIG. 7 is the block diagram of a digital bidirectional associative memory using a convolution memory block.

FIG. 8A is the memory map for a convolution memory storing a vertical matrix used in a digital bidirectional associative memory, and FIG. 8B is the memory map for a horizontal matrix used in a digital bidirectional associative memory.

FIG. 9A is a set of equations showing computations performed by a convolution memory upon a vertical matrix, and FIG. 9B is a set of equations showing computations performed by a convolution memory upon a horizontal matrix.

FIG. 10 is a table that compares an analog electro-optical bidirectional associative memory to a digital bidirectional associative memory using convolution memories.

2.2 Preferred Embodiment

Figure 11:
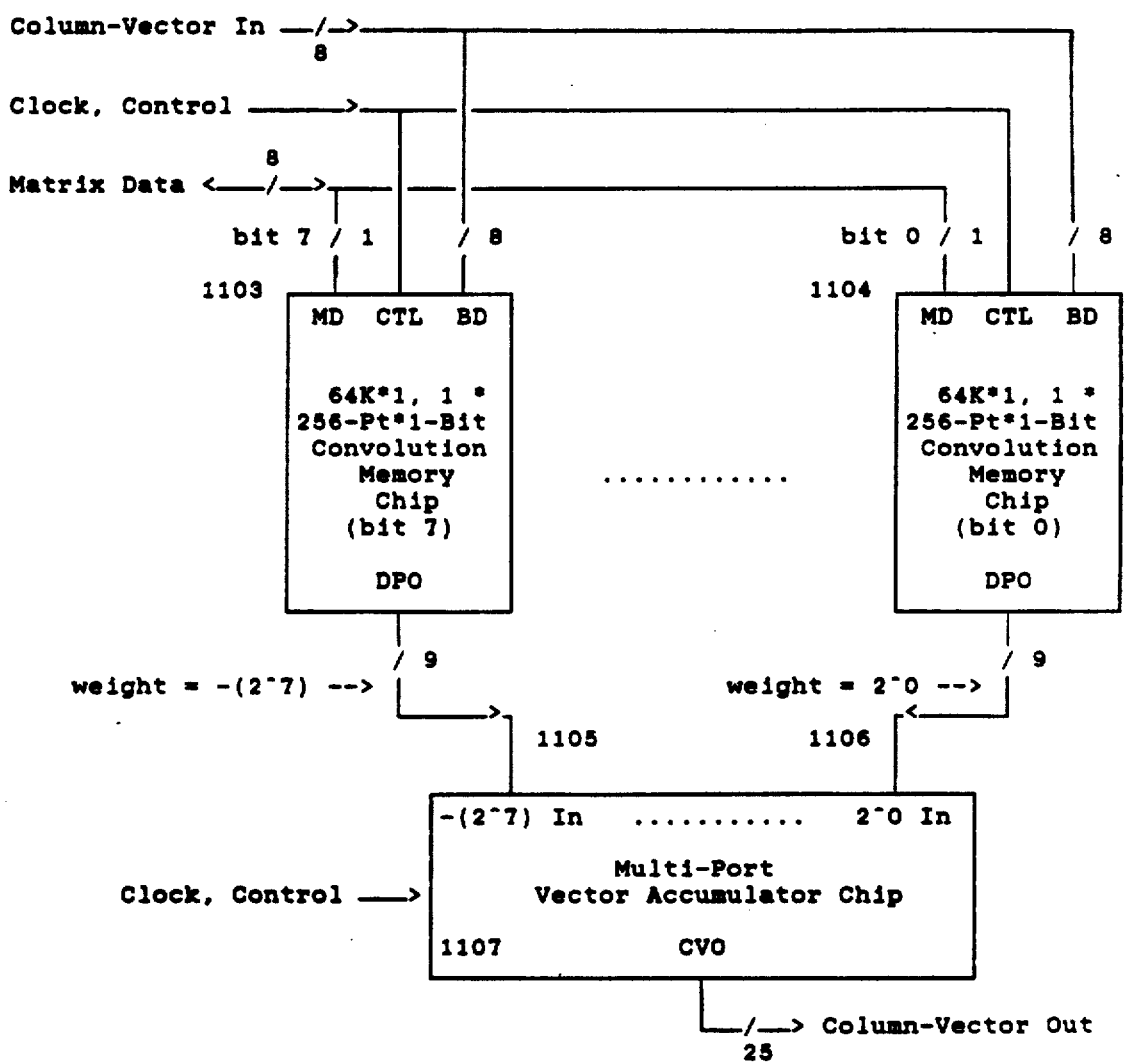

FIG. 11 is the simplified block diagram of an 8-bit convolution memory block.

Figure 12A:
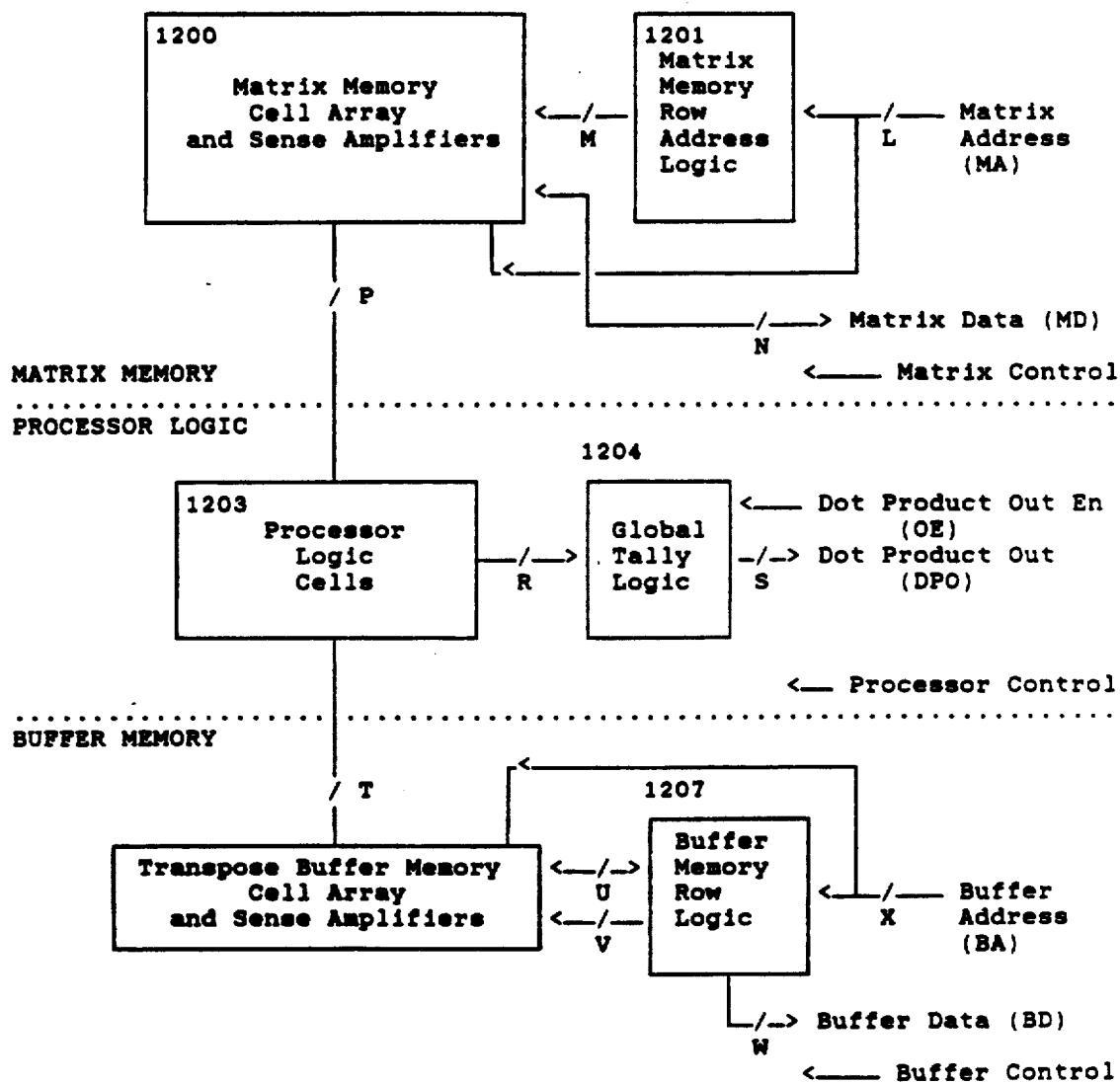
Figure 12B:
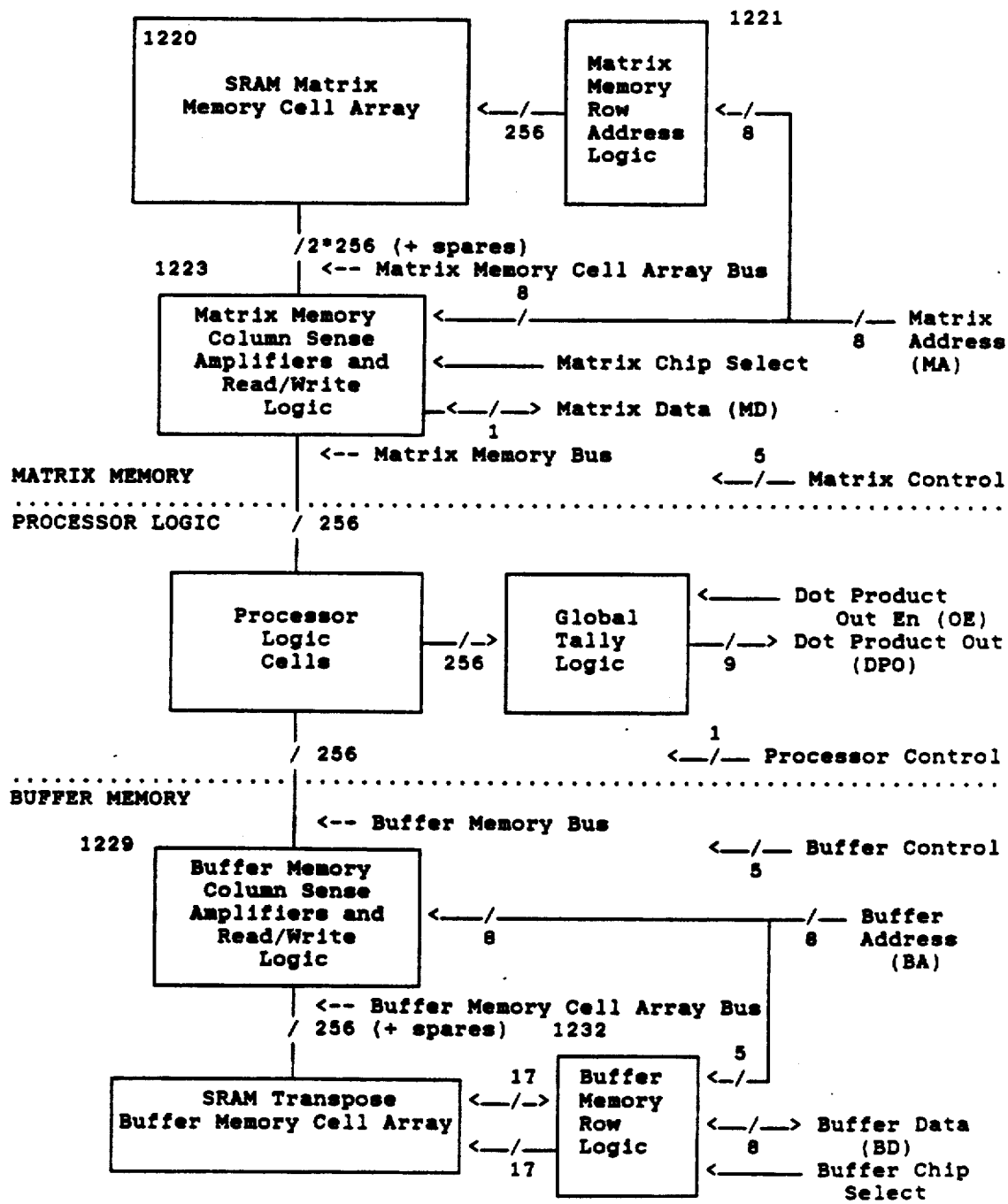

FIG. 12A is the simplified block diagram of a generic convolution memory chip, FIG. 12B is a detailed block diagram of a 64K*1, 1*256-point*1-bit convolution memory chip, FIG. 12C is a table of the pins and their functions, and FIG. 12D is the floorplan for the core of the "Interdigitated Buses" version of the chip.

Figure 13A:
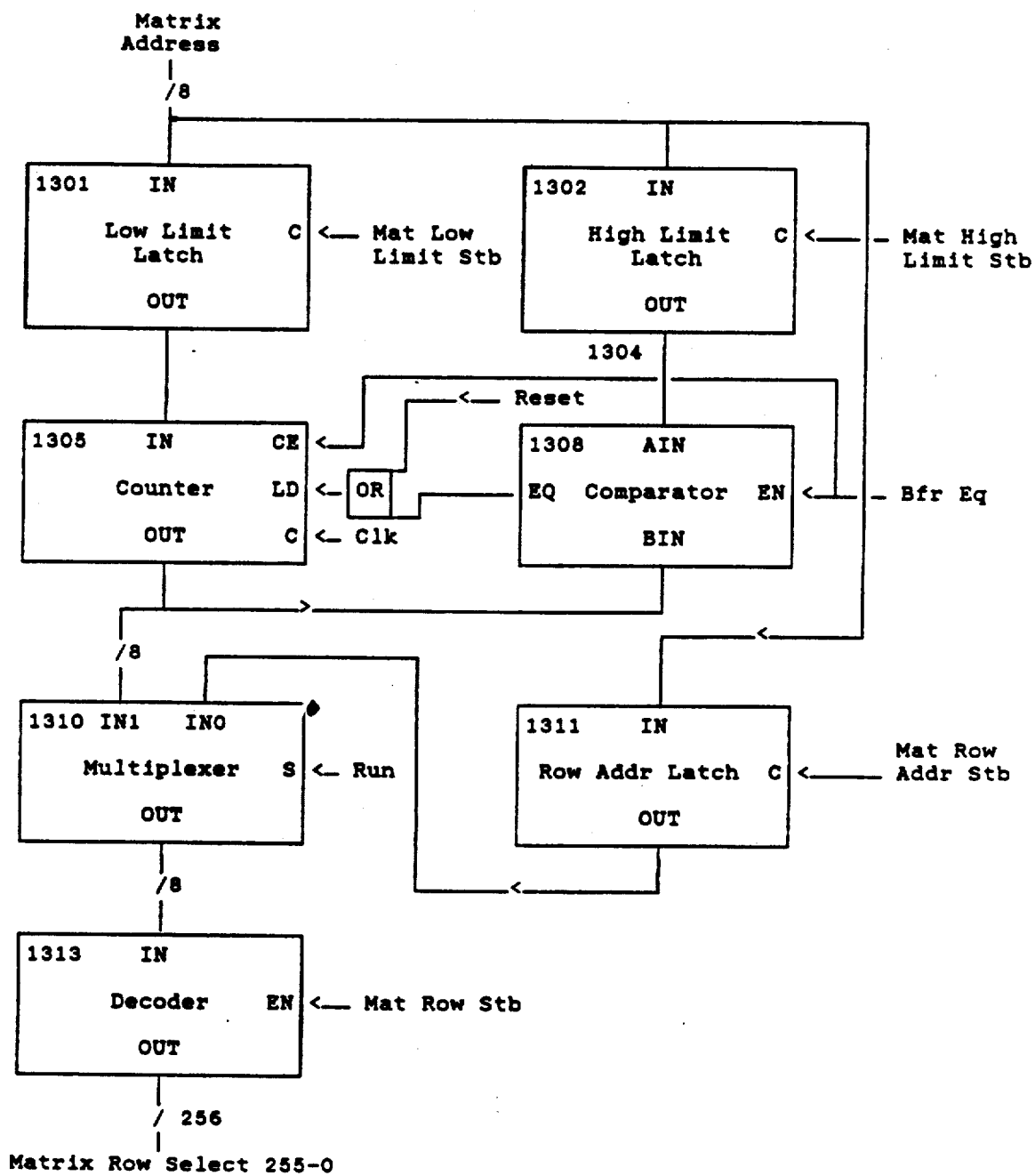
Figure 13B:
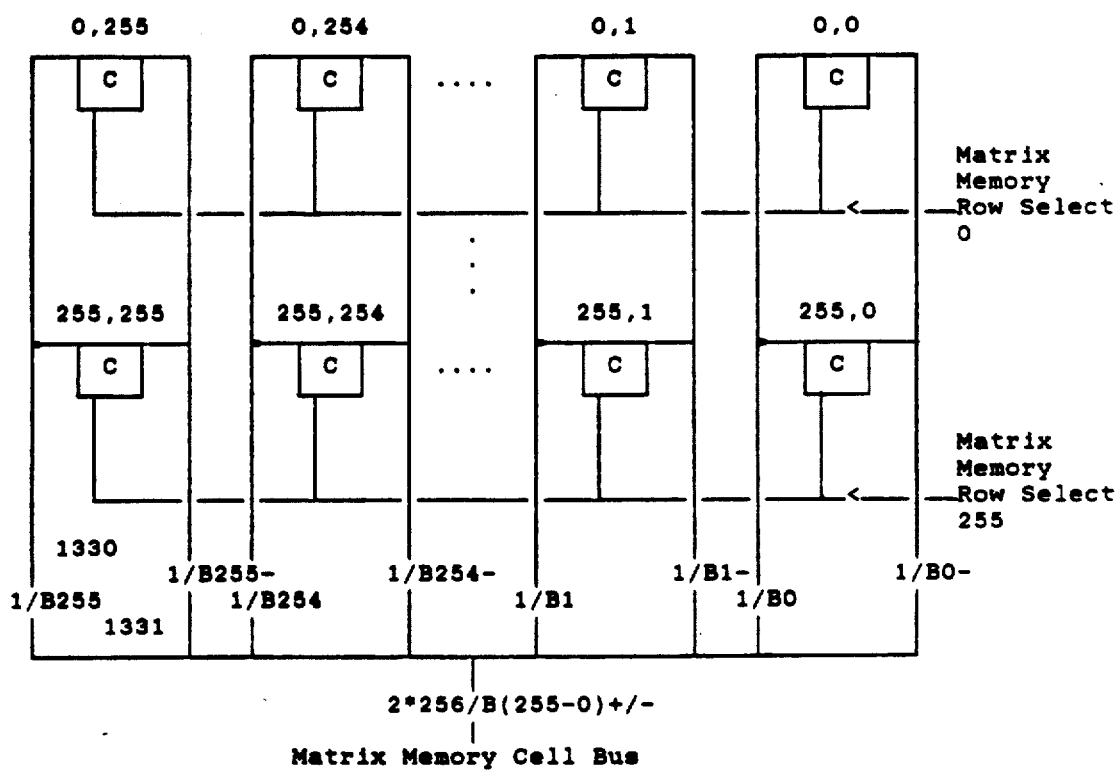
Figure 13C:
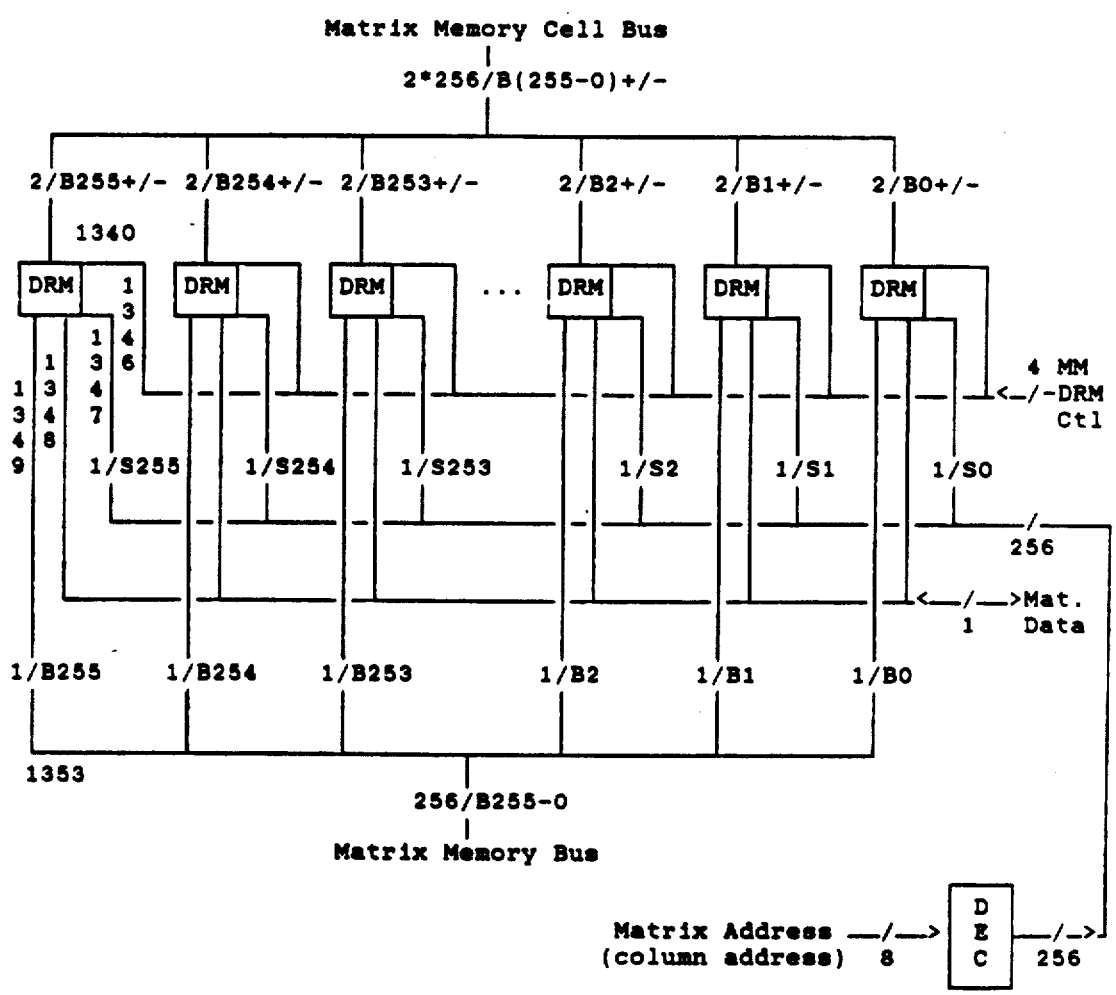

FIG. 13A is the block diagram of the matrix memory row address logic for a 64K*1, 1*256-point*1-bit convolution memory chip, FIG. 13B is a block diagram of the SRAM version of the matrix memory cell array, FIG. 13C is the block diagram for the sense amplifier and column read/write logic for the matrix memory, and FIG. 13D is the block diagram for the driver/receiver/multiplexer.

Figure 14A:
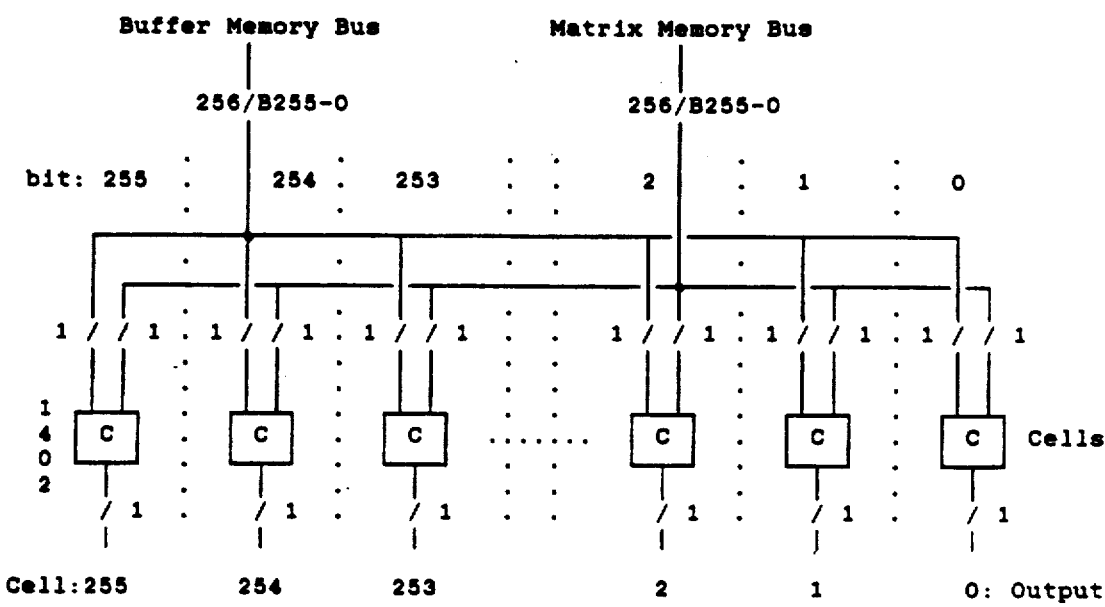
Figure 14B:
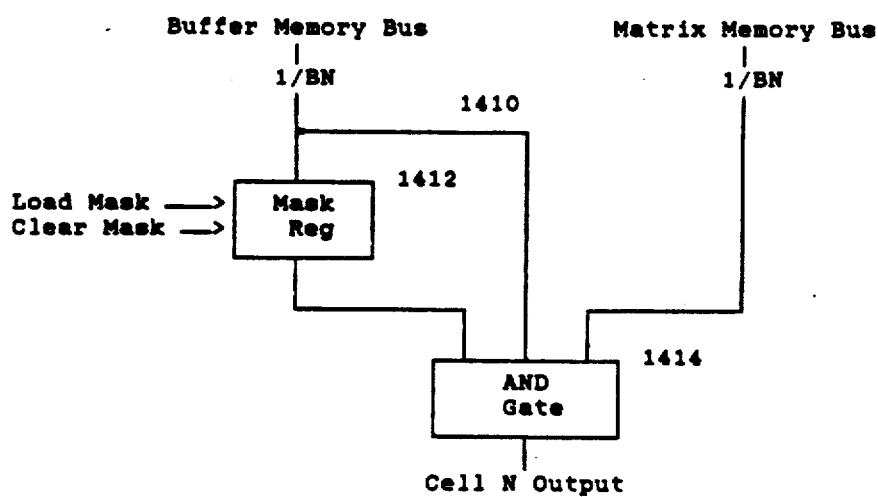

FIG. 14A is the block diagram of the processor logic cells for a 64K*1, 1*256-point*1-bit convolution memory chip, FIG. 14B is the cell block diagram, FIG. 14C is a table of the control signal states, and FIG. 14D is a table of control signal functions.

Figure 15A:
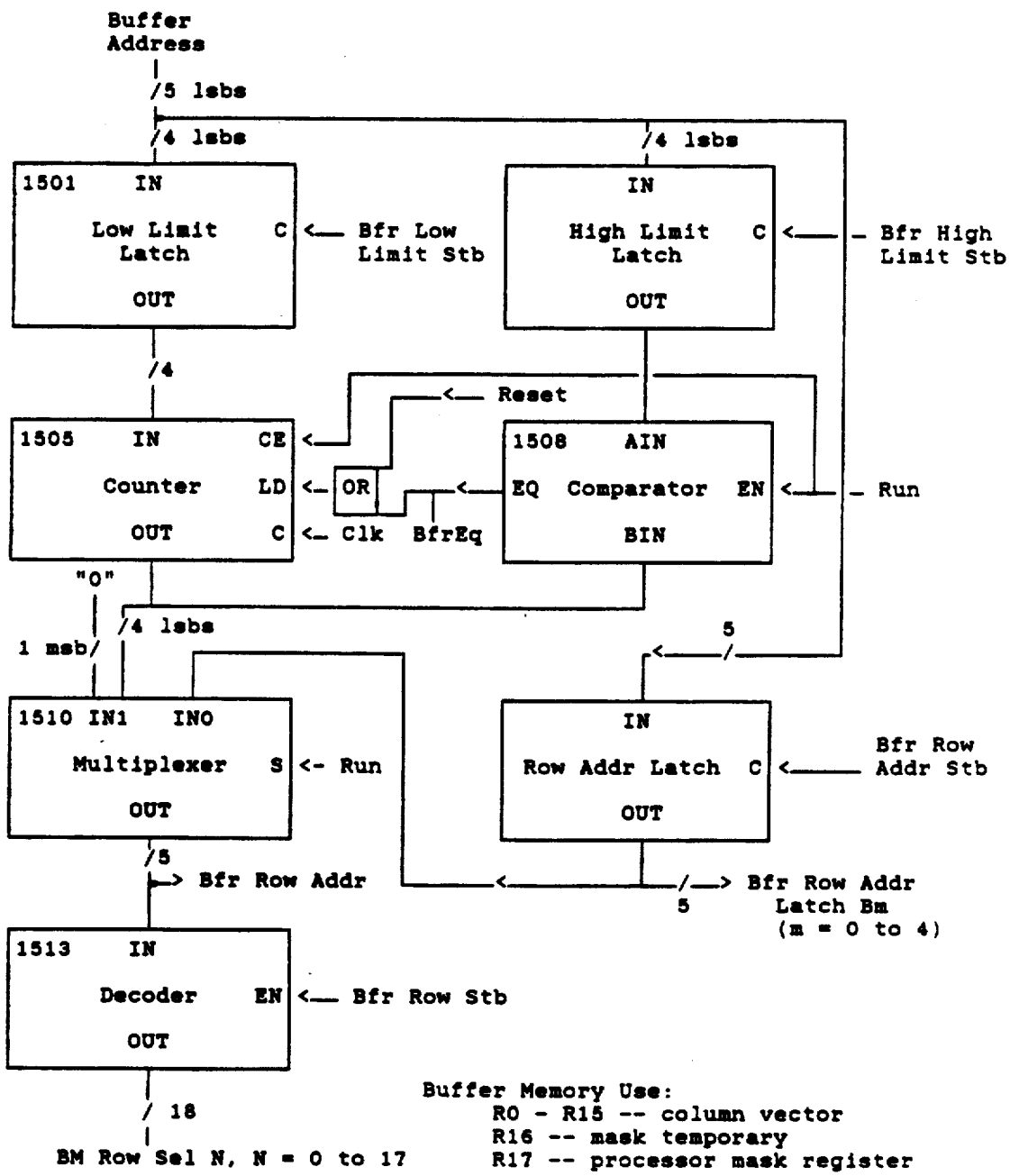
Figure 15B:
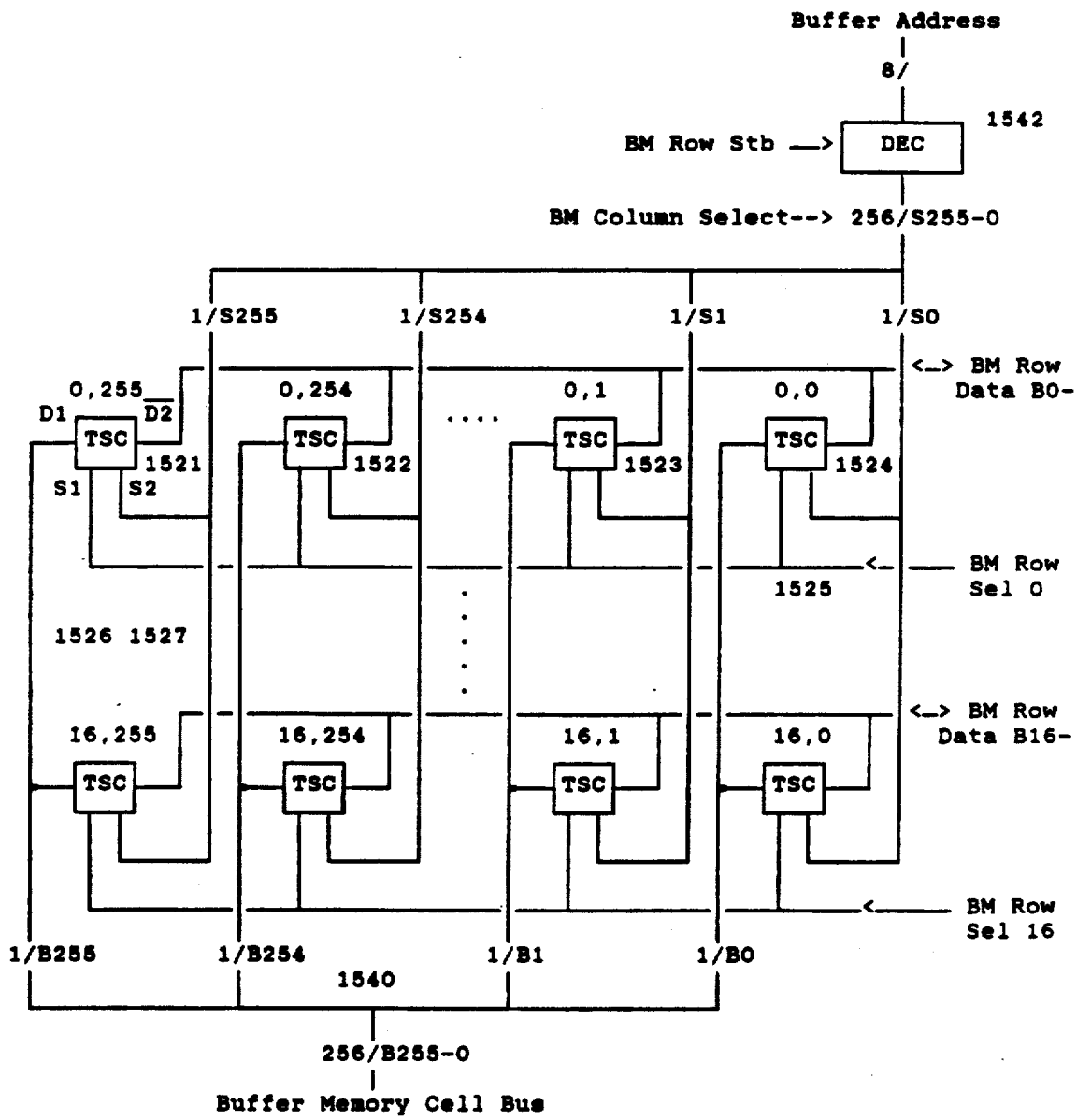
Figure 15D:
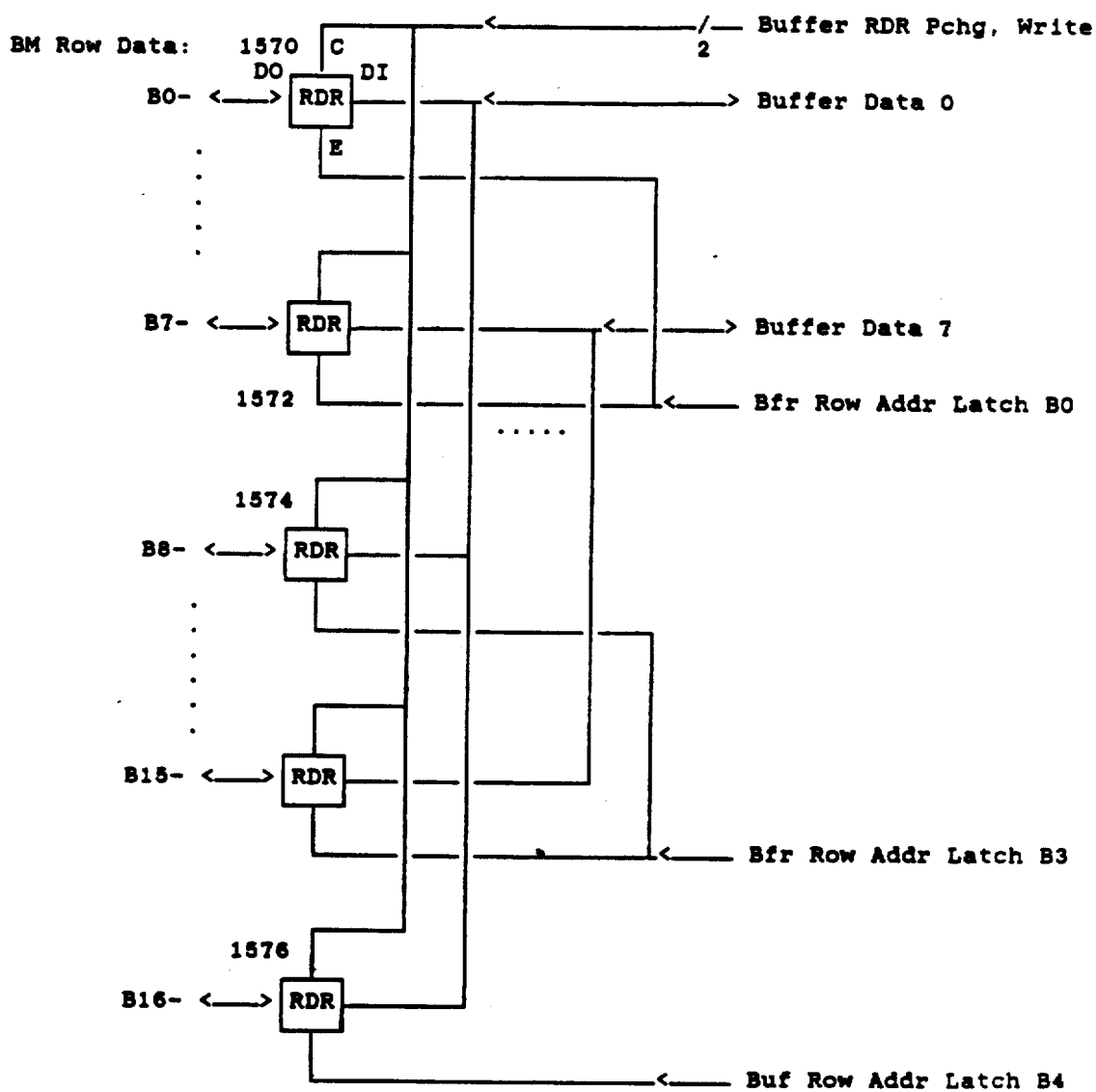
Figure 15E:
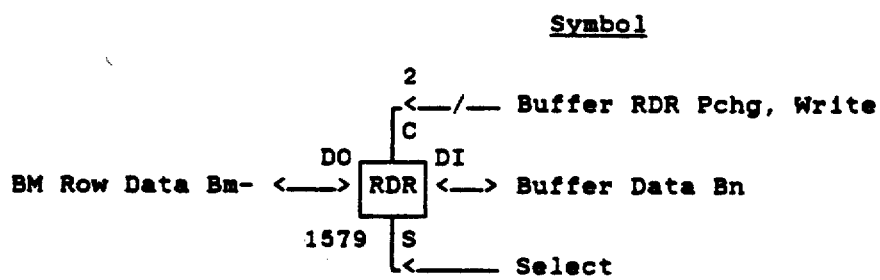

FIG. 15A is the block diagram of the buffer memory row address logic, FIG. 15B is the block diagram of the transpose buffer memory cell array, FIG. 15C is the block diagram, truth table, and schematic diagram for the buffer memory transpose storage cell, FIG. 15D is the block diagram for the buffer memory row sense amplifier, FIG. 15E is the block diagram for the buffer memory row driver/receiver, and FIG. 15F is the block diagram for the buffer memory column sense amplifier and read/write logic.

2.3 Convolution Memory Blocks

Figure 16:
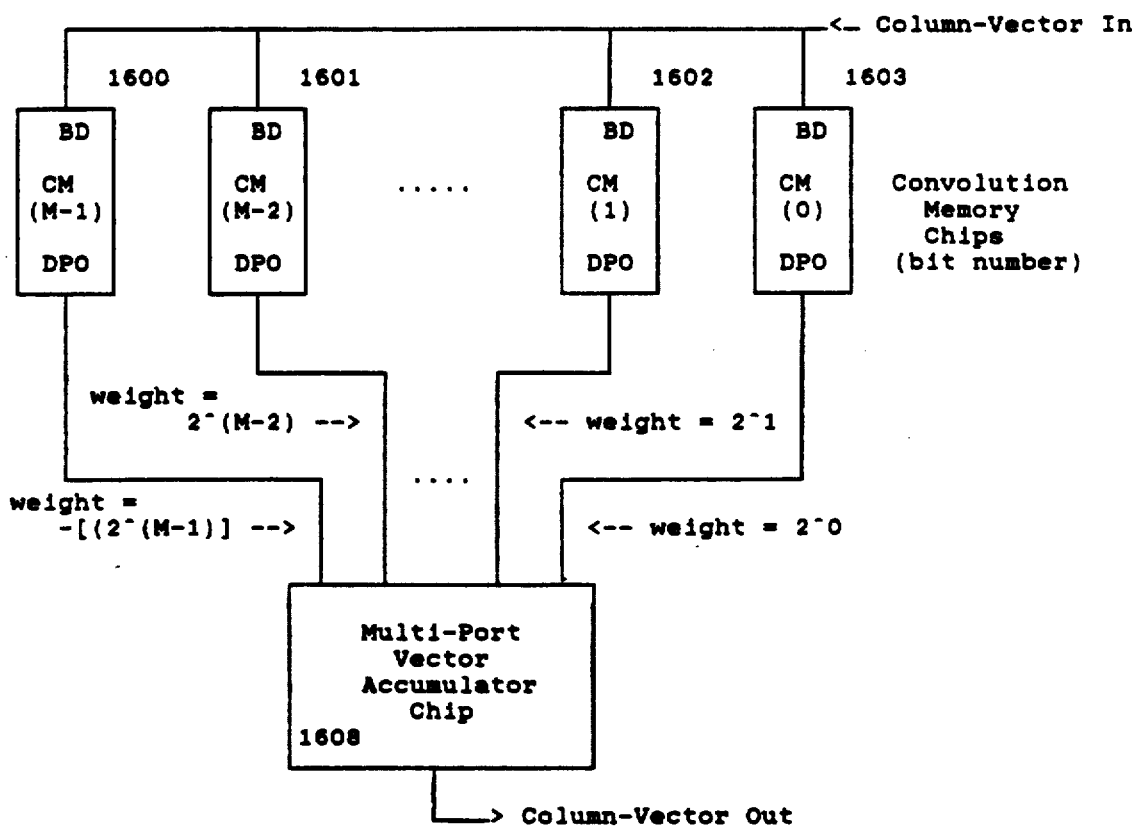

FIG. 16 is the block diagram for a convolution memory block with medium parallelism.

Figure 17:
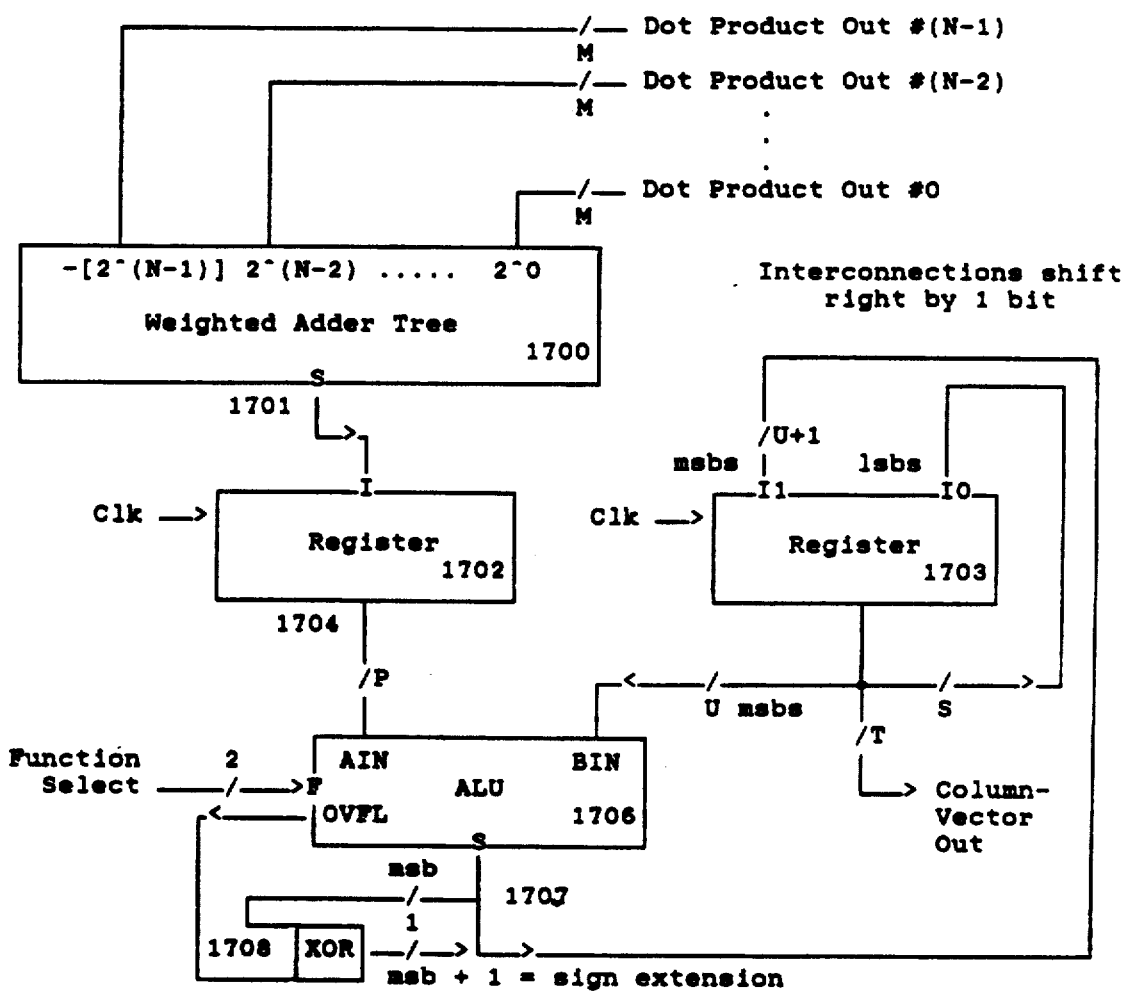

FIG. 17 is the simplified block diagram of a multi-port vector accumulator chip having minimum latency.

Figure 18:
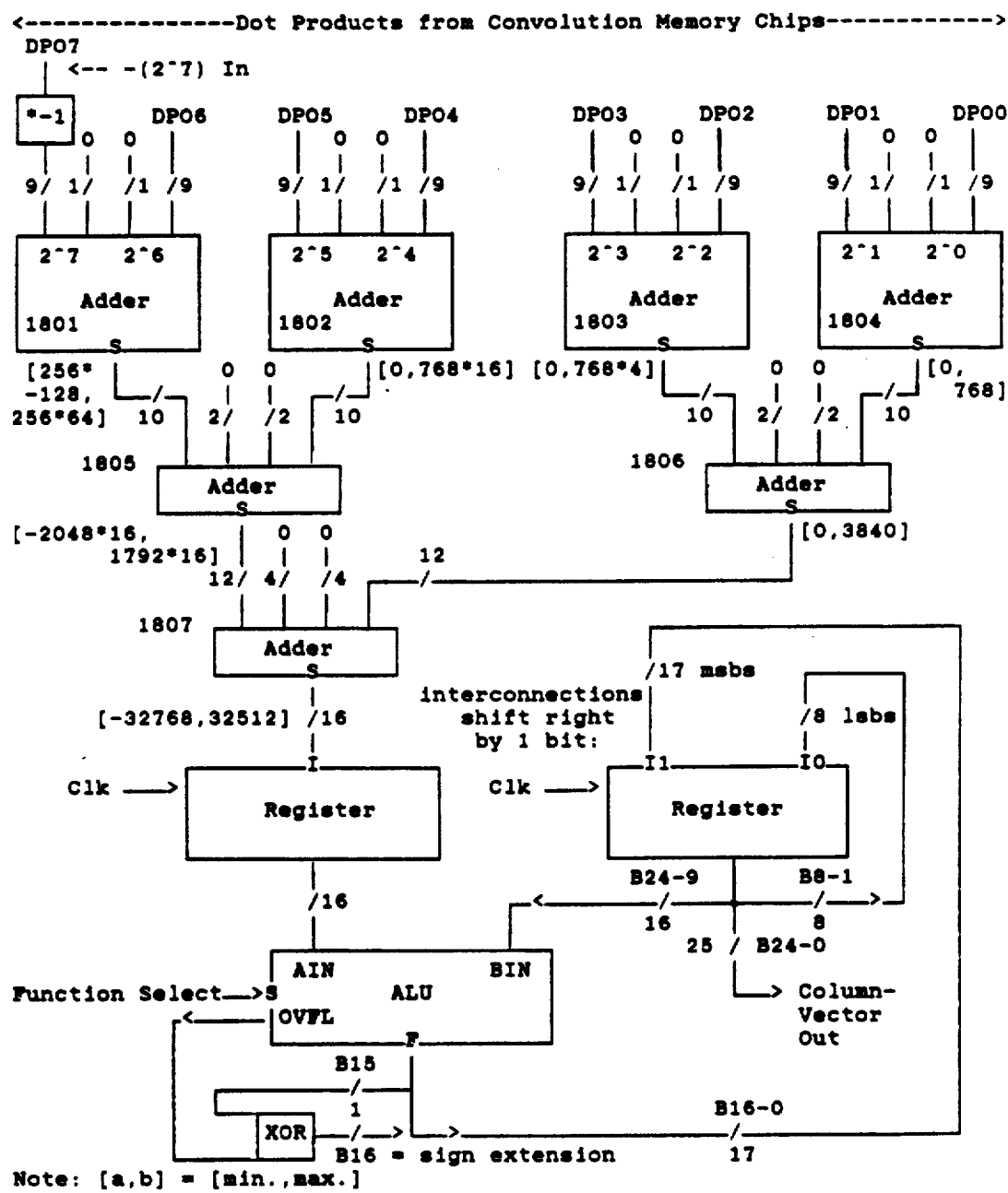

FIG. 18 is the block diagram of a 256-point, 8*8-bit, eight-port vector accumulator chip.

FIG. 19 is pseudo-code to explain the minimum-latency, row-serial, bit-serial, element-parallel method for the multiplication of a matrix times a vector.

FIGS. 20A to 20C are a numeric example of the use of convolution memory chips to perform a matrix-times-vector multiplication.

2.4 Alternative Embodiments

Figure 21:
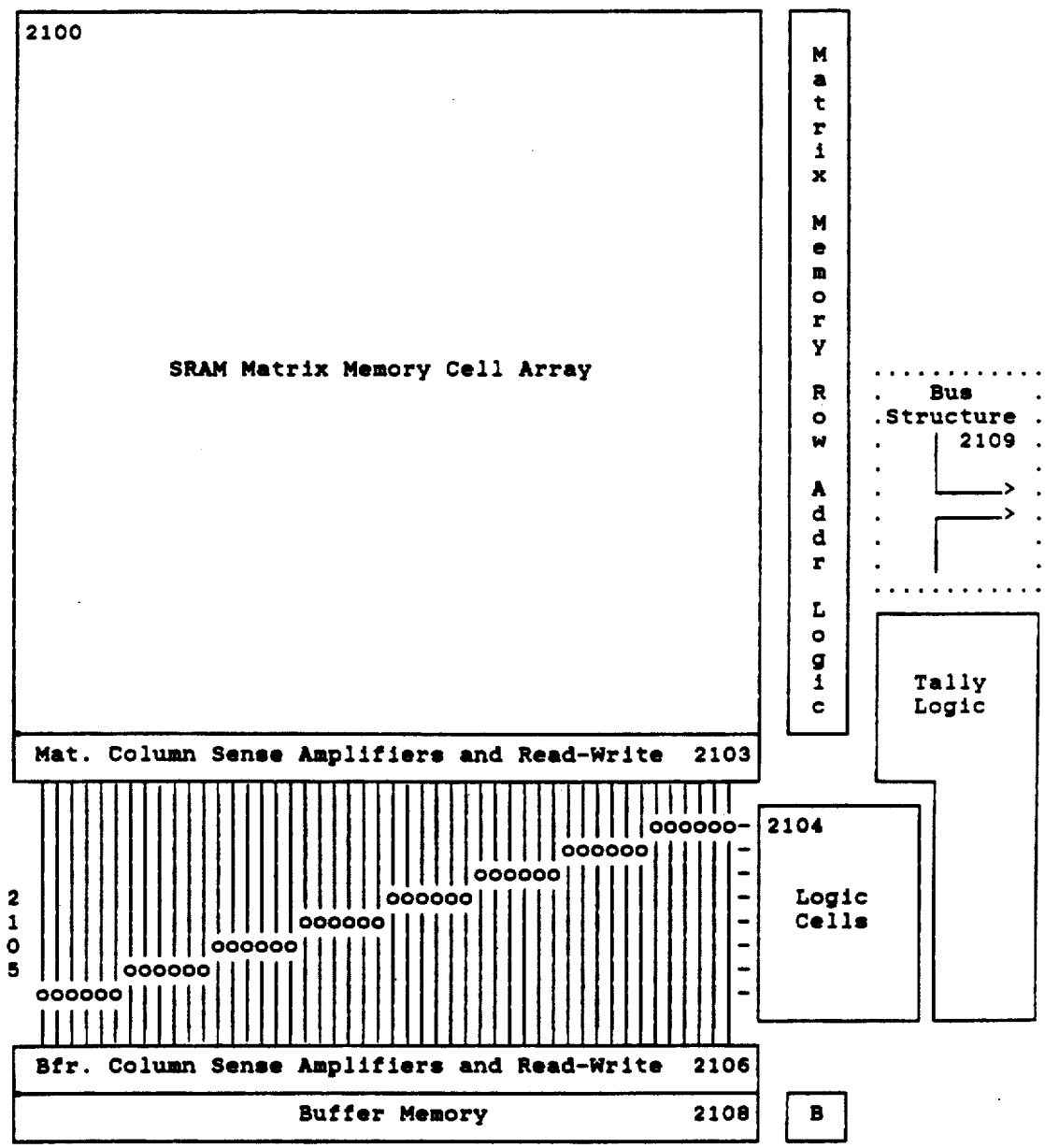

FIG. 21 is the floorplan for the core of the "T-bus" version of the 64K*1, 1*256-point*1-bit convolution memory chip.

Figure 22A:
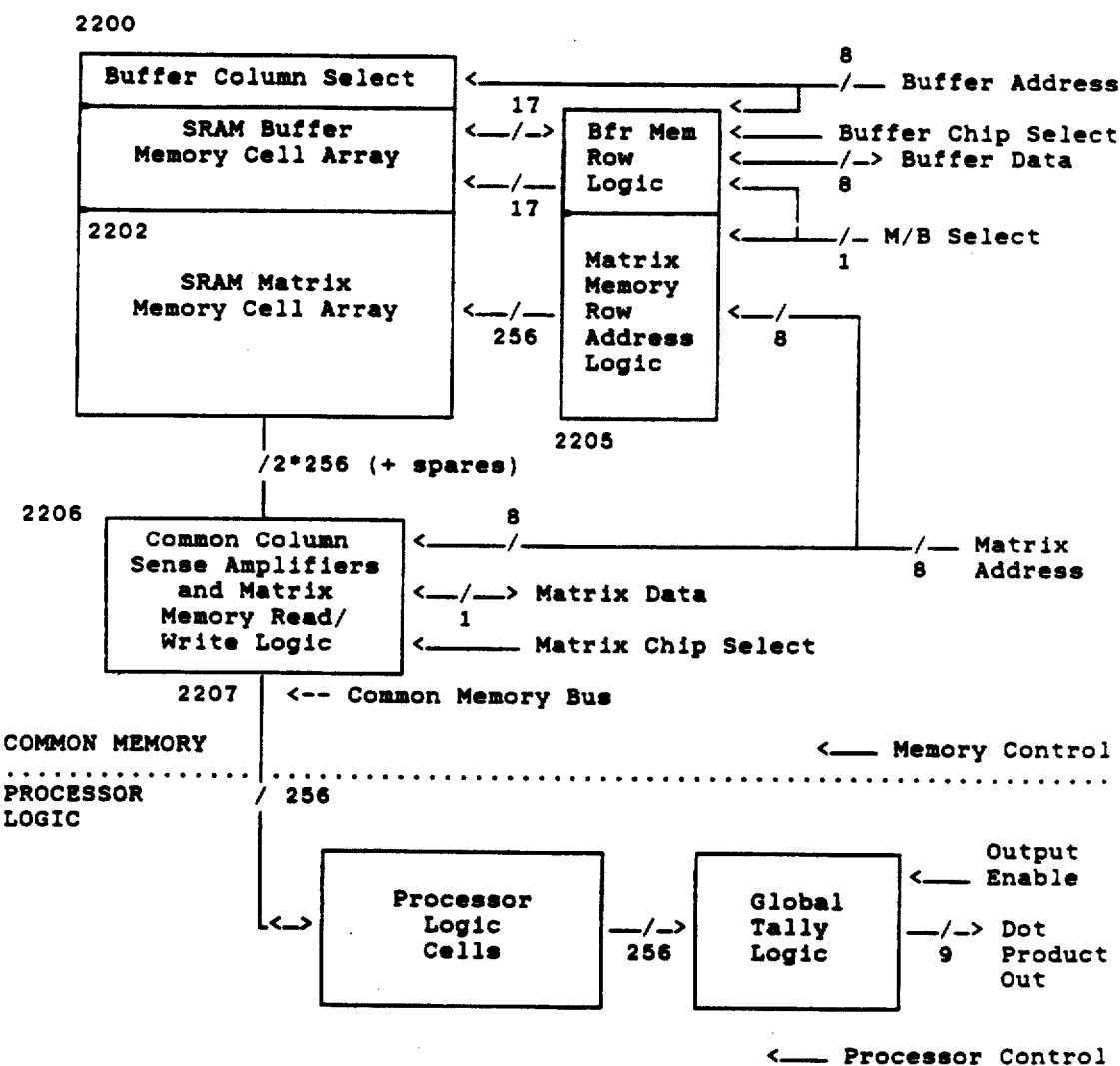
Figure 22B:
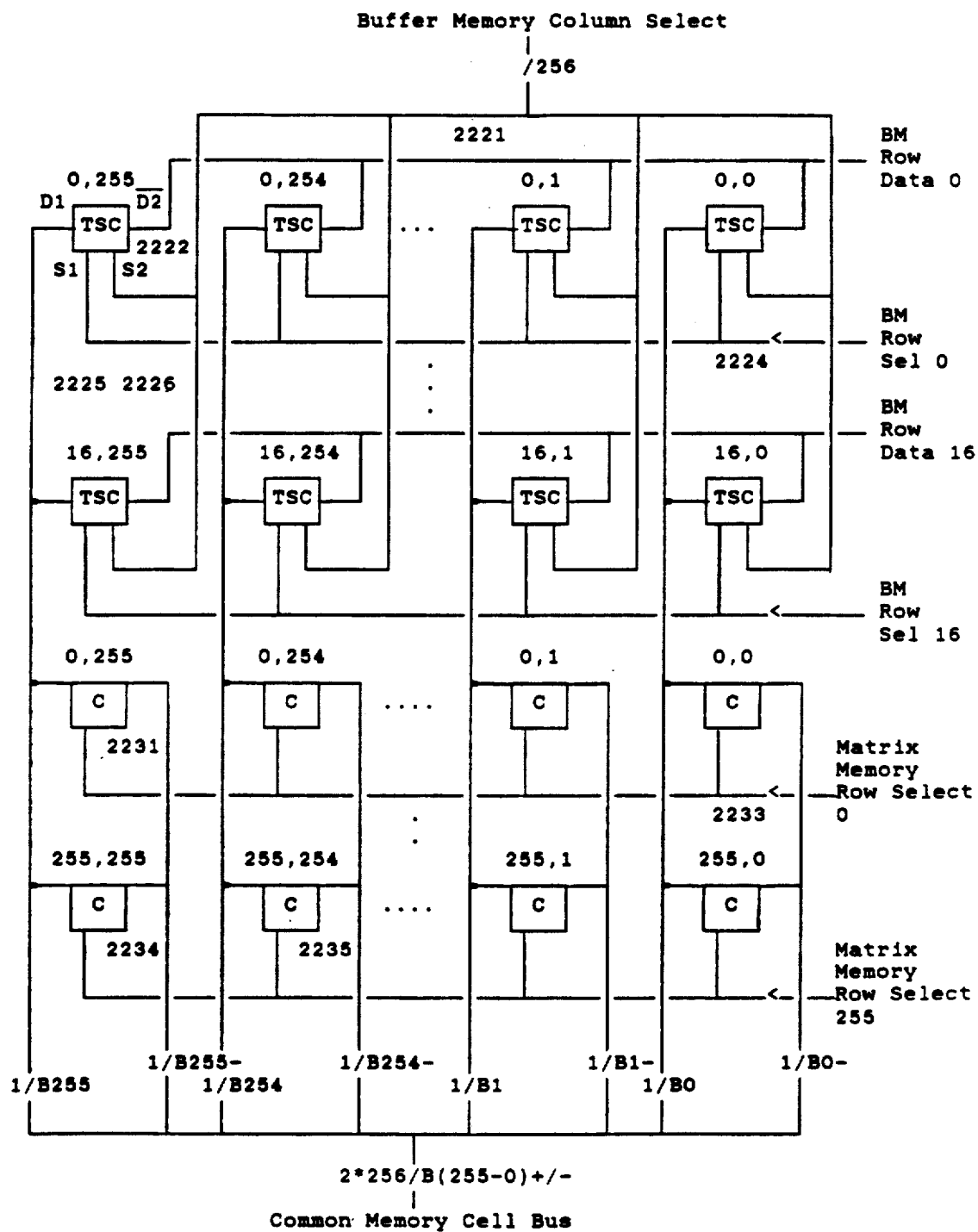
Figure 22C:
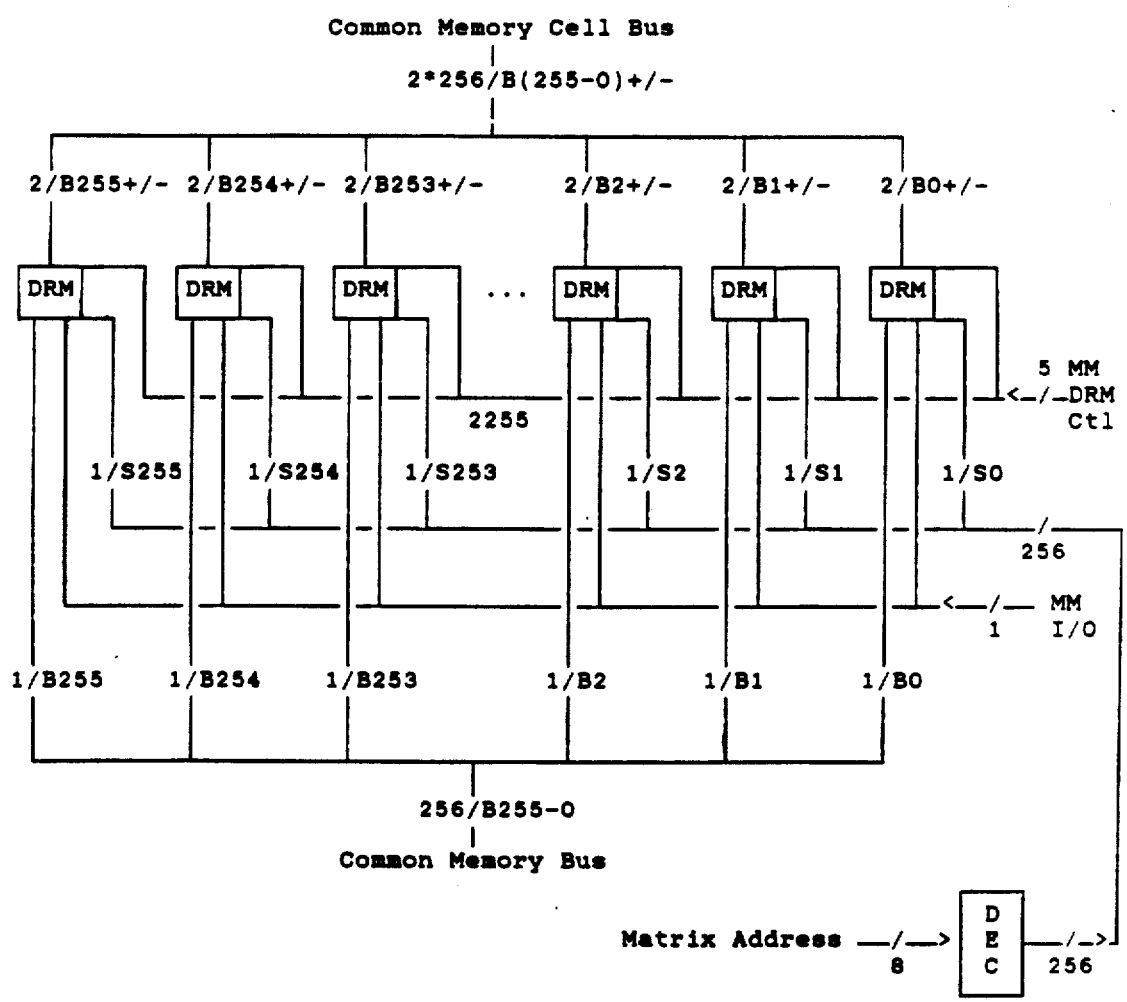
Figure 22E:
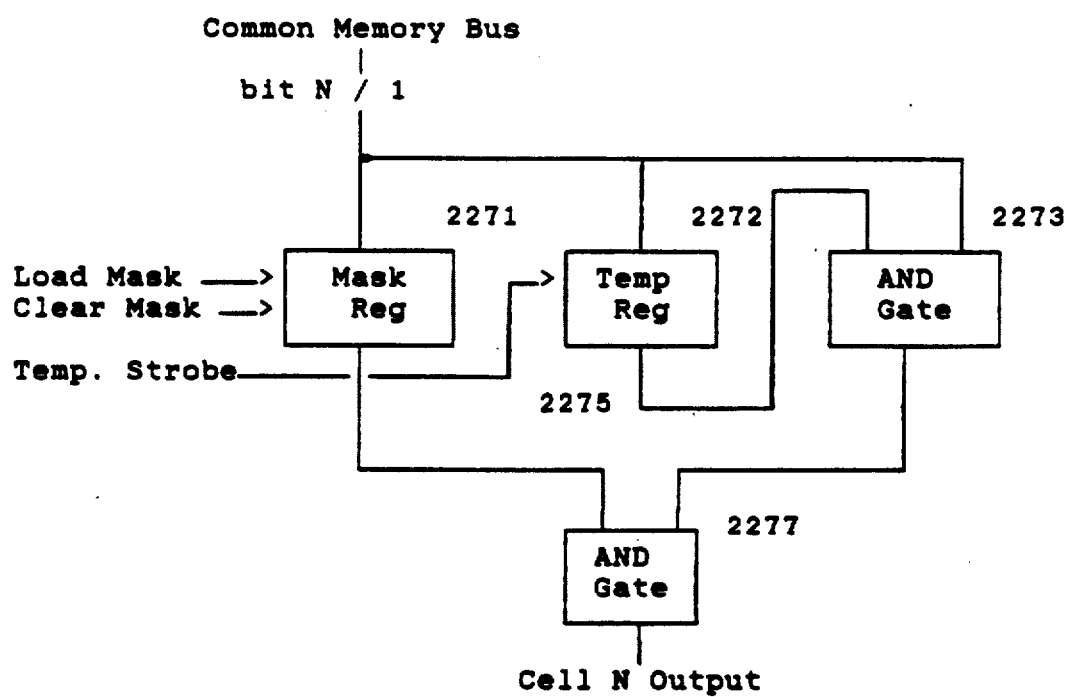
Figure 22F:
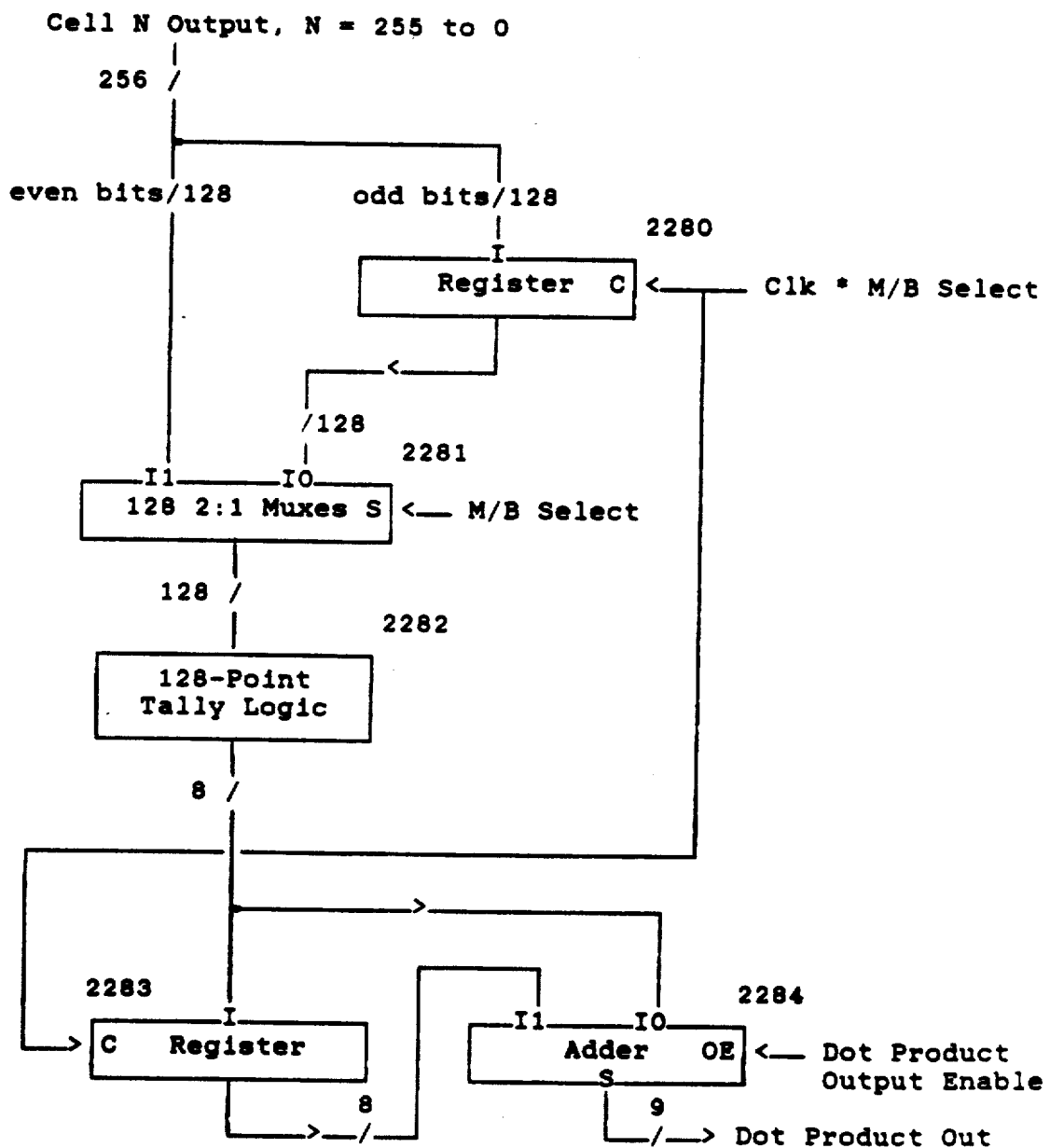

FIG. 22A is the detailed block diagram for the "Common Bus" version of the 64K*1, 1*256-point*1-bit convolution memory chip, FIG. 22B is the block diagram for the common memory cell array, FIG. 22C is the block diagram for the common column sense amplifiers and matrix memory read-write logic, FIG. 22D is the block diagram for the single-ended/double-ended driver/receiver/multiplexer, FIG. 22E is the block diagram for the single-bus processor cell, FIG. 22F is a block diagram of the common bus tally logic, and FIG. 22G is the floorplan for the core of the chip.

Figure 23:
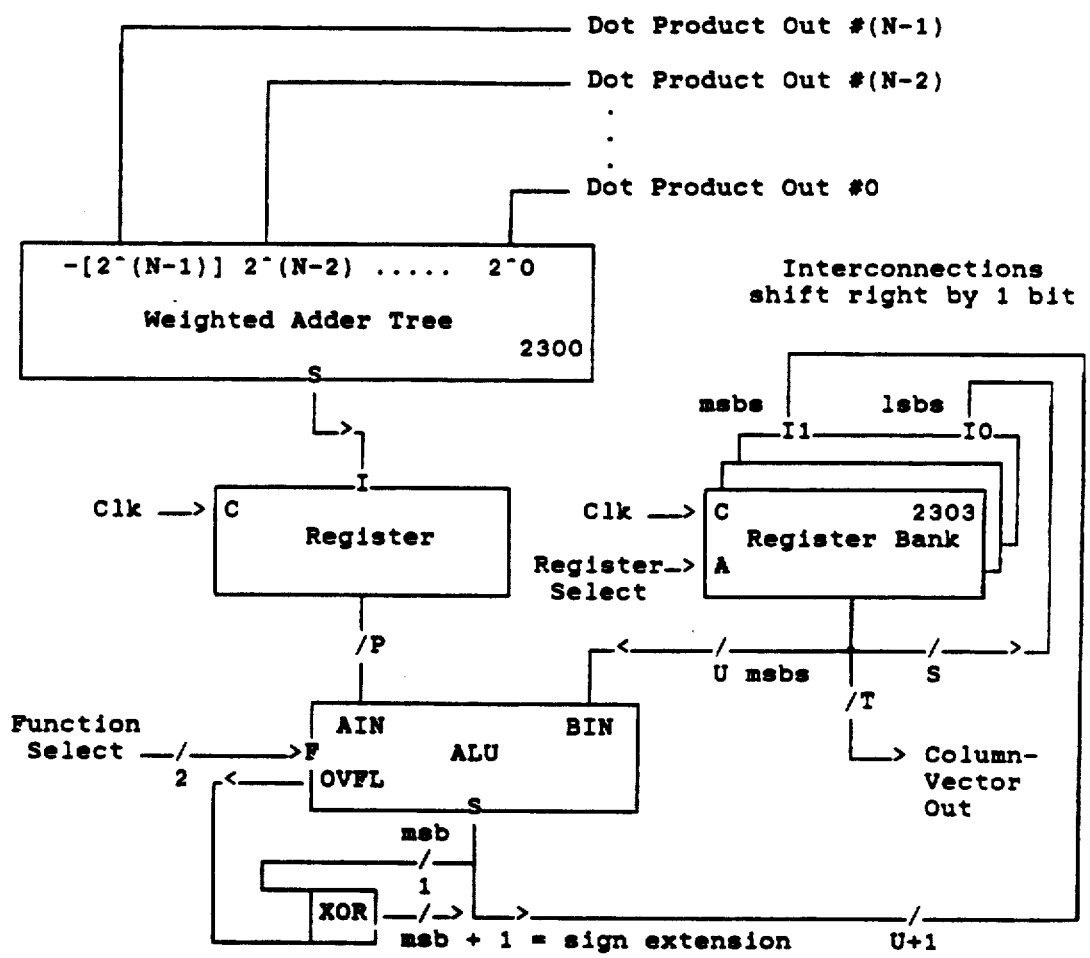

FIG. 23 is the simplified block diagram of a multiport vector accumulator chip having maximum latency.

FIG. 24 is pseudo-code to explain the maximum-latency, bit-serial, row-serial, element-parallel method for the multiplication of a matrix times a vector.

Figure 25A:
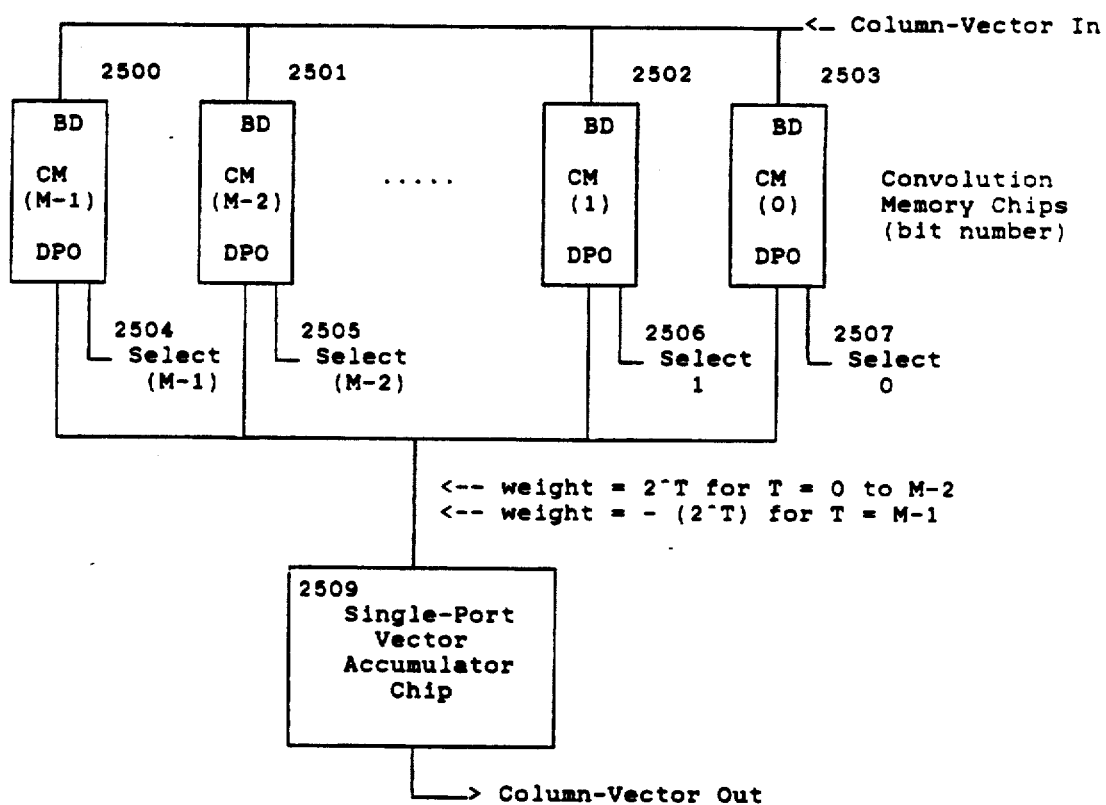
Figure 25B:
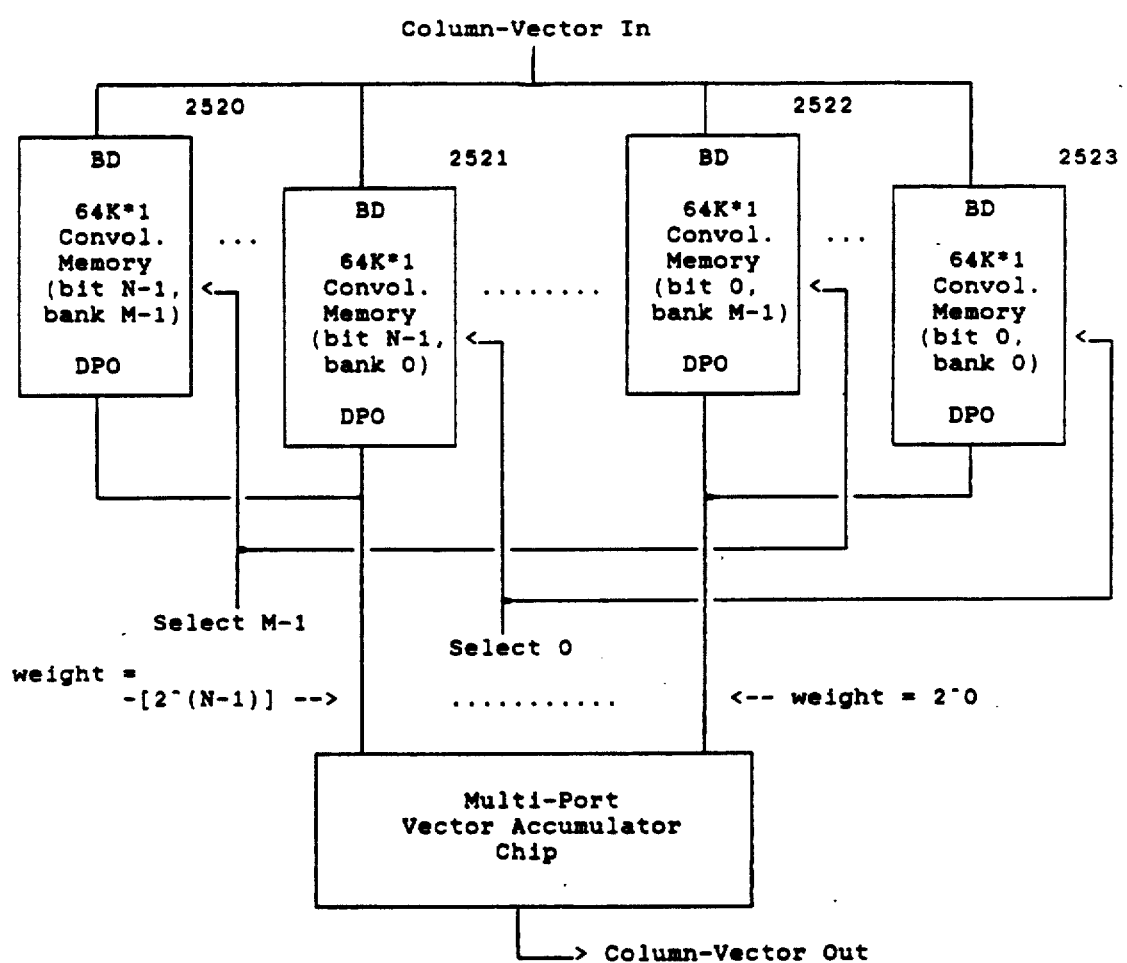
Figure 25C:
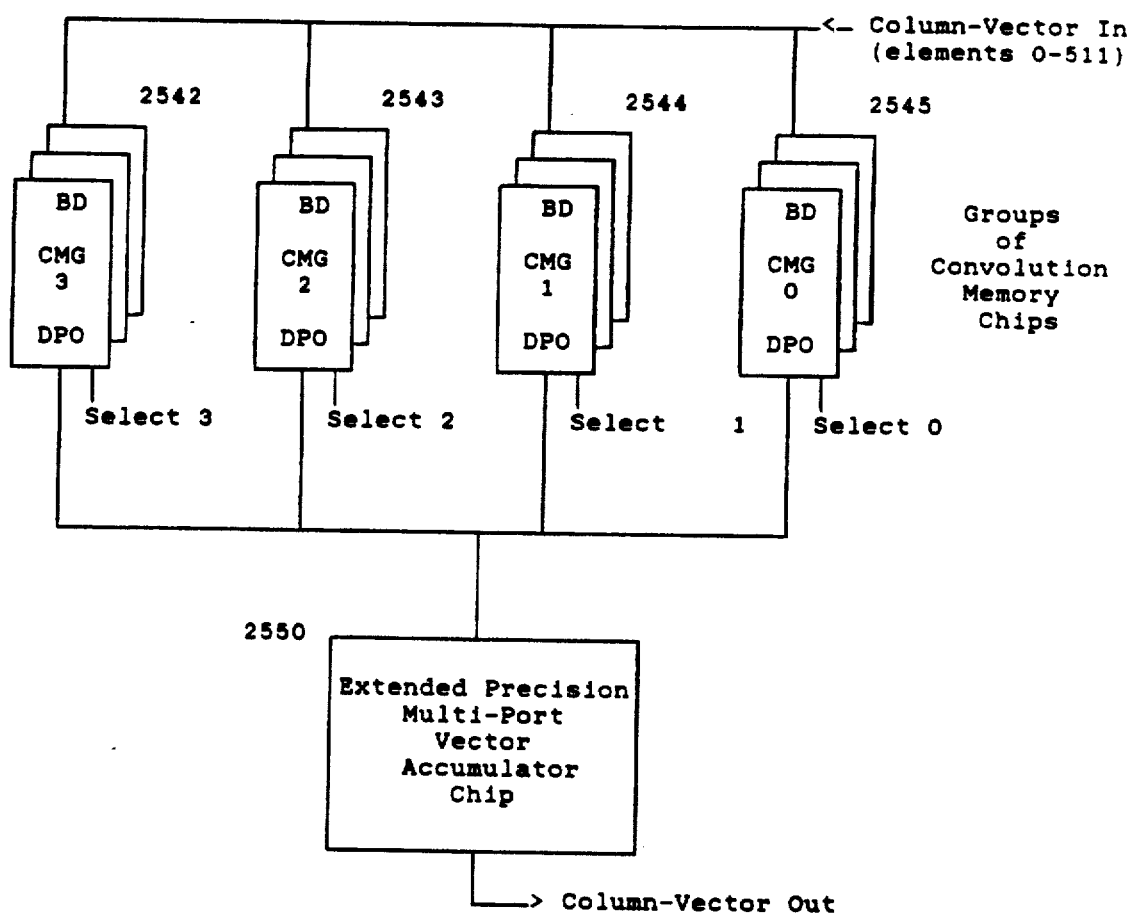
Figure 25D:
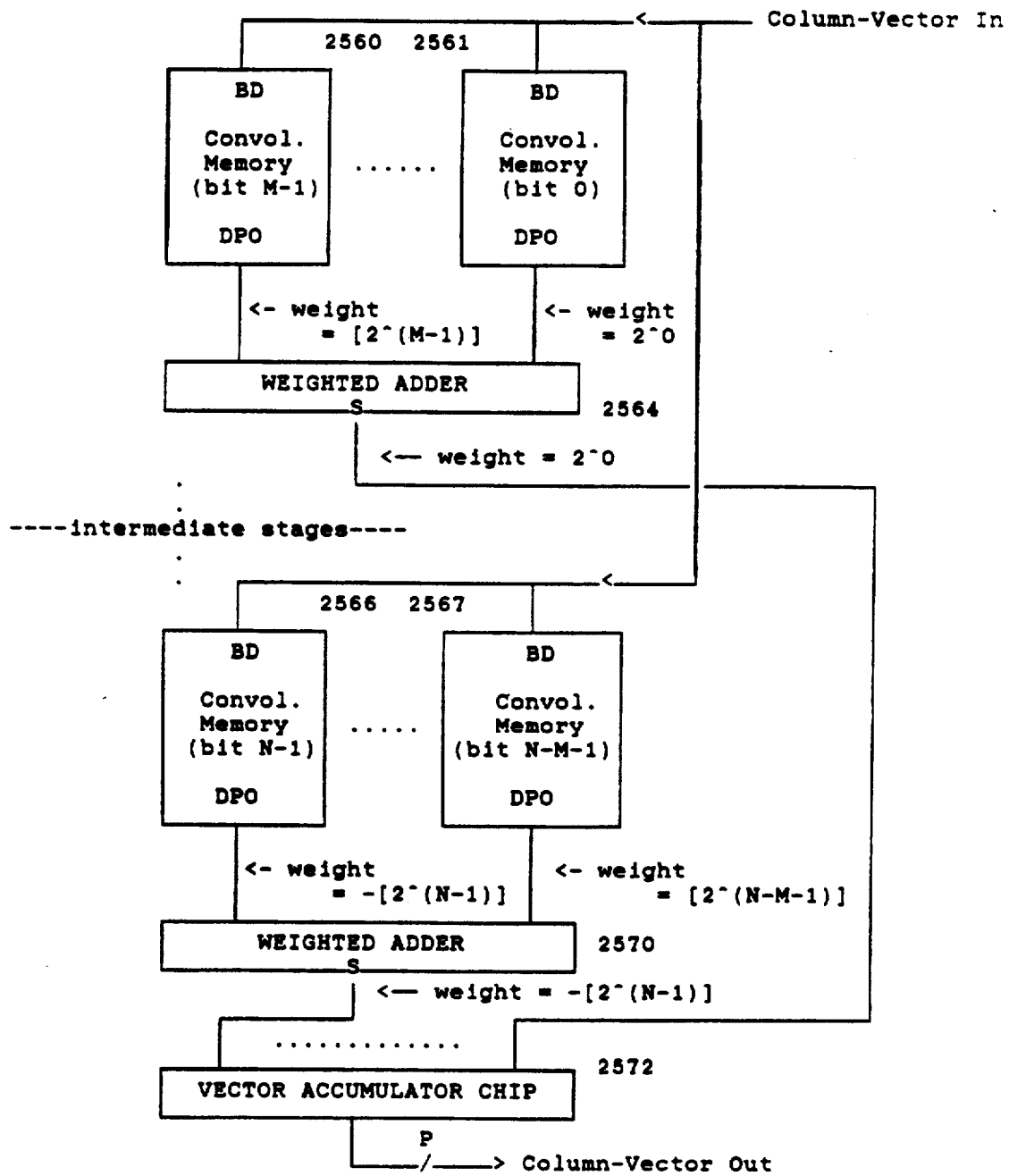
Figure 25E:
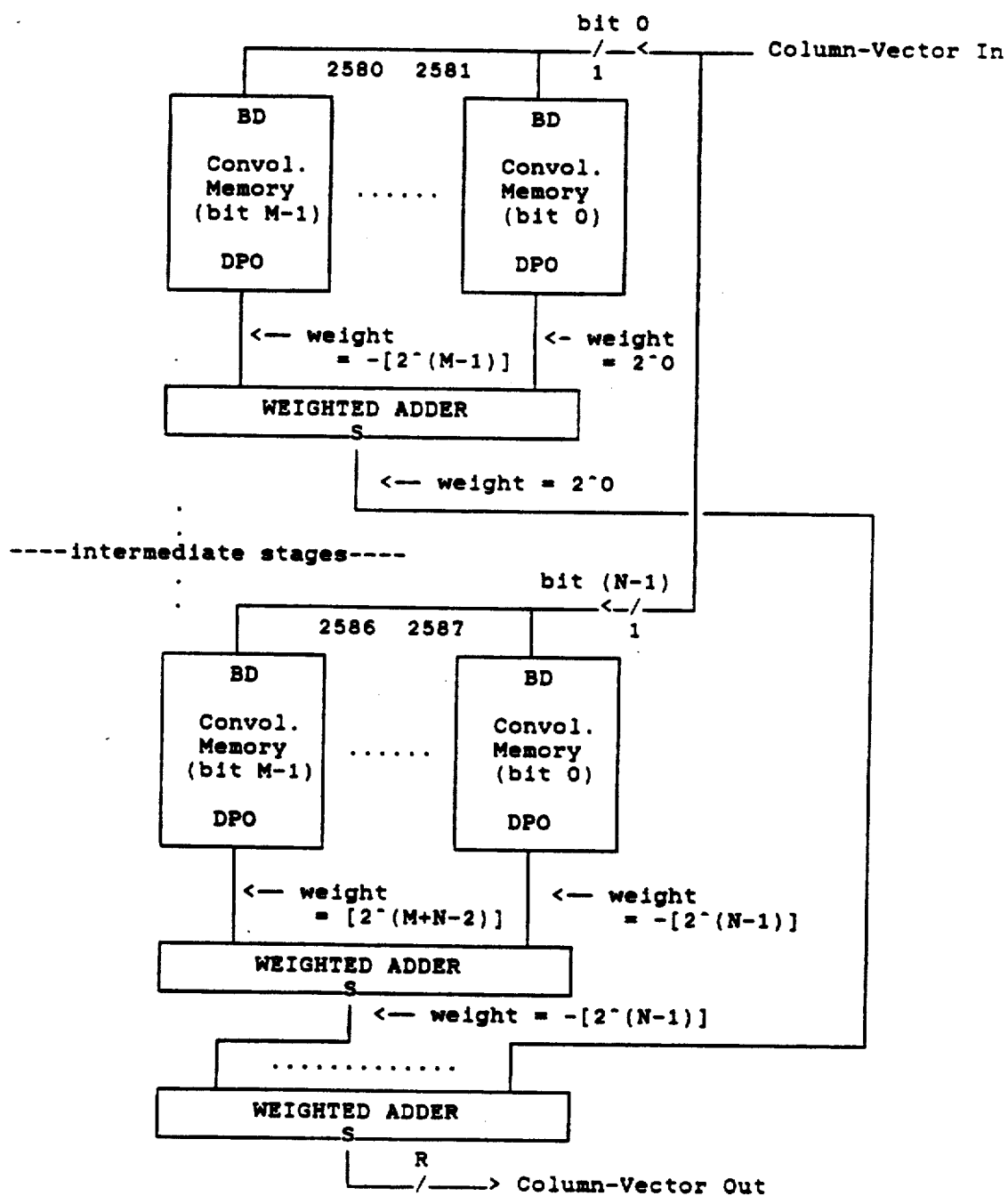

FIG. 25A is the block diagram for a convolution memory block with minimal parallelism, FIG. 25B is the block diagram of a multi-bank convolution memory block, FIG. 25C is the block diagram of a convolution memory block that handles a large matrix, FIG. 25D is the block diagram of a hierarchical network of adders feeding a vector accumulator chip, and FIG. 25E is the block diagram of a convolution memory block with maximum parallelism.

FIG. 26 is a table showing rank-256 matrix*vector performance estimates for a system of convolution memory chips and vector accumulator chips.

Figure 27A:
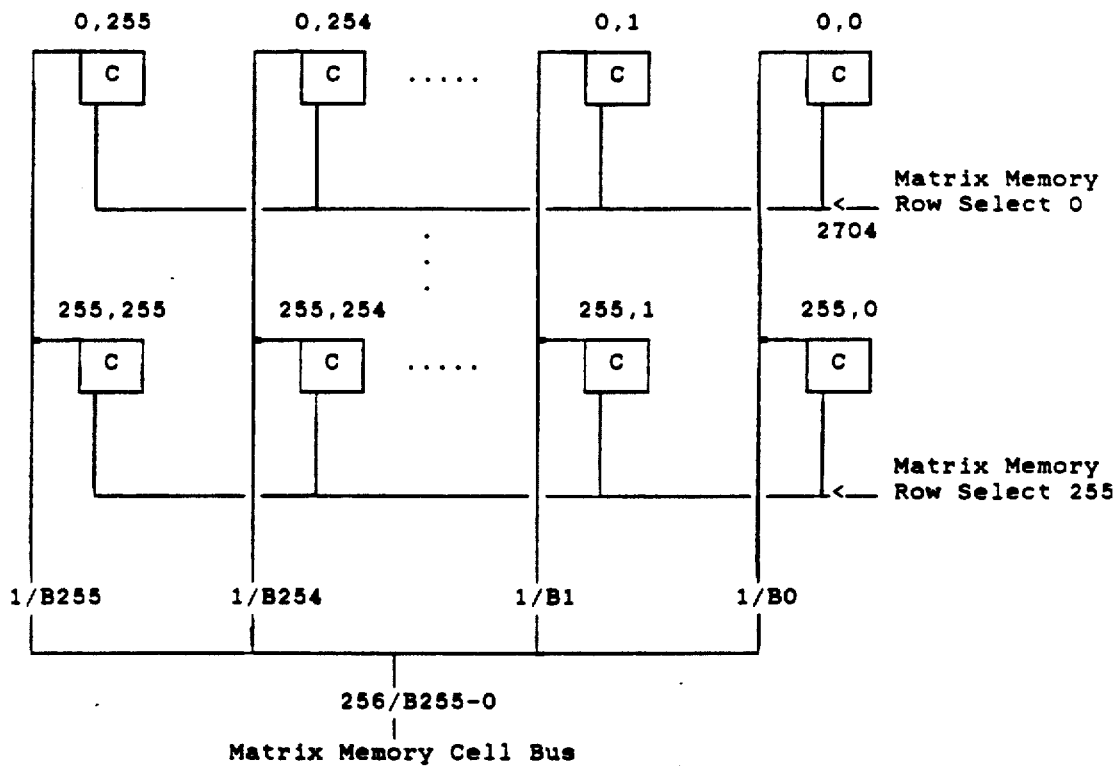
Figure 27B:
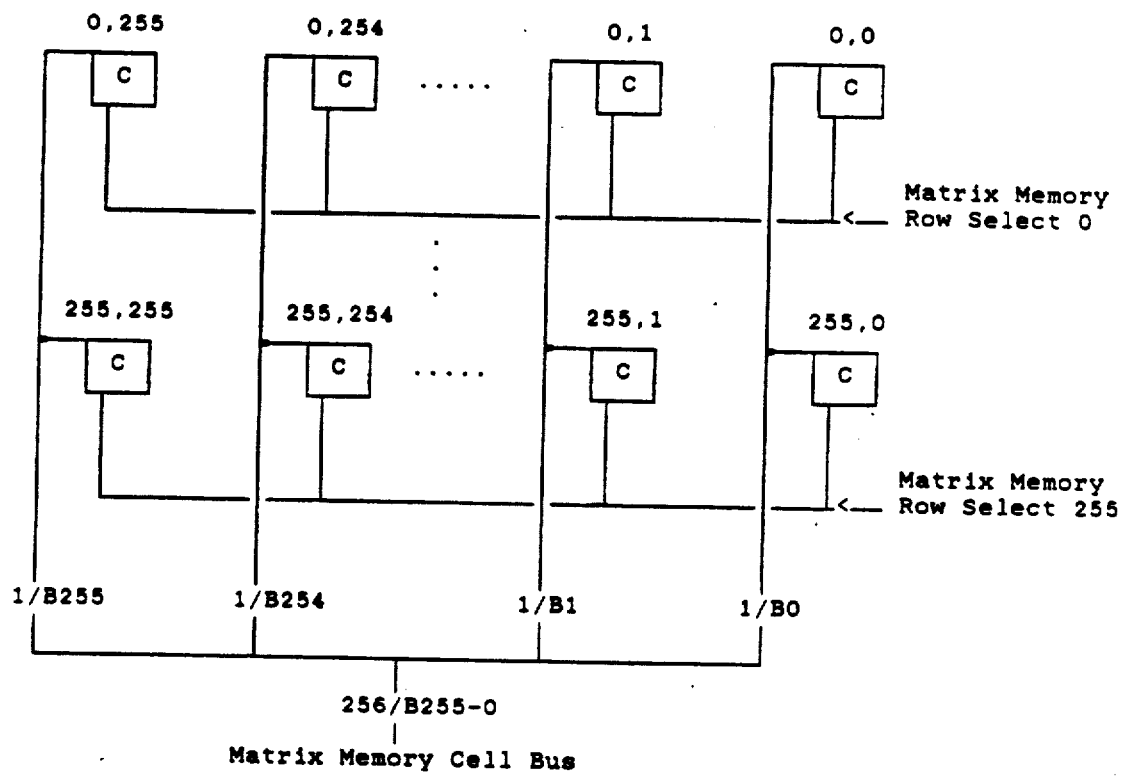
Figure 27C:
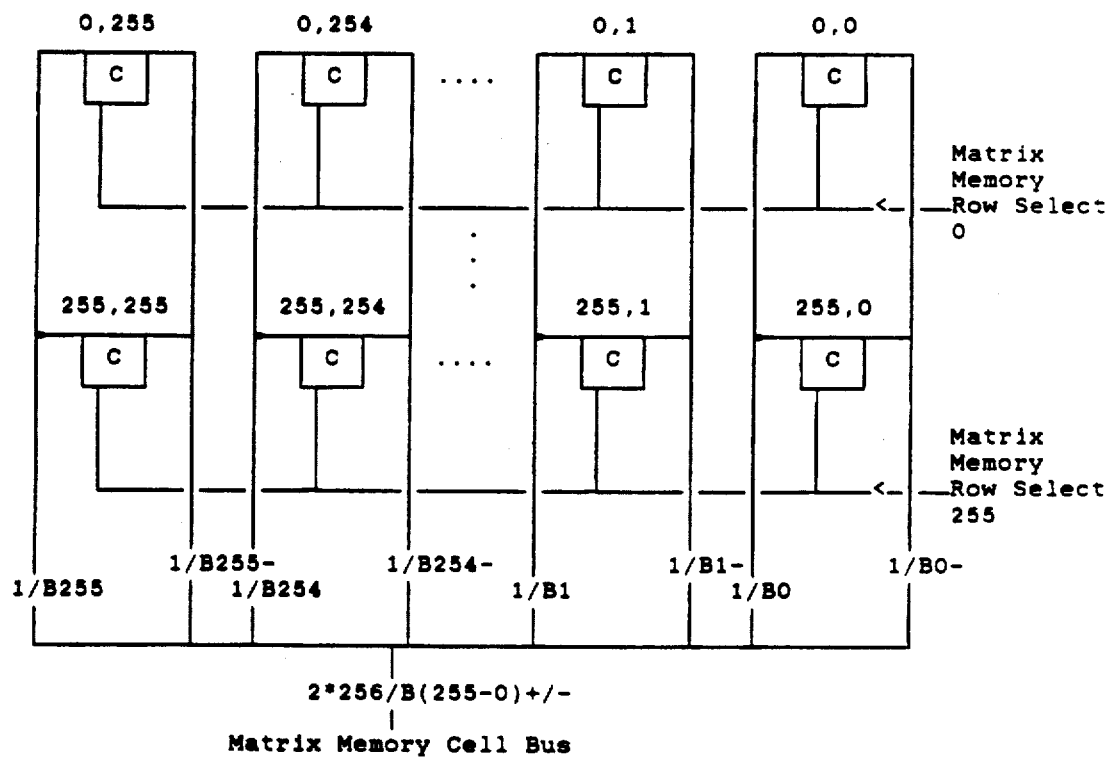

FIG. 27A is the block diagram for the DRAM version of the matrix memory cell array, FIG. 27B is the block diagram for the standard speed ROM version of the matrix memory cell array, and FIG. 27C is the block diagram for the fast ROM version of the matrix memory cell array.

Figure 28:
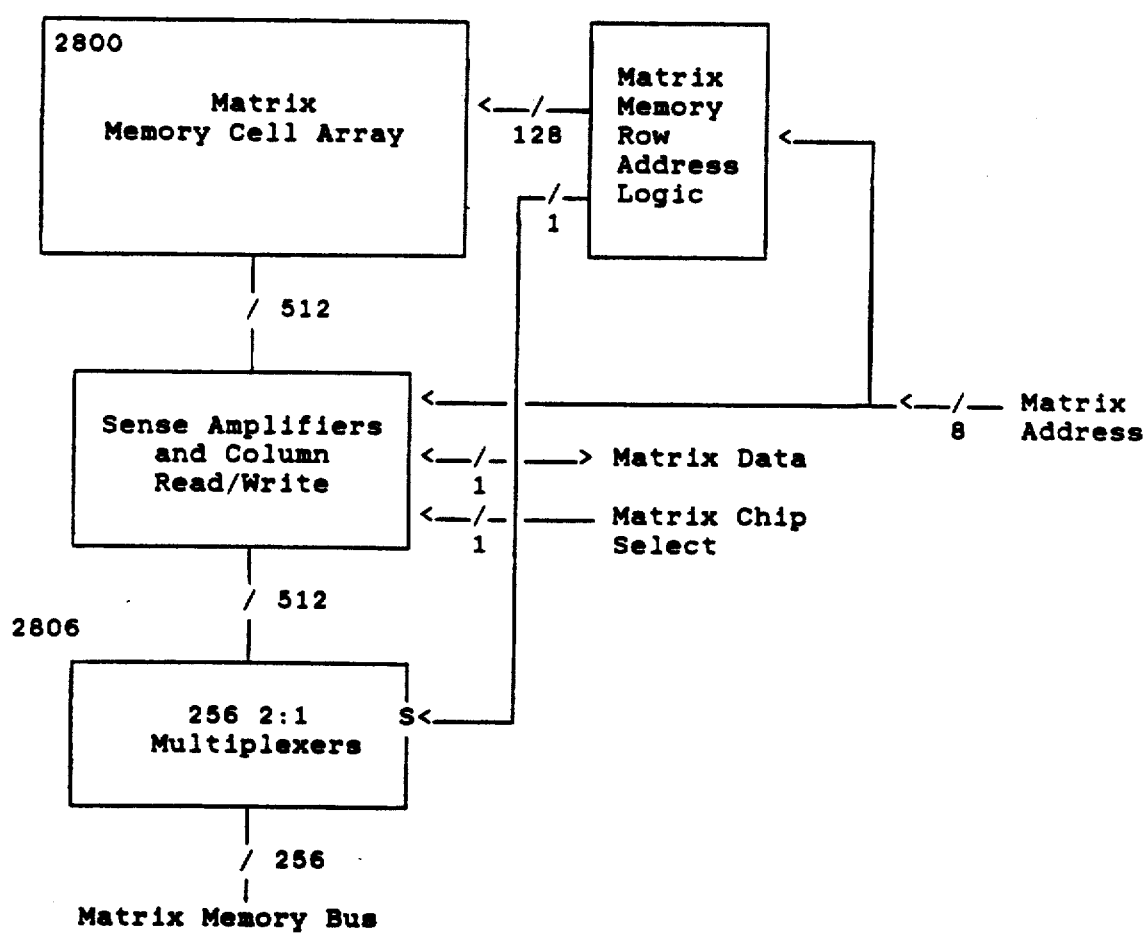

FIG. 28 is the block diagram of the matrix memory within a convolution memory chip using 2:1 multiplexers and column selection to match the layout pitch of the memory cells to the pitch of the logic cells.

Figure 29A:
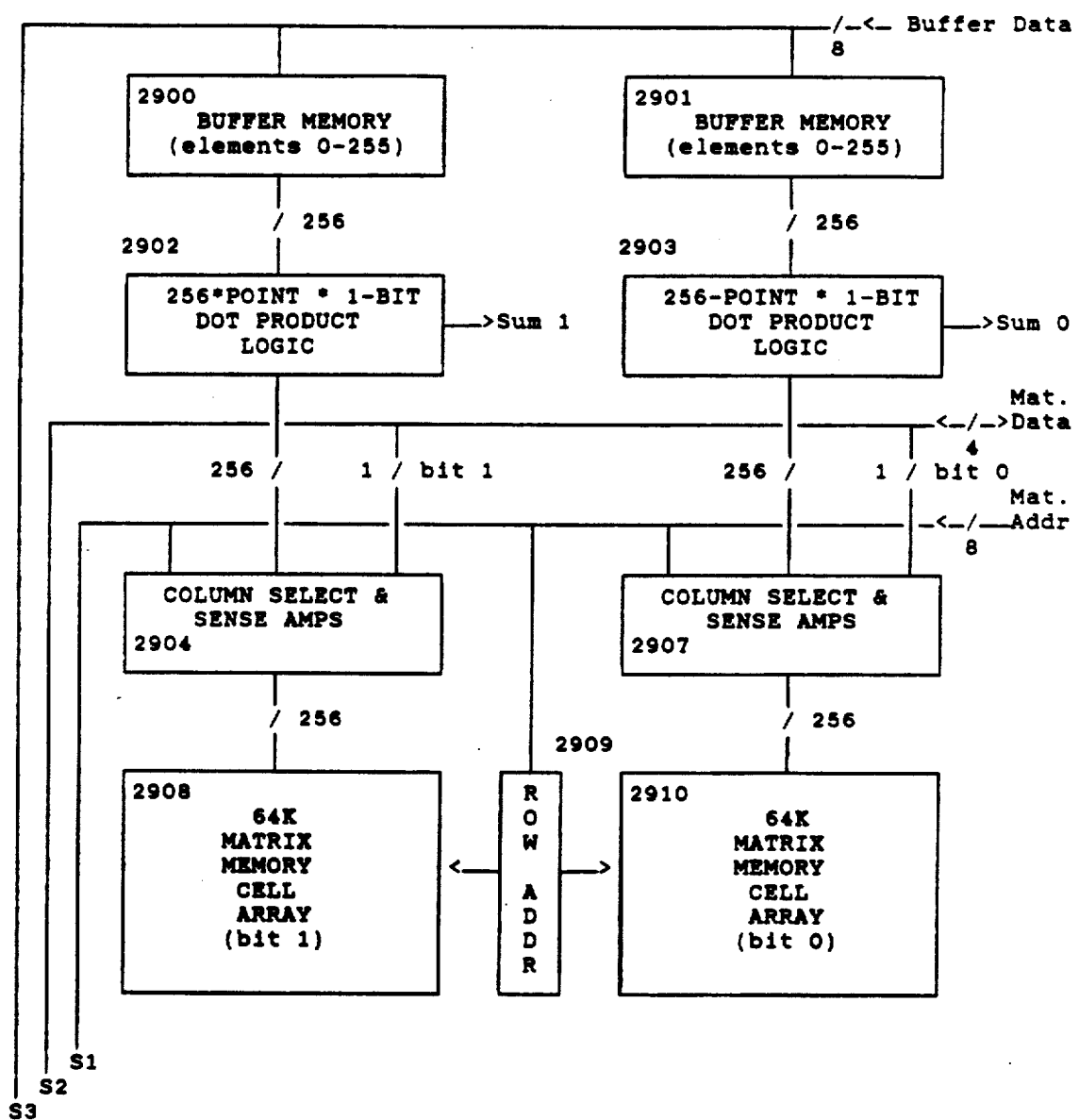
Figure 29B:
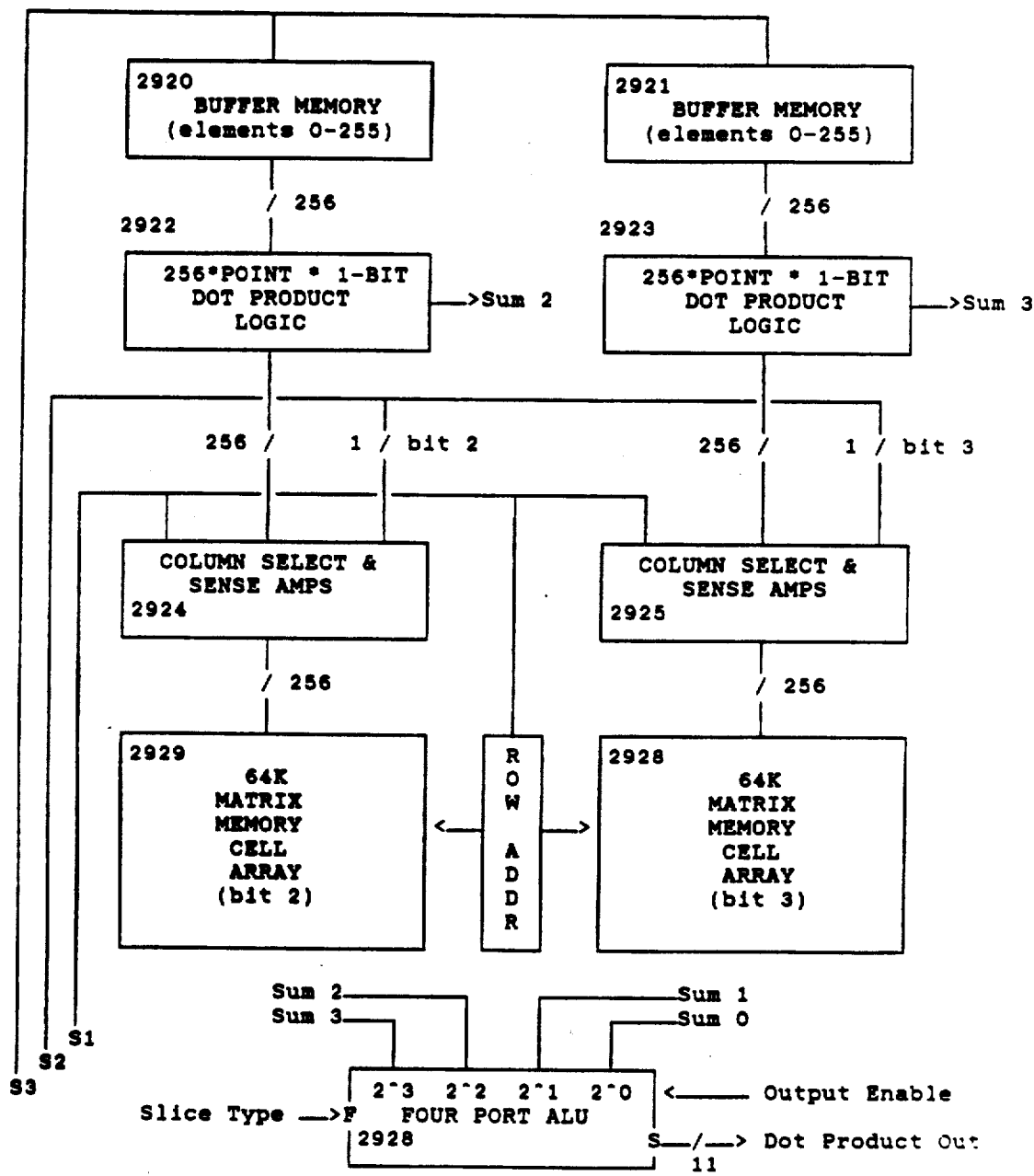
Figure 29C:
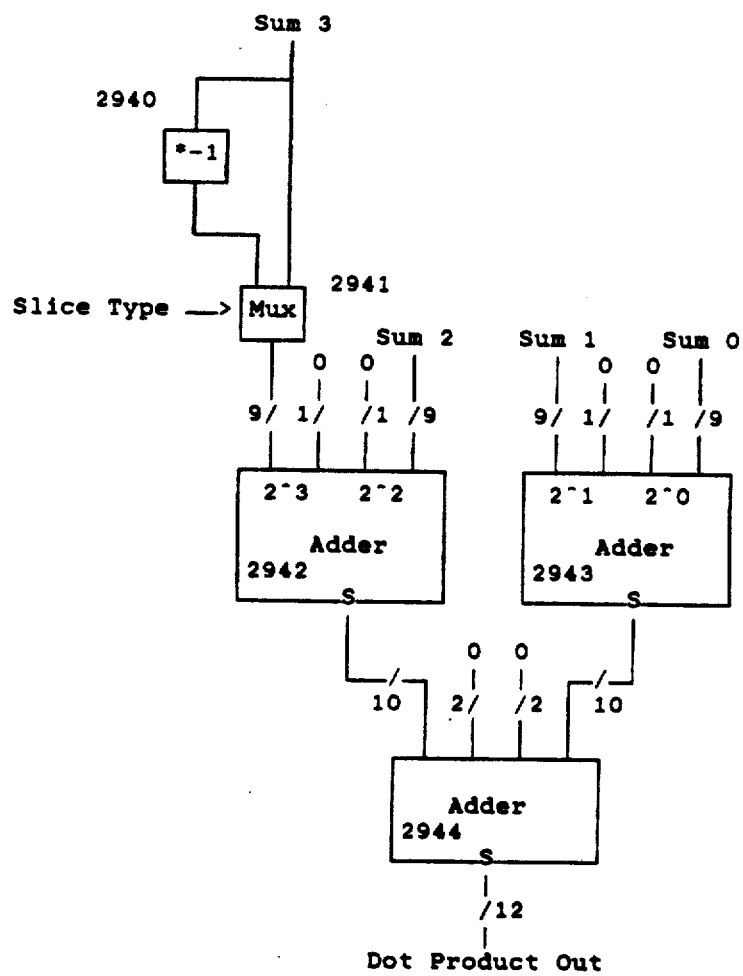

FIGS. 29A and 29B are the block diagram of a 64K*4, 4*256-point*1-bit convolution memory chip, and FIG. 29C is the block diagram for its four-port arithmetic and logic unit (ALU).

Figure 30A:
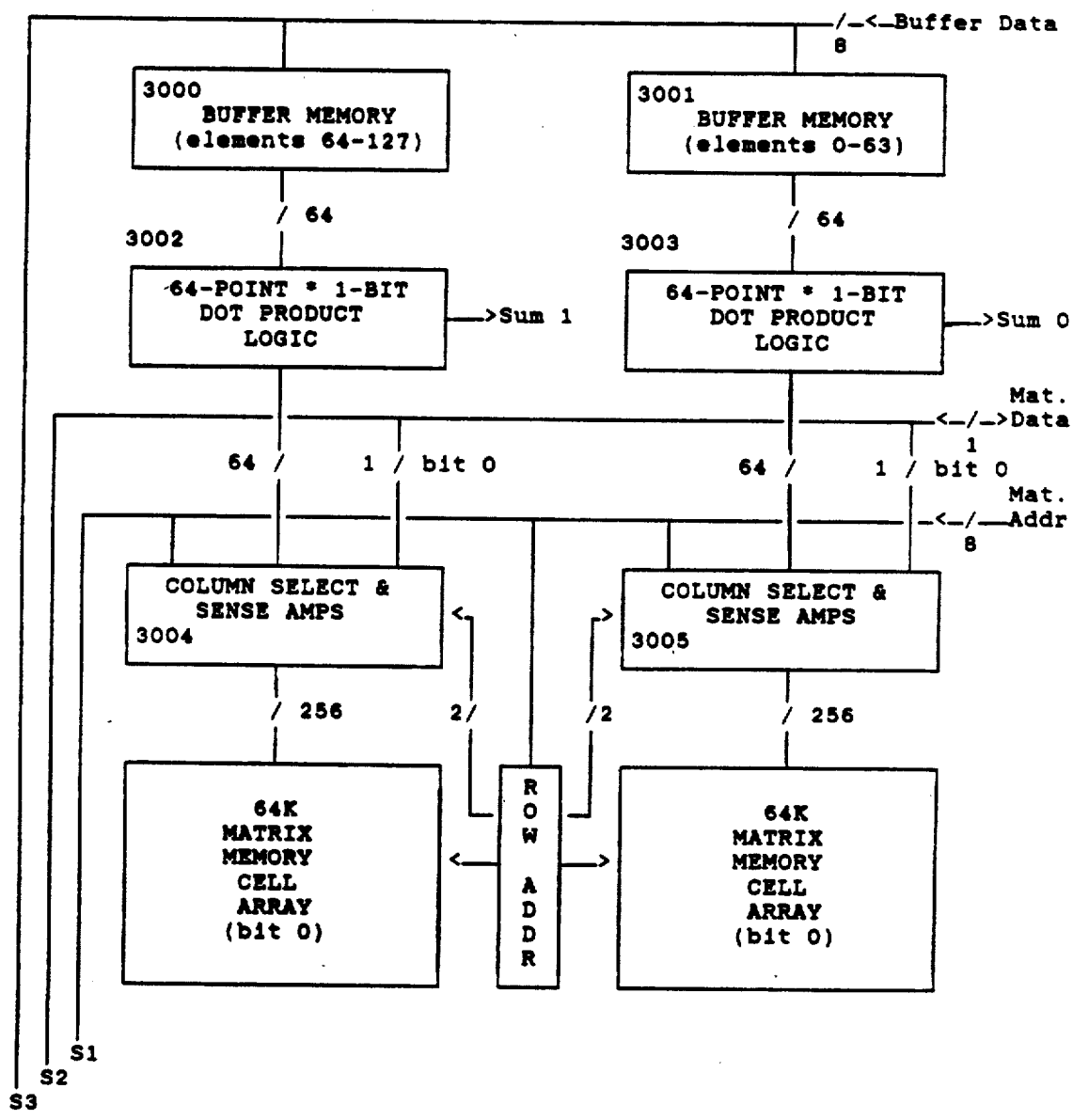
Figure 30B:
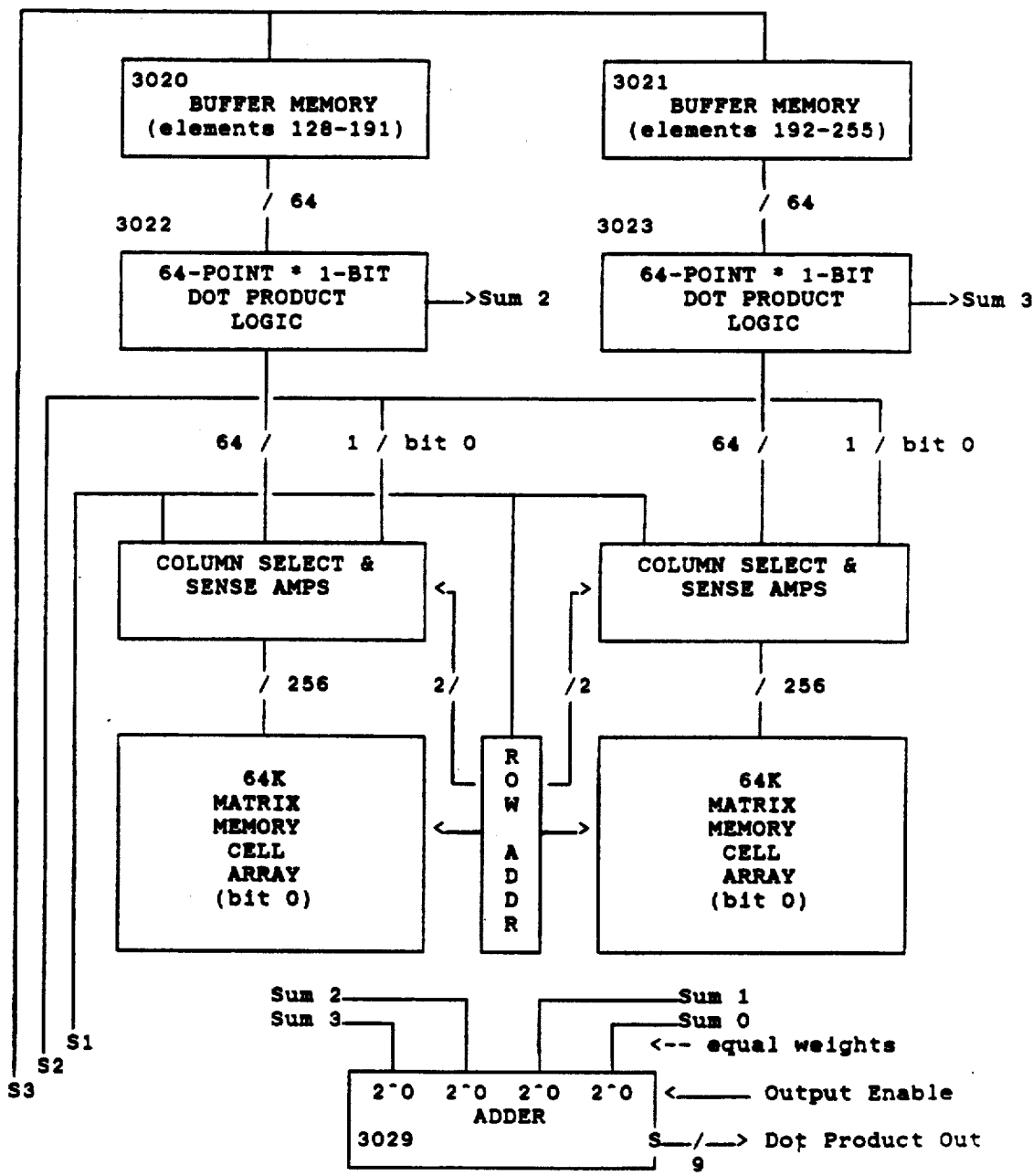
Figure 30C:
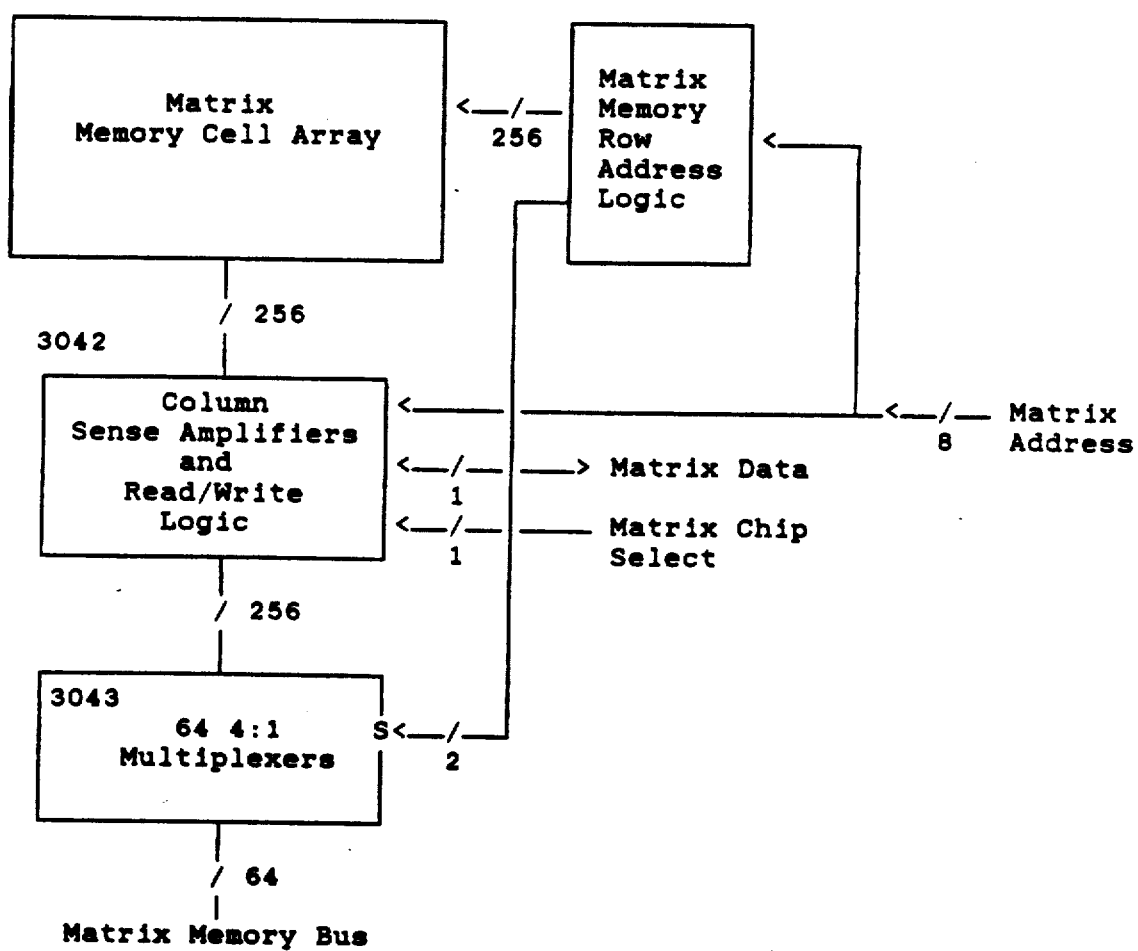

FIGS. 30A and 30B are the block diagram of a 256K*1, 4*64-point*1-bit convolution memory chip, and FIG. 30C is the block diagram of its matrix memory using 4:1 multiplexers and column selection for storage of multiple arrays.

Figure 31A:
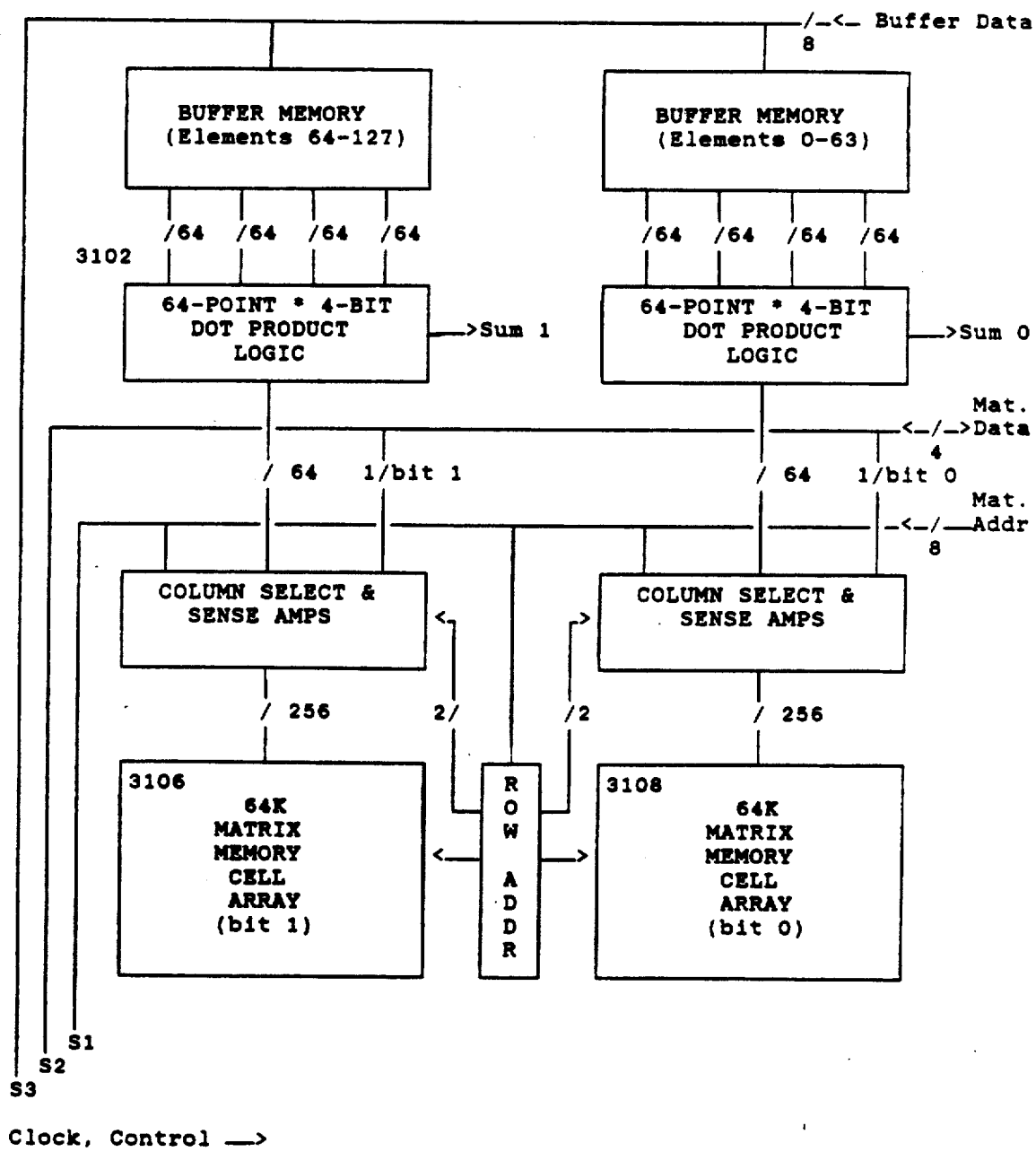
Figure 31B:
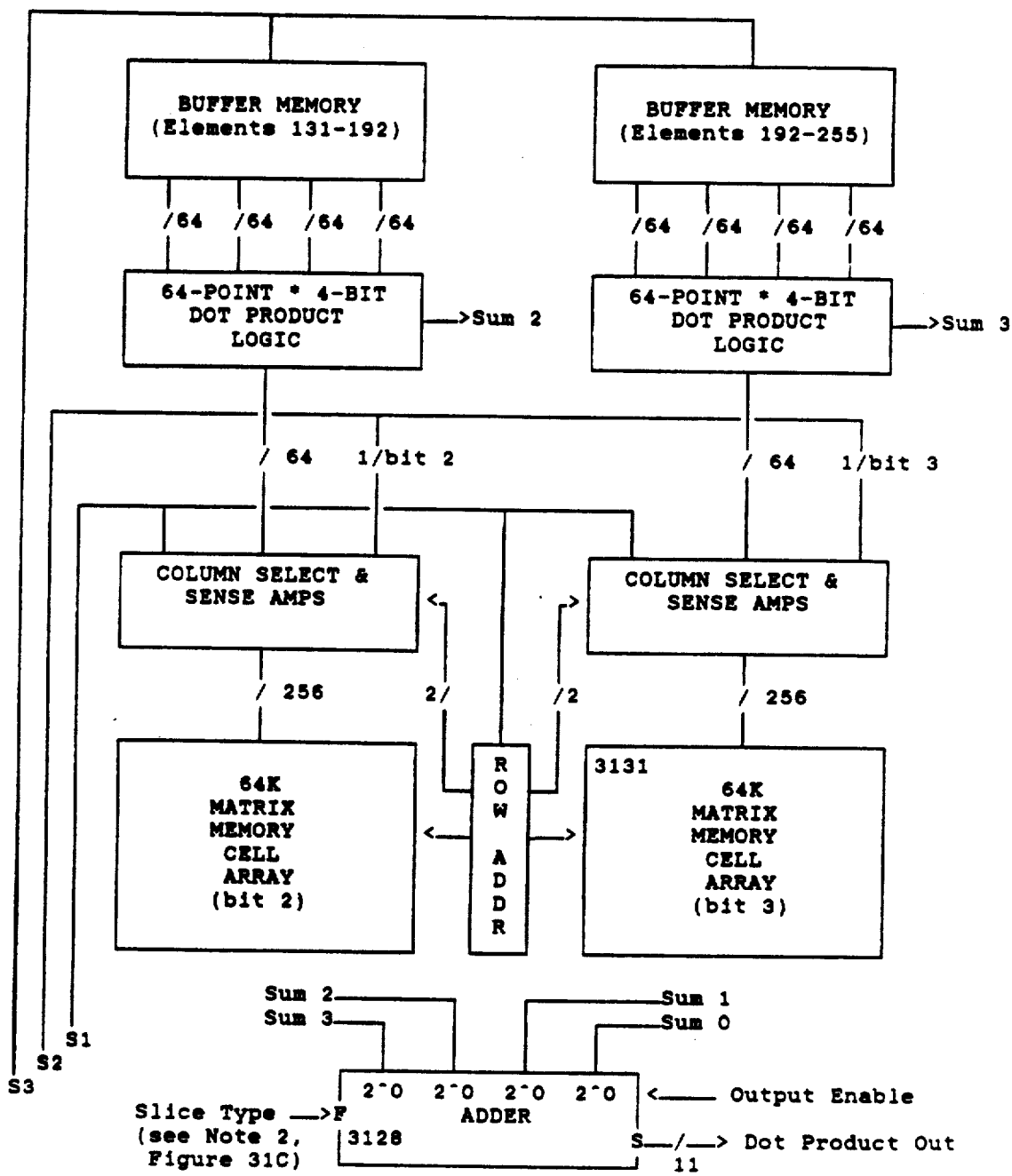
Figure 31C:
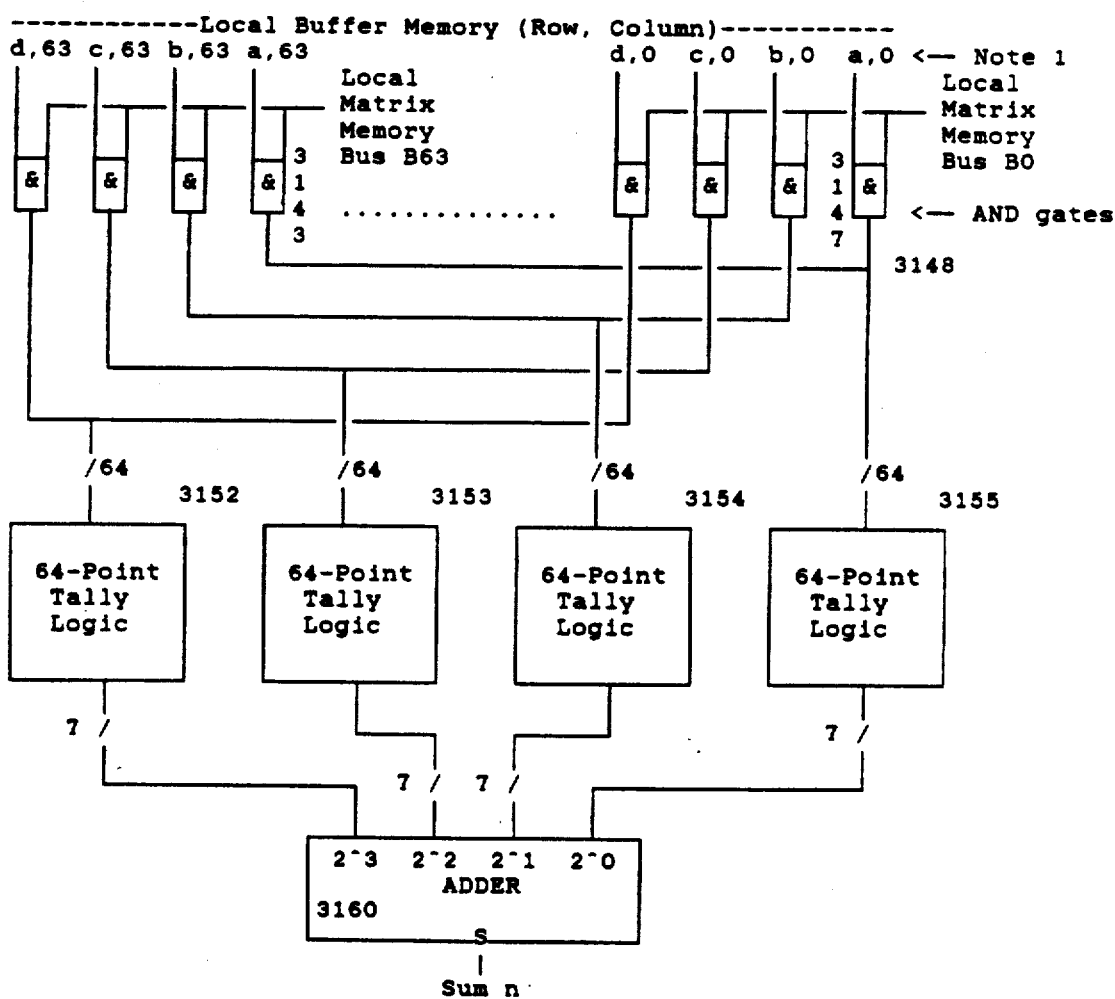

FIGS. 31A and 31B are the block diagram of a 64K*4, 4*64-point*4-bit convolution memory chip, and FIG. 31C is the block diagram for its 64-point*4-bit dot product logic.

2.5 Supporting Elements

Figure 32:
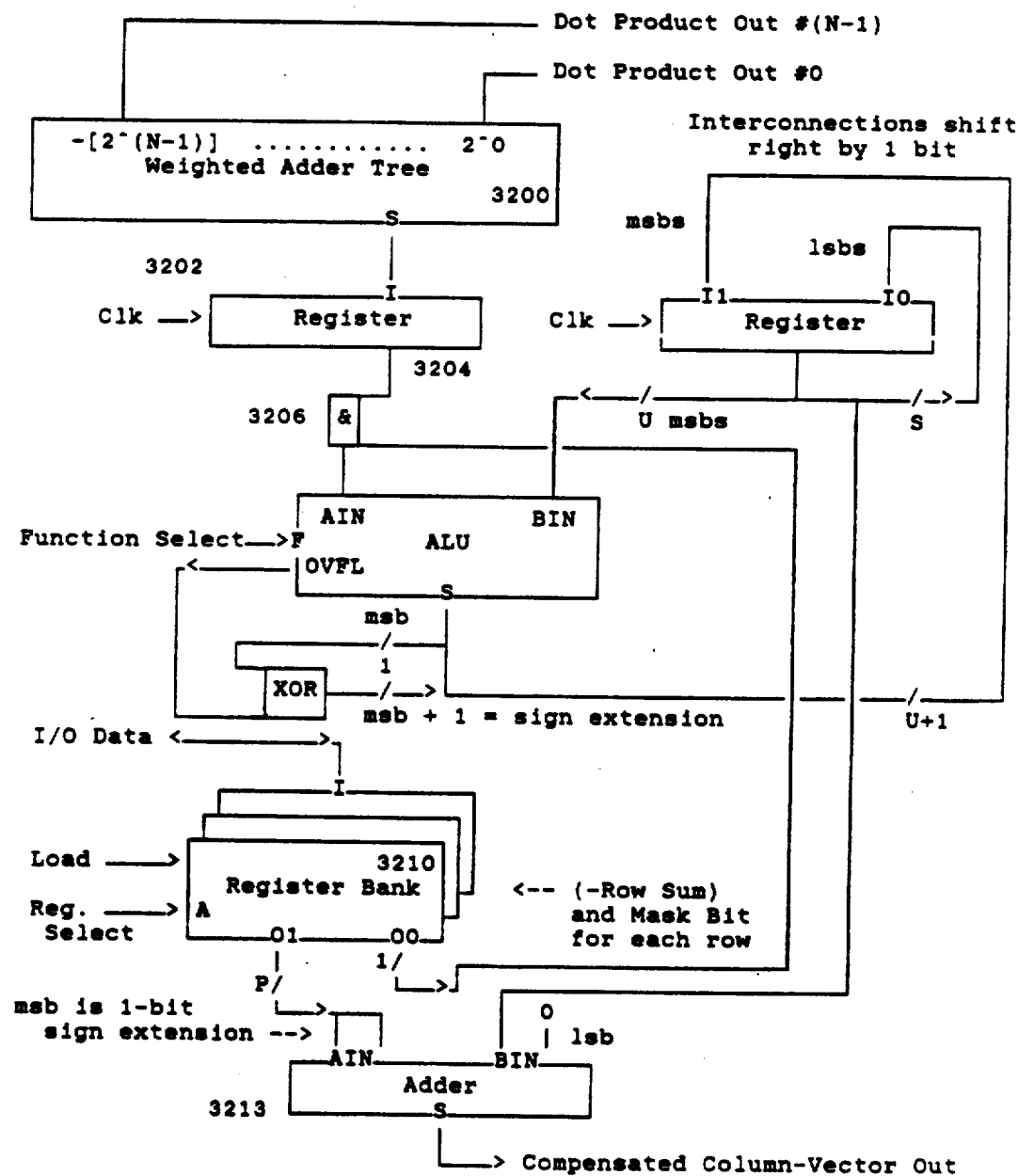

FIG. 32 is the simplified block diagram of a vector accumulator chip with minimum latency, row masking and 0/1 to −1/+1 conversion for artificial neural networks.

Figure 33A:
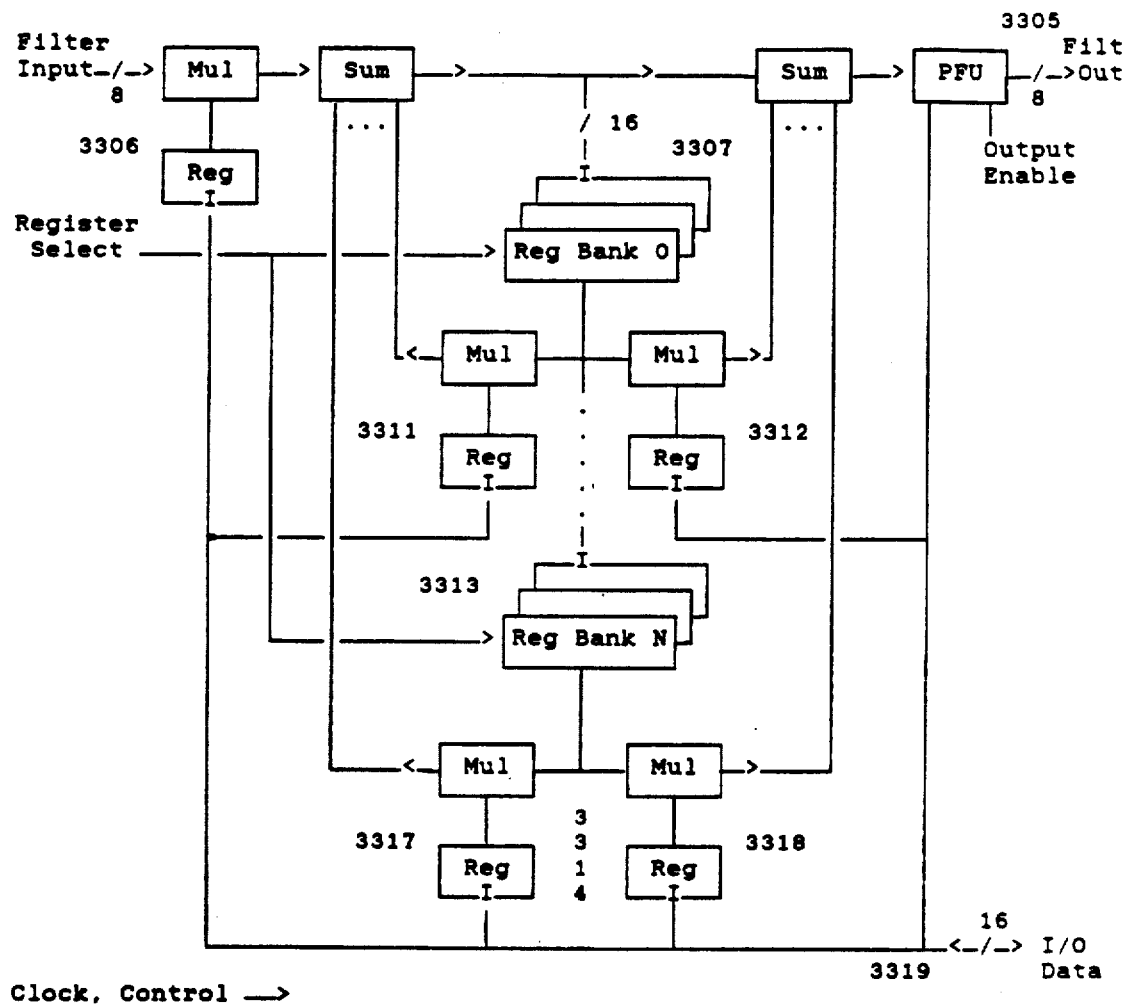
Figure 33B:
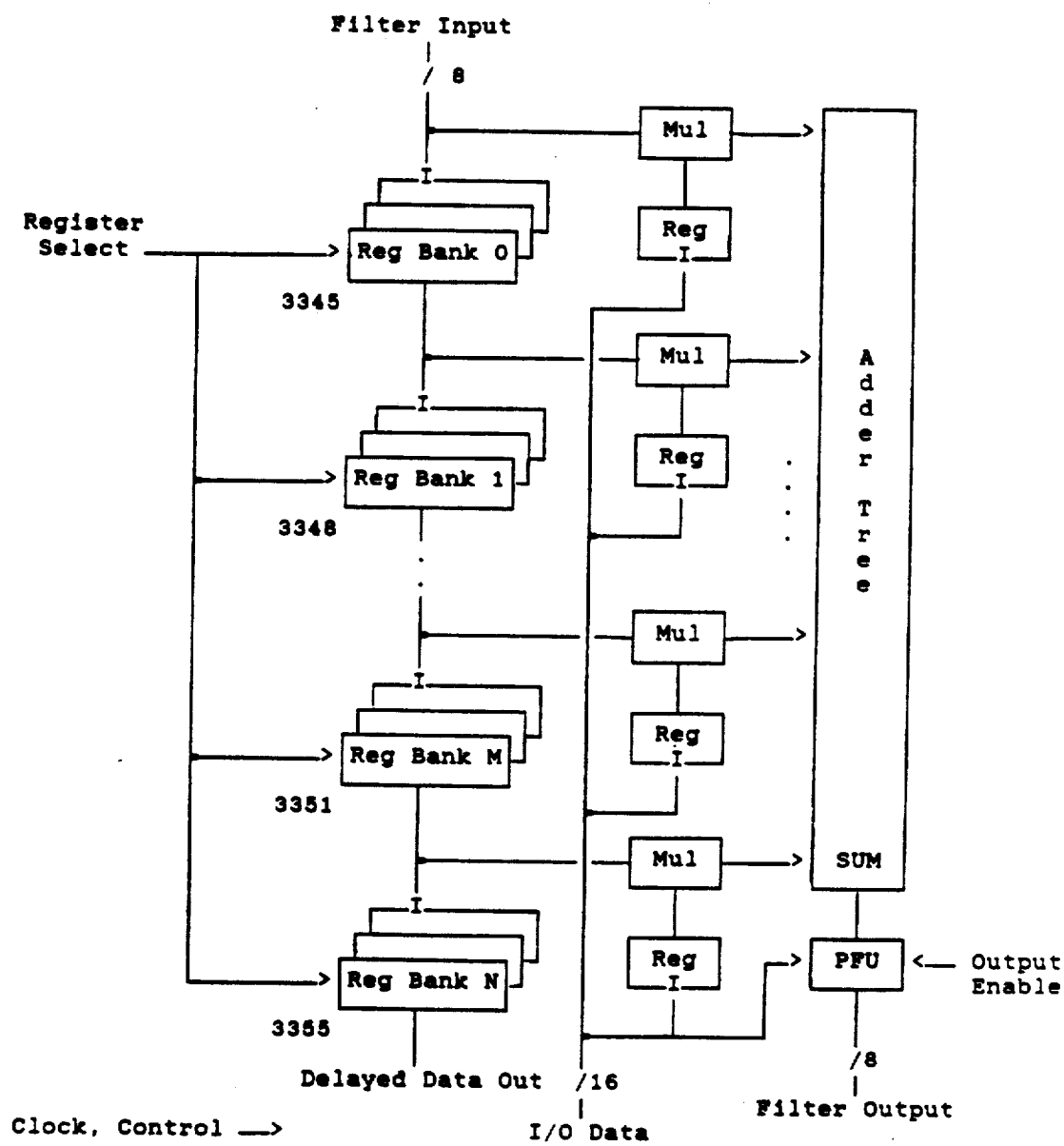

FIG. 33A is the block diagram of an infinite impulse response (IIR) vector filter chip and FIG. 33B is the block diagram of a finite impulse response (FIR) vector filter chip.

2.6 Significant Extensions

Figure 34A:
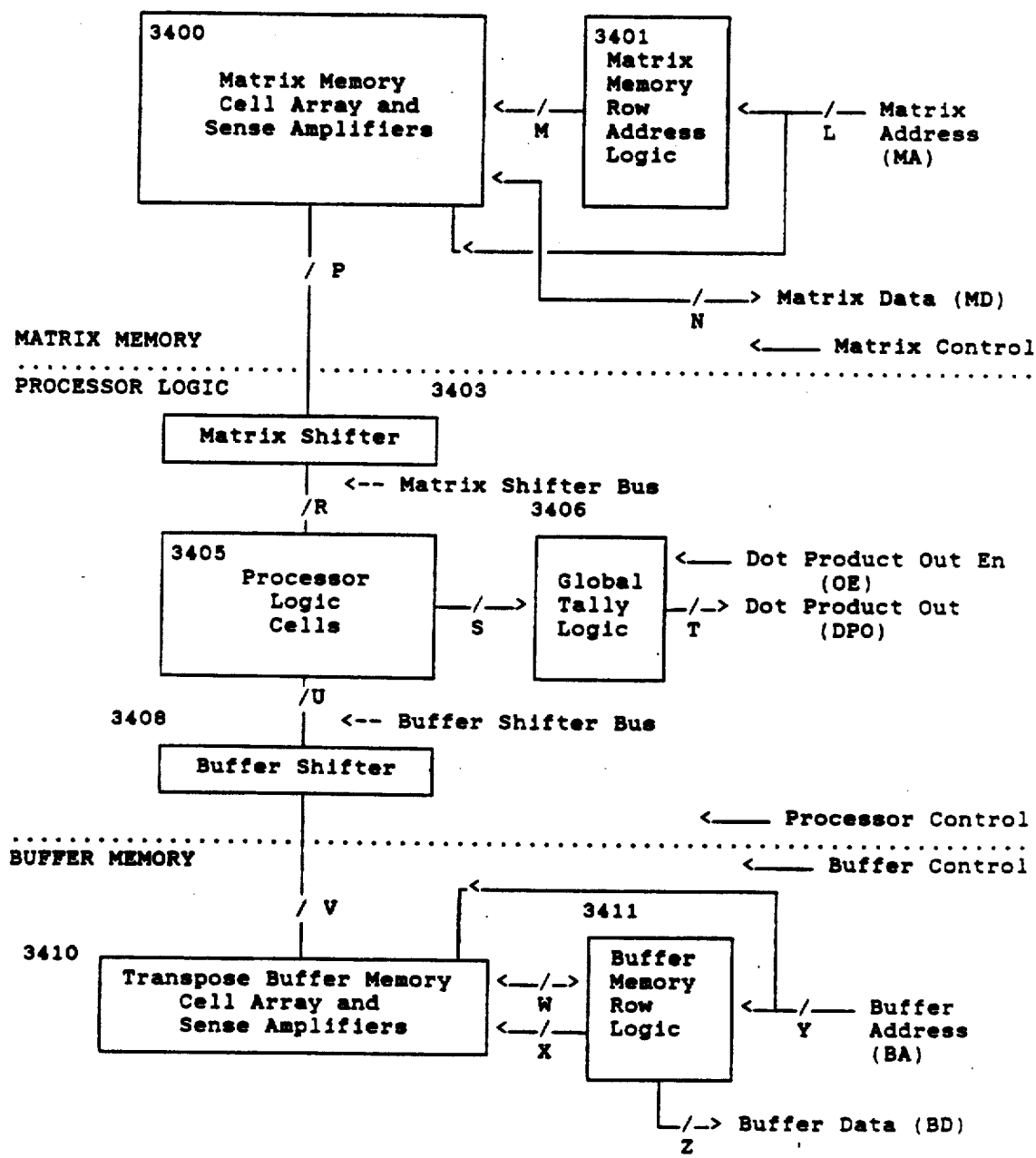
Figure 34E:
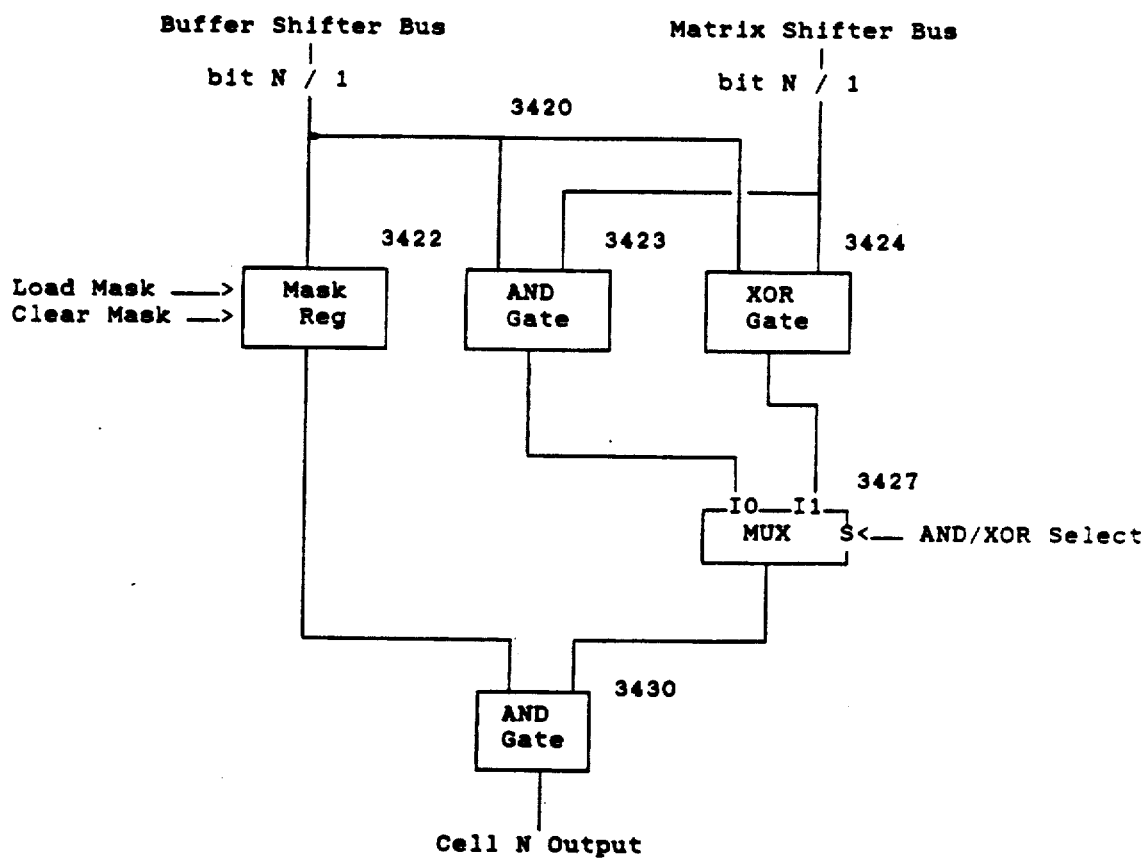
Figure 34F:
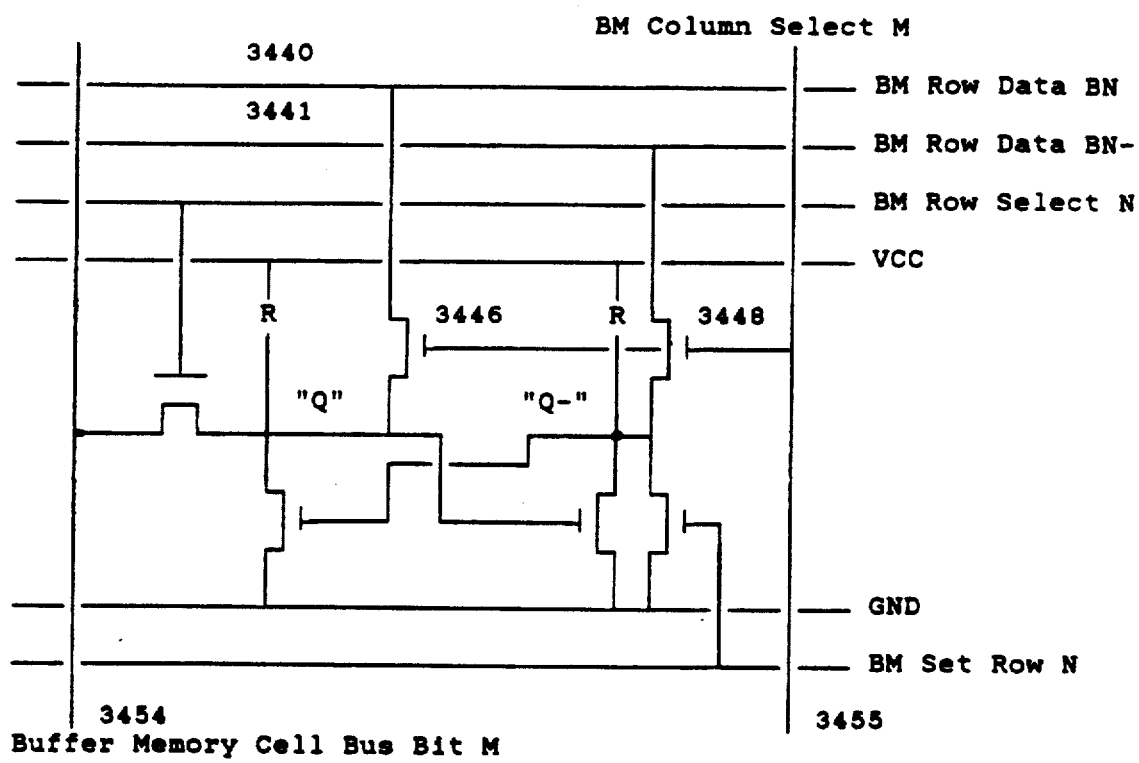
Figure 34G:
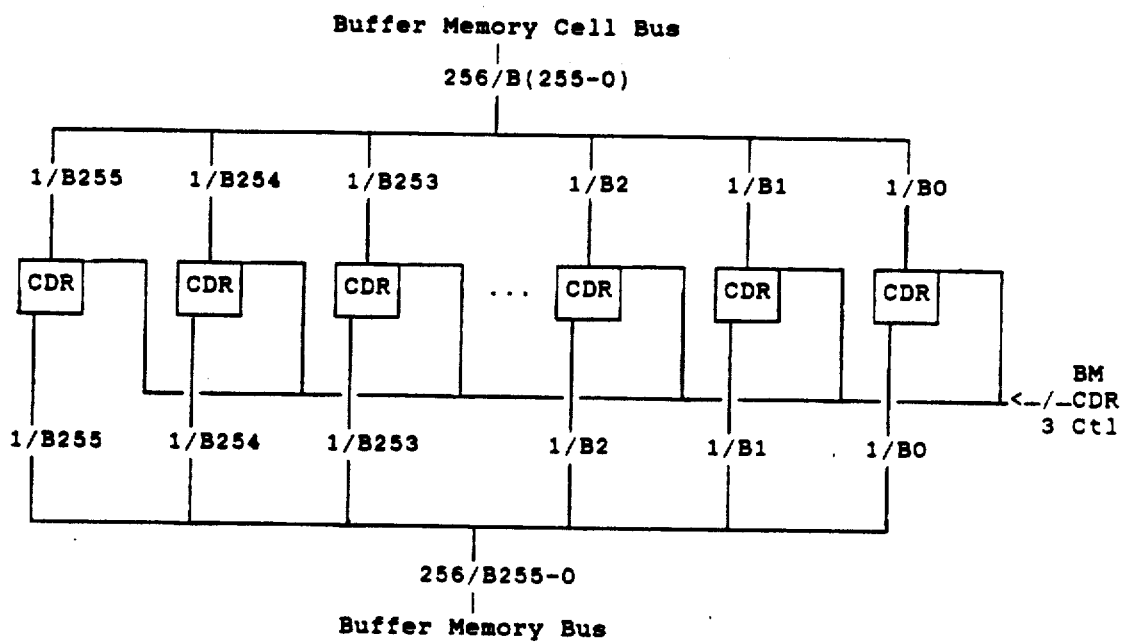
Figure 34H:
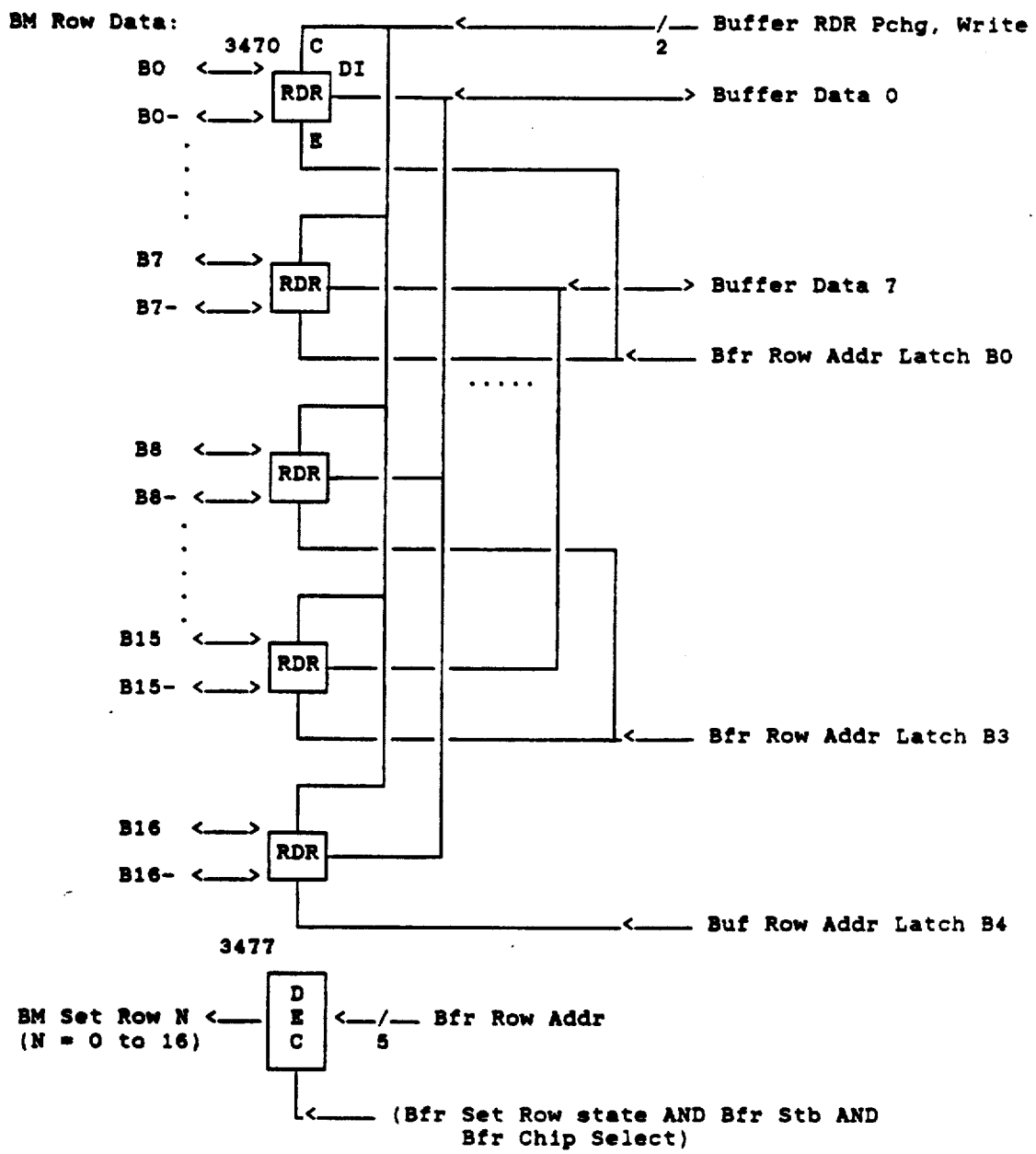

FIG. 34A is the simplified generic block diagram for a correlation memory chip, FIG. 34B is a table describing the pins for the chip, FIG. 34C is a table of processor control states, FIG. 34D is a table of matrix and buffer control states, FIG. 34E is the block diagram of a correlation memory processor cell, FIG. 34F is the circuit diagram of a row-writeable buffer memory cell, FIG. 34G is the block diagram of the buffer memory column sense amplifier and read/write logic, and FIG. 34H is the block diagram of the buffer memory row read/write logic.

Figure 35A:
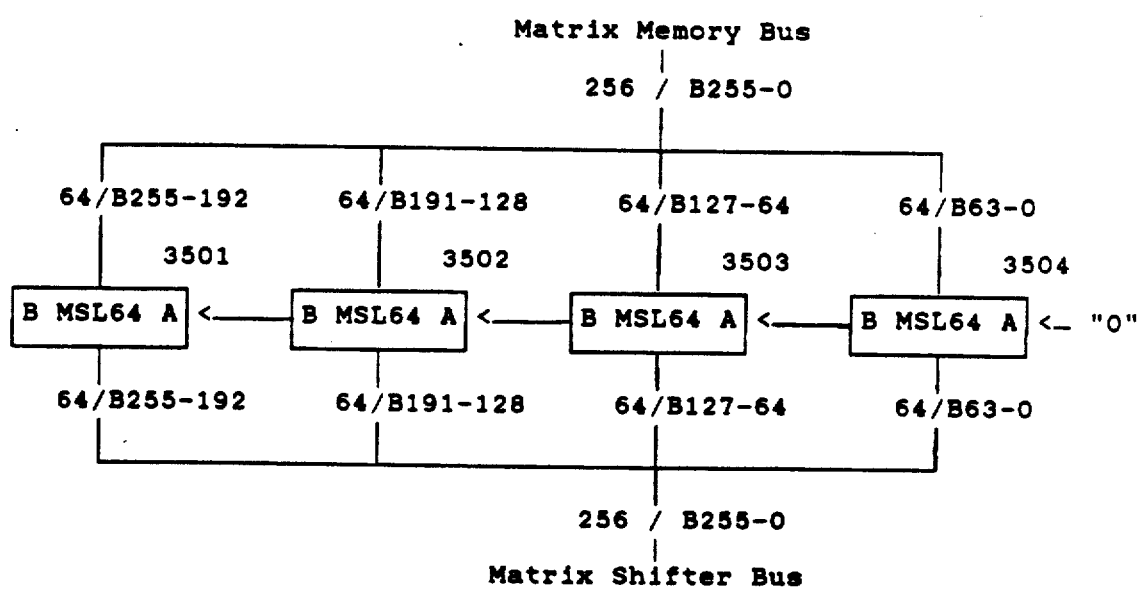
Figure 35B:
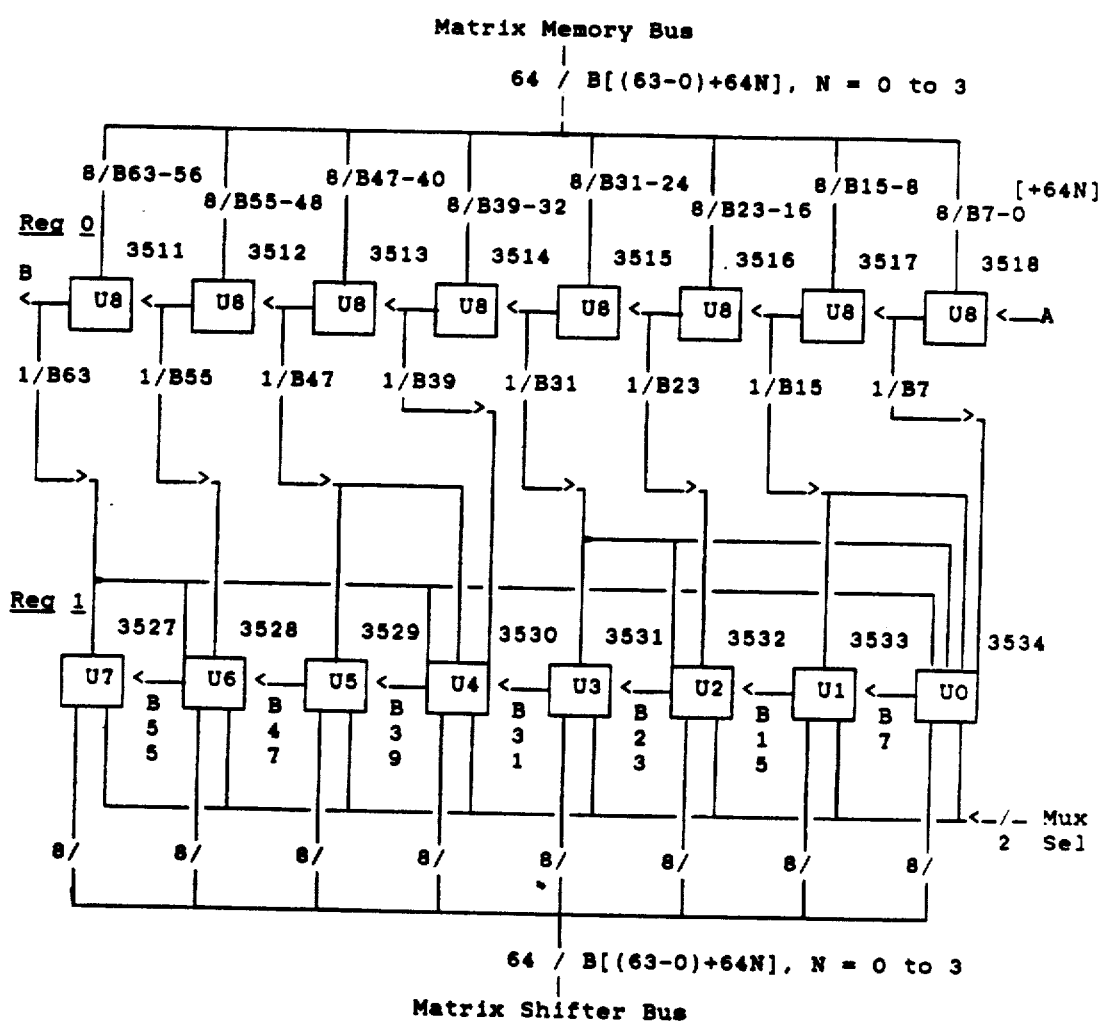
Figure 35E:
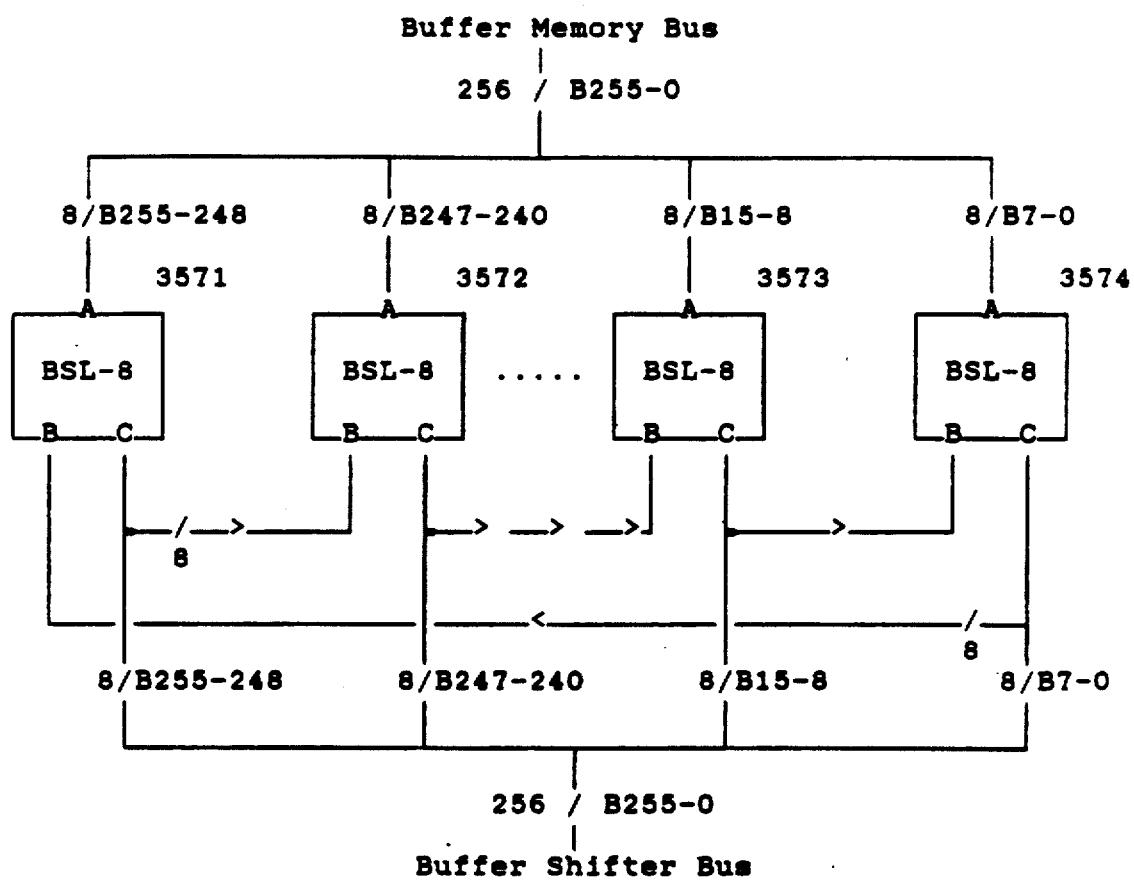
Figure 35F:
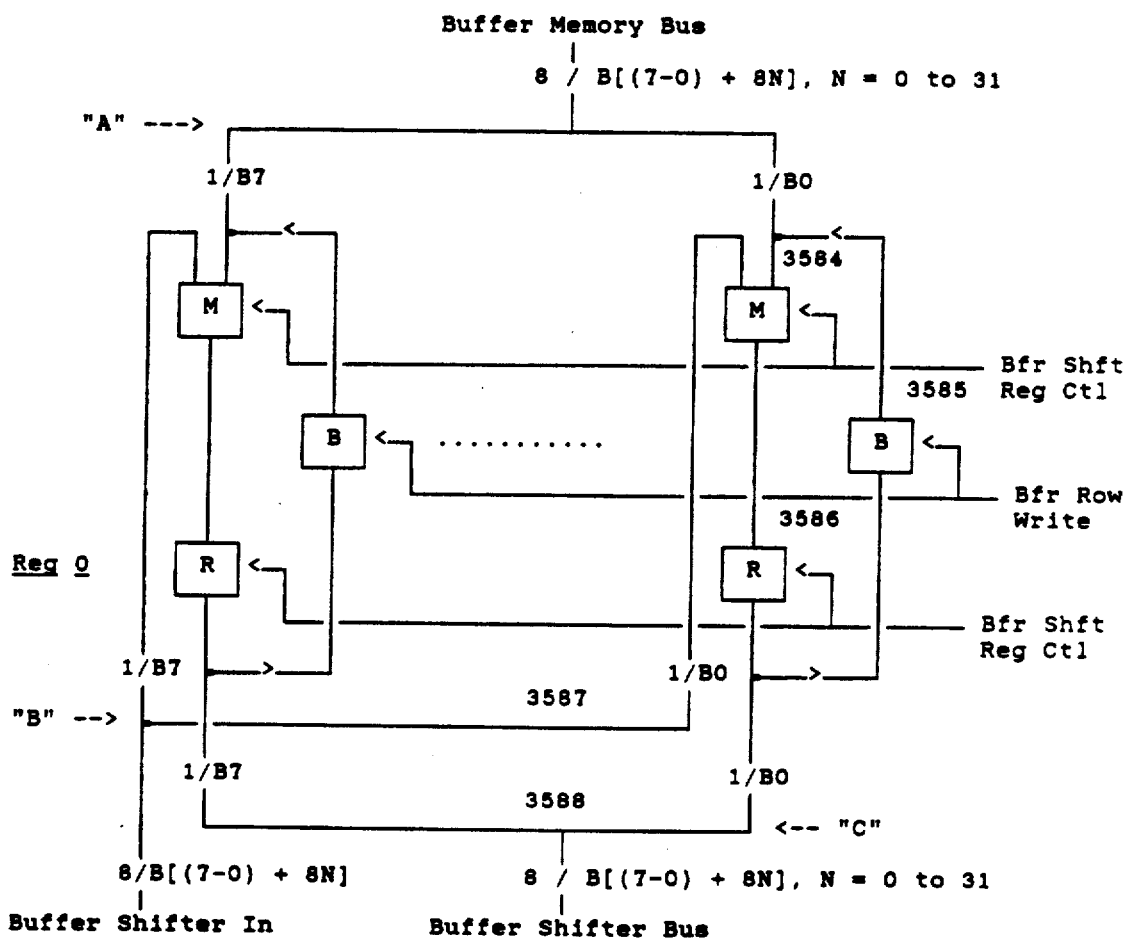

FIG. 35A is the block diagram for the matrix shift logic, 256-bit module, FIG. 35B is the block diagram for the matrix shift logic, 64-bit module, FIG. 35C is the block diagram for the matrix shift logic, 8-bit module, FIG. 35D is a table of matrix shift logic multiplexer inputs within a 64-bit module, FIG. 35E is the block diagram for the buffer shift logic, 256-bit module, and FIG. 35F is the block diagram for the buffer shift logic, 64-bit module.

FIG. 36A is a map of picture elements in a hypothetical image, and FIGS. 36B to 36F are definitions of groups of picture elements as convolution windows.

FIG. 37 is a list of a sequence of matrix shift register operations to perform a two-dimensional convolution.

FIG. 38A is a diagram of 16-point window coefficients, and FIGS. 38B to 38I are memory maps for various 4*4 windows with a 16-column input.

FIG. 39 is a diagram showing an example of image size expansion using two correlation memory chips.

Figure 40A:
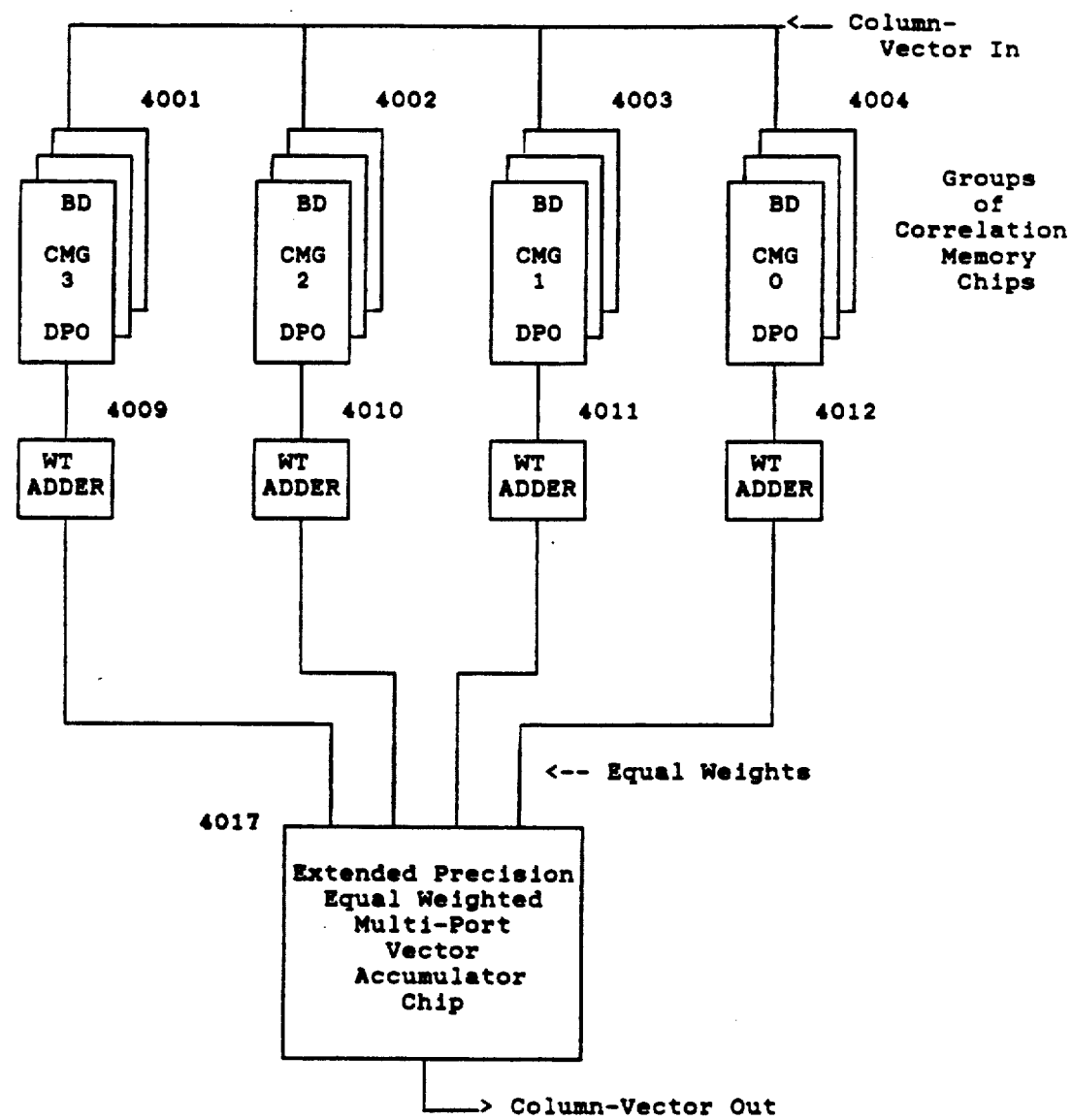

FIG. 40A is a block diagram showing a correlation memory block that handles a 32*32 convolution window, FIG. 40B is a table of definitions of 32*32-point window coefficients, FIG. 40C is a buffer memory memory map for a 32*32-point window prior to initial shifting, and FIG. 40D is a buffer memory memory map after initial shifting.

FIG. 41 is a table of convolution window sizes and their system effects.

Figure 42:
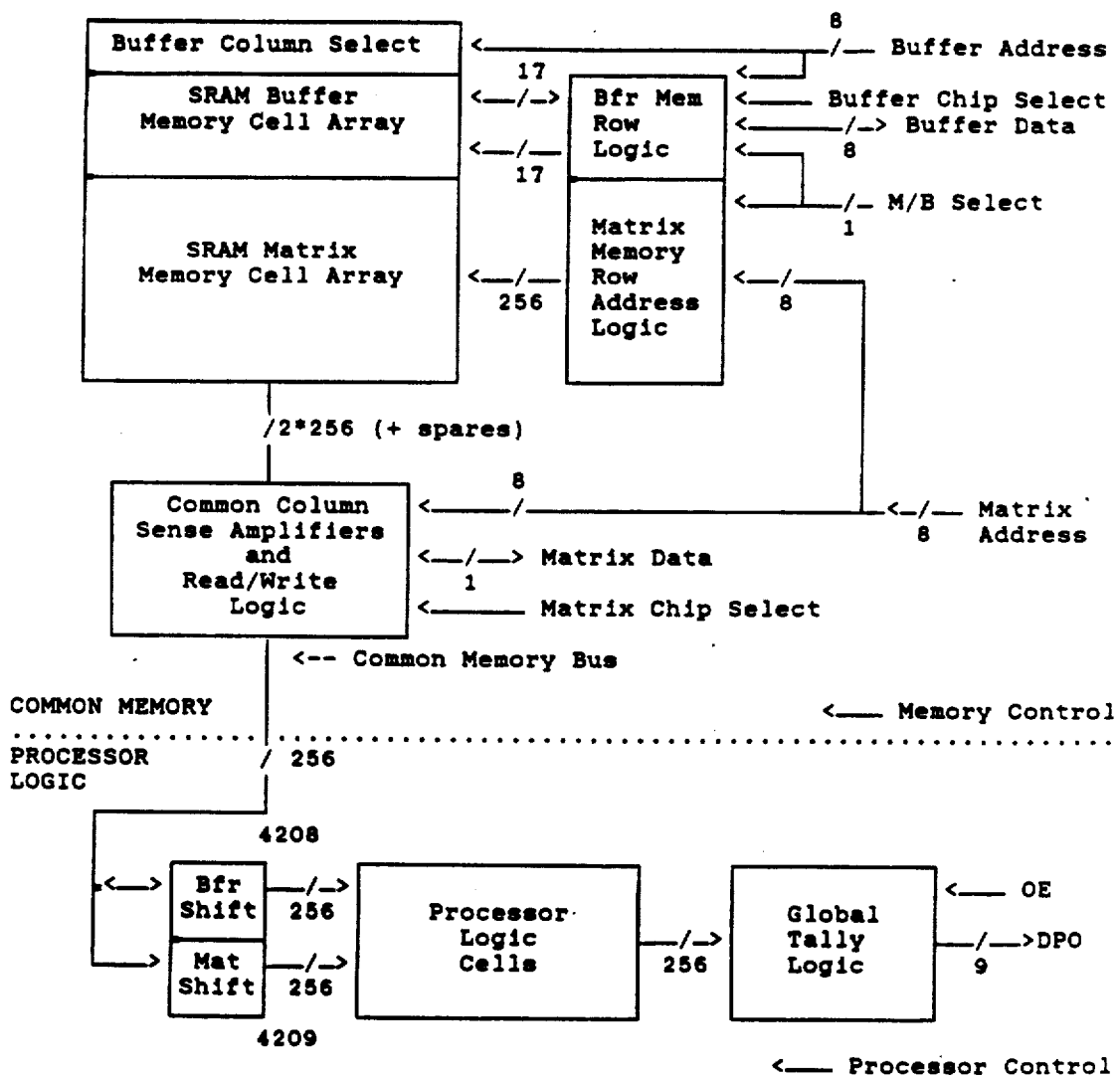

FIG. 42 is the block diagram of a correlation memory chip using a common bus.

2.7 Applications

Figure 43A:
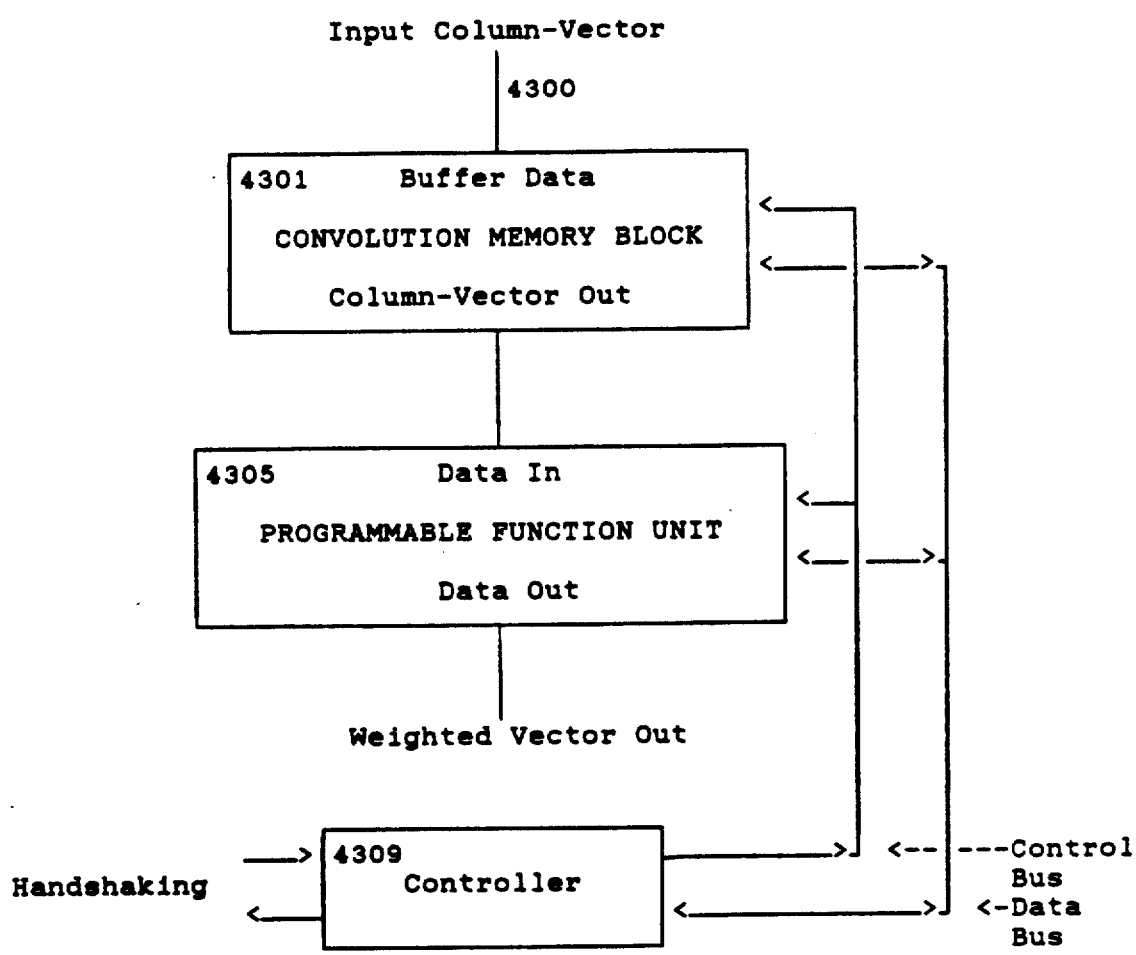
Figure 43B:
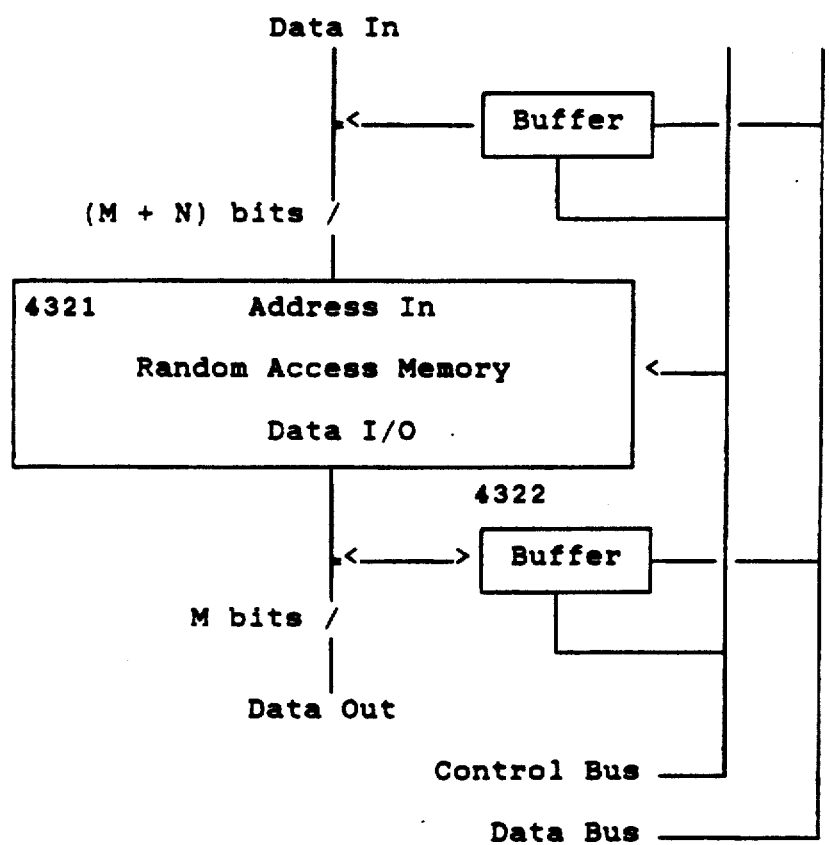
Figure 43C:
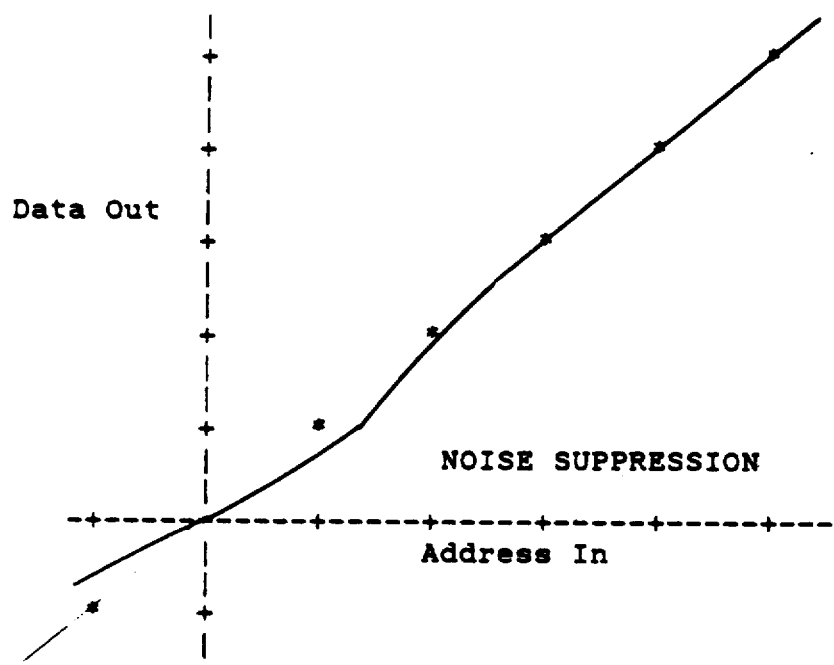

FIG. 43A is the block diagram of a convolution memory block used as an artificial neural network weighting element, FIG. 43B is the block diagram of a programmable function unit, and FIG. 43C is the curve of a typical transfer function.

Figure 44A:
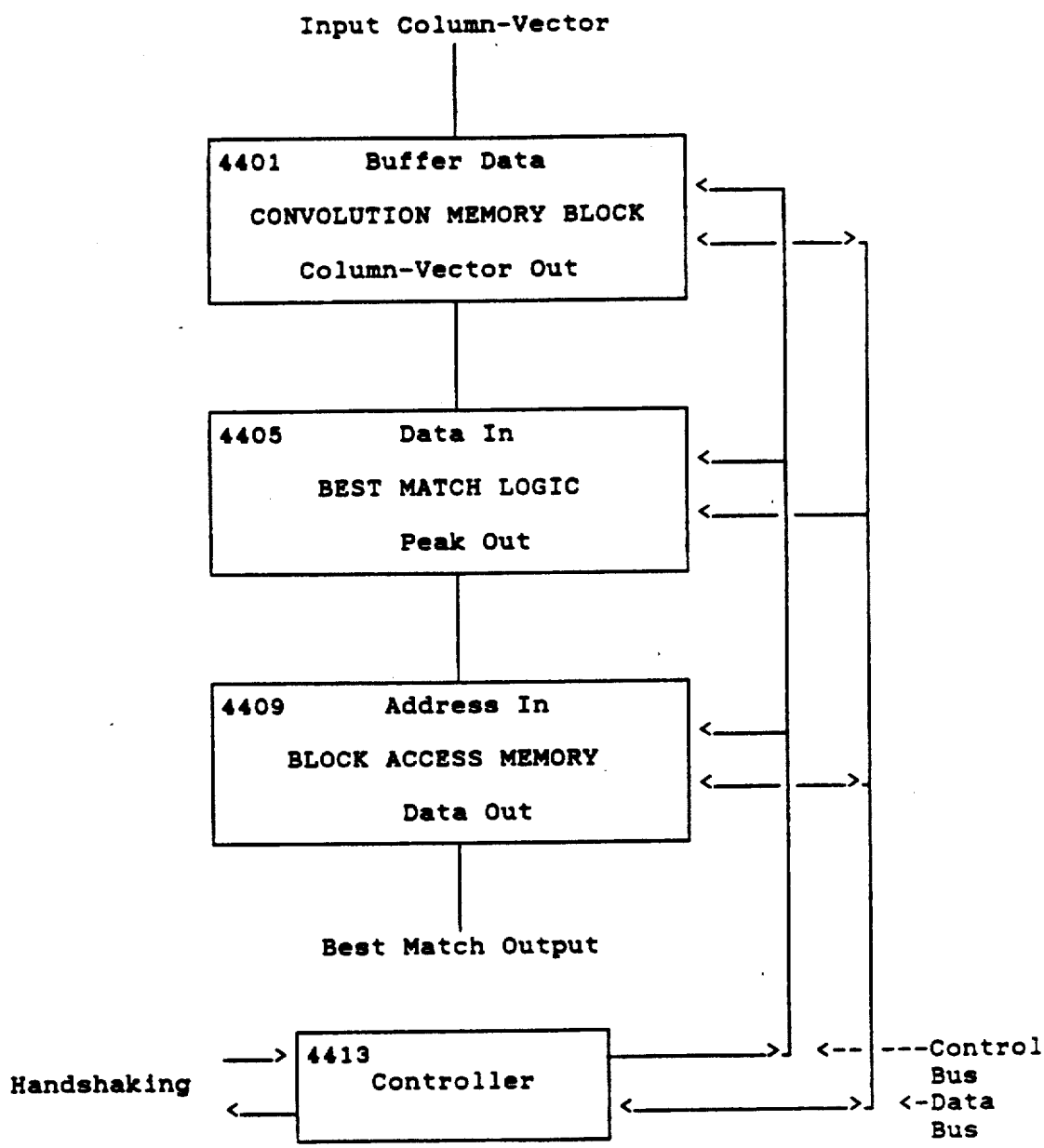
Figure 44B:
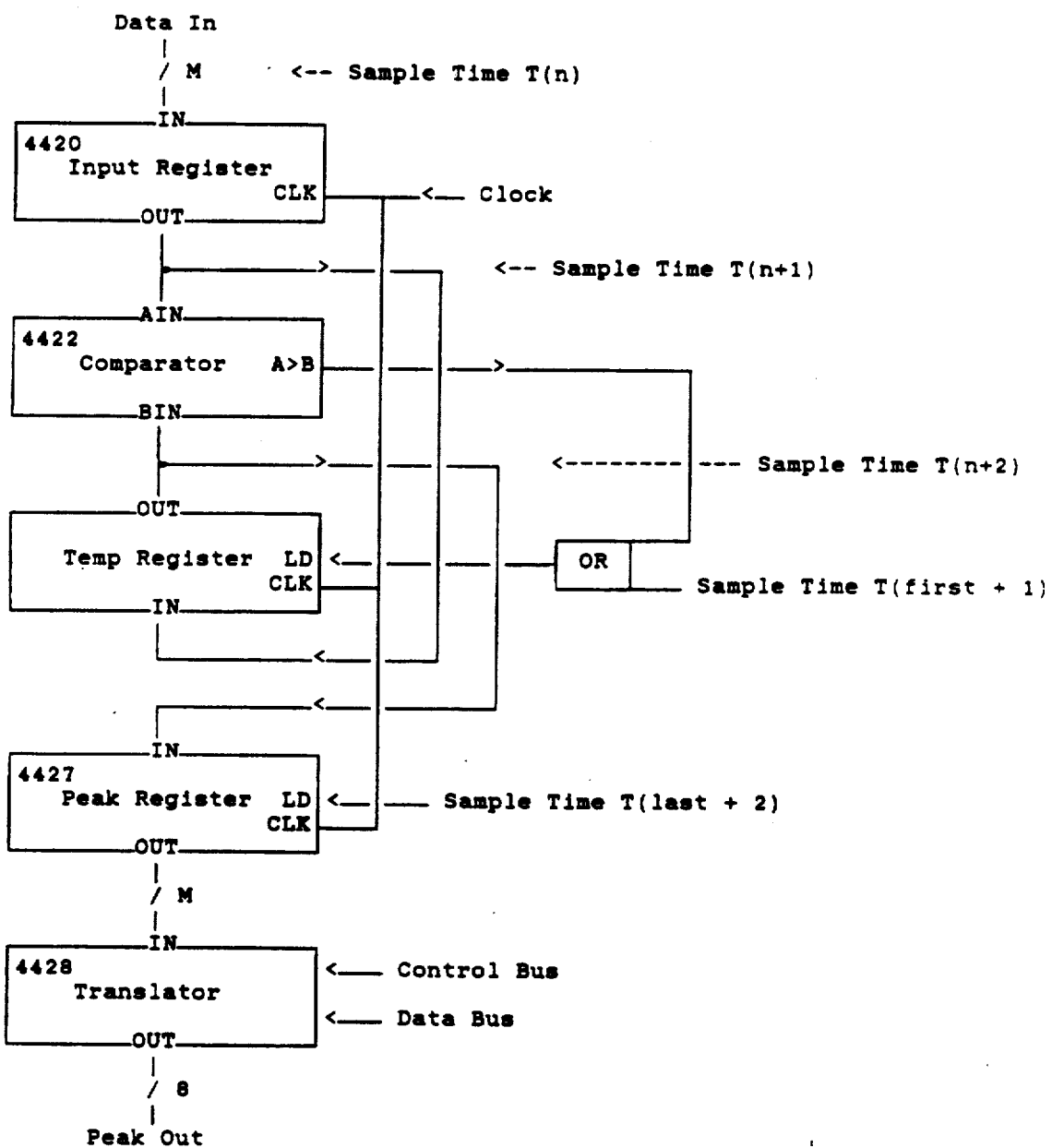
Figure 44C:
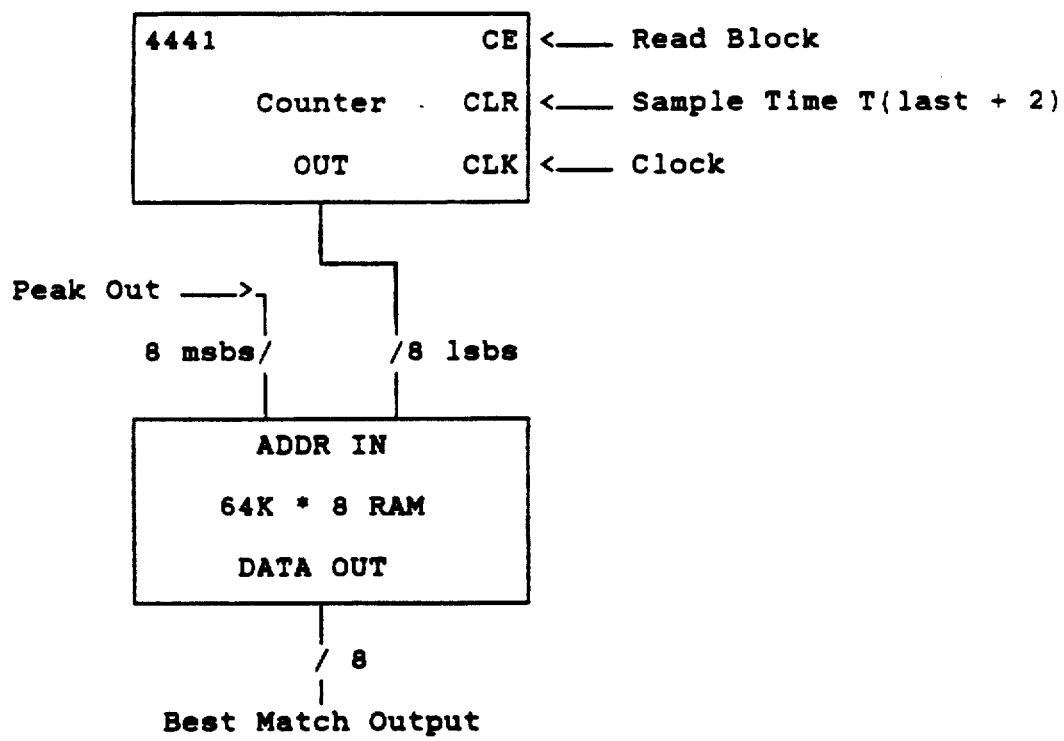

FIG. 44A is the block diagram of a matched filter circuit using a convolution memory block, FIG. 44B is the block diagram of best match logic, and FIG. 44C is the block diagram of a block-access memory.

Figure 45:
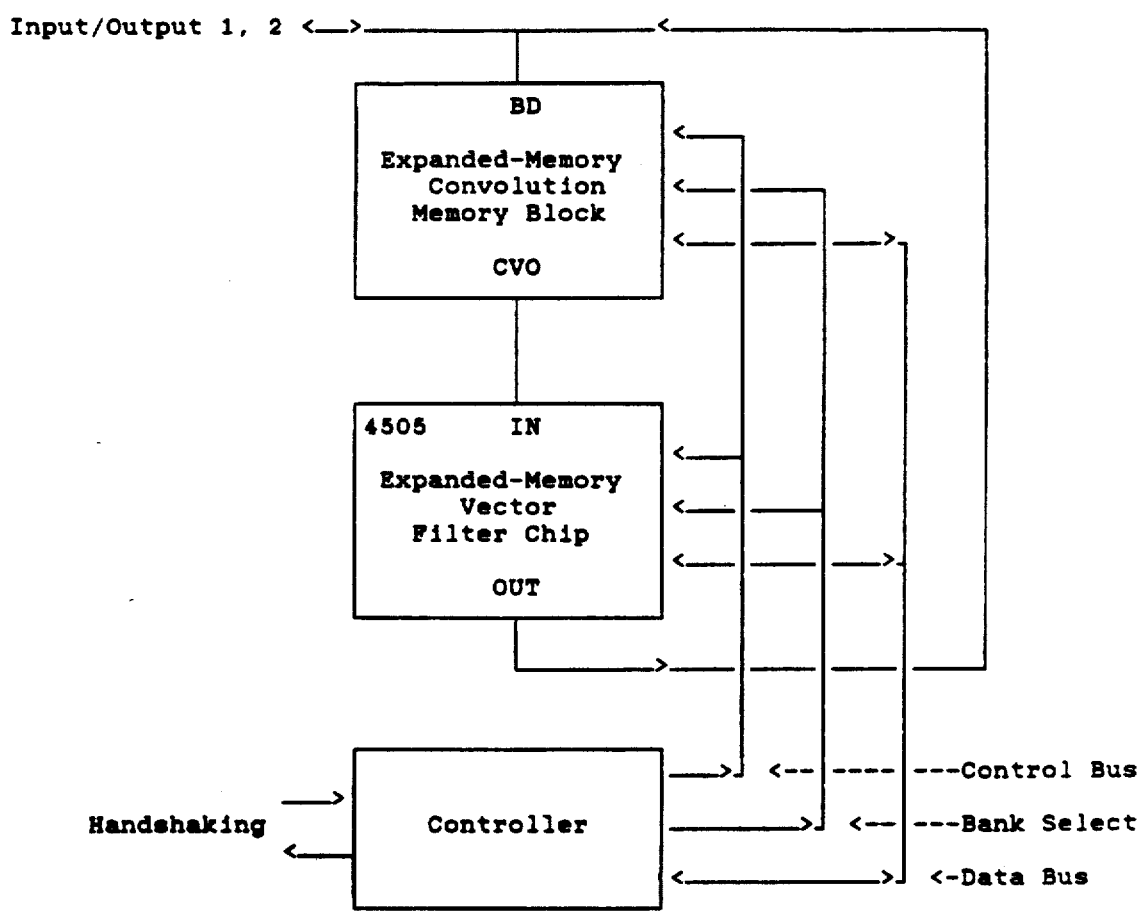

FIG. 45 is the block diagram of a digital bidirectional associative memory using expanded memory devices.

Figure 46:
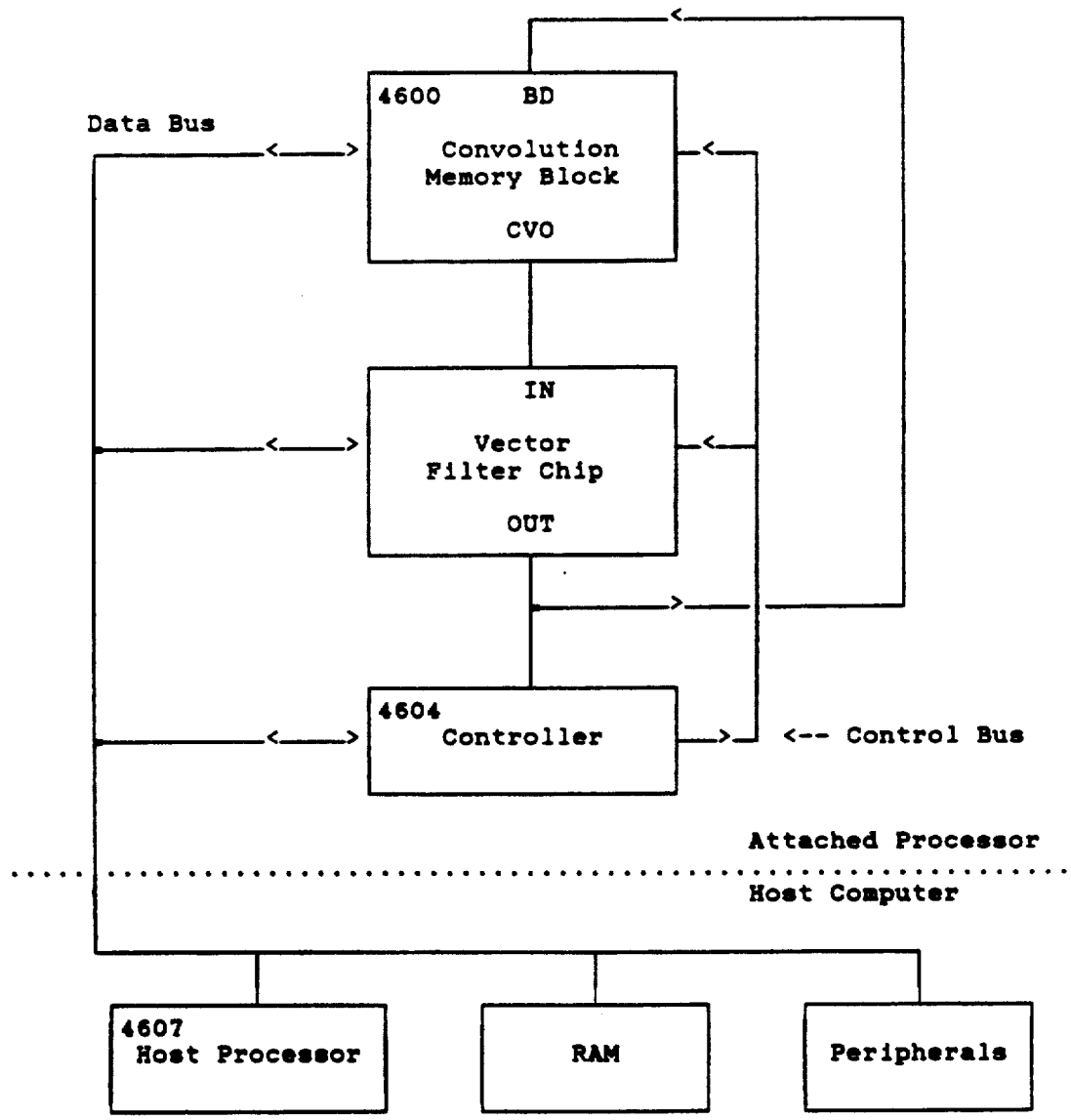

FIG. 46 is the block diagram of an attached processor using convolution memory chips.

Figure 47A:
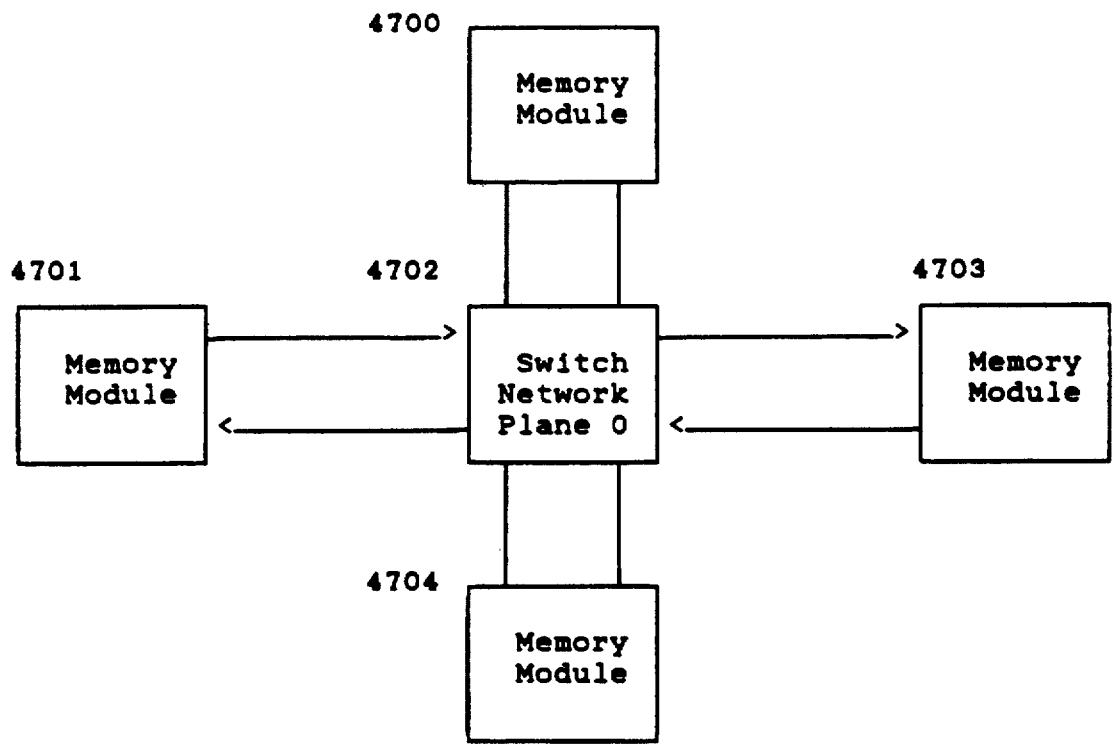
Figure 47B:
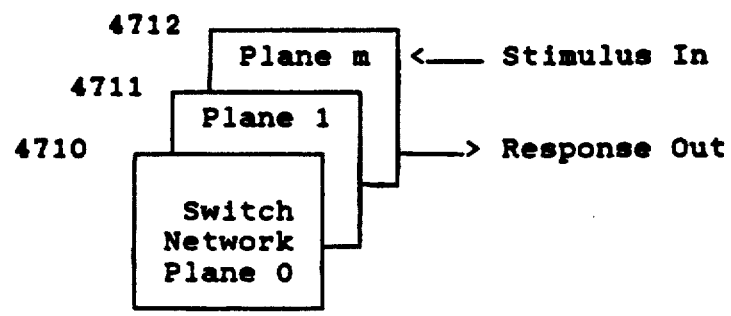

FIG. 47A is the block diagram of a hierarchical intelligent memory system, and FIG. 47B is the block diagram of a hierarchical switching network.

NOTE: For the convenience of the reader, all reference numbers are tied to the Figure numbers. Reference numbers are of the form XXYY, where XX is the Figure number, exclusive of any letter suffix, and YY is a reference number within that Figure.

IV. DETAILED DESCRIPTION OF THE INVENTION

IV. 1 Introduction

FIG. 5 introduces the invention herein by showing its application as a modified form of programmable logic array (PLA). This modified form of PLA produces a linear output rather than a binary output, and may have a pattern that is dynamically loadable rather than a fixed pattern that is programmed only at the time of design. It has a select input that chooses which one of its many patterns is to be evaluated, instead of evaluating all patterns simultaneously, has one multi-bit output port, rather than many single-bit outputs, and has a serial input rather than a parallel input.

A convolution memory, like a PLA, may be used as a matched filter, where the response of each row of the convolution memory is matched to a class of input patterns. The pattern is selected by choosing a set of input states to which a given row responds. As a modified PLA, each input is complemented external to the chip, and the set of true and false inputs is sent via the buffer data input for storage in the buffer memory and use by the entire array. Column 255 of each row may respond to the true (as cell 0,255 [510]=1 and cell 0,254 [511]=0), false (as cell 0,255 [510]=0 and cell 0,254 [511]=1), neither (cell 0,255=0 and cell 0,254=0), or both (cell 0,255=1 and cell 0,254=1) states of Input 127, and so on. Separate handling of the true and false states of each input are required since three responses to each input state are required: 1, 0, and don't care; while a single storage cell as 510 can handle only two states.

Thus an input column-vector comprising a set of 128 inputs, as 500 and 503, and the set of their 128 complements, 502 and 505, is serially presented to the buffer data input to a convolution memory chip and stored in the buffer memory, as registers 506 to 509. The basic premise of the chip is that a single set of these inputs will be applied to a large number of rows, each row storing a different pattern, and that there is sufficient storage in the buffer memory that a second set of inputs may be loaded into the chip while the previous set is being used. This double buffering is not shown in this simple drawing. Maximum performance of the chip requires that the number of cycles required to load the buffer memory is less than or equal to the number of rows of active patterns stored in the matrix memory times the number of rows of buffer memory that are used to evaluate those rows of the matrix memory.

A 64K*1 (K=1024) convolution memory chip stores a set of 256 rows of 256 columns each of binary weights, as 510 to 513 and 515 to 519. One row of these weights is activated by the row select logic 520 under control of matrix address. This weight matrix is loaded prior to application of the buffer data, and its pattern determines the response of the chip to the buffer data. As is explained later, this pattern may be permanently stored in the chip, being set at the time of manufacture, or may be loaded upon demand, depending upon the specific design of the matrix memory. There is additional logic (mask logic) that turns off entire columns so that their contents do not affect the output, but this detail is ignored in this example.

Once the matrix memory and the buffer memory are loaded, a row is selected under control of matrix address. Simultaneously, reg 506 is multiplied by weight 0,255 (510) and the product appears at 521, reg 507 is multiplied by weight 0,254 (511) and the product appears at 522, . . . , reg 508 is multiplied by weight 0,1 (508) and the product appears at 523, and reg 509 is multiplied by weight 0,0 (513) and the product appears at 524. All products, each of which is 0 or 1, are presented to the tally logic 525 that counts the number of 1's and places that count on the output lines. This count thus ranges from 0 to 256, requiring 9 bits. Implementation details of the matrix memory and multiplication logic differ from this explanation, but the principle is the same.

Note that a dimensionality of 256 by 256 for the matrix memory of the convolution memory chip has been chosen for simplicity of explanation. Any size may be built, and the number of rows may differ from the number of columns, although certain sizes will be more useful and more economical than others.

Figure 1C:
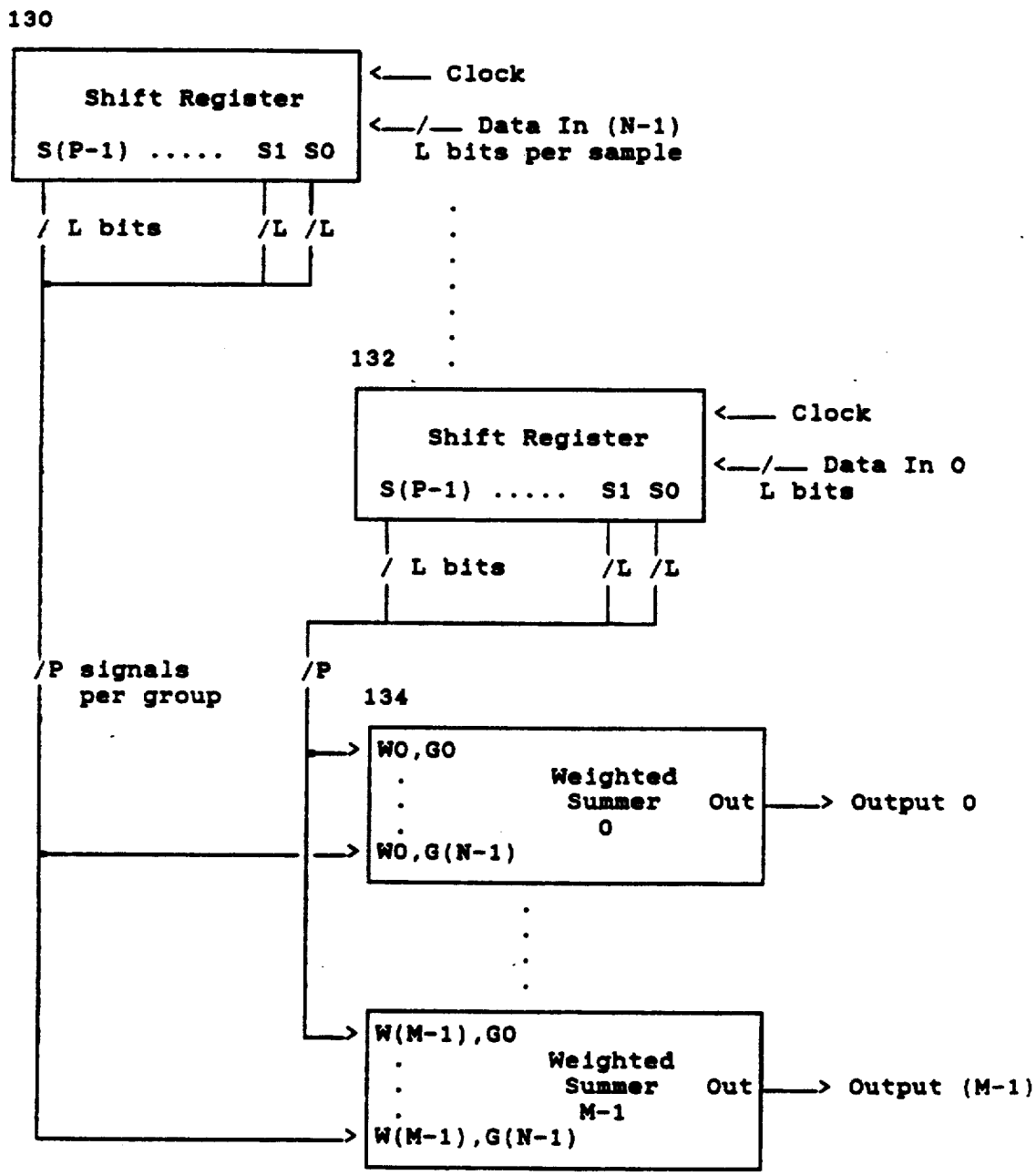
Figure 1D:
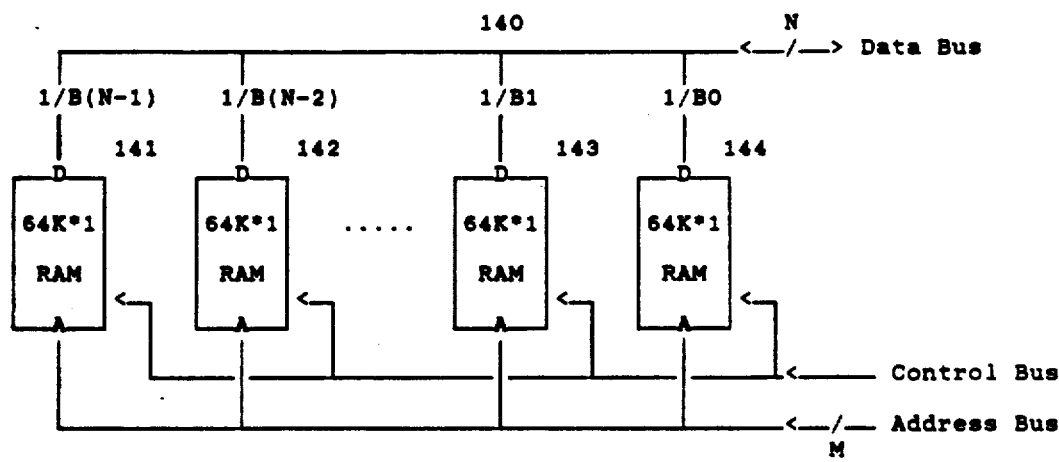
Figure 1E:
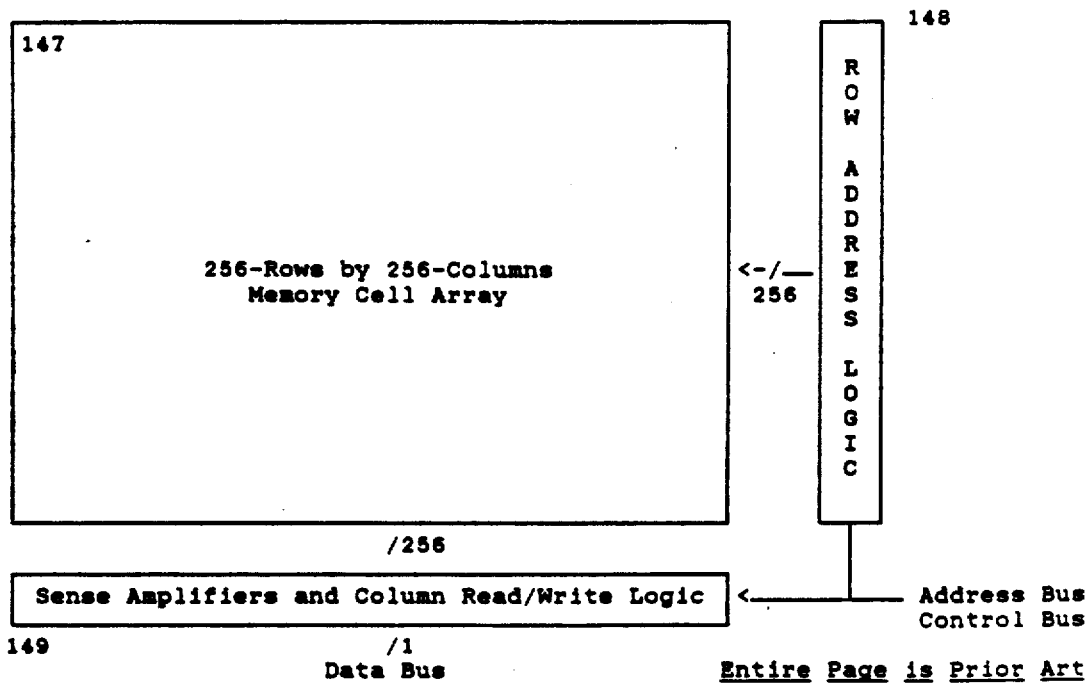
Figure 4A:
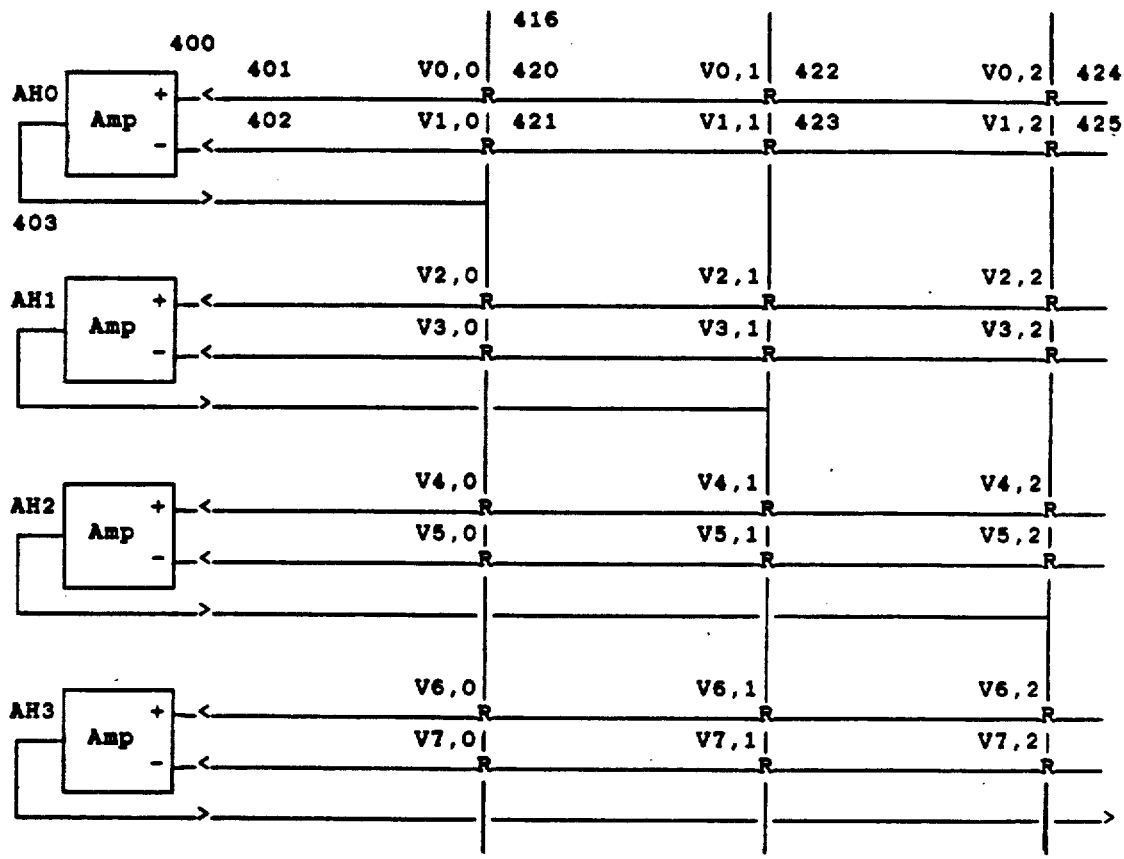
FIG. 4A is the circuit diagram for an analog Hopfield network.

A more complex example of the use of a convolution memory chip is shown in FIG. 6. The function performed is analogous to that of the analog Hopfield network of FIG. 4A. As will be described, multiple convolution memory chips may be used together to extend the precision of the weight matrix, forming the convolution memory block 600.

The controller 608 initializes the network by loading the weight matrix into the convolution memory block and filter coefficients into the vector filter. Under control of the handshaking signals, it then loads an input vector into the convolution memory block from Input-/Output 1 and provides the timing signals to sequence the flow of data around the loop. In addition, the controller monitors the sequence of outputs from the vector filter chip, determining that a stable result has been obtained when successive passes through the loop result in a consistent result. A best match to the input vector has then been obtained and may be conveyed to an external system via Input/Output 1. Since the number of passes around the loop depends upon how closely the input column-vector matches a stored pattern, the operation of the network is asynchronous with respect to the external system.

Assuming that the input column-vector has 256 elements and that the weight matrix is 256 elements square, then in 256 successive cycles a set of outputs is obtained from the convolution memory block. Each of these outputs is nearly equivalent to the outputs from one of the 256 amplifiers, or weighted summers, that comprise an analog network. Over time, each of the elements from the output of the convolution memory block, independently from all of the other outputs, is filtered as a sampled data stream by the vector filter chip 604 that controls the frequency response of the network the way the frequency response of an amplifier in FIG. 4A controls the frequency response of the analog network. The set of filtered outputs is fed back to the input of the convolution memory block, and the cycle repeats until a stable response is obtained. Applications that do not require the control of the dynamics of the network may delete the vector filter.

This same vector filter chip, when loaded with different sets of coefficients that determine its behavior, may perform as a low pass filter or a high pass filter. The effect of a low pass filter is to pass a signal only after it has persisted for a relatively long time, while the effect of a high pass filter is to pass a signal only when it changes rapidly.

Figure 4B:
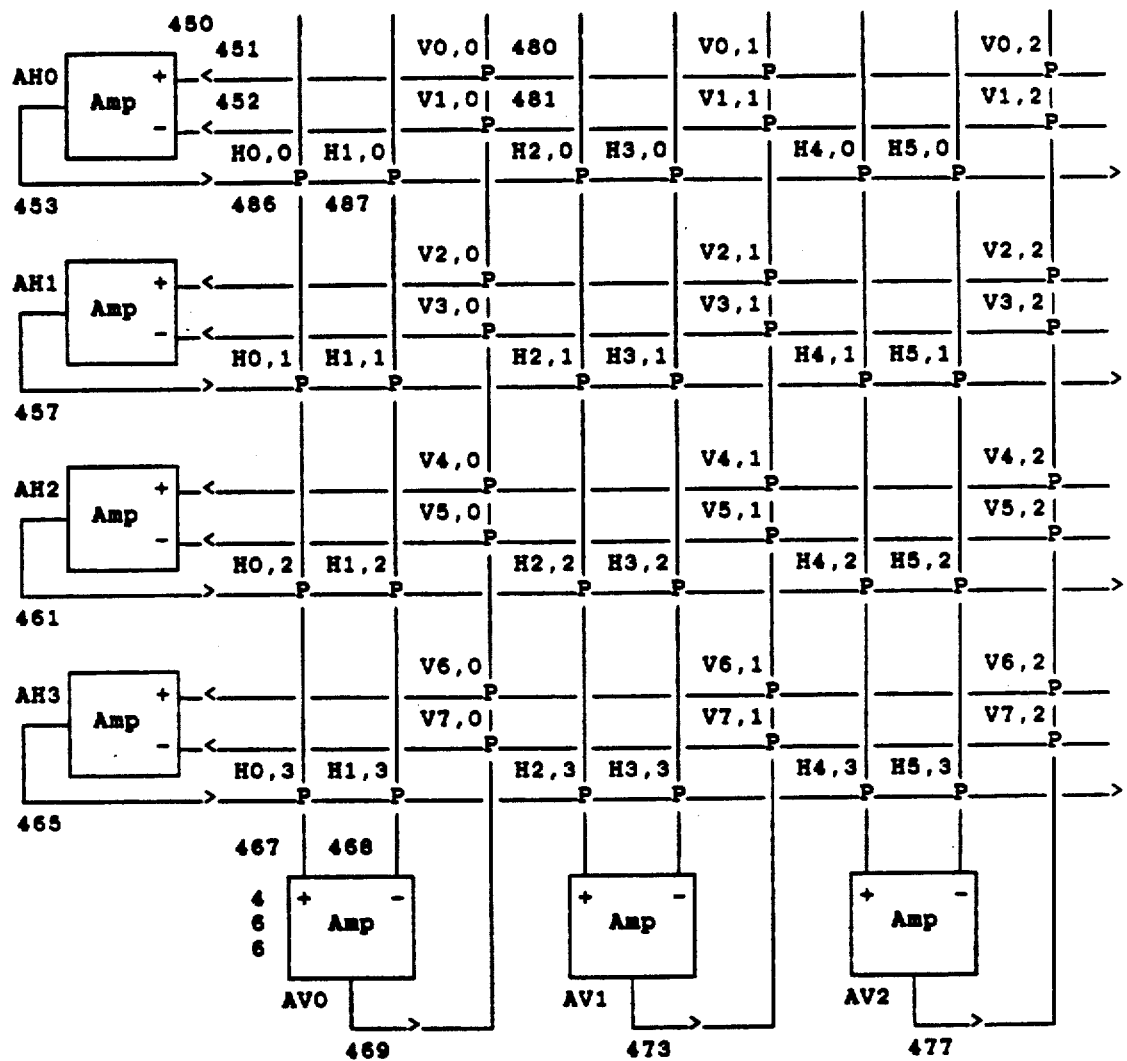
FIG. 4B is the circuit diagram of an analog, electro-optical, bidirectional associative memory (BAM)

FIG. 7 shows the block diagram of the digital equivalent of a analog electro-optical bidirectional associative memory (BAM) that is shown in FIG. 4B. Since there are two sets of weights and two sets of amplifiers in FIG. 4B, there are two convolution memory blocks 700 and 708, each with its own vector filter chip, 704 and 712 respectively, in the figure. The number of chips required to implement each of these four elements is one or more using modest fabrication technology and depends upon the accuracy, resolution, and matrix sizes desired, as will be described later.

With reference to the example of the analog BAM in FIG. 4B, convolution memory block 1 stores the V weight matrix and performs a series of vector dot-product calculations. The frequency response and output transfer characteristic are determined by vector filter 1 which is analogous to the AHn amplifiers. Convolution memory block 2 stores the H weight matrix. The frequency response and output transfer characteristic are determined by vector filter 2 which is analogous to the AVn amplifiers.

A convolution memory block is typically composed of multiple convolution memory chips and a glue, or vector accumulator, chip. A typical convolution memory chip stores a single weight bit and it stores the same weight bit for each element of the weight matrix, thus the number of convolution memory chips determines the number of bits of precision of the weight matrix.

For simplicity of explanation, it is assumed that convolution memory block 1 (700) stores the four rows by three columns of net vertical conductances from FIG. 4B, and that convolution memory block 2 (708) stores the three rows and four columns of net horizontal conductances. See FIGS. 8A and 8B, respectively. Since a convolution memory block can store signed weights in 2's complement notation, the separate storage of excitory and inhibitory weights is not necessary, and the net weight for each circuit node is computed from the difference between the positive and negative weights. Note that square matrices are not required, as shown in this example where there are four rows of three columns each or vice-versa.

FIG. 8B shows the convolution memory block 2 memory map. Each row of the weight memory stores an entire column of the H weight matrix as shown in FIG. 4B. Note that in this figure there are three rows of four columns each, the opposite of the organization shown in FIG. 8A.

The circuit operates by reading an input column-vector from either Input/Output 1 or Input/Output 2. Assuming the former, the controller 716, under control of the handshaking signals, reads a vector from an external source and loads it into the buffer memory in convolution memory block 1 (700) while turning off the output of vector filter 2. Once the entire vector has been received, the matrix times vector multiplications are begun. After each selected row of the weight matrix is handled, an element of the output vector is available at the output from the block. These rows may be dynamically selected as a block that may start and end at arbitrary locations in the matrix memory. Each of the time slots of the output of the convolution memory represents a different channel, and the samples of each channel are filtered over time by the vector filter. The vector filter is initialized as though zeroes existed prior to the reception by convolution memory block 1 of the latest input column-vector from the external source.

FIG. 9A shows the computations performed by convolution memory block 1. Each of the four rows of three columns of the V weight matrix 900 is multiplied times the input column-vector 901, comprising (AV0, AV1, AV2), producing an output column-vector 902 with four elements.

Unlike the analog BAM which performs all multiplications, additions and interconnections simultaneously, the convolution memory chip operates in row-sequential fashion which trades off simultaneous access to many low bandwidth elements for high speed access to much fewer but numerous elements in a high-density, row-wide-access memory with many high speed, very simple, processor logic cells feeding a global combinatorial logic circuit.

The dot-product computation is performed in a row-serial, bit-serial, element-parallel fashion. For each row in turn of the stored weight matrix, for each bit-weight in turn of the bit-vectors of the input column-vector (starting with the least significant bit-vector), the vector dot product of a row of the stored weight matrix times the input column-vector is computed. Each bit of the current row of the weight matrix is multiplied times its respective bit of the current column-vector bit-vector, and these many 1-bit by 1-bit products are summed to produce a partial dot product at the Dot Product Out port of the chip. The multiplication of each row of the weight matrix times all of the bit-vectors of the column-vector produces one element of the output vector, and these elements are sent one at a time to vector filter 1.

Vector filter 1 (704) is a time-shared filter with common, programmable characteristics for all filters. It determines half of the network dynamics in a manner analogous to the behavior of properly compensated operational amplifiers in an analog BAM, filtering each vector element independently of all others and storing past states as are required to operate each of the filters. The logical structure of the filter, such as infinite impulse response (IIR) or finite impulse response (FIR), and the number of stages, depend upon the application. A common, programmable transfer function is applied at the output of the filter to suppress noise near the origin, producing the signal that is fed to the next stage, convolution memory block 2 (708) in this case.

Convolution memory block 2 is logically identical to convolution memory block 1. It stores the V weight matrix and receives an input column-vector from vector filter 1. It cannot operate until it has received the entire column-vector from vector filter 1. The operation of the two convolution memory blocks is thus mutually exclusive unless two input column-vectors are being processed simultaneously. The output column-vector is sent one element at a time to vector filter 2.

FIG. 9B shows the computations performed by convolution memory block 2. Each of the three rows of four columns of the H weight matrix 910 is multiplied by the input column-vector 911, comprising (AH0, AH1, AH2, AH3), producing an output column-vector 912 with three elements.

Vector filter 2 is logically identical to vector filter 1. It determines the other half of the loop dynamics. Its output is fed back to the input column-vector port of convolution memory block 1.

The controller 716 initializes the states of the convolution memory blocks and the vector filters, controls the operation of these units, and determines when a steady state has been obtained. The output vector is then conveyed over Input/Output 1 or Input/Output 2 under control of the handshaking signals.

FIG. 10 compares the operation of an analog electro-optical bidirectional associative memory shown in FIG. 4B to the digital equivalent shown in FIG. 7. The primary benefits of the electro-optical implementation are that the weights may be changed simultaneously if patterned light is applied rather than relying on a photomask with uniform illumination, and only a single chip is required for its implementation. However, the weights have low precision, and an external optical system is required. The speed of the digital equivalent as disclosed herein is believed to be roughly equivalent to that of the analog circuit given the assumptions stated in the figure, but the digital equivalent is far more precise and stable, and may handle much larger matrices.

PERFORMANCE ESTIMATES OF A CONVOLUTION MEMORY SYSTEM

The performance advantage of the convolution memory architecture results from its tightly coupled, fine-grain memory and processing structure that is optimized for vector dot-product operations with long, typically 256-element, vectors. Assuming that the entire matrix fits into the matrix memory, no external input memory bandwidth is required following the loading of the input column-vector and the coefficient matrix, drastically reducing system costs and facilitating the sharing of external memories.

A typical chip would employ CMOS, 64K-bit, 30-nS SRAM technology and would produce a 256-point dot product every 30nS per bit of precision of the input column-vector. Note that since address generation, memory access (without requiring any column decoding), and data processing are all on the same chip, many interconnection delays are eliminated, and a system clock cycle equivalent to the delay of a single part may be used.

A block of 8 of these chips plus a glue chip (a vector accumulator chip) would provide 1024M 8*8-bit multiplications per second for signal processing or 8192M 8*1-bit multiplications per second for pattern recognition using artificial neural network techniques, both with full precision summation. The precision of the coefficients has little bearing upon the computation time, but directly affects the number of chips required. One pass through the entire feedback loop will take about 16 uS, i.e., 2*8 uS, for a 256*256 matrix.

Depending upon the application, the coefficient memory may be volatile or nonvolatile. All on-board memories are typically m*256 bits wide, drastically reducing external memory bandwidth requirements by avoiding the repetitious fetching of (1) the input vector during matrix-times-vector multiplication and (2) the coefficient matrix during matrix multiplication or iterative, e.g., pattern recognition, use.

In summary, the advantages of a convolution memory system are:

1. Wide temperature operation may be obtained without affecting performance.
2. Relatively loose, digital, semiconductor fabrication technology may be used.
3. Operation is deterministic. Pseudo-random or other noise may be added if desired for simulated annealing.
4. Accuracy and resolution may be increased by using additional convolution memory chips.
5. The circuit may be electrically subdivided to compute smaller problems than the maximum array size that a chip can handle.
6. The size of the problem being handled may be increased by using more convolution memory chips in a regular structure.
7. The design of the convolution memory chip may be made tolerant to most manufacturing defects to lower costs.
8. Very large memories that are partitioned into multiple subarrays on a single convolution memory chip can provide nearly instantaneous selection of different weighting matrices.
9. The utilization of most of the chip area of a convolution memory chip is high because the dominant structure is memory which is very dense and the layout of the memory may be efficiently matched to the layout of the processing logic.

IV. 2 Preferred Embodiment

FIG. 11 shows the simplified block diagram of an 8-bit convolution memory block, the block assumed in FIGS. 6 and 7. Eight identical convolution memory chips as 1103 and 1104 are driven in common by control lines and the column-vector lines. Each matrix data line is connected separately to the convolution memory chips, bit 0 being fed to 1104 and bit 7 being fed to 1103. This latter connection is analogous to the use of common, 1-bit wide memories, where eight are used in parallel to handle an 8-bit bus.

A matrix is loaded into the convolution memories using the control and matrix data lines. Arithmetic operations may then be performed. Each clock cycle, each convolution memory chip computes a vector dot product between one row of the matrix that it stores in the matrix memory, and one of the input column-vector bit-vectors that it stores in the buffer memory.

Unlike the matrix data, where one convolution memory chip stores a single weight of bit of each of the elements, all bits of each element of the column-vector are loaded into each of the convolution memories. Bit n of each element of the column-vector is typically loaded into row n of the buffer memory forming a set of n bit-vectors, each typically up to 256 bits long.

On the first cycle of computation, in each of the convolution memories, the bit-0 bit-vector of the column-vector is dot multiplied by the initial row of the convolution memory. This results in an initial set of outputs from the convolution memories that is weighted, summed and then loaded into temporary storage in the multi-port vector accumulator chip 1107. The outputs from the various convolution memories are scaled in accordance with the weight of the bit of the matrix that they store. Assuming that 2's complement representation is used for the matrix, then the weight of the least significant bit of the output 1106 of convolution memory 1104 that stores matrix bit 0 is $2^{\wedge}0$, or 1, ascending in binary powers with successive convolution memories, until reaching convolution memory 1103 which stores bit 7, the sign bit, resulting in a an output 1105 with a least significant bit with a weight of $-(2^{\wedge}7)$, or $-128$.

Similar structures may be built of any size, larger or smaller than the one shown, to achieve whatever level of precision is required. The aggregate performance of the system increases as more chips are used to increase the precision of the matrix since all convolution memory chips in an active block are computing dot-products simultaneously. Hence unlike conventional processor and memory architectures, the processing power of the system increases as the storage capacity of the system increases.

As will be described, the multi-port vector accumulator chip adds the outputs from the various convolution memory chips not only over space, i.e., over the eight convolution memory chips shown, but also over time, as successive bit-vectors of the input column-vector are processed. The method for dot product computation is an extension to the well known "add and shift" algorithm for multiplying a single pair of numbers in order to handle a pair of vectors.

During the second cycle of computation, the bit-1 bit-vector of the column-vector is processed by the convolution memory chips for the same row of the matrix as during the first cycle of computation. Since the bit 1 bit-vector has twice the weight of the preceding one, the bit 0 bit-vector, the vector accumulator chip gives twice the weight of the preceding sum to this latest sum, and a running sum of sums is maintained for the current row of the matrix memory. Successive weight bit-vectors are processed similarly until the sign-bit bit-vector is processed, which has a negative weight when 2's complement representation is used for the column-vector. Reflecting this negative weight, the vector accumulator chip subtracts the current sum of bit-vector dot products from the scaled accumulated sum.

Successive rows of the matrix are processed in a like fashion. The sequence of addresses fed in common to the matrix memories depends upon (1) the specific address within the convolution memory chips associated with each row of the matrix, (2) how many rows the matrix has, and (3) whether or not all of the rows of the matrix are to be used.

In a single cycle each convolution memory chip as shown in this example performs 256 1-bit by 1-bit multiplications then adds (tallies) them up. Thus each chip has the processing power equivalent to one 16-bit*16-bit multiplier, four 8-bit*8-bit multipliers, or thirty-two 1-bit*8-bit multipliers, optimistically assuming that a system of conventional multipliers, memories and adders, with their many interchip interconnections, can operate as fast as a system of convolution memory chips. Since eight convolution memory chips are working simultaneously in this example, the total processing power is equivalent to eight times these figures.

The advantages of the convolution memory architecture are:

(1) The multiplication of the entire matrix times the entire column-vector can take place without a single memory cycle external to the convolution memory chips to access either the matrix or the column-vector.

(2) The addressing of matrix data is done in a simple, linear sequence, where each address results in the simultaneous fetching of all bits of an entire row of the matrix. The aggregate size of the data word processed is thus the width of the row in one convolution memory chip times the number of convolution memory chips used. This is 2048 bits in the example in FIG. 11.

(3) The address generation, memory access, multiplication, and low-level summation are all performed on a single chip, eliminating inter-chip connections and their delays and the power to drive such interconnections, and providing higher speed from a lower performance memory architecture than would be required if data crossed chip boundaries.

(4) The system designer has the freedom to tailor the precision of the column-vector to the application, in which case an even trade is made between performance and precision, where performance is measured as the number of full precision operations made per second. The system shown in FIG. 11 can perform (W*R/N) N-bit by 8-bit multiply/add operations per second, where W is the number of elements in the column-vector, e.g., 256, R is the clock rate, e.g., 32 MHz, and N is the number of bits of precision of each element of the column-vector, e.g., 8.

Figure 4C:
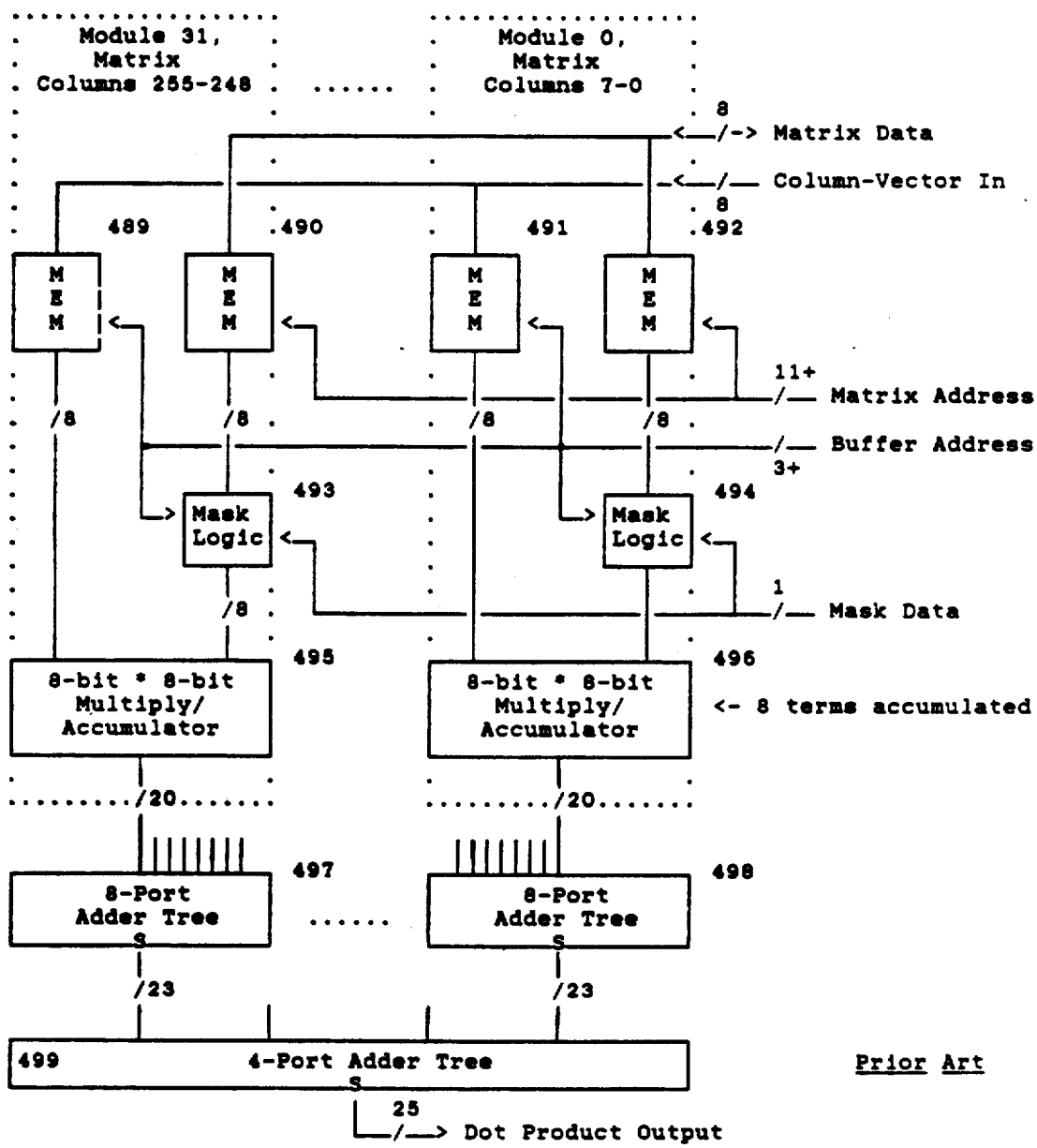
FIG. 4C is the block diagram of a rank-256, vector-times-matrix multiplier using conventional parts.

(5) A system of convolution memories has far fewer parts than a system of conventional multipliers, memories, and adders with equivalent performance. For example, assuming two systems operating at 32 MHz, a conventional system as shown in FIG. 4C using largely standard parts and performing 8-bit*8-bit operations would require 32 8-bit modules, each comprising (a) 1 8-bit*8-bit, 12 nS (extremely fast and expensive, with questionable availability) multiplier/accumulator as 495 or 496, (b) 1 8-byte*8-bit, 12 nS (tiny capacity but very fast and expensive) memory as 489 or 491 for an 8-element portion of the column-vector, (c) 1 2048-byte*8-bit, 12 nS (very fast and expensive) memory as 490 or 492 for a 256-row by 8-column portion of the matrix, and (d) assorted address generation and interconnect delays totaling 8 nS, plus 1 control chip (a gate array, not shown), 4 8-port*17-bit adder trees as 497 and 498 (each a gate array) and 1 4-port by 20-bit adder tree 499 (a gate array), for a total of 102 chips, in contrast to 8 64K-bit convolution memories (semi-custom or full-custom design), 1 8-port*9-bit vector accumulator (a gate array), and 1 control chip (a gate array), for a total of 10 chips. Furthermore, the conventional system requires 32 additional chips as 493 and 494 for mask logic (assuming gate arrays), for a total of 134 chips, if one requires the ability to turn off arbitrary columns, as is provided by the convolution memories and is needed to find n'th best matches in the digital equivalent of artificial neural network systems as shown in FIGS. 6 and 7.

(6) The convolution memory architecture becomes even more valuable when applied to an artificial neural network application where the matrix has 8-bit precision but the column-vector has only 1-bit precision. The total number of standard, off-the-shelf chips required in a conventional system multiplies about 8-fold, to about 1,000 chips, presumably reducible to about 300 chips if several kinds of gate arrays are used, while the number of chips in the convolution memory system remains at only 10.

(7) The design of the conventional system changes radically depending upon the precision required for the column-vector in order to equal the performance of a system of convolution memories, whereas only a change in the sequence of control signals is required to effect the change to the convolution memory system.

FIG. 12A shows the simplified, generic block diagram of a convolution memory chip. All bus widths are denoted by symbols to indicate that no particular set of bus widths is required.

The basic structure has three sections, a matrix memory, processor logic, and a buffer memory. Data is entered into the matrix memory cell array and sense amplifiers 1200 under control of the matrix address that places matrix data into a particular row and column of the matrix memory. Selection of the desired row is performed by the matrix memory row address logic 1201. While a single bit (N=1) is typically written into the matrix memory of each chip at a time, an entire row of data, P bits wide (typically 256) is read and passed to the processor logic cells 1203.

Likewise, the transpose buffer memory cell array and sense amplifiers 1206 stores the column-vector which is received at the buffer data port. However, there are several significant differences between the operation of the buffer memory and the matrix memory. Since one column-vector is typically being loaded while the previous one is being used, the buffer memory allows simultaneous reading and writing operations to different locations. In addition, an 8-bit byte (W=8) is typically loaded into the buffer memory at a time, compared to a single bit for the matrix memory. Furthermore, the orientation of the byte is rotated ninety degrees with respect to its being read out in a row and being passed to the processor logic cells. This rotation is necessary so that a single row of the buffer memory contains only bits of the same weight, one bit for each of the elements of the column-vector. This transpose operation complicates the design of the buffer memory, as will be described. However, the number of rows in the buffer memory is typically much less than the number of rows of the matrix memory, where typically M=256 but V=17.

For maximum performance and minimum latency, the optimum number of rows for the buffer memory is twice the number of bits of precision of each element of the column vector, plus one more row to store a mask vector. Latency is the delay from the start of the computation of a dot product for a particular row until the completion of the computation for that row. The amount of hardware in the convolution memory chip can be reduced if the latency can be increased, as will be described later.

The processor logic cells 1203 perform the multiplications for the dot product of the bit-vectors from the matrix memory and the buffer memory. The bus widths P and T are typically both equal to 256, but it will be shown later that they may differ by powers of two.

Assuming for simplicity that P=T=256, then the number of outputs R from the processor logic cells is also 256. The global tally logic 1204 receives these bits and counts, or tallies, the number of 1's. This count is done very quickly with combinatorial logic, typically in a tree with registers between layers of the tree for maximum performance. The design of such tally circuits is covered in the article in the prior art on the FEBRIS chip.

This counting results in a 9-bit output at the dot product out port under control of dot product out(put) en(able) which turns the output drivers on or off, allowing the outputs of multiple convolution memory chips to be connected in parallel.

FIG. 12B shows a detailed block diagram of a typical convolution memory chip. The variables in FIG. 12A representing bus widths have been replaced by the typical values. The primary extension shown in this drawing is that the matrix memory and the buffer memory have a set of column sense amplifiers and read/write logic, as 1223 and 1229, and that these memories are typically built as static random access memories (SRAMs) for high speed. However, any form of memory may be used for the matrix memory depending upon the lifetime of the stored data, and several forms of memory may be used for the buffer memory, as will be shown later.

Note that the number of wires connecting data from the matrix memory cell array 1220 to the sense amplifiers 1223 is 2*256 (+spares), whereas the number of wires from the buffer memory 1231 to the sense amplifiers 1229 is only 256 (+spares for repair at time of manufacture). This difference results from an attempt to equalize the physical widths of the two memories, as will be described.

A key difference between the matrix memory row address logic 1221 and the buffer memory row logic 1232 is that the buffer memory row logic enables the buffer memory to be written into from the side, i.e., to write a byte from buffer data into 8 bits of a 17-bit column, whereas the matrix memory row address logic has no provision at all for writing data, hence data can only be written into one bit of a row of the matrix memory by the matrix memory column sense amplifiers and read/write logic 1223.

The matrix memory and the buffer memory present a common memory structure to the user. This common structure is represented by a data path, as matrix data and buffer data, an enable path, as matrix chip select and buffer chip select, an address path, as matrix address and buffer address, and a control path, as matrix control and buffer control, although additional control states are found beyond what one finds in common memory chips. Ignoring this minor but significant difference, the convolution memory chip is intended to be easy to use because one can treat it largely like a common memory, as least for reading and writing data when computations are not being performed, and with restrictions when computations are being performed.

FIG. 12C is a table describing all of the pins for the convolution memory chip. Since there is not one memory but two, and these two memories operate simultaneously, and since there is processor logic present, the total pin count is much higher than one finds for a common memory chip.

FIG. 12D is the floorplan for one way to lay out the chip. The dominant area is occupied by the matrix memory cell array 1240, rather than logic. It is assumed that common fault tolerant memory design is used, wherein spare rows and/or spare columns are provided and selected permanently at the time of chip manufacture to increase chip yields.

It is further assumed that the outputs from the matrix memory column sense amplifiers 1242 pass through the region for the buffer memory cell array 1243 and the buffer memory column sense amplifiers 1244. The bus from the matrix memory is thus interdigitated with the bus of the buffer memory, increasing the width of the chip assuming that the metal runs of these two buses would otherwise interfere with one another. The two memory buses flow into the processor cells 1246, whose outputs flow into the global tally logic 1247.

A key distinction between this chip and other parallel processor chips such as the NCR GAPP chip, as listed in the prior art, is the presence of this global tally logic 1247. The strength of the convolution memory chip for handling dot products comes in part from this global logic that is simultaneously able to process the outputs from all of the very simple processor cells rather than trying to move the data around the chip so that more complex logic cells can perform the summation. The other part of the strength of this architecture comes from the way matrix data is distributed over multiple convolution memory chips, spreading out the computation load and increasing performance as the precision of the matrix is increased.

FIG. 13A is the block diagram of the matrix memory row address logic. This logic has two functions: (1) allow the operation of the matrix memory in a conventional fashion, where the row and column addresses are multiplexed onto the same matrix address lines to save pins, and (2) provide an on-chip means to generate a sequence of addresses to run the matrix memory while dot products are being computed. Generating addresses on chip avoids inter-chip delays in the address path and frees up the matrix address pins for other uses, such as loading a second bank of convolution memories that shares the same matrix address and matrix data lines.

Logic equations for the various control signals are given in FIG. 14D.

When the matrix memory is being treated like an ordinary memory, the matrix address is stored in the row addr(ess) latch 1311 and flows through the multiplexer 1310 to the decoder 1313 that selects a row of the memory.

When the matrix memory is to be used for the computation of dot products, the low limit latch 1301 is loaded with the address of the first row to be fetched. The high limit latch 1302 is loaded with the address of the last row to be fetched. Synchronous control of the counter 1305 is used so that for a typical setting of 0 for the low limit and a typical setting of 255 (decimal) for the high limit, all 256 rows of the matrix memory are used, starting with row 0. As is explained later, proper control of the low limit latch at the time of reset enables any row to be chosen as the initial row without affecting the range of addresses used, thus shifting the outputs in time.

When dot products are to be computed, the reset input to the chip is asserted, loading the counter 1305 with the contents of the low limit latch when buffer strobe, or clock, is asserted. The run state is then set active. As a result, the output of the counter 1305 passes through the multiplexer 1310 to the decoder 1313 and on to the matrix memory cell array. The counter is incremented when the bfr eq (buffer equal) signal is true which drives its CE (count enable) input. If the state of the counter 1305 is the same as the state of the high limit latch 1302, as detected by the comparator 1308, the LD (load) input to the counter is asserted when bfr eq is asserted, resulting in the contents of the low limit latch being synchronously loaded into the counter, overriding any incrementing by the counter. The operation of such a synchronous counter is like the operation of the 74163 counter from Texas Instruments, ignoring details of whether a control signal is true or false to activate a function.

Note that the loading of the latches is under control of the matrix memory signals, which are related to the matrix address, whereas the operation of the counter is controlled by Clk that comes from the buffer memory signals and also operates the processor logic.

FIG. 13B is the block diagram of the SRAM (static ram) version of the matrix memory cell array. This is a conventional design, as is well known in the art. Each storage cell as 1339 has a select input that facilitates reading if the two outputs are received by relatively high impedance devices, and facilitates writing if the two outputs are driven differentially by relatively low impedance devices.

Since such a memory has two signal lines as 1330 and 1331 for each column of cells, the matrix memory cell bus has twice as many signal lines as the number of columns of cells in the memory.

FIG. 13C shows the SRAM matrix memory column sense amplifier and read/write logic. Each driver/receiver/multiplexer (DRM) as 1340 receives: (1) the differential signals from a column of memory cells, (2) control lines 1346, (3) a select line 1347, (4) a matrix data line 1348, and (5) a matrix memory bus line 1349. The matrix memory bus line from each cell is collected into a 256-bit bus 1353 that is passed to the processor logic cells.

Writing into the memory is performed in a conventional way. During the first cycle, a row address is placed on the matrix address line and is loaded into the row address latch in the matrix memory row address logic, selecting a row of the matrix memory using the row address decoder 1313. During the second cycle, a column address is placed on the matrix address lines, selecting a column of the matrix memory with the decoder 1354, and a write signal is given, resulting in the activation of the differential drivers in one of the driver/receiver/multiplexers.

FIG. 13D shows the detailed design for the driver/receiver/multiplexer 1360. The differential receiver 1362 receives the two, complementary data lines from a column of memory cells. A differential driver 1363 generates a pair of differential signals to write into a column of memory cells. A mux (multiplexer) 1364 selects data from the matrix memory bus or the matrix data bus for writing into the memory. The provision for writing data from the matrix memory bus into the matrix memory is not required by the preferred embodiment, being provided to demonstrate that such a data path is possible. A buffer 1365 allows data from the matrix memory bus, presumably data from the matrix memory, to be passed to the matrix data bus for verification that data has been properly stored in the matrix memory.

FIG. 14A is a block diagram of the processor logic cells. The cells are extremely simple. A cell as 1402 receives buffer memory bus bit n and matrix memory bus bit n, where for this particular cell, n=255. A single output emerges from each cell as cell n output.

FIG. 14B is the cell block diagram. A mask reg (register) 1412 is loaded from the buffer memory bus 1410 and provides a signal to the AND gate 1414. The AND gate also receives a signal from the buffer memory bus and the matrix memory bus. This mask register enables the contents of one column of the matrix memory to have no effect upon the output of the processor logic, and in turn, the dot product output. To simplify the design of the mask register, it is constructed as a row-wide-clear, selective-set flipflop.

When multiplying two bits, A and B, together, the product is true only when both A and B are true, as provided by the AND gate as 1414.

FIG. 14C is a table of the control signal states that are required to operate the convolution memory chip. These states affect various control signals according to the table in FIG. 14D.

FIG. 15A is the block diagram of the buffer memory row address logic. The operation is similar to the operation of the matrix memory row address logic, except that the buffer memory has far fewer rows than does the matrix memory, in which case the decoder 1513 only has 18 outputs, and that the comparator 1508 provides a signal, Bfr Eq (buffer equal), that determines when the counter in the matrix memory row address logic may increment.

Note that the counter 1505 requires only 4 bits in order to cycle through the 16 rows that are provided to store the column-vector. The multiplexer 1510 provides the handling of 5 bits in order to control row 16 that is a temporary location for the mask data which is loaded into the mask register in the processor logic cells. This latter mask register is treated as row 17 for initialization purposes, but is not a physical part of the buffer memory.

FIG. 15B is the block diagram of the transpose buffer memory cell array. The buffer memory, unlike the matrix memory or conventional memories, provides the writing of parts of columns concurrent with the reading of rows. This facilitates the loading in multiple cycles of one column-vector while the previous one is being used by the processor logic cells, and allows the elements of the column-vector to be handled externally to the convolution memory chip as ordinary data, but to be read out as bit-vectors for use by the processor cells, where row m has bit m of every element of the column-vector, where m is 0 to 7.

The buffer memory may have as many rows as are needed, with 17 being only an example. A convolution memory chip that is intended to handle only binary images, such as for artificial neural network applications, would require only $[(2*1)+1]=3$ rows, while a chip to handle 16-bit precision with maximum efficiency would have $[(2*16)+1]=33$ rows. The size shown was chosen since many imaging applications have picture elements with 8-bit precision, and the processing of such images is expected to be a major application of the chip.

The design of the transpose buffer memory cell array has been optimized to constrain the number of vertical busses to be two per column as 1526 and 1527, the same number as is used in the SRAM matrix memory cell array, so that the chip layouts would have the same pitch, i.e., column-to-column spacing. This necessitates some constraints on the writing of data into the buffer memory.

Setting aside these constraints for the moment, a rectangular matrix of transpose storage cells (TSCs) is shown in FIG. 15B. A row, as cells 1521 to 1524, is selected for reading and use by the processor logic cells by asserting the BM (buffer memory) row sel(ect) 0 line 1525 which comes from the buffer memory row address logic. Each cell as 1521 places its data on a column output line as 1526 which forms one bit of the buffer memory cell bus 1540.

Simultaneously, the column containing the same cell may be selected by a BM column select line as 1527 that comes from the decoder 1542. Data may be written into the cell from a BM Row Data Bm- line while it is so selected, subject to the condition that the cell has been cleared first. Unlike conventional static RAMs that can write into a cell regardless of the state of the cell, the buffer memory, in order to reduce its physical size, operates each cell as a row-wise common-clear, selective-set flipflop. That is, the entire memory is cleared at one time, but an arbitrary bit in the row may be set.

This operation is an improvement over the use of shift registers, as is found in video RAMs, because it allows the writing into arbitrary cells in an arbitrary order, not requiring the filling of unused cells with null data, and reduces power requirements because the data is not shifting throughout entire shift registers in order to arrive at a desired location.

The truth table and circuit diagram of the cell are shown in detail in FIG. 15C. Ignoring the pullup resistors 1555 and 1556, four transistors are used. The basic flipflop is composed of transistor 1558, providing the Q output, and transistor 1559, providing the Q-output. Data from an entire row of such cells is accessed by the assertion of the BM Row Sel(ect) N line 1552, which turns on a row-access transistor as 1554. This transistor conveys the Q output to the Buffer Memory Cell Bus Bit M line, 1561, for reading, or vice-versa for clearing.

The cell can be cleared on a row-wide basis by applying a low impedance, zero voltage source to the Buffer Memory Cell Bus Bit M line while a BM Row Sel N line is asserted. All of the rows that are to receive data from the Buffer Data lines to the chip must be cleared in this way prior to loading the data into the buffer memory.

Data is loaded into a cell via the BM Row Data BN- line 1551 in concert with the BM Column Select M line. Transistor 1557 is turned on by the assertion of BM Column Select M, and if the cell has been cleared (Q=0), the cell may be set (Q=1) by grounding BM Row Data BN-. Since this data line is inverted, a logic one is represented by a low voltage which grounds out transistor 1559 through transistor 1557, turning off transistor 1558, causing Q to go high.

Since the BM Row Sel N line 1552 and the BM Column Select M line 1562 access the flipflop independently, the flipflop may be simultaneously read and written. Typical operation, however, is that one set of rows is read while a different set of rows is written.

FIG. 15D is the buffer memory row sense amplifier and read/write logic block diagram. (The buffer memory row logic 1207 consists of the buffer memory row address logic and the buffer memory row sense amplifiers and read/write logic.) It is assumed that an element of the column-vector has 8-bit precision and is loaded into rows 0 to 7 or 8 to 15, and that an element of the mask vector has 1-bit precision and is loaded into row 16 from which it is moved to the mask register in the processor logic. Thus when a write operation occurs, a varying number of row driver receivers (RDRs) as 1570 are turned on.

The selection of which group of row driver/receivers is turned on is made by the Bfr Row Addr(ess) Latch lines as 1572. Prior to a read or write operation, the row address latch in the buffer memory row address logic is loaded with an address that selects a group of row driver/receivers to access the buffer memory. Bfr Row Addr Latch B0 selects rows 0 to 7, BM Row Addr Latch B3 selects rows 8 to 15, and BM Row Addr Latch B4 selects row 16.

Since the buffer data port is only 8 bits wide, but there are 17 rows in the buffer memory, the row driver/receivers also route data between the buffer data port and the rows. For example, row 0 (using row driver/receiver 1570), row 8 (using row driver/receiver 1574), and row 16 (using row driver/receiver 1576), all connect to buffer data 0.

FIG. 15E tabulates the operation of the row driver/receiver 1579. An additional state, read precharge, is provided to speed access to a portion of a column. The row driver/receiver pulls up a row line for a brief time at the beginning of a read operation since the high-state impedance of a buffer memory cell is high (to reduce power), whereas the low-state impedance is low.

FIG. 15F shows the buffer memory column sense amplifier and read/write logic. A column driver/receiver (CDR) as 1581 connects a bit of the buffer memory cell bus 1580 to a like bit of the buffer memory bus 1583. A column driver/receiver has three functions as shown in the truth table: (1) precharge a column, analogous to precharging a row, (2) read a row, and (3) write a zero, i.e., clear, a row.

IV. Convolution Memory Blocks

With the description of the preferred embodiment of the convolution memory chip now complete, it is appropriate to describe in detail how to use multiple convolution memory chips together to increase system performance and to increase the precision of computations.

Since each convolution memory chip is a form of parallel processor, having 256 processor cells active simultaneously, and since it is desirable to increase the total processing power of a system by having multiple such chips active simultaneously, various ways of using multiple such chips have been devised.

FIG. 16 shows a convolution memory block with medium parallelism. A controller external to the block, as shown in FIG. 6, is required to command the various chips of the block to perform properly. In FIG. 16, multiple convolution memory chips as 1600 to 1603 are used to store a matrix and to compute the product of a column-vector and the stored a matrix. Like common, 1-bit wide memory chips, successive convolution memories hold successive bits of each element of the matrix: chip 1603 stores bit 0, chip 1602 stores bit 1, and so on.

The dot product outputs from these various convolution memory chips are received by a multi-port vector accumulator chip 1608. An arbitrary number of convolution memory chips may feed a single multi-port vector accumulator chip, but mechanical pin limitations place practical bounds on how many chips may feed one chip, and several solutions for this pin problem are described later. It appears reasonable to have eight to sixteen convolution memory chips feed a multi-port vector accumulator chip simultaneously.

In any case, since each convolution memory chip shown in FIG. 16 stores a bit of the matrix with a different weight, the vector accumulator chip weights these outputs correspondingly.

FIG. 17 is the simplified block diagram of a multi-port vector accumulator chip with minimum latency. The dot product outputs from a group of convolution memory chips are presented to a weighted adder tree 1700. The S output 1701 from the weighted adder tree feeds a register 1702. The output 1704 of the register feeds the A Input (AIN) of an arithmetic logic unit (ALU) 1706. The B Input (BIN) of the ALU is fed by a register 1703 that acts as an accumulator. The ALU functions to perform a dot product computation are shown in the Figure.

The most significant bit (msb) of the ALU output 1707 is corrected for overflow by the XOR gate 1708, and the ALU bits plus the corrected bit are fed to the register 1703. A one-bit shift right is performed on successive cycles of the register, where of the U+1 msbs that are fed into the register, the U most significant bits of these bits are fed back to the ALU, while the least significant bit of the U+1 bits at the input to the register becomes the most significant bit of the S least significant bits at the output of the register.

The operation of the ALU and the register 1703 is the common "add and shift" algorithm as is well known in the art. The difference here is in the formation of information to be fed to the A Input of the ALU, facilitating the multiplication of two vectors rather than two scalars.

It is important to note that the register 1703 requires only one storage location. This is possible because each dot product is completed soon after it is started, i.e., each dot product takes N cycles, where N is the number of bits of precision of each element of the column-vector. In successive cycles, bits of ascending significance are processed, starting with the least significant bit and ending with the most significant bit. This requires each convolution memory chip to store all of the bits of each element of the column-vector since the various bit-vectors are being cycled through very quickly. An alternative implementation, as described later, places the burden of storage on a single vector accumulator chip rather than on multiple convolution memory chips, resulting in a more economical design since redundant storage of the column-vector is avoided, but at the cost of increased latency.

FIG. 18 is the block diagram of a specific embodiment of a vector accumulator chip, where a 256-point, 8-bit by 8-bit multiplication is performed. Eight input ports, two each in adders 1801 to 1804, i.e., one for each of the dot product outputs from the eight convolution memory chips, are required.

The weighted adder tree, with its binarily weighted inputs, is shown in detail. In addition, the range of values that may appear at the nodes of the adder tree are shown in brackets ("[low value, high value]") to help demonstrate the operation of the implementation.

Dot Product Out 0 (DPO0) and DPO1 are fed to adder 1804. Since DPO1 has twice the significance of DPO0, a leading zero is appended to DPO0, whereas a trailing zero is appended to DPO1 as the signals are applied to the adder. DPO2 and DPO3 are handled similarly at adder 1803, as are DPO4 and DPO5 at adder 1802.

Assuming that 2's complement representation of the matrix elements is used, DPO7 is a special case because the sign bit of each matrix element has negative weight. Thus DPO7 is subtracted from, rather than added to, the other sums. Subtraction is accomplished by taking the 2's complement of DPO7 using the complementer ("*−1"or "times minus one") 1800, and the result is fed to adder 1801 which also receives DPO6, but with the proper significance. Note that even if a maximum value of DPO7 is obtained, 256 (decimal) or 100,000,000 (binary), that the proper result is obtained when it is complemented.

The outputs from the first level of the adder tree, adders 1801 to 1804, are summed by the second level of the adder tree, adders 1805 and 1806. Since the least significant bit of the DPO2 input to adder 1803 has four times the weight of the least significant bit of the DPO0 input to adder 1804, the output from adder 1804 is padded with two leading zeroes, while the output from adder 1803 is extended with two trailing zeroes at the input to adder 1806. Adder 1805, receiving the outputs of adders 1801 and 1802, works similarly.

The outputs from the second level of the adder tree, adders 1805 and 1806, are summed by the third level of the adder tree, adder 1807. Since the least significant bit of the DPO4 input to adder 1802 has sixteen times the weight of the least significant bit of the DPO0 input to adder 1804, the output from adder 1806 is padded with four leading zeroes, while the output from adder 1805 is extended with four trailing zeroes at the input to adder 1807. The output of adder 1807 is the same as the output of the adder tree 1700 shown in FIG. 17.

FIG. 19 is pseudo-code to explain the minimum latency, row-serial, bit-serial, element-parallel method for the multiplication of a matrix times a vector. The name of the method is derived from the sequence of the data processing steps, going from outer loop to inner loop. The inner-most "loop" is the element-parallel operation, as represented by the statement "for all convolution memories simultaneously", that in hardware is handled by the processor cells and tally logic in each chip, coupled with the weighted adder in the vector accumulator chip.

The next loop, the bit-serial loop, sequences through the bit-vectors of the column-vector, going from least significant to most significant. This sequencing is provided in hardware by the buffer memory row address logic. The final and outer loop, the row-serial loop, sequences through each row in ascending row-order. It is provided in hardware by the matrix memory row address logic.

FIG. 20A defines some sample matrices that are used in FIGS. 20B and 20C to demonstrate this method for the multiplication of a matrix times a vector. Representations in both binary (2003 to 2005) and decimal (2000 to 2002) are given so that the actual operations upon the bits may be seen, while a calculator may be used upon the decimal representations to confirm the result. For simplicity, very few elements are used, but the method is applicable regardless of the number of elements used, so long as the width of the matrix 2003 and the height of the column vector 2004 are the same.

The transformation between the loading of a column vector 2004 and the use of a column-vector is also shown (2011), as is the storage of the matrix 2003 in the matrix memories of the four convolution memories (CM3 to CM0, 2007 to 2010) required by the example. Note that a different bit of the matrix is stored in each convolution memory, but that the entire column-vector is stored in each convolution memory.

As an example of the example, FIG. 20B gives step 0 of this multiplication method. This step operates upon row 0 of the matrix memory and row 0 of the buffer memory, the latter storing the least significant bit-vector of the column vector.

In each of the four convolution memory chips, the two rows are ANDed together, performing four 1-bit by 1-bit multiplications in each chip, yielding a bit-wise AND of 1010 in CM3. The number of 1's in this result is tallied, and is 2 (decimal), or 0010 (binary). Since CM3 stores the sign bits of the matrix, this result is complemented prior to being weighted and added to the other tallies. The weighting and adding of the tallies is performed by the weighted adder in a single vector accumulator chip, whereas four convolution memory chips are working simultaneously on their various vectors.

Steps 1, 2, and 3 handle the bit-1, bit-2, and bit-3 bit-vectors of the column-vector.

The partial dot products, e.g., Result 0,0, are themselves weighted and added, as shown under "product formation", until all rows, i.e., all bit-vectors, of the column-vector have been used. The Dot Product Out, as RESULT A, may now be compared to the expected result shown in matrix 2005.

The process is repeated in FIG. 20C for the next row, row 1, of the matrix. This process continues until all rows of the matrix that have data to be processed have been processed.

IV. 4 Alternative Embodiments

FIG. 21 shows a floorplan of the "T-bus" version of the layout of the convolution memory chip. The matrix memory bus from the matrix column sense amplifiers and read/write logic 2103 meet the buffer memory bus from the buffer column sense amplifiers and read/write logic 2106 in a shape resembling a "T" lying on it side, as 2109, and pointing to the right whereupon it enters the logic cells 2104.

The effect of this organization is that a matrix memory layout 2100 and a buffer memory layout 2108 can be used that do not have to be precisely matched in width or have wires from one passing through the other. However, a large amount of chip area is consumed by the buses 2105 that connect these memories to the logic cells.

It is also possible that the processor logic can be located where the interconnections 2105 are shown, rather than being placed off to the side.

The point of this exercise is to show that the way that the chip is laid out may have a significant effect, beyond minor variations due to propagation delay effects of various length wires, upon its architecture and in turn upon its performance.

The issue being addressed is how to connect a large number of wires from each of the buffer memory and the matrix memory to a single set of processor cells. While it is common to have a "multiport RAM" with two outputs, each independently addressed, be connected to the two inputs to an ALU, as in the Advanced Micro Devices 2900 bit-slice processor chip, or to have two, 64- to 128-bit registers connected to a 1-bit ALU as in the NCR GAPP chip, it is not conventional to have two entire memories, with all of the columns of both accessible, connected to a large number of processor cells. Attention must thus be paid to making this connection economically.

FIG. 22A is the block diagram for a convolution memory chip with a common memory bus 2207. Since the number of accessed columns of the buffer memory must match the number of accessed columns of the matrix memory in order for the n-point, 1-bit by 1-bit dot product operation to be performed, a single memory may contain both memories. Two cycles would be required per operation, one to read a row of the matrix, the other to read a row of the buffer. Assuming that the clock rate is the same in this configuration as in the configuration where the two memories are separate, the performance is cut in half. (However, yet another alternative embodiment, the Correlator Memory, as described later, would show a negligible degradation for certain applications if this technique were applied to it.) However, the cost benefits resulting from a more compact chip layout may warrant a loss of performance.

The SRAM matrix memory cell array 2202 has rows addressed by the matrix memory row address logic 2205 and columns addressed by the common column sense amplifiers and matrix memory read/write logic 2206. The latter block is very nearly the same as the matrix memory column sense amplifiers and read/write logic described earlier.

The SRAM buffer memory cell array 2201 has rows addressed by the bfr (buffer) mem (memory) row logic 2204, just as before. However, the columns of the buffer memory are now addressed by the buffer column select logic 2200 that previously was considered a part of the buffer memory column sense amplifiers and read/write logic, and the column outputs of the buffer memory cells are connected to the column outputs of the matrix memory, in which case the sense amplifiers 2206 do double duty, serving for both the buffer memory and the matrix memory.

An area of memory devoted to each of the buffer memory and the matrix memory is required to provide an amount of storage that may be used efficiently, hence the number of rows is not a power of 2, and to provide different input/output capability depending upon the frequency with which an area of the memory needs to be modified, and the way the data needs to be entered.

Thus in this common bus structure, as before, one bit of data would be entered into a row of the matrix memory, or eight bits would be entered into a column of the buffer memory in a single cycle.

FIG. 22B is the block diagram of the common memory cell array. Note that the number of vertical connections to the upper section of the memory, the buffer memory as transpose storage cells (TSCs) 2222 and 2228, is the same as the number of vertical connections to the lower section, the matrix memory, as cells (Cs) 2231 and 2234. The intent is that the horizontal pitch, or spacing, of the cells of the buffer memory should be the same as that of the buffer memory cells, yielding a compact layout, and since there are many columns, i.e., 256 in this example, it is essential that the number of vertical connections be minimized.

The number of horizontal signals required to operate each row of the buffer memory, where it is two as 2221 and 2224, differs from that of the matrix memory, where it is one as 2233, but this affects only the vertical spacing between rows of the buffer memory. Since there are relatively few rows of the buffer memory, a slight increase in the vertical spacing has a negligible impact upon the size of the layout.

The operation of the sense amplifiers, 2206, thus depends upon the source of the data; the buffer memory having one line and using a single-ended receiver, and the matrix memory having two lines and using a double-ended receiver.

FIG. 22C is a block diagram of the common column sense amplifiers and matrix memory read/write logic. The difference between this Figure and a similar circuit in FIG. 13C is the number of control lines in the control bus 2255 in order to handle the two types of memory cells.

FIG. 22D is the block diagram of the single-ended/double-ended driver/receiver/multiplexer that copes with the two types of memory cells. The SE/DE Rcvr (single-ended/double-ended receiver) 2262 is controlled by the SE/DE Control signal, which is M/B (matrix/buffer) Select-. When dot products are being computed, the M/B select signal, as shown in FIG. 22A, specifies which memory to read data from, resulting in the proper selection being made by the SE/DE Receiver.

The diff(erential) drvr (driver) 2263 is not affected by a choice of which memory is active because the use of the matrix memory cell bus true (+) bit line is invariant to which memory is chosen, leaving the false (−) bit line as a don't care with respect to the buffer memory.

FIG. 22E shows the block diagram for the common bus processor cell. An additional register, the temp(orary) reg(ister) 2272 has been added, and it, the mask register 2271 and the AND gate 2273 are all driven from the same bit of the common memory bus.

The sequence of operations is to first read the buffer memory and then the matrix memory in order to compute each dot product. The temporary register is loaded during the first cycle when the buffer memory portion of the common memory is read, and the output from the AND gate 2277 would be ignored. During the second cycle, the output from the matrix memory portion of the common memory would be combined by the AND gate 2273 with the output from the temporary register, and the result from the AND gate 2277 would be used by the tally logic.

As a result of this two cycle operation, the design of the tally logic may be optimized, as shown in FIG. 22F. Rather than having 256-point tally logic that operates in one cycle and rests (is wasted) the next cycle, one may combine a 128-bit register 2280 with a gang of 128 2:1 multiplexers 2281 with 128-point tally logic 2282 in order to evenly spread the use of the tally logic over the two cycles. The cost of a 128-bit register and gang multiplexer is insignificant compared to the cost of an additional 128-point tally logic, so this solution is very cost effective.

The design of the 128-point tally logic 2282 is pipelined to improve performance, as described in the prior art, but this level of detail is ignored to show the principle that half-width tally logic may be used efficiently in a two-cycle system.

During the fetching of data from the matrix memory, when M/B Select=1, the cell outputs are valid. The odd bits are loaded into the register 2280 while the even bits are passed through the gang multiplexer 2281 and tally logic 2282, and the partial tally is loaded into the register 2283. (Many other even splits of the cell output bus are possible as well.)

During the fetching of data from the buffer memory, the contents of the register 2280 are passed through the gang multiplexer 2281 and the tally logic 2282, and the partial tally is added to the previous partial sum that is stored in the register 2283 to produce a 256-point tally at the output of adder 2284.

FIG. 22G is the floorplan for the convolution memory chip with a common bus. As all floorplans have been drawn to a common scale, a careful comparison of this floorplan to the previous ones reveals that less width, since the interdigitated buses have been eliminated, and less height, since the T bus has been eliminated and the tally logic is roughly half as complex (the reduced area of the tally logic is not apparent on the drawing), are required to realize the function as a result of using a common bus structure, but at the cost of lower performance.

FIG. 23 shows the block diagram of a multi-port vector accumulator chip with maximum latency. The difference between this drawing and the one in FIG. 17 is the use of a register bank 2303 rather than a single register 1703. As was mentioned earlier, a tradeoff can be made between the size of the buffer memory in each convolution memory chip and the computation latency. If increased latency is acceptable, the cost of the convolution memory chip may be reduced somewhat by reducing the number of rows of the buffer memory. However, a bank of registers, rather than a single register, is needed in the vector accumulator chip in order to accumulate partial results that were previously accumulated over a few adjacent cycles, rather than over many cycles that access all active rows of the convolution memory chip.

The number of registers in the register bank 2303 is thus equal to the number of rows in the convolution memory. Ignoring pipeline delays, the register select lines would be driven in tandem with the selection of rows in the matrix memory to store the partial dot products. The completion of dot products thus occurs in a burst of adjacent clock cycles during the access of the most significant bit-vector of the column vector, rather than occuring uniformly, separated by the number of cycles required to cycle through the various bit-vectors of the column-vector.

Note that in the adder tree 2300, the subtraction operation for the most significant bit is implied by the notation that a certain input, as $-[2^{\wedge}(N-1)]$, has a negative weight.

The pseudocode to explain the maximum-latency, bit-serial, row-serial, element-parallel method for the multiplication of a matrix times a vector is given in FIG.

24. This figure differs from that of FIG. 19 by the exchange of the two outer loops. As a result, the innermost "loop", the statement "for all convolution memories simultaneously", is handling the same level of significance of the column vector for all rows of the convolution memory. The next loop is cycling through the rows, and the outer loop is cycling through the bit-vectors of the column-vector. Data is output when the last bit-vector of the column-vector is being used.

There are many ways to trade off cost and performance using convolution memory chips. FIG. 11 showed a typical subsystem with "medium parallelism". FIG. 25A shows a convolution memory block with minimal parallelism, the benefit being that a simple, single-port vector accuulator chip 2509 may be used, analogous to a multi-port chip with only the least significant port of the weighted adder tree being used.

The convolution memories as 2500 to 2503 are loaded as previously described with matrix data, and the bit weights for these matrix elements is shown in parenthesis in the chips for reference.

However, instead of having the outputs of all convolution memories be added simultaneously by the vector accumulator chip, a set of select lines as 2504 to 2507 is used to sequence through the outputs of the convolution memory chips. These dot product outputs are connected to a common bus 2508. Only one select line would be active at a time in order to avoid conflicts on the bus. The single-port vector accumulator chip would weight each output in accordance with its significance as the different convolution memories are accessed and as the different bits of the column vector are used. Thus the weighting is done in time rather than in space, i.e., across the outputs of multiple chips.

A degenerate case of this Figure occurs when a single convolution memory chip is used with a single-port vector accumulator chip. If successive bits of the matrix are loaded into different portions of the convolution memory chip, and the mask logic or the matrix row select logic is used to choose the appropriate sections of the matrix memory during the computations for a particular weight of matrix bit, then very small systems may be realized.

FIG. 25B shows a multi-bank convolution memory block. This Figure is a combination of FIGS. 11 and 25A, providing access to one bank of multiple convolution memory chips simultaneously, as 2520 and 2522, for computations while allowing another bank, as 2521 and 2523, to be loaded, or allowing a matrix to be handled efficiently that is too large to be stored in a single bank of convolution memory chips.

The latter case of handling a large matrix is shown explicitly in FIG. 25C. Assuming that each convolution memory chip can store 1 bit of a 256*256 matrix, and that one desires to multiply a 512*512 matrix times a 512-element column-vector, four groups of convolution memory chips may be used. The placement of matrix elements into the various convolution memory groups is shown at 2551. The elements of the column-vector would be loaded into the buffer memory of the appropriate convolution memory groups, namely CMG0 (2545) and CMG1 (2544) for elements 0 to 255, and CMG2 (2543) and CMG3 (2542) for elements 256 to 511.

Since 512-element dot products are being computed rather than 256 as described previously, extended precision, i.e., one additional bit, is required in the vector accumulator chip 2550.

Assuming minimal latency computations, one would use the select lines to sequentially take a 256-point dot product from one convolution memory group, then a 256-point dot product from a second convolution memory group, and add them together in order to obtain the 512-point dot product. For example, row 0 of the matrix would use CMG0 and CMG2, while row 511 of the matrix would use CMG1 and CMG3. The vector accumulator chip would be provided with sufficient storage that it would be able to compute each of the two 256-point products, and then combine the two to produce the 512-point output.

This summing of the outputs from two convolution memory groups using portions of the same column vector input may be extended to the summing of the outputs from convolution memory groups having unrelated inputs, and to the summing of the output of one convolution memory group and some other source of vector data. The general purpose summing of vector products, as (A*B)+(C*D), may thus be performed.

Maximum throughput occurs when all rows and all columns of the convolution memory chip participate in an operation. This is not possible when a matrix has row or column dimensions that are not integer multiples of 256.

The columns that are to be used with a particular matrix are enabled by the mask logic in the PROCESSOR ARRAY. The rows that are used with a particular matrix are enabled by setting the limit registers in the ADDRESS LOGIC. Irregular sequences of row addresses may be obtained by loading the row address register via Matrix Address for each cycle of operation.

If the matrix is sufficiently small, it may not be cost effective to use the convolution memory chip to process it on a dedicated basis. Larger matrices, such as 64 by 64, may be placed in physically distinct binary blocks of a convolution memory chip, such as for storing multiple planes of a 3-D matrix.

FIG. 25D shows a convolution memory block using hierarchical adders to feed a vector accumulator chip. If the number of bits of precision of the matrix is large, then it is mechanically impractical to have a single vector accumulator chip receive all of the outputs from the convolution memories. Weighted adders as 2564 may receive the outputs from some of the convolution memory chips, as 2560 and 2561, whose output feeds the vector accumulator chip 2572, where it is combined with the output of another weighted adder as 2570 that receives the outputs from additional convolution memory chips as 2566 and 2567. Naturally, the weights given the inputs to the vector accumulator chip would match the weights provided by the weighted adders.

In FIG. 25D, as usual, the number of cycles required to compute the dot product for one row is the same as the number of bits of precision of each element of the column-vector. In FIG. 25E is the block diagram of a convolution memory block with maximum parallelism that will compute a full precision dot product in a single cycle, rather than multiple cycles. This is accomplished by storing multiple copies of the matrix, such as by storing bit 0 in each of convolution memories 2581 and 2587. In addition, a different bit-vector of the column-vector is loaded into different groups of convolution memory chips, such as placing the bit-0 bit-vector into convolution memory chips 2580 and 2581, and the bit-(N−1) bit-vector in convolution memory chips 2586 and 2587.

This implementation is inefficient in the sense of storing multiple copies of the matrix, but achieves maximum performance, further showing the broad capabilities of the design of the convolution memory.

FIG. 26 is a table that gives some performance estimates for rank-256 dot product computations for various degrees of parallelism, levels of precision, and types of convolution memory chips. The structure of two additional forms of convolution memory chips, as listed in the Figure, is described later.

The primary lesson of this table is that one 64K*1, 1*256-point*1-bit convolution chip performs like thirty-two 1-bit by 8-bit multipliers, four 8-bit by 8-bit multipliers, one 16-bit by 16-bit multiplier, or one-quarter of a 32-bit by 32-bit multiplier. One 64K*4, 4*256-point*1-bit convolution memory chip is equal to four of these preceding chips, or is equal to one 64K*4, 4*64-point*4-bit convolution memory chip.

FIG. 27A is the block diagram of the dynamic RAM (DRAM) version of the matrix memory cell array. The design of DRAM chips is well known in the art, so the details of driving, receiving, refreshing, etc. are not repeated here. The important point is that the architecture of the convolution memory supports a diversity of memory types, and the primary effect of using DRAM technology instead of SRAM technology is that one wire per column of cells is required instead of two and the speed typically reduces, while the density of storage increases because a DRAM cell is much simpler and thus smaller than a SRAM cell.

FIG. 27B is the block diagram of the standard speed ROM version of the matrix memory cell array. As it may be convenient to program a particular pattern into a convolution memory chip at the time of manufacture, or to load the pattern at some later time in a nonvolatile fashion, a variety of well known nonvolatile memory technologies may be used. Such technologies are listed under "memory cell operation" in the Figure.

FIG. 27C is the block diagram of the fast ROM version of the matrix memory cell array. High speed may be realized by having complementary data outputs from each storage cell, as is found with SRAM technology.

Further variations of memory technology, such as pseudo-static RAMs, may also be used to build the matrix memory cell array, hence the design of the convolution memory is not limited to those memory technologies shown.

FIG. 28 is the block diagram of a matrix memory using 2:1 multiplexers for layout pitch matching. Depending upon the memory technology used, the pitch, or spacing, between the columns of the matrix memory cell array 2800 may be much less than the pitch of the processor cells. One may thus organize the memory in a rectangular fashion, as 128 rows of 512 bits each, and select alternate columns, e.g., the odd columns, using multiplexer 2806. Selection of the remaining cells, e.g., the even columns, during the next cycle is thus done very quickly since another access of the memory 280J is not required. The one bit required to operate the multiplexer 2806 would come from the least significant bit of the counter 1305 of the matrix memory row address logic, while the seven higher order bits of the counter would be passed to the decoder 1313.

Depending upon the relative pitch of the columns of the memory and the pitch of the processor cells, this technique may be extended to other degrees of multiplexing as shown later.

FIGS. 29A and 29B show the block diagram for an alternate implementation of a convolution memory chip. This 64K*4, 4*256-point*1-bit convolution memory chip is logically identical to four 64K*1, 1*256-point*1-bit convolution memory chips, plus a four-port ALU 2928. Vertical slices through this Figure reveal four identical sections comprising elements (1) 2900, 2902, 2904, and 2908, (2) 2901, 2903, 2907, and 2910, (3) 2920, 2922, 2924, and 2929, and (4) 2921, 2923, 2925, and 2928. A slight economy results from having only two sets of matrix memory row address logic, rather than four, where each set as 2909 serves two 64K matrix memory cell arrays as 2908 and 2910.

The matrix data connection to the 64K*4 chip is four bits wide, rather than one for the 64K*1 chip, with one of the bits going to each of the four 64K matrix memory cell arrays.

Details of the control logic are not shown, being logically identical to that found in the 64K*1 convolution memory chip.

The only significant difference between a group of four 64K*1 convolution memory chips and one 64K*4 chip is the four-port ALU 2928. The detail of this ALU is shown in FIG. 29C. The chip would have a "slice type" pin that is asserted if the chip stores the most significant bit of the matrix and if 2's complement representation is used for the matrix. As described in the operation of the multi-port vector accumulator chip, since the most significant bit of the matrix may have negative weight, a subtraction, rather than addition operation is required for the most significant bit. The subtraction is provided by a mux (multiplexer) 2941 that selects the output of a complementer 2940 if the chip stores the most significant bit, or selects the unaltered Sum 3 otherwise.

The remainder of the four-port ALU, comprising adders 2942, 2943, and 2944, is analogous to a portion of the design of the multi-port vector accumulator chip.

FIG. 30A shows another implementation of the convolution memory chip. Since a conventional memory chip is composed of multiple subarrays, e.g., a conventional 256K*1 chip is often composed of four 64K*1 subarrays, it is convenient to be able to make use of a large amount of storage while keeping the amount of processor logic low, and to spread this processor logic about the chip, placing it in proximity to each memory subarray.

The 256K*1, 4*64-point*1-bit convolution memory chip shown in FIGS. 30A, B, and C has the same processing power as a single 64K*1, 1*256-point*1-bit convolution memory chip. This is apparent because the total number of points computed by the chips are the same, i.e., 256 points with 1-bit precision is equivalent to four blocks with each performing 64 points with 1-bit precision. The counter in the matrix memory row address logic would have ten bits, rather than eight, in order to provide the two additional bits (2 most significant bits for bank selection) to operate the 4:1 multiplexer.

The advantage of the design of this 256K*1 chip is that it allows a relatively slow memory technology to be used while improving throughput as a result of the 4:1 multiplexing that is provided by the column sense amplifiers and read/write logic as 3042 working with the 64 4:1 multiplexers as 3043 shown in FIG. 30C. In addition, unlike the 64K*4 chip described previously that stored four copies of the column-vector, one copy for each of its four 64K memory arrays, the 256K*1 chip splits the storage of the column-vector into four 64-bit groups. Input buffer 3001 stores column-vector elements 0–63, input buffer 3000 stores column-vector elements 64–127, input buffer 3020 stores elements 128–191, and input buffer 3021 stores elements 192–255.

Since the entire chip is treated like a 1-bit wide memory, the outputs of the four 64-point*1-bit dot product logic blocks, 3002, 3003, 3022, and 3023, are weighted identically by the adder 3029.

FIGS. 31A, B, and C show the block diagram of a 64K*4, 4*64-point*4-bit convolution memory chip. This chip is equal in performance to four 64K*1, 1*256-point*1-bit convolution memory chips. The significant difference between this chip and the previous one is that each set of processor logic, as 3102, computes a 64-point by 4-bit dot product instead of a 64-point by 1-bit dot product, and that each of the four 64K matrix memory cell arrays, as 3106 and 3108, stores a different weight bit of the matrix.

FIG. 31C shows the block diagram of the 64-point*4-bit dot product logic. Four tallies are computed, one by each of the four 64-point tally logic blocks 3152–3155. Each of these blocks is driven by 64 AND gates, each gate multiplying one bit of the buffer memory bus times one bit of the matrix memory bus. For example, AND gate 3147 operates on row "a" column 0 of the buffer memory and bit 0 of the matrix memory. For simplicity, the mask logic that would feed every AND gate is not shown.

All AND gates that operate on a like weight bit, as AND gates 3147 and 3143, are connected to the same tally logic, as 3155. The outputs from all four blocks of tally logic 3152–3155 are weighted and summed by the ADDER 3160 to produce a sum that is passed to ADDER 3128. The ADDER 3128 weights the outputs from each of the four blocks of 64-point*4-bit dot product logic the same to produce the dot product out, unless matrix memory cell array 3131 stores the sign bit and 2's complement representation is used, in which case the Sum 3 input to the adder is complemented prior to being added to Sum 0, Sum 1, and Sum 2.

The distinctive feature of the 64-point by 4-bit dot product logic is that it operates on four successively weighted bits from the buffer memory at the same time, while working on a single weight of bit from the matrix memory. This results in the simultaneous computation of a 1-bit*4-bit product on each of the 64 pairs of elements handled by each of the four dot product logic blocks.

IV. 5 Supporting Elements

FIG. 32 shows the block diagram for a vector accumulator chip that provides row masking and 0/1 to −1/+1 conversion for artificial neural network applications. The register bank 3210 has many registers as there are rows in the convolution memories that provide the dot product out to the weighted adder tree 3200. The Reg(ister) Select signal is coordinated with the row selection in the convolution memories so that data relevant to each row may be fetched from the register bank and be operated upon by the vector accumulator chip.

It may be desirable to exclude the output of a row of the convolution memory from the computation of dot products. This may be done by forcing a zero as the output from the row by the AND gate 3206 by storing a zero as the row mask bit for that row in the register bank 3209. Since the drawing uses "bus nomenclature", note there is one such AND gate for each of the many outputs 3204 of the register 3202.

In addition, it may be desirable for artificial neural network applications for the column-vector output to be computed as though a binary input column-vector has states −1 and +1 rather than 0 and 1. While the input column-vector could be represented by two bits to give states −2, −1, 0, and +1, two cycles would be required to compute each dot product rather than one, halving performance.

The register bank 3210 and the adder 3213 provide the equivalent of two-bit precision of the column-vector input using only a single bit. This is done by storing the negative of the sum of all matrix elements in a given row in a corresponding location in the register bank.

The calculations are performed as follows, where the underscore represents vector notation:

1. $\underline{CV}$ plus (not $\underline{CV}$) = $\underline{1}$; if each of the elements of the column-vector is a single-bit number, then the vector sum of it and its bit-wise complement is a unity vector.
2. $\underline{1}*\underline{Rn} = Kn$; this is the sum of all elements in row n.
3. $\underline{CV}*\underline{Rn} = Yn$; this is the dot product computed as usual for row n
4. Let $\underline{CVS}$ be the "column-vector signed" having −1 and +1 values rather than 0 and 1.
5. $\underline{CVS}*\underline{Rn} = (\underline{CV}*\underline{Rn}) - [(\text{not } \underline{CV})*\underline{Rn}]$; the effect of the column-vector signed is the computation of the difference between the usual dot product and the dot product using the bit-wise complement of the column vector.
6. $\underline{CVS}*\underline{Rn} = Yn - [(\underline{1} - \underline{CV})*\underline{Rn}]$; substituting eqns 1 and 3 into 5.
7. $\underline{CVS}*\underline{Rn} = Yn - (Kn - Yn) = (2*Yn) - Kn$.

Thus the effect of a column-vector with values −1 and +1 can be determined using a binary column-vector if the result is modified according to the formula in equation 7.

Thus the n'th register in the register bank is loaded with −Kn, the 2's complement of the sum of all of the elements of row n of the matrix, and this value is added by adder 3213 to twice the dot product (Yn) computed using the binary column vector. Yn is doubled simply by appending a zero as the new least significant bit as shown at the BIN input to adder 3213.

FIGS. 33A and 33B show additional building blocks that are required to realize the digital equivalent of analog feedback networks such as a Hopfield network. These "vector filters" provide the equivalent of a controllable frequency response that is provided by the frequency characteristics and compensation of amplifiers in a physical analog circuit. The frequency response of these amplifiers, and by extension these vector filters, control the dynamics of the feedback loop in order to control the flow of state transitions.

FIG. 33A shows the block diagram of the infinite impulse response (IIR) vector filter chip. The design of an IIR filter that operates on a single sampled data stream is well known. Such a well known circuit has been extended to handle a sequence of vectors of samples of multiple channels. An N+1—order filter, comprising register banks O through N, as 3307 and 3313, is shown. In addition, fully functional multipliers have been assumed, but many techniques are known in the art to reduce such multipliers to simple shifters if the requirements for spectral characteristics are sufficiently flexible.

To explain the multi-channel operation, let:

$$CV(t = 0) = (A0, B0, C0)$$
$$CV(t = 1) = (A1, B1, C1)$$
$$\vdots$$
$$CV(t = n) = (An, Bn, Cn)$$

The samples to be filtered for the 0'th channel are thus A0, A1, ..., An, the samples to be filtered for the 1st channel are B0, B1, ..., Bn, and the samples to be filtered for the 2nd channel are C0, C1, ..., Cn. The number of locations in each of the register banks 3307 and 3313 matches the number of elements in the column-vector, CV. The register select input chooses a register in each of the register banks that contains the state for the current element of the vector, and which will be updated with the new state before progressing on to the next element.

Programmable characteristics have been assumed, but the characteristics are the same for all elements of the column-vector. This programmability is provided by registers 3306, 3311, 3312, 3317, and 3318 which are loaded from the I/O Data line 3319. Signal lines to select and control these registers have been omitted for simplicity, but an elementary decoder that chooses a single register at a time in response to a set of coded selection lines, along with signals to specify reading or writing, are all that are required.

The operations performed for each element of the column-vector are the operations that an IIR filter that is dedicated to that element would perform.

One additional feature has been added to the design of the filter, a programmable function unit, PFU, 3305. It may be desirable to have an output transfer function that suppresses low level signals, signals comparable in magnitude to round-off noise. The design of this block is described in a latter section.

FIG. 33B shows the block diagram of a finite impulse response (FIR) vector filter chip. Like the IIR filter chip, the design of single channel FIR filters is well known in the art. A set of register banks 3345, 3348, 3351, and 3355 has been added to the design of a conventional filter to handle the multiple channels that are present in the column-vector. The number of such register banks, i.e., the number of stages of the filter, may be adjusted as required to provide the level of filter performance required.

The design of the FIR vector filter, like the design of the IIR vector filter, facilitates the handling of a different channel of the column-vector on every cycle of the channel clock.

The operations performed for each element of the column-vector are the operations that an FIR filter that is dedicated to that element would perform.

IV.6 Significant Extensions

FIG. 34A shows the simplified block diagram of a correlation memory chip. A correlation memory chip is an extended version of the convolution memory chip shown in FIG. 12A, the primary difference being that the correlation memory chip has shift registers as a part of its processor logic. These shift registers facilitate two-dimensional image processing, particularly the computation of large convolution windows.

Inversely, the convolution memory chip is a degenerate, or reduced, form of the correlation memory chip, since a subset of the functions of the correlation memory chip behaves like a convolution memory chip. All of the drawings showing a block of convolution memory chips, as FIG. 25D, may use a correlation memory chip in place of a convolution memory chip.

The structure of the matrix memory cell array and sense amplifiers 3400, matrix memory row address logic 3401, and the global tally logic 3406 are the same as for the convolution memory chip shown in FIG. 12A. Extensions have been made to the transpose buffer memory cell array and sense amplifiers 3410, the buffer memory row logic 3411, and the processor logic cells 3405. The matrix shifter 3403 and the buffer shifter 3408 are completely new.

FIG. 34B is a table of the pins for the correlation memory chip. The changes identified above are reflected in the Processor section, namely the addition of nine signals to Processor Control and one signal to Buffer Control. An additional change has been made to the Buffer Control signals in the form of the definition of an additional state, but this additional state does not require any additional pins since several states were previously unused.

The Address Propogate signal controls the incrementing of the matrix memory row address counter. As will be shown, the computation of a convolution window requires many cycles of the buffer memory prior to a change in the selection of a row in the matrix memory. In addition to all prior conditions, the Address Propogate signal must now be asserted to enable the incrementing of the matrix memory row address counter.

FIG. 34C is a table of the states of the processor control signals. The processor logic now has two functions, AND and XOR, rather than just AND. The matrix shifter has two registers, each requiring two bits for control, and the buffer shifter has one register, also requiring two bits for control. In addition, the width of the convolution window is specified by the two bits of the multiplexer select.

FIG. 34D is a table of the states of the matrix control, which is unchanged, and the buffer control. The buffer write row state has been added to the latter to facilitate the handling of convolution windows with more points than the number of columns in the buffer memory, typically 256, as will be described.

FIG. 34E is the block diagram of the processor cell for the correlation memory. The mask reg(ister) 3422 and the AND gate 3430 work as in the convolution memory. The AND gate 3423 was also present in the convolution memory, but now its output is connected to a mux (multiplexer) 3427. This multiplexer also receives the output of XOR gate 3424 that is driven from the buffer shifter bus 3420 and the matrix shifter bus like the AND gate 3423. This XOR gate facilitates the computation of the correlation between two binary images. The multiplexer 3427, under control of AND/XOR Select, which comes from the Processor Control lines, chooses one of the two outputs to be the output of the cell, and this output is presented to the tally logic.

FIG. 34F is the circuit diagram of the row-writeable buffer memory cell. Relative to the buffer memory cell shown in FIG. 15C for the convolution memory chip, transistor 3446 and the BM Row Data BN line 3440 have been added. This transistor facilitates the writing into the memory cell regardless of its state by the buffer memory row read/write logic, while the design for the convolution memory required that a cell be cleared by a row-wide operation prior to its being loaded. There are cases in the computation of convolution windows with more than 256 points where it is desirable to modify only a small fraction of the cells, requiring this extension.

A portion of a column of the cells may now be written into by asserting BM Column Select M (3455), turning on transistors 3446 and 3448. Turning on two transistors to write into a static RAM cell is well known in the art. Data is applied to the BM Row Data BN line 3440 and the complement of that data is applied to the BM Row Data BN- line 3441 using relatively low impedance sources, causing the cell to assume the state applied to the BM Row Data BN line. Data may be read from the cell using these two lines by connecting these two lines to a differential receiver with a relatively high input impedance.

FIG. 34G is the block diagram of the buffer memory column sense amplifier and read/write logic. This logic is the same as seen in FIG. 15F with the exception that the Row Write state has been added. This new state enables the contents of the buffer memory bus as driven by the buffer shift logic to be written into a row of the buffer memory. This state is selected by the buffer memory control lines, as described in the Figure.

Data can be written into a row of the buffer memory only following the setting of the bits of the row. The buffer set row state of the buffer control lines is provided for this purpose. Unlike a conventional static RAM that has true and complementary signal lines for each storage cell for a single direction of access, the buffer memory is accessible from both a row-wise and a column-wise direction, hence the name "transpose buffer memory". The correlation memory chip provides conventional, differential access to the buffer memory for manipulating a column of the memory, causing the addition of one row of interconnection per row of memory cells as compared to the convolution memory. However, it is not economical to provide differential access for the row-wide access since this would require the addition of one wire for every column, or 256 wires in the typical case. A tradeoff has thus been made that slightly reduces system performance by requiring that a row be set before it is written, but this is highly cost effective since the size of the chip is reduced as a result.

Thus there is no fundamental reason why the transpose buffer memory cannot have differential access from both row and column directions, it is purely an economic issue. Such differential access could speed the access in the row direction, and such access is made during every cycle of the computation of a convolution window, but high speed may be obtained using single-ended signalling by appropriate choice of the size of the elements of the cell and the precharging of the cell bus data lines.

FIG. 34H is the block diagram of the buffer memory differential row read/write logic. This figure differs from FIG. 15D of the convolution memory by the provision of differential row driver/receivers as 3470 rather than single-ended row driver/receivers. The operation of such differential driver/receivers is well known in the art of static RAM design.

Decoder 3477 has been added to provide the signals required to implement the buffer set row operation, used to initialize the mask register and the buffer memory.

FIG. 35A shows the 256-bit module of the matrix shift logic. This module is organized into four 64-bit modules, 3501 to 3504, in order to be able to compute windows as small as 8*8 picture elements since such a window comprises a total of 64 points. These four modules are connected in a one-dimensional chain, with module 3504 feeding the next most significant module 3503, and so on, with significance of the module determined by the significance of the matrix memory bits that it receives.

FIG. 35B is the block diagram for the 64-bit module of the matrix shift logic. The 64-bit module is organized into eight 8-bit modules, where reg(ister) 0 and reg 1, while contained within a single 8-bit module, are shown explicitly in order to show the interconnections between them. The basic scheme is that there is an elementary set of interconnections between two registers which, when combined with a particular method for placing an image into the matrix memory of the correlation memory chip, facilitates the efficient computation of various sizes of convolution windows.

Since the computation of a convolution window involves the repeated use of many picture elements, it is desirable to load each picture element into the correlation memory chip only once in order to compute all windows that need it, rather than once for each window that uses it or once for each row of the windows that use it. Loading each picture element into a correlation memory only once avoids a large amount of data handling outside of the correlation memory chip, greatly reducing the number of chips required to implement a system.

The registers of FIG. 35B are organized into chains of several sizes, where data from the matrix memory is loaded into reg 0 and serially shifted from reg 0 into reg 1. There is also a parallel path from reg 0 to reg 1 so that the correlation memory may be used as a convolution memory.

The lengths of the chains are 8-, 16-, 32-, and 64-bits. Only certain groups of 8-bit modules support these lengths, as shown in FIG. 35B and tabulated in FIG. 35D. The following combinations are supported since they support the convolution method that is described later:

1. 8-bit—any column of reg 1 and reg 0 is acceptable. An example is U8 (3518) feeding U0 (3534) or U8 (3517) feeding U1 (3533).

2. 16-bit—any column of reg 0 and reg 1 containing a pair of adjacent U8's, where the right-most U8 receives a bit from the matrix memory that is a multiple of 16. An example is U8 (3516) feeding U8 (3515) which feeds U2 (3532) which feeds U3 (3531).

3. 32-bit—any column of reg 0 and reg 1 containing four adjacent U8's, where the right-most U8 receives a bit from the matrix memory that is a multiple of 32. An example is U8 (3514) feeding U8 (3513) feeding U8 (3512) feeding U8 (3511) feeding U4 (3530) feeding U5 (3529) feeding U6 (3528) feeding U7 (3527).

4. 64-bit—the entire 64-bit module works collectively, where the eight U8's feed from right to left into one another, with the left-most U8 (3511) feeding U0 (3534), and U7 to U0 feeding one another from right to left.

The effect of these varied groupings is to define a set of window widths that the correlation memory chip handles efficiently. Smaller widths may be handled by padding images with null picture elements as the image is loaded into the matrix memory of the correlation memory chip. Additionally, the interconnection hardware could be tailored to provide other sizes, but many applications are best served by the sizes shown.

The choice of window width is made by the multiplexer select lines listed in FIG. 34C. The height of the window is chosen by the placement of picture elements into the matrix memory, along with the use of the mask logic, as will be described.

FIG. 35C shows the 8-bit module of the matrix shift logic. The complexity of the interconnections between reg 0 and reg 1 is handled by the multiplexer, M, 3565. A parallel connection from each bit of reg 0 to a corresponding bit of reg 1 is also shown, as the connection from R 3548 to R 3564 via signal 3556. For simplicity, this parallel connection was not shown in FIG. 35B.

FIG. 35D is a table of matrix shift logic multiplexer inputs. Note that the apparent complexity of the interconnections as shown in FIG. 35B is reduced to a set of connections that are often insensitive to changes in the window width. This insensitivity results from the support of only selected grouping of portions of reg 0 and reg 1, as previously described. Thus U1, as shown in the Figure, can never form the least significant portion of any window width other than 8 bits, being tied to the most significant bit, reg 1 B7, of its lesser significant neighbor for window widths of 16-, 32-, and 64-bits.

FIG. 35E shows the block diagram of the 256-bit module of the buffer shift register. The module is divided into 32 8-bit modules, as 3571 to 3574, which are connected into a ring.

The buffer shift logic differs from the matrix shift logic in these ways:

1. There is a single buffer shift register, versus two matrix shift registers.
2. The ends of the buffer shift register are tied together, the ends of the matrix shift register are not.
3. The buffer shift register shifts from left to right, from higher significance to lesser significance, while the matrix shift register shifts the opposite direction.
4. The buffer shift register shifts with a displacement of eight bits, e.g., from bit 8 to bit 0, whereas the matrix shift register shifts with only one bit displacement, e.g., from bit 1 to bit 2. The buffer shift register thus acts like a barrel shifter.
5. The output of the buffer shifter may be written back into the buffer memory, while the output of the matrix shifter passes only to the processor logic.

The purpose for these various differences will be apparent from the description of the method for performing a convolution window computation using the correlation memory chip.

FIG. 35F shows the block diagram of the 8-bit module of the buffer shift logic. A multiplexer, M, as 3584 feeds a register, R, as 3586. The output of this register drives the buffer shifter bus 3588 and the buffer, B, 3585. The output of this buffer is turned on by bfr (buffer) row write in order to load the contents of the register back into the buffer memory.

The multiplexer as 3584 is controlled by bfr shft (shift) select. A load operation causes the buffer memory bus to be loaded into the register via the multiplexer, while a shift operation causes the buffer shifter in port 3587 to be entered into the register. As shown in FIG. 35E, the 8-bit modules are chained together so that shifts of 8-bits are made in a single cycle.

The distance of the shift that is made in one cycle is an engineering decision that trades off chip area, in terms of the number of signal paths required to implement a shift, versus performance in terms of the number of shifts that are required to move the data a particular distance. A window that is 2 (N+3) bits wide requires a sufficient number of shifts to move the data that far.

FIG. 36A is a picture element map that defines the notation that is used to describe the method of window convolution using correlation memory chips. In the Figure, the first letter of each picture element identifies the row, or line, while the second letter identifies the column. Each of these many picture elements may be represented by a multiplicity of bits, but that multiplicity of bits merely affects the number of correlation memory chips that is required to store that much precision, as was described for the convolution memory chip. These various bits have no bearing upon the flow of information within a correlation memory chip since each chip handles a picture element as though it had only a single bit of precision, and this flow is at the heart of the method used.

For simplicity, the examples to describe the method will use very small convolution windows, windows that are four columns wide and four rows high. One may extend these examples to whatever size one desires to use.

FIG. 36B defines groups of picture elements as "window 0,4N". One first notes that the four left-most and four right-most columns of picture elements are shown as zero. These zeroes are not stored in the matrix memory of the correlation memory, but result from initialization of the matrix shifter, as will be described. These zeroes enable multiple correlation memory chips to operate together to handle images with an arbitrarily large number of picture elements per line, unlike the sixteen shown in FIG. 36A.

The dots of FIG. 36B group the picture elements into 4*4 windows. The center of each window is denoted by a "+". The upper left picture element from which a window derives its name is underlined. Window 0,0 thus has picture element AA in its upper left-hand corner, and this picture element came from row 0 and column 0 of the picture element map. Similarly, picture element AM is in the upper left-hand corner of window 0,12 since it came from row 0 and column 12 of the picture element map.

A key part of the efficient method of computing convolution windows relies upon the transformation of a region of picture elements from a rectangle, typically a square, into a line. This transformation is significant because an entire row of the buffer memory or matrix memory may be accessed in a single cycle. Thus the four rows of picture elements of window 0,0 have been concatenated, starting from the top and working down as each row is placed after each other from left to right. Thus picture element BA follows picture element AD. The placement of this line of picture elements into columns of the matrix memory is also shown. This placement into columns is significant because of the various ways that these picture elements must be shifted in order to compute the convolution window. Line 0 of the image is typically placed in row 0 of the matrix memory, and so on, but only a limited number of lines need be stored in the matrix memory at one time, and once the use of a row in the matrix memory has been completed, another line of the image may be placed in the row.

FIG. 36C defines groups of picture elements as "window 0,4N+1". The upper left hand element of each window is now in column −3, 1, 5 and so on. Furthermore, one can see that as the left-most window progressed from position 0,−4 to position 0,−3, it picked up the first column of picture elements, comprising picture elements AA, BA, CA, and DA. Inversely, as window 0,12 moved to the right to become window 0,13, it picked up its first column of 0's.

FIG. 36D defines groups of picture elements as "window 0,4N+2". The upper left-hand element of each window is now in column −2, 2, 6 and so on. Furthermore, one can see that as the left-most window progressed from position 0,−3 to position 0,−2, it picked up the second column of picture elements, comprising picture elements AB, BB, CB, and DB. Inversely, as window 0,13 moved to the right to become window 0,14, it picked up its second column of 0's.

FIG. 36E defines groups of picture elements as "window 0,4N+3". The upper left-hand element of each window is now in column −1, 3, 7 and so on. Furthermore, one can see that as the left-most window progressed from position 0,−2 to position 0,−1, it picked up the third column of picture elements, comprising picture elements AC, BC, CC, and DC. Inversely, as window 0,14 moved to the right to become window 0,15, it picked up its third column of 0's.

The next step is not shown, for which the next group of picture elements is "window 0,4N+4". Since the window numbering is modulo 4, in which case one can refer back to FIG. 36B for "window 0,4N". In general, the windows operate modulo N, where N is the width of the window.

FIG. 36F defines groups of picture elements as "window 1,4N". The only difference between any window 0,4N and any window 1,4N is that the upper left-hand corner of the window is placed in row 1 rather than row 0, as shown in the Figure. Thus picture element BA is in the upper left-hand corner of window 1,0. The resulting linear sequence of picture elements for that window is also shown.

FIG. 37 shows the sequence of operations performed by the matrix shift registers to computer a 4*4 convolution. Great care has been taken so that groups of correlation memory chips may work together to build very large convolution windows and to efficiently handle very large images, i.e., images with many rows and columns of picture elements.

Continuing with the picture element map of FIG. 36A, the matrix shifter is initialized so that a zero output is obtained from each correlation memory chip for any window n, < −4, i.e., any window that is more than four columns to the left of the picture elements that are stored in the matrix memory.

For window 0,−4, the linear representation of the picture elements in window 0,0 is loaded into matrix shifter reg 0 from row 0 of the matrix memory.

At this point, the division of the matrix shifter according to the width of the convolution window is important because it affects the shifting of picture elements from reg 0 into reg 1. Both reg 0 and reg 1 shift to the left, where the left end of a section of reg 0, as column 15, is connected to the right edge of the same section of reg 1, as column 12. Although the minimum width for the preferred embodiment of the correlation memory chip is eight, this example assumes that a width of four is valid in order to simplify the explanation. The principle applies regardless of the width chosen.

For window 0,−3, the left-most bit (one of the bits of picture element AA) of each vertical group of four bits of reg 0 is shifted into the right-most position of reg 1 in the same group, shifting the entire left-most picture element when the actions of all correlation memory chips are considered collectively. Thus picture element AA is shifted from the left of reg 0 into the right of reg 1, and a don't care state, denoted as "xx", is shifted into the right side of reg 0. Picture elements BA, CA, and DA are handled similarly. The contents of reg 0 may now be seen to be the same as the contents of window 0,−3 as shown in FIG. 36C.

A dot product of the picture element bit-vector contained in matrix shift logic reg 1 and each member of the set of bit-vectors that represent the window coefficients is computed for each state of matrix shift logic reg 1.

The shifting process continues as shown with both matrix shifter reg 0 and reg 1 shifting until the window 0,−1 state is reached. If nothing were done to reg 0, it would be full of don't care states after shifting its last valid picture element, as AD, into reg 1 during the next shift. However, in order to maintain the flow of processing, reg 0 is loaded from matrix memory row 1 while its last valid picture elements are shifted into reg 1. The loading and shifting occur simultaneously and synchronously.

This cycle of shifting and loading continues as the window is moved through all horizontal positions of line 0 of the picture element map. When the last picture elements have been read from the line, the picture elements are padded with zero. This is accomplished as shown in window 0,12 of FIG. 37, where reg 0 is cleared, rather than loaded, as the last picture element is shifted from reg 0 into reg 1. These zeroes proceed to fill reg 1 on successive cycles. Once the last of the zeroes is shifted in reg 1 from reg 0, both registers are commanded to perform a no-op, maintaining a zero output from the correlation memory chip. This zero may be added without effect to the output of any additional correlation memories that contain additional picture elements from line 0 of the image. This combination of multiple chips is shown later in detail.

FIG. 38A shows examples of 16-point window coefficients. These coefficients may be arranged spatially in various ways, such as a rectangular array of two rows of eight columns each or four rows of four columns each. In any case, the coefficients, denoted as "cX", are mapped from a rectangular array into a linear array and stored in the buffer memory, just as the picture elements are mapped into linear arrays and stored in the matrix memory. The 4*4 square array is used throughout the following example.

FIG. 38B shows the zeroth memory map for the matrix memory and the relative placement of the coefficients in the buffer memory with respect to the matrix memory. Note that this initial placement of the coefficients pertains to all positions of picture element windows 0,X.

The next complexity of the method of convolution is now introduced.

The number of rows that is required in the matrix memory for the most cost effective and efficient operation is equal to the number of picture elements in each line of the image divided by the width of the convolution window (rounded up). If this condition is satisfied, then a picture element need be loaded only once into a correlation memory for all of the windows that use it. The effective width of each of these rows is equal to the total number of points in the window, i.e., the product of the window width and the window height. See FIG. 41.

As shown in FIG. 41, the number of rows is quite modest in many cases, generally being less than the 256 that one finds in a related device, a 64K*1 convolution memory that is organized as 256 rows of 256 columns. The dominant demand is thus not the number of rows in a correlation memory, but the number of points over which it computes a dot product. As will be shown, multiple correlation memories may be used together so that the number of points that a group of them can handle in a single cycle is the sum of their individual widths.

The way that the amount of storage that is required in each correlation memory chip is minimized is by recycling the storage as soon as the picture elements that a portion of it stores are no longer needed. This recycling is shown in FIG. 38C where a portion of the memory map is marked "changing", and the row 0 portion of that changing section is loaded with the information that pertains to the upcoming window 1,0 rather than the completed window 0,0. Thus as soon as the computations that currently use matrix memory row 0 are completed, picture elements AA, AB, AC, and AD may be discarded and be replaced by picture elements EA, EB, EC, and ED. Since the matrix shifters contain the picture elements from row 0, as shown in FIG. 37, these four new picture elements may be obtained from the external image memory and be loaded into the matrix memory after the row 0 fetch is made but before the next access is made, which is to row 1, to obtain the picture elements needed for the next group of four windows. The amount of time available to obtain these new elements is proportional to the product of the number of bits of precision of the window coefficients and the width of the window, in which case a relatively large number of cycles is typically available to load the data.

FIG. 38D shows that a portion of matrix memory row 1 has been loaded with picture elements EE, EF, EG, and EH, while FIG. 38E shows that a portion of matrix memory row 2 has been loaded with picture elements EI, EJ, EK, and EL, preparing these rows for computations using window 1,4 and window 1,8, respectively.

FIG. 38F shows that all picture elements, as Ax, from line 0 of the image have been replaced by the picture elements, as Ex, from line 4 of the image, thus an entire region of the matrix memory has changed, as noted in the Figure.

At this point the window coefficients must be realigned with the columns of the image to which they apply. A circular shift right of four columns, from column of greater significance to column of lesser significance, is thus required since the top line of window 1,0 is line 1 of the image, containing picture elements as Bx that are stored in columns 11 to 8 of the matrix memory, whereas the previous top line of the matrix memory was stored in columns 15 to 12 of the matrix memory. By circular shift is meant that the coefficients that are shifted out of one end are entered into the other end.

Note that the coefficients are shifted across the entire length of all of the picture elements that comprise the window, rather than across only the width of the window, and that the shift is to the right rather than to the left, as is the case for the shifting of the picture elements by the matrix shift logic.

The shifting of the coefficients is performed by the buffer shifter. Rather than shifting by one column at a time, the shift is ideally as long as the window is wide. However, this shifting is made infrequently, only following the completion of an entire line of the image. The design of the correlation memory performs this shifting of coefficients as economically as possible, causing a short pause in the computation of convolution windows. This pause is consistent with a slight pause that many systems experience between the end of processing one line and the beginning of the next line.

The details of this shifting of coefficients are as follows:

1. Row n of the buffer memory is loaded into the buffer shifter. (For simplicity of explanation, assume that this row stores the least significant bit-vector of the window coefficients.)
2. Row n of the buffer memory is set (using the buffer set row operation) while the buffer shifter is circularly shifted (rotated) to the right. As many shifts are performed as are necessary depending upon the width of the window and the distance that the buffer shifter can shift in a single cycle, e.g., eight bits as shown in FIG. 35E.
3. The contents of the buffer shifter are written back into row n of the buffer memory. 4. This sequence is repeated for all of the bit-vectors that are stored in the buffer memory and comprise the coefficients being used for the current convolution.

A complication arises to this procedure when multiple correlation memory chips are used to increase the number of points in the window beyond the number of points that may be handled by one chip. A modified procedure to handle this complication is described in a later section.

FIG. 38G shows the memory map for the computation of window 2,0 using row 0 of the matrix memory. The Fx picture elements have been loaded into the memory in place of the Bx picture elements. Since the top of the window is now in columns 7 to 4, the Cx columns of the image, the window coefficients have been shifted again to be in the proper position.

FIG. 38H shows the memory map for the computation of window 3,0 using row 0 of the matrix memory. The Gx picture elements have been loaded into the memory in place of the Cx picture elements. Since the top of the window is now in columns 3 to 0, the Dx columns of the image, the window coefficients have been shifted again to be in the proper position.

FIG. 38I shows the memory map for the computation of window 4,0 using row 0 of the matrix memory. The Hx picture elements have been loaded into the memory in place of the Dx picture elements. Since the top of the window is now back to its original position in columns 15 to 12, the Ex columns of the image, the window coefficients have been shifted again to their original position, and the cycle now repeats through the remainder of the lines of the image.

FIG. 39 shows an example of image size expansion using two correlation memory chips. In the event that the number of picture elements in one line of the image and the width of the convolution window are such that one correlation memory chip cannot store all of the picture elements for a line of the image, multiple correlation memory chips may be used. In this case, the correlation memory chips are used in such a way that the convolution window slides from one correlation memory chip to the next while the dot product outputs of the chips are being added. Care is taken in the handling of the picture elements in each correlation memory chip so that a zero output is obtained when the window is outside of the region of the image that a particular correlation memory chip handles, and so that the gradual handover from one chip to the next is done correctly.

For example, correlation memory chip 0 is shown to store window 0,8 (3900) and window 0,12 (3901), as well as storing, in effect, window 0,16 (3902) and beyond as all zeroes. Correlation memory chip 1 is shown to store, in effect, window 0,12 (3903) and less as all zeroes, plus picture elements for window 0,16 (3904), window 0,20 (3905), and beyond.

One example of the transition from correlation memory chip 0 having a non-zero output to correlation memory chip 1 having a non-zero output demonstrates the principle of adding the output of the two to enlarge the image storage capacity. This is shown for window 0,14 as 3909 for correlation memory chip 0 and as 3910 for correlation memory chip 1.

Each of the two chips has two columns of (binary) picture elements and two columns of zeroes, chip 0 having the zeroes on the right and chip 1 having the zeroes on the left. The dot product for each chip is shown, as is the sum of the two outputs which represents the convolution of all the picture elements in window 0,14 with the coefficients in the window.

While this example has been stated in terms of two chips, it is also applicable to the operation of two blocks of correlation memory chips in order to obtain as much precision of the picture elements as is required.

FIG. 40A is the block diagram or a correlation memory block that handles a 32*32 window. As shown in the table in FIG. 41, such a large window requires the cooperation of multiple groups of correlation memory chips in order to compute a 1024-point dot product in a single cycle per bit of coefficient precision when a typical, single chip can perform only a 256-point dot product.

The column-vector, which represents the coefficients of the window, is fed to four groups of correlation memory chips as 4001 to 4004. Each group of chips has as many chips as are required to provide the required precision for the picture elements. A typical figure is eight-bit precision, in which case a total of 4*8=32 correlation memory chips are required. One observes that this arrangement results in the operation upon a 32*256-bit=8192-bit word every cycle.

The dot product output from each of the correlation memory chips in a group as 4001 feeds a weighted adder as 4009. The outputs of all of the weighted adders 4009 to 4012 feed a single vector accumulator chip 4017 that has sufficient precision to handle 1024-point dot products. As with the convolution memories described earlier, one cycle is required per bit of precision of the column-vector, unless other degrees of parallelism are applied as shown in FIG. 25. Note that in this case the vector accumulator equally weights the outputs from the weighted adders since the numerical significance of the data from all four weighted adders is the same.

Note also that there are no connections between correlation memory blocks where the output of one feeds the input to another. Care has been taken to reduce the number of pins of the correlation memory chip, as will be described.

FIG. 40B defines the notation used to describe the coefficients of the 32*32 window. The initial placement of these coefficients into the lower numbered rows of the buffer memory of each convolution memory chip is also shown. The placement is critical since the method for moving the coefficients with respect to the picture elements requires that information be placed properly in the various groups of correlation memory chips.

FIG. 40C shows the placement of a second set of coefficients in the higher numbered rows of the buffer memory prior to the completion of the processing for the first line of the image. Recalling from FIG. 38 that the coefficients must be shifted following the completion of every line of the image, the coefficients must be shifted a distance equal to the width of the window, 32 columns in this case, after the completion of one line and prior to starting the next line.

However, since in this example one chip can handle only a portion of the window, the window coefficients must, in effect, cross chip boundaries. Such a crossing would be very expensive if pins were dedicated to the purpose. A modest, 8-bit wide buffer shifter path would cost 16 pins per chip, 8 on the left and 8 on the right, and these pins would rarely be used—only a few cycles at the end of a line of the image.

The design of the correlation memory avoids this potential waste of pins by keeping the rotation of the coefficients within a chip by preloading a portion of the buffer memory with the coefficients that would have been obtained if the shifting would have crossed a chip boundary. Notice, therefore, that the coefficients on the extreme right end of each correlation memory chip have been so chosen. In correlation group 3, for example, coefficients C255,0 to C255,31 occupy the positions that formerly were occupied by coefficients C7,0 to C7,31 as shown in the previous Figure.

It is assumed that a second set of coefficients is stored in a section of buffer memory that is distinct from the section that is being used to perform the computations so that the loading of these coefficients may be performed while the previous set is being used.

FIG. 40D shows the buffer memory state after the coefficients have been shifted. As desired, the coefficients are now located as though they crossed chip boundaries.

The sequence for this movement of the coefficients is:

1. An initial set of coefficients is loaded into high addresses in the buffer memory (the choice of high or low is immaterial so long as they can be written efficiently from the buffer data port of the chip).

2. The storage cells in the low addresses in the buffer memory are set using the "buffer set row" function.

3. Each row of coefficients is copied from a high row to a low row by way of the buffer shifter.

4. Computations are performed using the coefficients in the low rows.

5. New coefficients are loaded into the high rows of the buffer memory in such a way that the row, when rotated within the chip, will contain the proper coefficients in all locations. The number of coefficients loaded into each correlation memory chip is the same as the width of the convolution window, and the new coefficients are placed into the lowest numbered columns of the chips.

6. The calculations for the current line of the image are completed.

7. Row (n+8), assuming 8-bit coefficients, of the buffer memory is loaded into buffer shift logic reg 0.

8. Row n and row (n+8) of the buffer memory are set and the contents of the buffer shift logic are shifted by the width of the window. This shifting may take multiple steps—4 steps assuming buffer shift logic with 8-bit movement per cycle.

9. The contents of buffer shift logic reg 0 are written into row n in order to perform the next set of computations and into row (n+8) in preparation for the next update of one portion of the coefficients.

10. Steps 7 to 9 are repeated for each additional bit-vector of the coefficients.

11. The computation of convolution windows is resumed.

FIG. 42 is the block diagram of a correlation memory chip with a common bus. This design is a combination of the design of the common bus version of the convolution memory as shown in FIG. 22A with the design of the correlation memory shown in FIG. 34A. Unlike the convolution memory that requires access to each of the buffer memory and the matric memory each cycle, in which case a common bus for both memories cuts the performance in half, the correlation memory accesses the buffer memory every cycle (assuming minimum latency), but only accesses the matrix memory after performing as many computations as the convolution window is wide times the number of bits of precision of the window coefficients.

A common bus thus reduces the performance of a correlation memory a small amount. This degradation decreases as the width of the window and the number of bits of precision of the window coefficients increase. However, unlike the convolution memory that takes the common bus as far as the processor cells, the correlation memory requires separate bfr (buffer) shift logic 4208 and mat(rix) shift logic 4209, so the design of the processor logic still requires two input buses.

An additional impact upon the design of the correlation memory when a common bus is used is that the ability to write shifted coefficients from the buffer shift logic back into the buffer memory must be maintained, so the common column sense amplifiers and read/write logic 4206 must be able to support this operation. Such operation was provided for in FIG. 13D, where the label "matrix memory bus" would be replaced by "common memory bus", but was listed as "for future expansion" in FIG. 14D part II, namely, this Figure.

As shown in FIG. 35C, the matrix memory shift logic has a two level deep pipeline, i.e., matrix shifter reg 0 and reg 1 are in series with the flow of data from the matrix memory to the processor logic, whereas the buffer shift logic 35F has only a one level deep pipeline consisting of buffer shifter reg 0. The address logic must thus be initialized in such a way that data from proper locations in the matrix memory and the buffer memory arrive at the processor logic at the same time.

This is accomplished as follows:

1. The buffer memory low limit latch (1501) is loaded with one less (modulo the number of rows for storing coefficients) than the usual value.

2. Reset and a buffer strobe are applied, loading the value in the low limit latch into the counter (1505).

3. The buffer memory low limit latch is loaded with the proper value for computing dot products.

4. Run is asserted and dot product computations are begun.

IV. 7 Applications According to this Invention

FIG. 43A is the block diagram of a convolution memory block used as an artificial neural network weighting element. The purpose of the circuit is to receive a set, or vector, of stimuli as the input column-vector 4300 and to produce a set of outputs, where each output results from the application of a presumably different set of weights to the input data vector.

The dot product output from the convolution memory block is passed to a programmable function unit 4305. If necessary, the output from the convolution memory block is truncated or rounded using conventional techniques in order to provide a suitable number of bits at the input to any block that receives its output.

It is sometimes desirable to provide a non-linear transfer function in artificial neural network circuits in order to suppress low level noise, particularly when the output from one circuit element is fed back into itself. The programmable transfer unit provides this capability.

Upon initialization, the controller 4309 loads a weight matrix into the convolution memory block 4301 and a transfer function into the programmable function unit 4305. This information is presumed to be resident in the controller, such as being stored in a ROM at the time of manufacture of the system. Other means for providing this data are shown in a later section.

The matrix memory row address logic must be initialized. Assuming that the majority of the rows in the matrix memory are used to store the weight matrix, then the loading of the matrix memory typically begins with row zero and progresses linearly upward. The matrix memory low limit latch is thus set to zero, and the matrix memory high limit latch is set to the address of the highest numbered row that is used.

The buffer memory row address logic must be initialized. Assuming that the majority of the columns in the matrix memory are used to store the input column-vector, then the loading of the buffer memory typically begins with column zero and progresses linearly upward. Assuming that the lowest numbered row or rows in the buffer memory store the bit-vectors of the input column-vector, then the buffer memory low limit latch is set to zero and the buffer memory high limit latch is set to the address of the highest numbered row that is used.

The external system that provides the input column-vector signals the controller via the handshaking signals that the input column-vector is ready to be loaded into the convolution memory block. The controller then sequences through as many locations in the buffer memory of the convolution memory block as are required to store the input column-vector. The controller counts the number of locations loaded in the buffer memory as the loading proceeds, and upon completion of the loading clears the row of mask bits in the buffer memory and then sets the mask bit in the buffer memory row of mask bits corresponding to each element that has been loaded. The mask register in the processor logic is then initialized and this updated row of mask bits is then moved into it. Computations may now proceed.

If the number of elements received from the external source does not vary, then the mask register operations may be ignored following initialization.

Operation of the convolution memory chip is quite simple at this point. Since there is typically only a single bit of precision of the input column-vector, the methods for the minimal latency and maximum latency multiplication of a matrix times a vector are the same. The convolution memory block is reset, setting the matrix memory address counter and the buffer memory address counter to the value of their respective low limit latches, and the run state is signalled by the controller. The multiplication of a row of the weight matrix times the input column-vector will now occur every clock cycle, where the clock cycle is defined by the buffer memory strobe. The result for that row will then appear at the dot product output after allowing for any pipeline delays in the tally logic. This result is then adjusted according to the transfer function in the programmable function unit 4305, the controller signals the system receiving the weighted vector that new results are available, and the result is passed on to the receiving system for further processing.

The controller maintains the run state long enough to process as many rows of weights as it has loaded into the convolution memory. Upon completion of the final dot product, the controller signals the system receiving the weighted vector that the operation has been completed.

FIG. 43B shows the block diagram of a simple way to realize a programmable function unit. A random access memory (RAM) 4321 may be loaded by the controller with a set of values that defines the transfer function. The column-vector output from the convolution memory block is then used to select a value that becomes the output from the programmable function unit.

The RAM is thus loaded by the controller by turning off the column-vector output from the convolution memory block, turning on buffer 4320 so that the controller may send addresses to the RAM, and writing data into the RAM via the buffer 4322.

FIG. 43C shows a typical transfer curve. The extension of the curve into the third quadrant is not shown. Any curve may be specified using the technique described above. A less than linear response is shown near the origin to suppress low level noise.

FIG. 44A shows the block diagram of a matched filter using a convolution memory block 4401. Unlike analog designs that have been described by Caltech, the design shown in the block diagram may handle arbitrarily large numbers of data points with arbitrarily high levels of precision using relatively easy, digital circuit design and fabrication techniques. In addition, the time for the digital circuit to determine a high precision response is often comparable to or less than the time required for an analog circuit to determine a low-precision response due to the problems of settling times and cross-coupling in an analog circuit.

The convolution memory block 4401 is initialized by the controller 4413. The weight matrix is loaded and the input column-vector is received from an external system as described for the circuit in FIG. 43A. However, the dot product output from the convolution memory chip 4401 is received by the best match logic 4405. Assuming that the value of a dot product reflects the degree of match between the weight vector in a row of the convolution memory and the input column-vector, then the weight vector that best matches the input column-vector may be determined by finding the largest value resulting from the various dot products.

This is the classical technique for matched filtering. The sequence of input column-vectors would reflect temporally-shifted or spatially-shifted inputs to which a best match is found.

The maximum value that is detected by the best match logic 4405 is then fed to the block access memory 4409. The block access memory then uses that best match value to choose a vector to send to the receiving circuit.

FIG. 44B shows the block diagram of the best match logic 4405. An input register 4420 receives the M bits from the convolution memory block. Assuming that typical, 64K*1,1*256-point*1-bit convolution memory chips are used, which can store only 256 rows or patterns, then there are more bits of precision than there are patterns to be matched.

The translator 4428 is loaded by the controller with a set of values that for each pattern convert the many possible values of the column-vector output that reflect that pattern into a single value. This translator is in fact a programmable function unit as shown in FIG. 43A.

The comparator 4422 compares the value in the temp(orary) register 4424 to the value in the input register 4420. If the value in the input register is greater than the value in the temp register, the value in the temp register is replaced by the value in the input register. After all samples, i.e., all elements of the column-vector output, have been evaluated, the contents of the temp register is transferred to the peak register 4427.

The temp register is initialized with the value of the first sample loaded into the input register. The time when sample Sn is present at Data In of the input register 4420 is Sample Time T(n). This sample is available at the output of the input register one clock cycle later at Sample time T(n+1). If this sample is loaded into the temp register 4424, it will be available at the output of the temp register at Sample Time T(n+2). The last sample is thus available at the output of the temp register at Sample Time T(last+2).

This timing sequence, like all other control signals, is provided by the controller 4413. It is assumed that there are two time intervals after the last sample is computed at Sample Time T(last) but before the next sample is computed at Sample Time T(first) to facilitate the handling of the data.

The peak output from the translator 4428 selects a block in the RAM 4444. The counter 4442 is cleared at the same time the peak register 4427 is loaded and, under control of the read block signal, is used to address the sequence of samples in the RAM that are within the block selected by the peak register as modified by the translator 4428.

Conventional digital signal processing uses for the convolution memory block 4401, in the absence of the best match logic 4405 and the block access memory 4409 are:

Fourier Transforms

Discrete fourier transforms, rather than fast fourier transforms, may readily be computed using convolution memory chips. A single set of 64K *1 chips, with the number of chips depending upon the required accuracy of the transform, may directly compute a full 256-point transform of a real input. This results from the fact that the 256-point discrete fourier transform is the product of a 256*256 matrix representing the fourier weights times a 256-point signal vector, producing a 256-point output vector of amplitude versus frequency.

Larger transforms, and real and imaginary parts, may be computed by recognizing the simple relationships between the sine and cosine functions. The difference between a 256-point transform and a 512-point transform may be reflected in the change in sign of the lowest frequency component at its midpoint. The difference between the sine and cosine transform may be produced by a shift in the placement of the input samples within the buffer memory with respect to the fourier weights in the matrix memory corresponding to a 90 degree phase shift. A single set of convolution memory chip chips may thus be employed to compute sine and cosine transforms of arbitrary size.

The use of convolution memory chips to compute discrete fourier transforms, rather than the use of dedicated fast fourier transform logic, makes sense when the performance is adequate and the programmable nature of the convolution memory chip is useful. In addition, modified transforms may be computed that could not otherwise be done.

Walsh-Hadamard Transforms

Walsh-Hadamard Transforms (WHT's) are analogous to fourier transforms in that they employ a set of orthogonal, harmonically related functions. They are far easier to compute, however, since they assume only two values, constituting a collection of square waves, rather than a continuum of values for sine and cosine waves. WHT's are thus ideally suited for computation using a single convolution memory chip chip which typically has only 1-bit precision.

FIG. 45 shows the block diagram of a digital bidirectional associative memory using convolution memory chips with expanded memory. This block diagram may be compared to FIG. 7 which shows the block diagram of a digital bidirectional associative memory using convolution memory chips as shown in FIG. 12A and vector filter chips as shown in FIG. 33A.

The activity of the circuit in FIG. 7 is only about 50% since one convolution memory block must compute its full set of outputs prior to the operation of the following convolution memory block which uses that first set of outputs as inputs. Each vector filter chip is thus busy only half the time as well.

A reduced number of chips may be used, and the utilization of these chips may be continuous, in the circuit shown in FIG. 45. Convolution memory chips as shown in FIG. 30 may be used, wherein one of the four 64K*1 matrix memories of the chip stores one weighting matrix, such as the "vertical coefficients" as shown in FIG. 8A, and another of its 64K*1 matrix memories would store the "horizontal coefficients" as shown in FIG. 8B. Using the bank select signal, the controller 4510 would choose one block of coefficients or the other as information is passed around the loop.

The number of storage locations in the vector filter chip 4505 would thus have to be double the number implied by FIG. 7 since the outputs from the horizontal matrix and the vertical matrix in the convolution memory blocks must be kept separate.

FIG. 46 is the block diagram of an attached processor. Any of the many configurations of convolution and correlation memories may be used.

It has previously been stated that the controller initializes the weight matrix in the convolution memory and the vector filter according to some predetermined pattern. This pattern may in fact be provided by a host processor 4607 which directly addresses the matrix memory in the convolution memory chip and the coefficients in the vector filter chip. The host processor would load these values as desired and place an input column-vector in the controller 4604. The host processor would then signal the controller to find the best match to that input vector, using a recursive technique as provided by the feedback from the vector filter 4602 back into the convolution memory block 4600, or to perform whatever other operation is desired, such as a simple, single-pass, multiplication of the matrix times the input column-vector in the convolution memory block.

The controller would provide the detailed timing to the convolution memory block and the vector filter block to perform the operations, then signal the host processor when the computations are done. This provision of control signals by the controller is in fact a form of microcode, but unlike most machines, such as those built from bit slice chips like the Advanced Micro Devices 2900, the microcode in FIG. 46 controls the flow of data, rather than the operations, such as ADD, Subtract, etc., performed upon that data.

FIG. 47A shows the block diagram of a hierarchical intelligent memory system. Multiple memory modules, 4700, 4701, 4703 and 4704, are provided. Each of these memory modules may be as shown in FIGS. 6, 7, or 43 or elsewhere within this disclosure, and the various modules may be of varying function.

These memory modules are arranged in a group, or plane, being connected to a switch network plane 4702. Each of the modules may receive data and control information from the switch network plane, and send data and control information to the switch network plane.

FIG. 47B shows a hierarchical network of such switch network planes, planes 4710, 4711, and 4712. These switch network planes are capable of passing information within themselves and between them, as well as to communicate with external sources, as stimulus in, and external receivers, as response out. Such hierarchical switching networks are known in the art as digital packet switches such as those based upon the ITT System 12 Digital Switch. Such switches send packets of control and data information between users in an asynchronous fashion. The control information includes routing information, which could select a particular destination in order to choose a particular type of memory system to be accessed, and the number of elements in the vectors, while the data information would be the vector itself.

The application of such a hierarchical memory system may be to identify moving objects. The input, or stimulus, to such a system may be an image sensor, receiving visible light, infrared, radar, sonar, or whatever is desired. This image would be moved through the system to the appropriate plane or planes of memory systems to determine what the moving object is and whether it requires any response.

The system is hierarchical so that information from the environment may be used to narrow and speed the search by choosing appropriate memory planes. Such information may identify whether the moving object is beneath the sea, on the sea, on the land, in the air or in space. Such high level features may be determined from the data, and these features are used to select other memory planes for further processing.

The switching network would convey the information from the image sensor to multiple memory planes simultaneously. This narrowing of the search would itself be made in a memory plane that is presented with information about the environment and is able to make a best-match to the situation to choose the next set of operations to perform.

Each level in the hierarchy would in turn make their best match to the data presented to them, determine the features of interest, and pass the information on to the next level of the hierarchy for additional processing.

In theory, an enormous, single plane memory system may be made that can be presented with all inputs and derive a best match response. This is not practical since many things have no bearing upon one another, and it is much more efficient to segment a system into groups of related objects. Thus airplanes would be compared against each other, and submarines would be compared against each other, but airplanes would not be compared against submarines.

FIG. 26 presented some performance estimates for various degrees of hardware parallelism and precision. Since the main characteristic of a pattern recognition system appears to be well suited to artificial neural network techniques, a basic module with 1-bit by 8-bit precision and built with modest fabrication technology could provide 8 billion multiply/accumulate operations per second and require only nine chips. (More advanced technology would reduce this to three.) Assuming three additional chips for interface and control, then a basic memory module requires twelve chips.

A system of 1024 such modules would then theoretically provide 8 trillion multiply/accumulate operations per second. Such a special purpose, pattern recognition supercomputer may be named a "TeraComputer" after "tera" for trillion. The size of such a system would likely be a few cubic feet, and the system would likely dissipate a few thousand watts when fully active.

Derating this performance figure by $\frac{2}{3}$ to $\frac{1}{4}$, as is common in translating the peak performance of a conventional supercomputer into the amount of delivered performance, yields 1 to 2 TOPS (trillion operations per second). Such derating compensates for non-optimum matrix sizes, various potential interconnection bottlenecks, and unforeseen difficulties.

Note, however, that this level of performance is consistent with the use of silicon CMOS operating at 32 MHz, whereas gallium arsenid logic typically operates 5 to 10 times faster, delivering proportionately more performance.

The primary purpose of this example is to show that an enormous amount of pattern recognition capability may be provided using a relatively small number of chips that integrate memory and processing together in an efficient fashion to implement the most basic of signal processing operation, the multiplication of a matrix times a vector.

What is claimed is:

1. A convolution memory chip comprising:
a matrix memory, the matrix memory comprising:
(a) matrix memory row address logic (1221), having a matrix address input, a matrix address control input, a matrix row address latch (1311) having an input coupled to the matrix address input and controlled by the matrix address control input for storing a matrix row address presented on the matrix address input, a matrix row address decoder (1313) having a plurality (R) of matrix row select outputs, the matrix row address decoder being coupled to the matrix row address latch and operable for activating one of the R matrix row select outputs in response to a content of the matrix address latch;
(b) a matrix memory cell array (1220), comprising a matrix of R rows by C columns of memory cells, the matrix memory cell array having matrix column buses coupled thereto, the matrix memory cell array being coupled to the R matrix row select outputs and responsive to an activation of one of the R matrix row select outputs for coupling each memory cell an associated one of the R rows to an associated one of the matrix column buses,
(c) matrix memory column sense amplifiers and read/write logic (1223) coupled to the matrix memory cell array through the matrix column buses and having a matrix data port for receiving and transmitting matrix data to means external to the convolution memory chip, logic (1223) further having an input for receiving the matrix column buses and producing in response to information conveyed by the matrix column buses C signals upon a matrix memory bus, logic (1223) further having having a column decoder (1354) coupled to the matrix address and responsive to a matrix column address being input thereon for decoding the matrix column address and asserting a corresponding matrix column select signal for selecting a memory cell corresponding to the row address latched in the matrix row address latch, the operation of the column decoder causing a transfer of N bits of information between the selected row of the matrix memory cell array and the matrix data port, a buffer memory, the buffer memory comprising:
(d) buffer memory row logic (1232) having a buffer address input coupled to a buffer address, a buffer address control input, a buffer row address latch (1511) coupled to the buffer address input and controlled by the buffer address control input for latching a buffer row address appearing on the buffer address, a buffer row address decoder (1513) having an input coupled to an output of the buffer row address latch and responsive to a buffer row address latched therein for activating one of a plurality (V) of buffer row select outputs of the decoder,
(e) a transpose buffer memory cell array (1231), comprising a matrix of V rows by T columns of memory cells, the transpose buffer memory cell array having buffer memory column buses coupled thereto, and, in response to an activation of one of the V buffer row select outputs, connecting each memory cell in an associated one of the V rows to an associated buffer memory column bus for transferring W bits of information between one column of the buffer memory cell array and a buffer data port,
(f) buffer memory column sense amplifiers and read/write logic (1229) having an input coupled to the buffer address and responsive to a buffer column address appearing thereon for selecting a column of the buffer memory cell array for transferring information between the buffer data port and the buffer memory cell array, and also for receiving the buffer column bus and producing in response to signals appearing thereon T signals upon a buffer memory bus, the convolution memory chip further comprising processor logic, the processor logic being coupled between the matrix memory bus and the buffer memory bus and comprising:
(g1) processor logic cells (1225) coupled to the matrix memory bus and to the buffer memory bus for performing operations upon data received from the matrix memory bus and the buffer memory bus, the processor logic cells having an output coupled to a processor cell bus for expressing thereon data resulting from the operations, and
(g2) global logic (1227), coupled to and receiving the processor cell bus for performing operations upon the data received from the processor cell bus and producing an output expressive of the performed operations.

2. A chip as described in claim 1, wherein the number of bits in each of the buffer memory bus and the matrix memory bus is the same, wherein there is one processor logic cell for each bit of the matrix memory bus, and wherein the operation performed by each of the processor logic cells is:

processor cell bus bit n =

(matrix memory bus bit n) LOGICAL AND (buffer memory bus bit n).

3. A chip as described in claim 2, wherein a function performed by the global logic is to count a number of processor logic cells having a true output and to provide the count as a dot product output.

4. A chip as described in claim 3, wherein the matrix memory bus and the buffer memory bus have the same number of bits, and the number of active bits is 64 times an integer power of two, and wherein the processor logic additionally comprises:
  (a) matrix shift logic (3403), receiving a window width select signal and comprising:
  (a1) matrix register 0 which receives the matrix memory bus in response to a load matrix register 0 command, is cleared in response to a clear matrix register 0 command, and shifts its contents by one bit in response to a shift register 0 command, wherein bit n is shifted into bit (n+1),
  (a2) matrix register 1 which receives a parallel output of matrix register 0 in response to a load matrix register 1 command, produces a matrix shifter bus as a parallel output, is cleared in response to a clear matrix register 1 command, and shift its contents by one bit in response to a shift register 1 command, wherein bit n is shifted into bit (n+1) unless:
  (a2a) if (window width select=8-bits) and {(n modulo 8)=0}, then matrix register 1 bit n input=matrix register 0 bit (n+7) output, or
  (a2b) if (window width select=16-bits) and {(n modulo 16)=0}, then matrix register 1 bit n input=matrix register 0 bit (n+15) output, or
  (a2c) if (window width select=32-bits) and {(n modulo 32)=0}, then matrix register 1 bit n input=matrix register 0 bit (n+31) output, or
  (a2d) if (window width select=64-bits) and {(n modulo 64)=0}, then matrix register 1 bit n input=matrix register 0 bit (n+63) output,
  (b) the processor logic further comprising buffer shift logic (3408), the buffer shift logic comprising:
  (b1) buffer register 0 which receives the buffer memory bus in response to a load buffer register 0 command and which includes a parallel output coupled to a buffer shifter bus, is cleared in response to a clear buffer register 0 command, and shifts in response to a shift buffer register 0 command, where the shifting is from bit n to bit (n−d), except that the "d" least significant bits feed the "d" most significant bits,
  (b2) a buffer that in response to a buffer row write signal passes a buffer shifter bus bit n to a buffer memory bus bit n for all bits of both the buffer shifter bus and the buffer memory bus,
and the processor logic cells include means for coupling the processor logic cells to the buffer shifter bus and the matrix shifter bus instead of the buffer memory bus and the matrix memory bus, respectively, in order to provide a correlation memory chip.

5. A chip as described in claim 4, additionally comprising:
  a matrix/buffer select signal that is asserted when a matrix memory operation is to be performed;
  means for coupling column "n" of the buffer column bus to column "n" of the matrix column bus for each of the bits of the buses so that when the matrix/buffer select signal is not asserted, information from the buffer memory cell array may be conveyed to the matrix memory bus by the matrix memory column sense amplifiers and read/write logic, and when the matrix/buffer select signal is asserted, information from the matrix memory cell array may be conveyed to the matrix memory bus by the matrix memory column sense amplifiers and read/write logic;
  matrix memory column sense amplifiers and read/write logic for conveying the output from the buffer shift logic to the buffer memory cell array for storage; and wherein
  the buffer shift logic is coupled to the matrix memory bus instead of the buffer memory bus.

6. A chip as described in claim 4, wherein the processor logic cells further comprise:
  (a) a mask register that receives the buffer shifter bus instead of the buffer memory bus, and
  (b) an exclusive-OR gate and a multiplexer, wherein the multiplexer, under control of a select signal, S, chooses between the output of an AND gate and the output of the exclusive-OR gate, so that the operation performed by each processor logic cell is:

cell n output = {(matrix shifter bus bit n) LOGICAL-AND (buffer shifter bus bit n) LOGICAL-AND S} LOGICAL OR {(matrix shifter bus bit n) LOGICAL EXCLUSIVE-OR (buffer shifter bus bit n) LOGICAL-AND (NOT S)}

LOGICAL-AND (mask register bit n), where this output is conveyed to the input of the global logic.

7. A chip as described in claim 1, additionally comprising:
  (a) buffer memory row logic comprising:
  (a1) a buffer low limit latch (1501) receiving the buffer address at an input and capturing the state of the input when commanded by a buffer low limit strobe,
  (a2) a buffer high limit latch (1502) receiving the buffer address at an input and capturing the state of the input when commanded by a buffer high limit strobe,
  (a3) a buffer comparator (1508) that when enabled by a run signal compares an output of the buffer low limit latch to an output of the buffer high limit latch and asserts a buffer equal signal at an output when the outputs are equal,
  (a4) the buffer row address latch (1511) receiving the buffer address at the input, and capturing the state of the buffer address when commanded by a buffer row address strobe,
  (a5) a buffer counter (1505), receiving a clock signal at a clock input, receiving the run signal at a count enable input, and receiving the output of the buffer low limit latch at a parallel data input and capturing the state of the parallel data input when commanded by a simultaneous assertion of a load input and the clock input, where load input is asserted when a reset signal is asserted or when the buffer equal signal is asserted, and where the counter increments each time that it receives a clock signal while the count enable input is asserted, (a6) a buffer multiplexer (1510) that receives an output of the buffer counter at an INPUT1, the output of the buffer row address latch at an INPUT2, and the run signal at a select input for selecting the buffer row address latch for an output when the run signal is false, (a7) a buffer decoder (1513) that receives the output of the buffer multiplexer at an input and in response thereto asserts one of a plurality of outputs, the plurality of outputs being coupled to the buffer memory row select lines, (b) matrix memory row logic comprising:

(b1) a matrix low limit latch (1301) receiving the matrix address at an input and caputuring the state of the input when commanded by a matrix low limit strobe, (b2) a matrix high limit latch (1302), receiving the matrix address at an input and capturing the state of the input when commanded by a matrix high limit strobe, (b3) a matrix comparator (1308) that when enabled by the buffer equal signal compares an output of the matrix low limit latch to an output of the matrix high limit latch and asserts a matrix equal signal at an output when the outputs are equal, (b4) the matrix row address latch (1311), receiving the matrix address at the input, and capturing the state of the matrix address when commanded by a matrix row address strobe, (b5) a matrix counter (1305), receiving a clock signal at a clock input, receiving the buffer equal signal at a count enable input, and receiving the output of the matrix low limit latch at a parallel data input and capturing the state of the parallel data input when commanded by a simultaneous assertion of a load input and the clock input, where load input is asserted when the reset signal is asserted or when the matrix equal signal is asserted, and where the matrix counter increments each time that it receives a clock signal while the count enable input is asserted, (b6) a matrix multiplexer (1310) that receives an output of the matrix counter at an INPUT1, the output of the matrix row address latch at an INPUT2, and receives the run signal at a select input for selecting the matrix row address latch for an output when the run signal is false, and (b7) a matrix decoder (1313) that receives the output of the matrix multiplexer at an input and in response thereto asserts one of a plurality of outputs, the plurality of outputs being coupled to the matrix memory row select lines, 8. A chip as described in claim 7, additionally comprising:

processor logic cells that include a single-bit mask register (1412) in each cell, where a mask register bit n is loaded from a buffer memory bus bit n in response to a load signal, and wherein the operation performed by each logic cell is:

cell n output = (matrix memory bus bit n) LOGICAL AND (buffer memory bus bit n) LOGICAL AND (mask register bit n).

9. A chip as described in claim 1, wherein the matrix memory is chosen from the set of dynamic random access memory, static random access memory, pseudo-static random access memory, read only memory, erasable read only memory, and electrically erasable read only memory.

10. An integrated circuit device for executing matrix operations of the form {A} operated upon by {B} equals {C}, where {A}, {B} and {C} are each a matrix having a plurality of elements expressed in either unsigned or in two's complement format, comprising:

at least one first array of data storage means organized as (j) physical rows and (k) physical columns of bits, an individual one of the (j) rows providing storage for one bit of each of a plurality of elements of a row vector of the matrix {A}, an individual one of the (j) rows storing bits of a same binary weight;

at least one second array of data storage means organized as (m) physical rows and (n) physical columns of bits, an individual one of the (m) rows providing storage for storing a same binary weight bit of each of a plurality of elements of a column vector of the matrix {B};

means, having inputs coupled to said first array of data storage means and to said second array of data storage means, for processing in a predetermined manner a specified one of the (j) rows of the first array of data storage means with a specified one of the (m) rows of the second array of data storage means for producing a plurality of (x) output bits; and means, coupled to said processing means, for determining a number of the output bits having a specified logic state.

11. An integrated circuit device as set forth in claim 10 wherein said processing means comprises means for multiplying bits of the specified one of the (j) rows of the first array of data storage means times corresponding bits of the specified one of the (m) rows of the second array of data storage means.

12. An integrated circuit device as set forth in claim 10 wherein said processing means comprises means for exclusive-ORing bits of the specified one of the (j) rows of the first array of data storage means with corresponding bits of the specified one of the (m) rows of the second array of data storage means.

13. An integrated circuit device as set forth in claim 10 wherein said processing means comprises means for storing a plurality of mask bits, and wherein said processing means further comprises means for combining bits of the specified one of the (j) rows of the first array of data storage means with corresponding bits of the specified one of the (m) rows of the second array of data storage means, said processing means further comprising means for logically combining a resulting bit of the combination with a corresponding one of the mask bits to produce a corresponding one of the output bits.

14. An integrated circuit device as set forth in claim 10 wherein at least said first array of data storage means is comprised of dynamic random access memory, static random access memory, pseudo-static random access memory, read only memory, erasable read only memory, ferroelectric memory, electrically erasable read only memory or of combinations thereof.

15. An integrated circuit device as set forth in claim 10 wherein said determining means comprises means for counting a number of the output bits having a specified logic state.

16. Apparatus for multiplying a matrix, said matrix having R rows and C columns of matrix elements each represented by MP matrix precision bits in either unsigned or in two's complement notation, by a column-vector having C rows of column-vector elements each represented by VP vector precision bits in either unsigned or in two's complement notation, said apparatus comprising a plurality of integrated circuit devices for storing and for processing at least the matrix and the column-vector and for outputting a result of a multiplication therebetween, said apparatus further comprising means, coupled to said devices, for controlling the operation thereof to sequentially process rows of the matrix, an individual one (N) of said integrated circuit devices comprising:

at least one first array of data storage means organized as a two dimensional array of physical rows and physical columns of bits for storing a same binary weight bit (N) of each of a plurality of the matrix elements such that a bit of a matrix element (a,b) is stored at a row (a+mo), column (b) of said first array of data storage means, where mo is an offset;

a second array of data storage means organized as at least a one dimensional array of bits for storing at least one column-vector such that a bit (m) of a first column-vector element (j) is stored in a row (m+vo), bit (j) of said second array of data storage means, where vo is an offset;

means, having inputs coupled to one of said at least one first array of data storage means and to an associated one of at least one of said second array of data storage means, for multiplying a specified one of the rows of the first array of data storage means by a specified one of the rows of the second array of data storage means for producing a plurality of output bits; and means, coupled to said multiplying means, for counting a number of the result bits having a specified logic state for producing a partial product expressive of the processing of a specific row of the first array of data storage means and a specific row of the second array of data storage means;

said apparatus further comprising, means, coupled to said plurality of integrated circuit devices, for generating a dot product from a plurality of said partial products.

17. A method of multiplying a matrix times a vector, comprising the steps of:

storing a matrix, the matrix being comprised of elements each having (n) bits of precision, within (n) first two-dimensional memory arrays, each of said arrays being organized as physical rows and physical columns of memory storage cells such that (a) all of the bits of all of a plurality of the elements are stored in a same one of the first two-dimensional memory arrays, where the bits stored in any one of the arrays all have a same binary weight, (b) each row of the matrix is stored in a physical row of memory storage cells, (c) successive rows of the matrix are stored in successive physical rows of memory storage cells; and (d) each column of the matrix is stored to coincide with a physical column of the memory storage cells;

storing a column vector, each element having (m) bits of precision, within (n) second two-dimensional memory arrays, each array being organized as physical rows and physical columns of memory storage cells, such that each element of the vector is stored to coincide with a physical column of the memory storage cells and same-binary weight bits are stored in a physical row of storage cells;

for each desired physical row of the first two-dimensional memory array, simultaneously multiplying each of a multiplicity of the bits of a physical row of the first two-dimensional memory array by a corresponding bit of a physical row of the second two-dimensional array and adding the resultant bits to produce a partial product thereof;

scaling as a function of matrix bit binary weight and adding multiple partial products to produce an intermediate result; and scaling as a function of column-vector bit binary weight a succession of the intermediate results to produce a dot product.

18. A row-serial, bit serial, element-parallel method for multiplying a matrix times a vector with minimum latency, comprising the steps of:

(a) providing a matrix having R rows and C columns of elements, each of these elements being represented by MP (matrix precision) bits in two's complement notation, (b) providing a column-vector having C elements, each of these elements being represented by CVP (column-vector precision) bits in two's complement notation, (c) providing a mask vector having C 1-bit elements, where element B must be true for column B of the matrix to be included in a computation, (d) providing a system comprising MP modules plus global control and combinatorial logic, each module comprising a matrix memory, a buffer memory, C processor cells, and tally logic, storing a bit N of each matrix element in the matrix memory in module N such that an element (K, L) is placed in row K, column L of the matrix memory, storing the column-vector in the buffer memory in each module such that bit M of element J is stored in row M, bit J of the buffer memory, selecting rows of the matrix memory and selecting rows of the buffer memory and, with a processor cell P in module N, performing a computation in accordance with the expression:

cell $(P, N)$ = {mask$(P, N)$ LOGICAL AND buffer_memory_column$(P, N)$}, for any row of the buffer memory that is selected and for any row of the matrix memory that is selected, counting with the tally logic in module N a number of processor cells in module N having a true output as a result of the execution of the step of performing a computation, and producing a dot_product (N), for any row of the buffer memory that is selected and for any row of the matrix memory that is selected, and wherein the step of performing a computation includes the following steps for each row in turn of the matrix memory, for each row in turn of the buffer memory, and for all processor cells and tally logic at once:

(step 1) initializing a matrix row index (mri) to zero,
(step 2) initializing a buffer row index (bri) to zero,
(step 3) forming a weighted sum of all MP dot products in accordance with the expression:

$$\text{sum} = \{\{2^\wedge 0 * \text{dot\_product}(0)\} + \{2^\wedge 1 * \text{dot\_product}(1)\} + \ldots + \{2^\wedge(MP\text{-}2) * \text{dot\_product}(MP\text{-}2)\} - \{2^\wedge(MP\text{-}1) * \text{dot\_product}(T\text{-}1)\}\};$$

(step 4) determining a value of bri and if bri=0 setting a variable temporary=sum, or
(step 5) if bri=1 to CVP-2 setting temporary=-sum+½ temporary, or
(step 6) if bri=CVP-1 setting temporary={-1-*sum}+½ temporary,
(step 7) incrementing bri such that bri=bri+1 then processing a next bit-vector of the column-vector,
(step 8) determining if bri<CVP and if so then continuing execution of the method at step 3;
(step 9) otherwise completing processing of the matrix row and setting column_vector_out(mri)=2^(CVP-1)*temporary;
(step 10) incrementing mri to process a next row of the matrix;
(step 11) determining a value for mri, if mri<R, then continuing execution of the method at step 2; or
(step 12) if mri=R then stopping execution of the method.

19. A method as described in claim 18, wherein the step (9) includes an additional step of:

compensating a column vector in accordance with the expression:

(step 9.1) Compensated_column_vector_out(mri) =

$\{(2 * \text{column\_vector\_out}(mri)) - (\text{sum of all matrix elements in row } mri)\}$, the step of compensating providing for a binary column-vector, having states of 0 and 1, to produce a result as though it had states of −1 and +1.

20. A bit-serial, row-serial, element-parallel method for multiplying a matrix times a vector, comprising the steps of:

(a) providing a matrix having R rows and C columns of elements, each of these elements being represented by MP (matrix precision) bits in two's complement notation,
(b) providing a column-vector having C elements, each of these elements being represented by CVP (column-vector precision) bits in two's complement notation,
(c) providing a mask vector having C 1-bit elements, where element B must be true for column B of the matrix to be included in a computation,
(d) providing a system comprising MP modules plus global control and combinatorial logic, each module comprising a matrix memory, a buffer memory, C processor cells, and tally logic, storing a bit N of each matrix element in the matrix memory in module N such that an element (K, L) is placed in row K, column L of the matrix memory, storing the column-vector in the buffer memory in each module such that bit M of element J is stored in row M, bit J of the buffer memory, selecting rows of the matrix memory and selecting rows of the buffer memory and, with a processor cell P in module N, performing a computation in accordance with the expression:

cell $(P, N)$ = {mask$(P, N)$ LOGICAL AND buffer_memory_column$(P, N)$ LOGICAL AND matrix_memory_column$(P, N)$}, for any row of the buffer memory that is selected and for any row of the matrix memory that is selected, counting with the tally logic in module N a number of processor cells in module N having a true output as a result of the execution of the step of performing a computation, and producing a dot_product (N) for any row of the buffer memory that is selected and for any row of the matrix memory that is selected, and wherein the step of performing a computation includes the following steps for each row in turn of the matrix memory, for each row in turn of the buffer memory, and for all processor cells and tally logic at once:

(step 1) initializing a buffer row index (bri) to zero,
(step 2) initializing a matrix row index to zero,
(step 3) forming a weighted sum of all MP dot products in accordance with the expression:

$$\text{sum} = \{\{2^\wedge 0 * \text{dot\_product}(0)\} + \{2^\wedge 1 * \text{dot\_product}(1)\} + \ldots + \{2^\wedge(MP\text{-}2) * \text{dot\_product}(MP\text{-}2)\} - \{2^\wedge(MP\text{-}1) * \text{dot\_product}(T\text{-}1)\}\};$$

(step 4) determining a value for bri and if bri=0 setting a variable temporary(mri)=sum; or
(step 5) if bri=1 to CVP-2 setting temporary(mri)=-sum+½ temporary(mri); or
(step 6) if bri=CVP-1 setting temporary(mri)=(−1-*sum)+½ temporary(mri); and
(step 7) if bri=CVP-1 setting column_vector_out(mri)=2^(CVP-1)*temporary(mri);
(step 8) incrementing mri such that mri=mri+1 then processing a next row of the matrix,
(step 9) determining if mri<R and if so continuing execution of the method at step 3; otherwise
(step 10) incrementing bri to process a next bit-vector of the column-vector,
(step 11) determining a value for bri, if bri<CVP, then continuing execution of the method at step 2; or
(step 12) if bri=CVP then stopping execution of the method.

* * * * *